United States Patent [19]
Lannert et al.

[11] Patent Number: 6,101,489
[45] Date of Patent: Aug. 8, 2000

[54] SYSTEM, METHOD AND ARTICLE OF MANUFACTURE FOR A GOAL BASED SYSTEM UTILIZING A TIME BASED MODEL

[75] Inventors: Eric Jeffrey Lannert, Chicago, Ill.; Timothy John Gobran, Natick, Mass.; Karen Therese Smith, Chicago; Michael James Willow, Wheeling, both of Ill.; Jonathan Christian Conant, Worcester, Mass.; Scott Michael Murphy, Stratford, Conn.

[73] Assignee: AC Properties, B.V., Netherlands

[21] Appl. No.: 09/219,079

[22] Filed: Dec. 22, 1998

[51] Int. Cl.[7] .................................................. G06F 15/18
[52] U.S. Cl. .............................. 706/45; 706/47; 345/338
[58] Field of Search ....................... 706/45, 47; 345/338

[56] References Cited

U.S. PATENT DOCUMENTS

| | | | |
|---|---|---|---|
| 4,874,784 | 10/1989 | Clancey | 706/50 |
| 4,891,766 | 1/1990 | Derr et al. | 706/60 |
| 4,931,950 | 6/1990 | Isle et al. | 706/11 |
| 4,964,077 | 10/1990 | Eisen et al. | 345/337 |
| 4,977,529 | 12/1990 | Gregg et al. | 395/500.39 |
| 5,002,491 | 3/1991 | Abrahamson et al. | 434/322 |
| 5,170,464 | 12/1992 | Hayes et al. | 706/60 |
| 5,189,402 | 2/1993 | Naimark et al. | 345/473 |
| 5,208,745 | 5/1993 | Quentin et al. | 364/188 |
| 5,208,898 | 5/1993 | Funabashi et al. | 706/45 |
| 5,239,617 | 8/1993 | Gardner et al. | 706/11 |
| 5,267,865 | 12/1993 | Lee et al. | 434/350 |
| 5,310,349 | 5/1994 | Daniels et al. | 434/350 |
| 5,311,422 | 5/1994 | Loftin et al. | 395/500.23 |

(List continued on next page.)

FOREIGN PATENT DOCUMENTS

WO 98/03953  1/1998  WIPO .

OTHER PUBLICATIONS

Rik Min, Simulation Technology and Parallelism in Learning Environments [retrieved on Aug. 18, 1999]. Retrieved from the Internet <URL: http://www.to.utwente.nl/prj/min/Book/chapter1.htm>, 1995.

E.K. Tam et al., WITS: A Reusable Architecture for a VR–Based ITS [retrieved on Aug. 18, 1999]. Retrieved from the Internet <URL: http://advlearn.lrdc.pitt.edu/its–arch/papers/tam.html>, Jun. 1996.

Antoinette J. Muntjewerff, Automated Training of Legal Reasoning [retrieved on Aug. 18, 1999]. Retrieved from the Internet <URL: http://www.bileta.ac.uk/94papers/muntjew.html>, Apr. 1994.

(List continued on next page.)

*Primary Examiner*—Tariq R. Hafiz
*Assistant Examiner*—Michael Pender
*Attorney, Agent, or Firm*—Hickman Stephens & Coleman, LLP

[57] ABSTRACT

A system is disclosed that provides a goal based learning system utilizing a rule based expert training system to provide a cognitive educational experience. The system provides the user with a simulated environment that presents a business opportunity to understand and solve optimally. Mistakes are noted and remedial educational material presented dynamically to build the necessary skills that a user requires for success in the business endeavor. The system utilizes an artificial intelligence engine driving individualized and dynamic feedback with synchronized video and graphics used to simulate real-world environment and interactions. Multiple "correct" answers are integrated into the learning system to allow individualized learning experiences in which navigation through the system is at a pace controlled by the learner. A robust business model provides support for realistic activities and allows a user to experience real world consequences for their actions and decisions and entails realtime decision-making and synthesis of the educational material. The system is architected around a time based model to manage and control the system.

19 Claims, 79 Drawing Sheets

U.S. PATENT DOCUMENTS

| | | | |
|---|---|---|---|
| 5,317,688 | 5/1994 | Watson et al. | 345/377 |
| 5,359,701 | 10/1994 | Fukui et al. | 706/53 |
| 5,372,507 | 12/1994 | Goleh | 434/118 |
| 5,441,415 | 8/1995 | Lee et al. | 434/350 |
| 5,533,903 | 7/1996 | Kennedy | 434/307 R |
| 5,535,422 | 7/1996 | Chiang et al. | 345/338 |
| 5,537,141 | 7/1996 | Harper et al. | 348/12 |
| 5,539,869 | 7/1996 | Spoto et al. | 345/336 |
| 5,566,291 | 10/1996 | Boulton et al. | 345/326 |
| 5,576,844 | 11/1996 | Anderson et al. | 386/52 |
| 5,577,186 | 11/1996 | Mann, II et al. | 345/302 |
| 5,597,312 | 1/1997 | Bloom et al. | 434/362 |
| 5,616,033 | 4/1997 | Kerwin | 434/118 |
| 5,644,686 | 7/1997 | Hekmatpour | 706/45 |
| 5,673,369 | 9/1997 | Kim | 706/50 |
| 5,690,496 | 11/1997 | Kennedy | 434/307 R |
| 5,696,885 | 12/1997 | Hekmatpour | 706/59 |
| 5,720,007 | 2/1998 | Hekmatpour | 706/50 |
| 5,727,950 | 3/1998 | Cook et al. | 434/350 |
| 5,772,446 | 6/1998 | Rosen | 434/307 R |
| 5,788,508 | 8/1998 | Lee et al. | 434/350 |
| 5,791,907 | 8/1998 | Ramshaw et al. | 434/262 |
| 5,799,292 | 8/1998 | Hekmatpour | 706/11 |
| 5,806,056 | 9/1998 | Hekmatpour | 706/50 |
| 5,810,747 | 9/1998 | Brudney et al. | 600/595 |
| 5,822,745 | 10/1998 | Hekmatpour | 706/59 |
| 5,823,781 | 10/1998 | Hitchcock et al. | 434/118 |
| 5,823,788 | 10/1998 | Lemelson et al. | 434/350 |
| 5,835,683 | 11/1998 | Corella et al. | 706/59 |
| 5,868,575 | 2/1999 | Kuczewski | 434/118 |
| 5,870,768 | 2/1999 | Hekmatpour | 707/501 |
| 5,889,845 | 3/1999 | Staples et al. | 379/211 |

OTHER PUBLICATIONS

David McArthur, Artificial Intelligence and Mathematics Education [retrieved on Aug. 18, 1999]. Retrieved from the Internet <URL: http://www.rand.org/hot/mcarthur/Papers/aied.html>, Aug. 1992.

Tom Murray, Authoring Intelligent Tutoring Systems: An Analysis of the State of the Art [retrieved on Aug. 18, 1999]. Retrieved from the Internet <URL: http://www.cs.u-mass.edu/~tmurray/papers/ATSummary/AuthTools.html>, Jul. 1999.

David McArthur et al., The Roles of Artificial Intelligence in Education: Current Progress and Future Prospects [retrieved on Aug. 18, 1999]. Retrieved from the Internet <URL: http://www.nib.unicamp.br/recursos...education/intelligent--tutoring.html>, Apr. 1994.

Masoud Yazdani, Intelligent Tutoring Systems: An Overview [retrieved on Aug. 18, 1999]. Retrieved from the Internet <URL: http://www.intellectbooks.com/authors/lawlwer/its.htm>, 1986.

Daniel D. Suthers, Technical Report: Computer Aided Education and Training Initiative [retrieved on Aug. 18, 1999]. Retrieved from the Internet <URL: http://advlearn.lrdc.pitt.edu/advlearn/papers/FINALREP.html>, Jan. 1998.

Kiplinger TaxCut Press Releases [retrieved on Aug. 9, 1999]. Retrieved from the Internet <URL: http://www.taxcut.com/taxcut/98press_releases/pr98_nowshipping.html>, Dec. 1998.

Turbo Tax Deluxe Product Information [retrieved on Aug. 9, 1999]. Retrieved from the Internet <URL: http://www.intuit.com/turbotax/prodinfo/ttdlx.html >, Dec. 1998.

Lin Grensing–Pophal, Flexible learning, Feb. 1998, Credit Union Management vol. 21, No. 2, p. 32–33+.

Charles W. Calmbacher, Interactive multimedia instructs the individual, Oct. 1994, Occupational Health & Safety vol. 63, No. 10, pp. 144–145.

Jean–Francios Manzoni, Albert A. Angehrn, Understanding organizational dynamics of IT–enabled change: A multimedia simulation approach, Winter 1997/1998, Journal of Management Information Systems: JMIS, vol. 14, No. 3, pp. 109–140.

Marianne Kolbasuk McGee, Train with less pain, Oct. 13, 1997, Informationweek No. 652, pp. 150–154.

Engines for Education: URL: http://www.ils.nwu.edu/~e_for_e/nodes/I–M–INTRO–ZOOMER–pg.html; Viewed Feb. 15, 1999; Roger Schank; Web site claims 1994 copyright.

*Socialized Collaborative Learning in Multimedia Virtual Worlds*, Learning Environments, National University of Singapore; URL: http://www.iscs.nus.edu.sg/labs/learning/lels/VRML.html; Viewed Feb. 16, 1999.

C. D. Whittington, L. M. Campbell; Task–Oriented Learning on the Web; Innovations in Education and Training International; vol. 36, No. 1, Feb. 1999.

J. Gonzalez, J. V. Lopez, F. A. Bustio, P. Corcuera, E. Mora; Development of an Integrated Simulator and Real Time Plant Information System; Advances in the Operational Safety of Nuclear Power Plants, Proceedings of an International Symposium 1996.

Anup Kumar, Raj Pakala, R. K. Ragade, J. P. Wong; The Virtual Learning Environment System; $28^{th}$ Annual Frontiers in Education Conference; Conference Proceedings, vol. 2, Nov. 4–7, 1998.

Ramnath Chellappa, Anitesh Barua, Andrew B. Whinston; An Electronic Infrastructure for a Virtual University; Communications of the ACM, vol. 40, No. 9, Sep. 1997.

Wendy Doube; A Browser–based System to Support & Deliver DE; $28^{th}$ Annual Frontiers in Education Conference; Conference Proceedings, vol. 1, Nov. 4–7, 1998.

David A. Foster; FRA: Teaching Financial Accounting with a Goal–Based Scenario; Intelligent Systems in Accounting, Finance and Management, vol. 4, 1995.

David A. Foster; Real–World Analysis Skills Goal–Based Scenario; pp. 68–74.

Allan Collins; Goal–Based Scenarios and the Problem of Situated Learning: A Commentary on Andersen Consulting's Design of Goal–Based Scenarios; Educational Technology, Nov.–Dec. 1994.

Jack, M. Wilson, David N. Mosher; Interactive Multimedia Distance Learning (IMDL): The Prototype of the Virtual Classroom; 1994.

Interview Conducted by William Graham; Goal–Based Scenarios and Business Training: A Conversation with Roger C. Schank; Educational Technology, Nov.–Dec. 1994.

Joel Montgomery, Robert Campbell, Christine Moffett; Conducting and Supporting a Goal–Based Scenario Learning Environment; Educational Technology, Nov.–Dec. 1994.

Alan Nowakowski; A Special Section—Goal–Based Scenarios: A New Approach to Professional Education: Reengineering Education at Andersen Consulting; Educational Technology, Nov.–Dec. 1994.

Al Seagren, Britt Watwood; The Virtual Classroom: Great Expectations. Delivering Graduate Education by Computer: A Success Story; 1996.

Mark L. Lengnick–Hall, Virtual learning: A Revolutionary Approach to Building a Highly Skilled Workforce, Autumn 1998, Personnel Psychology Vol. 51, No. 3, pp. 767–771.

J. Bernard Keys, Robert M. Fulmer, Stephen A Stumpf, Microworlds and simuworlds: Practice field for the learning organization, Spring 1996, Organizational Dynamics vol. 24, No. 4, pp. 36–49.

George Cole, Learning with Computers, May 1994, Accountancy vol. 113, No. 1209, pp. 60–64.

Tony Burns, Multimedia training "Get lemonade, not a lemon!", Jun. 1997, Jounral for Quality and Participation vol. 20, No. 3, pp. 22–26.

Lin grensing—Pophal, Flexible learning, Feb. 1998, Credit Union Management vol. 21, No. 2, pp. 32–33+.

Charles W. Calmbacher, Interactive multimedia instructs the individial, Oct. 1994, Occupational Health & Safety vol. 63, No. 10, pp. 144–145.

Jean Francios Manzoni, Albert A. Angehrn. Understanding organizational dynamics of IT–enabled change: A multipedia simulation approach, Winter 1997/1998, Journal of Management Information Systems: JMIS, vol. 14, No. 3, pp. 109–140.

REVIEW EACH INVOICE, AND CREATE THE PROPER JOURNAL ENTRY BY DRAGGING THE APPROPRIATE
ACCOUNTS FROM THE ACCOUNT LIST TO THE JOURNAL.

| E BIKES | INTERNAL DOCUMENT | ASSETS | LIABILITIES & EQUITIES | REVENUES | EXPENSES |
|---|---|---|---|---|---|

DATE: 01/02
DESCRIPTION: AMOUNT
START-UP INVESTMENT IN E-BIKES FROM E-CORPORATE    $210,000.00

| | |
|---|---|
| 510 | COST OF GOODS SOLD |
| 513 | DIRECT MATERIAL VARIANCE |
| 515 | CASH DISCOUNTS EARNED |
| 571 | IMPUTED INTEREST EXPENSE |
| 580 | OTHER FINANCIAL CHARGES |
| 970 | INTEREST EXPENSE |
| 980 | US FEDERAL INCOME TAXES |
| 8100 | SALARIES AND WAGES EXPENSE |
| 8200 | PAYROLL ALLOWANCES |
| 8300 | EMPLOYEE BENEFITS |

TOTAL: $210,000.00

◁ BACK    2 OF 22    NEXT ▷

JOURNAL - Y1

| DATE | ENT. # | ACCOUNTS | | DR | CR |
|---|---|---|---|---|---|
| 1/31 | 1 | 471 | PAID-IN CAPITAL | $210,000.00 | |
| | | 10 | CASH | | $210,000.00 |

FIG. 14

REVIEW EACH INVOICE, AND CREATE THE PROPER JOURNAL ENTRY BY DRAGGING THE APPROPRIATE ACCOUNTS FROM THE ACCOUNT LIST TO THE JOURNAL.

| BC | BLUE CHIP SECURITIES | | ASSETS | LIABILITIES & EQUITIES | REVENUES | EXPENSES |
|---|---|---|---|---|---|---|
| SETTLEMENT INVOICE | | | | | | |
| DATE: 01/02 | INV. # 6578-31 | | 379 | PAYROLL TAXES ACCRUED | | |
| DESCRIPTION: $150,000.00 GOV. BONDS | | $150,000.00 | 380 | EMPLOYEE BENEFIT COST ACCRUED | | |
| | | | 381 | OTHER TAXES ACCRUED | | |
| NOTE FROM MANAGEMENT: WE WONT USE THE ENTIRE $210,000.00 WE GOT FROM CORPORATE THIS MONTH, SO WE PURCHASED THESE BONDS SO WE CAN EARN SOME INTEREST. | | | 391 | ACCRUED EXPENSES | | |
| | | | 401 | DEFERRED INCOME | | |
| | | | 419 | RESERVE FOR SUNDRY LOSES | | |
| | | | 421 | RESERVE FOR REPLACEMENT | | |
| | | | 462 | FOREIGN CURRENCY TRANSLATION ADJ. | | |
| TOTAL: $150,000.00 | | | 471 | PAID-IN CAPITAL | | |
| | | | 481 | RETAINED EARNINGS 1/1 | | |
| BACK | 2 OF 22 | NEXT | | | | |

| | | JOURNAL - Y1 | DR | CR |
|---|---|---|---|---|
| DATE | CNT. # | ACCOUNTS | | |
| 1/31 | 2 | 30 ACCOUNTS RECEIVABLE | $150,000.00 | |
| | | 10 CASH | | $150,000.00 |

FIG. 15

REVIEW EACH INVOICE, AND CREATE THE PROPER JOURNAL ENTRY BY DRAGGING THE APPROPRIATE ACCOUNTS FROM THE ACCOUNT LIST TO THE JOURNAL.

BELL PHONE COMPANY

PAID IN CASH

ACCOUNT NUMBER 001362
INVOICE NUMBER 5438169
INVOICE DATE: 01/24
AMOUNT DUE: $700.00

--- PLEASE DETACH AND RETURN THIS PORTION WITH YOUR PAYMENT

SUMMARY OF CHARGES
PHONE BILL: $660.37
TAX: $39.63
TOTAL AMOUNT DUE: $700.00

| ASSETS | LIABILITIES & EQUITY | REVENUES | EXPENSES |
|---|---|---|---|
| 379 | PAYROLL TAXES ACCRUED | | |
| 380 | EMPLOYEE BENEFIT COST ACCRUED | | |
| 381 | OTHER TAXES ACCRUED | | |
| 391 | ACCRUED EXPENSES | | |
| 401 | DEFERRED INCOME | | |
| 419 | RESERVE FOR SUNDRY LOSSES | | |
| 421 | RESERVE FOR REPLACEMENT | | |
| 462 | FOREIGN CURRENCY TRANSLATION ADJ | | |
| 471 | PAID-IN CAPITAL | | |
| 481 | RETAINED EARNINGS 1/1 | | |

◁ BACK    2 OF 22    NEXT ▷

JOURNAL - Y1

| DATE | ENT. # | ACCOUNTS | | DR | CR |
|---|---|---|---|---|---|
| 1/31 | 3 | 8506 | UTILITIES EXPENSE | $700.00 | |
| | | 10 | CASH | | $700.00 |

FIG. 16

Team Feedback

In looking at your first three journal entries:
- Source document 1 is journalized incorrectly. Consider what accounts are affected when cash is received by the business.
- You have incorrectly journalized source document 2. Take another look at the transaction details.
- You have correctly recognized source document 3 as an expense. However, you need to select a different expense account for your entry.

Close 0.080B

FIG. 17

Team Feedback

You need to correct the following in your first three journal entries:

- Source document 1 is still journalized incorrectly. Debit the appropriate asset account and credit the appropriate equity account. If you are still having trouble, review the accounting concepts.
- You have correctly recognized source document 3 as an expense. However, you need to select a different expense account for your entry.

Close 0.080B

FIG. 19

TRANSFORMATION ENGINE PERFORMS CALCULATIONS ON DOMAIN MODEL DATA

TRANSFORMATION ENGINE CAN MODIFY AND AUGMENT DOMAIN MODEL DATA

TRANSFORMATION ENGINE CAN TURN ON TOPICS IN REMEDIATION ENGINE

PROFILING ENGINE CAN TURN ON TOPICS IN REMEDIATION ENGINE

PROFILING ENGINE PERFORMS RULE BASED PATTERN MATCHING ON DOMAIN MODEL DATA

REMEDIATION ENGINE CAN INCLUDE ANY DIGITAL ASSET IN FEEDBACK (VIDEO, AUDIO, URL, ETC.)

REMEDIATION ENGINE USES PROVEN ALGORITHM TO COMPOSE AND DELIVER APPROPRIATE FEEDBACK

REMEDIATION ENGINE CAN MODIFY DOMAIN MODEL TO HIGHLIGHT OR FIX ERRORS FOR THE STUDENT

INTERFACE REBUILDS ITSELF FROM MODIFIED DOMAIN MODEL

STUDENT INTERACTS WITH INTERFACE. ACTIONS ARE REPORTED TO AND RECORDED IN THE DOMAIN MODEL

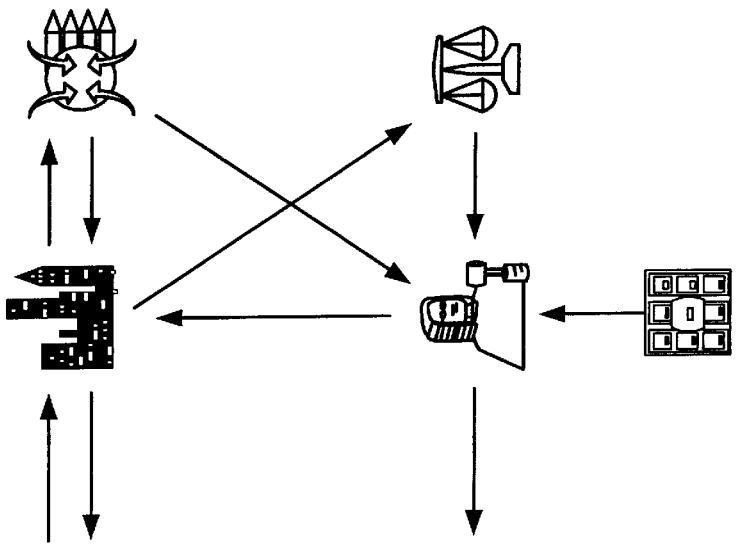

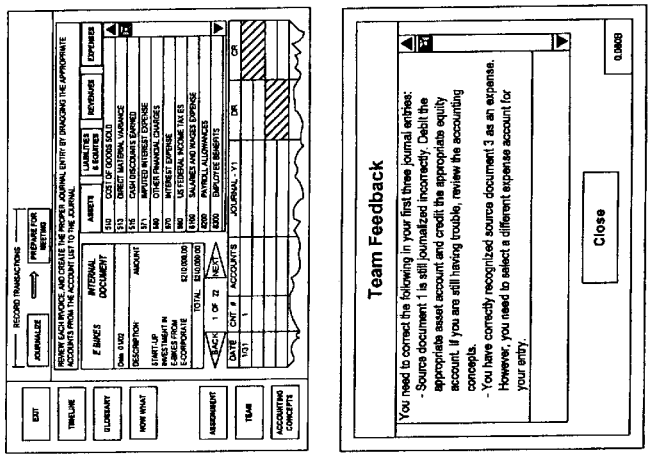

REVIEW EACH INVOICE, AND CREATE THE PROPER JOURNAL ENTRY BY DRAGGING THE APPROPRIATE ACCOUNTS FROM THE ACCOUNT LIST TO THE JOURNAL.

| COUNTRY WIDE INSURANCE | ACCT # 0793 | BILLING DATE 1/13 | 793- | | ASSETS | LIABILITIES & EQUITIES | REVENUES | EXPENSE |
|---|---|---|---|---|---|---|---|---|
| | INV # | | | | | | | |
| ITEM | DESCRIPTION OF SERVICES | 237 DATE OF SERVICES | AMT. DUE | | 8460 | LAND, BLDG &LG EQUIP RENTAL EXP | | |
| 1 | BUSINESS INSURANCE | JANUARY | $100.00 | | 8480 | INSURANCE EXPENSE | | |
| | | FEBRUARY | $100.00 | | 8502 | STANDARD TOOLS EXPENSE | | |
| | | MARCH | $100.00 | | 8504 | OFFICE SUPPLIES EXPENSE | | |
| | | | | | 8506 | UTILITIES EXPENSE | | |
| PLEASE PAY THIS AMOUNT | | | $300.00 | | 8508 | TELEPHONE EXPENSE | | |
| DATE DUE: | | | | | 8510 | LEGAL FEE EXPENSE | | |
| | | | | | 8512 | PROFESSIONAL FEE EXPENSE | | |
| ◁ BACK | 12 OF 22 | NEXT ▷ | | | 8514 | MISC SERVICES EXPENSE | | |
| | | | | | 8520 | SMALL EQUIPMENT RENTAL EXPENSE | | |

JOURNAL - Y1

| DATE | CNT. # | ACCOUNTS | | DR | CR |
|---|---|---|---|---|---|
| 1/31 | 12 | 120.1 | PREPAID INSURANCE | $200.00 | |
| | | 8480 | INSURANCE EXPENSE | $100.00 | |
| | | 10 | CASH | | $300.00 |

FIG. 29

FLOW CHART LEGEND FOR
FIG'S 36A, 36B, 36C AND 36D

TG = TARGETGROUP
CT = COACH TOPIC
CI = COACHITEM
PSL = PARAMETER SUBSTITUTION LANGUAGE
FBK = FEEDBACK

FIG. 37

| DISTINCT_INPUT ▼ | | 9999 | |
|---|---|---|---|
| | A | B | C | D |
| 1 | QUESTION 1 | | | |
| 2 | | 1 + 1 = | 9999 | |
| 3 | | | | |

FIG. 42

| | A | B | C | 4 |
|---|---|---|---|---|
| | DRAGDROP_IN... ▼ | | 0 | |
| 4 | QUESTION 2 | | | |
| 5 | | WHAT'S THE RESULT OF 4+2 ? | | |
| 6 | | A) 2 | | |
| 7 | | B) 8 | | |
| 8 | | C) 6 | | |
| 9 | | D) NONE OF THE ABOVE | | |
| 10 | | | | |
| 11 | | 1204 | 0 | |
| 12 | | | | |

FIG. 43

|  | 1 |  |  |  |  |
|---|---|---|---|---|---|
| 1.1 | 1.2 | 1.3 | ... | 1.n |  |
| 2.1 | 2.2 | 2.3 | ... | 2.n |  |
| . | . | . |  | . |  |
| . | . | . |  | . |  |
| . | . | . |  | . |  |
| n.1 | n.2 | n.3 | ... | n.n |  |

FIG. 44

| DRAGDROP_IN... ▼ | | 0 | |
|---|---|---|---|
| | A | B | C | 4 |
| 4 | QUESTION 2 | | | |
| 5 | | WHAT'S THE RESULT OF 4+2 ? | | |
| 6 | | A) 2 | | |
| 7 | | B) 8 | | |
| 8 | | C) 6 | | |
| 9 | | D) NONE OF THE ABOVE | | |
| 10 | | | | |
| 11 | | 1204 | 0 | |
| 12 | | | | |

FIG. 45

| | A | B | C | D | E | F | G |
|---|---|---|---|---|---|---|---|
| | DISTINCT_OUT... ▼ | | | =SUM(C24:C29) | | | |
| 13 | QUESTION 3 | | | | | | |
| 14 | IN A HARDWARE STORE YOU CAN FIND THESE PRODUCTS: | | | | | | |
| 15 | | | HAMMER | | $13.00 | | |
| 16 | | | SAW | | $15.00 | | |
| 17 | | | SCREWDRIVER | | $7.00 | | |
| 18 | | | CHISEL | | $4.00 | | |
| 19 | | | PAIL | | $12.00 | | |
| 20 | | | SANDPAPER | | $0.50 | | |
| 21 | SELECT THE MAXIMUM NUMBER OF PRODUCTS SO THAT THE TOTAL IS CLOSEST TO $20.00 | | | | | | |
| 22 | | | | | | | |
| 23 | | | | DESCRIPTION | | Actual Total | |
| 24 | ~MY LIST~1211 | | $7.00 | SCREWDRIVER | | $20.00 | |
| 25 | ~MY LIST~1213 | | $12.50 | PAIL | | | |
| 26 | ~MY LIST~1214 | | $0.50 | SANDPAPER | | | |
| 27 | | | | | | | |
| 28 | | | | | | | |
| 29 | | | | | | | |
| 30 | | | | | | | |

FIG. 46

| INTEREST RATE ▶ | | 0.04 | | | | |
|---|---|---|---|---|---|---|
| | A | B | C | D | E | F | G |
| 1 | | | | | | | |
| 2 | FINANCE SIMULATION | | | | | | |
| 3 | | | | | | | |
| 4 | | INTEREST | 40.08 | | | | |
| 5 | | | | | | | |
| 6 | | INTEREST RATE | 0.04 | | | BALANCE | 1000 |
| 7 | | | | | | | |

FIG. 49

| INTEREST_RATE_BU | | | | | ▽ | | | | | | |
|---|---|---|---|---|---|---|---|---|---|---|---|
| | A | B | C | D | E | F | G | H | I | J | K |
| 1 | BACKUPS | | | | | | | | | | |
| 2 | | | | | | | | | | | |
| 3 | INPUTS | | | | | OUTPUTS | | | | | |
| 4 | | INTEREST RATE | | | | | INTEREST | | | BALANCE | |
| 5 | | TIME | VALUE | | | | TIME | VALUE | | TIME | BALANCE VALUE |
| 6 | | | | | | | | | | | |
| 7 | | | | | | | | | | | |
| 8 | | | | | | | | | | | |
| 9 | | | | | | | | | | | |
| 10 | | | | | | | | | | | |

FIG. 50

| BALANCE | ▶ | | | 1000 | | | |
|---|---|---|---|---|---|---|---|
| | A | B | C | D | E | F | G |
| 1 | FINANCE SIMULATION | | | | | | |
| 2 | | | | | | | |
| 3 | | | | | | | |
| 4 | | INTEREST | 40.08 | | | BALANCE | 1000 |
| 5 | | | | | | | |
| 6 | | INTEREST RATE | 0.04 | | | | |
| 7 | | | | | | | |

FIG. 51

RULE ID: 18

RULE NAME: WHAT IS BDM

CONDITION ID: 19

TARGET GROUP: INTRO - WHAT IS BDM (5502) ▽

AGGREGATE VALUES

|  | (5504) UCP | UCN | UCZ | USP | USN |
|---|---|---|---|---|---|
| MIN: | 1 | -999 | -999 | -999 | -999 |
| MAX: | 999 | 999 | 999 | 999 | 999 |

|  | UCP2 | UCP3 | UCP4 | UCP5 | CntAtt |
|---|---|---|---|---|---|
| MIN: | -999 | -999 | -999 | -999 | -999 |
| MAX: | 999 | 999 | 999 | 999 | 999 |

|  | #Subs | %+Att | %+Tot | AggRel | %+Rel |
|---|---|---|---|---|---|
| MIN: | -999 | -999 | -999 | -999 | -999 |
| MAX: | 999 | 999 | 999 | 999 | 999 |

|  | ChThis | ChPrev | HINT: |
|---|---|---|---|
| MIN: | -999 | -999 |  |
| MAX: | 999 | 999 |  |

FIG. 55

RULE ID: 19

RULE NAME: BDM CHILD 1

CONDITION ID: 20

TARGET GROUP: INTRO - WHAT IS BDM ▽

AGGREGATE VALUES

|  | UCP | UCN | UCZ | USP | USN |
|---|---|---|---|---|---|
| MIN: | 1 | -999 | -999 | -999 | -999 |
| MAX: | 999 | 999 | 999 | 999 | 999 |

|  | UCP2 | UCP3 | UCP4 | UCP5 | CntAtt |
|---|---|---|---|---|---|
| MIN: | -999 | -999 | -999 | -999 | -999 |
| MAX: | 999 | 999 | 999 | 999 | 999 |

|  | #Subs | %+Att | %+Tot | AggRel | %+Rel |
|---|---|---|---|---|---|
| MIN: | -999 | -999 | -999 | -999 | -999 |
| MAX: | 999 | 999 | 999 | 999 | 999 |

|  | ChThis | ChPrev | HINT: |
|---|---|---|---|
| MIN: | -999 | -999 | |
| MAX: | 999 | 999 | |

FIG. 58

COACH ITEM ID: 26

NAME: BDM CHILD 1

TYPE: CHILD TEX: 5902

SEQUENCE NO: 0

CHILD DISPLAY COUNT: 0

FEEDBACK

TELL ME ABOUT PLAN.... 5904

FIG. 59

| ICA MEETING CONFIGURATION | | |
|---|---|---|
| COACH ITEM NAME | SOURCE ITEM NAME | TARGET NAME |
| INTRO Q1 | INTRO Q1 | INTRO Q1 |
| INTRO CHILD 2 | INTRO Q2 | INTRO Q2 |
| INTRO Q3 | INTRO Q3 | INTRO Q3 |
| BDM CHILD 1 | WHAT IS Q1 | WHAT IS Q1 |
| BDM CHILD 2 | WHAT IS Q2 | WHAT IS Q2 |
| BDM CHILD 3 | WHAT IS Q3 | WHAT IS Q3 |
| HOW LONG CHILD | HOW LONG Q1 | HOW LONG Q1 |
| HOW LONG CHILD | HOW LONG Q2 | HOW LONG Q2 |
| HOW LONG CHILD | HOW LONG Q3 | HOW LONG Q3 |
| LEARN CHILD 1 | LEARN Q1 | LEARN Q1 |
| LEARN CHILD 2 | LEARN Q2 | LEARN Q2 |
| LEARN CHILD 3 | LEARN Q3 | LEARN Q3 |
| TELL ME PLAN Q1 | TELL ME PLAN Q1 | TELL ME PLAN Q1 |
| TELL ME PLAN Q2 | TELL ME PLAN Q2 | TELL ME PLAN Q2 |

ICA MEETING CONFIGURATION

COACH ITEM: 14

SOURCE ITEM: 9

TARGET: 9

OK
CANCEL (6002)
EDIT
DELETE
ADD NEW

| CONFIGURATION | | |
|---|---|---|
| OBJECTS | ANALYSIS | |
| ☑ SourcePage | ☐ CoachTopics Activate | OK |
| ☑ SourceItem | ☐ CoachItems Delivered | |
| ☑ TargetPage | ☐ User SourceItemTarget | CANCEL |
| ☑ Target | | |
| ☑ SourceItemTarget | | |
| ☑ Attribute | | |
| ☑ TargetGroup | | |
| ☑ TargetGroupTarget | | |
| ☑ CoachTopic | | |
| ☑ CoachItem | | |
| ☑ Rule | | |
| ☑ ConditionAggregate | | |
| ☑ ConditionSpecific | | |
| ☐ CoachApproval | | |
| ☐ Coach | | |
| ☐ DISPLAY SUBFOLDERS | | |

FIG. 70

SYSTEM, METHOD AND ARTICLE OF MANUFACTURE FOR A GOAL BASED SYSTEM UTILIZING A TIME BASED MODEL

FIELD OF THE INVENTION

The present invention relates to education systems and more particularly to a rule based tutorial system that utilizes a time based model to control business simulations of actual environments to teach new skills.

BACKGROUND OF THE INVENTION

When building a knowledge based system or expert system, at least two disciplines are necessary to properly construct the rules that drive the knowledge base, the discipline of the knowledge engineer and the knowledge of the expert. The domain expert has knowledge of the domain or field of use of the expert system. For example, the domain expert of an expert for instructing students in an automotive manufacturing facility might be a process control engineer while the domain expert for a medical instruction system might be a doctor or a nurse. The knowledge engineer is a person that understands the expert system and utilizes the expert's knowledge to create an application for the system. In many instances, the knowledge engineer and domain expert are separate people who have to collaborate to construct the expert system.

Typically, this collaboration takes the form of the knowledge engineer asking questions of the domain expert and incorporating the answers to these questions into the design of the system. This approach is labor intensive, slow and error prone. The coordination of the two separate disciplines may lead to problems. Although the knowledge engineer can transcribe input from the expert utilizing videotape, audio tape, text and other sources, efforts from people of both disciplines have to be expended. Further, if the knowledge engineer does not ask the right questions or asks the questions in an incorrect way, the information utilized to design the knowledge base could be incorrect. Feedback to the knowledge engineer from the expert system is often not available in prior art system until the construction is completed. With conventional system, there is a time consuming feedback loop that ties together various processes from knowledge acquisition to validation.

Educational systems utilizing an expert system component often suffer from a lack of motivational aspects that result in a user becoming bored or ceasing to complete a training program. Current training programs utilize static, hard-coded feedback with some linear video and graphics used to add visual appeal and illustrate concepts. These systems typically support one "correct" answer and navigation through the system is only supported through a single defined path which results in a two-dimensional generic interaction, with no business model support and a single feedback to the learner of correct or incorrect based on the selected response. Current tutorial systems do not architect real business simulations into the rules to provide a creative learning environment to a user.

SUMMARY OF THE INVENTION

According to a broad aspect of a preferred embodiment of the invention, a goal based learning system utilizes a rule based expert training system to provide a cognitive educational experience. The system provides the user with a simulated environment that presents a business opportunity to understand and solve optimally. Mistakes are noted and remedial educational material presented dynamically to build the necessary skills that a user requires for success in the business endeavor. The system utilizes an artificial intelligence engine driving individualized and dynamic feedback with synchronized video and graphics used to simulate real-world environment and interactions. Multiple "correct" answers are integrated into the learning system to allow individualized learning experiences in which navigation through the system is at a pace controlled by the learner. A robust business model provides support for realistic activities and allows a user to experience real world consequences for their actions and decisions and entails realtime decision-making and synthesis of the educational material. The system is architected around a time based model to manage and control the system.

DESCRIPTION OF THE DRAWINGS

The foregoing and other objects, aspects and advantages are better understood from the following detailed description of a preferred embodiment of the invention with reference to the drawings, in which:

FIG. 14 illustrates a display in which a student has made some mistakes in accordance with a preferred embodiment;

FIG. 15 illustrates a journal entry simulation in accordance with a preferred embodiment;

FIG. 16 illustrates a simulated Bell Phone Bill journal entry in accordance with a preferred embodiment;

FIG. 17 illustrates a feedback display in accordance with a preferred embodiment;

FIGS. 18 and 19 illustrate a feedback display in accordance with a preferred embodiment;

FIG. 26 illustrates a suite to support a student interaction in accordance with a preferred embodiment;

FIG. 28 illustrates a display of journalization transactions in accordance with a preferred embodiment;

FIG. 29 illustrates the objects for the journalization task in accordance with a preferred embodiment;

FIG. 37 illustrates an example of separating out some mistakes for the interface to catch and others for the ICAT to catch has positive and negative impacts in accordance with a preferred embodiment;

FIG. 42 illustrates the arithmetic steps in accordance with a preferred embodiment;

FIG. 43 illustrates a drag & drop input operation in accordance with a preferred embodiment;

FIG. 44 illustrates list object processing in accordance with a preferred embodiment;

FIG. 45 illustrates the steps for configuring a simulation in accordance with a preferred embodiment;

FIG. 46 illustrates a distinct output in accordance with a preferred embodiment;

FIG. 49 is a PInput Cell for a simulation model in accordance with a preferred embodiment;

FIG. 50 is a PInput backup cell in a simulation model in accordance with a preferred embodiment;

FIG. 51 is a display illustrating a POutput cell in accordance with a preferred embodiment. The steps required to configure the POutput are presented below;

FIG. 55 illustrates a display depicting configured rules in accordance with a preferred embodiment;

FIG. 58 illustrates configuration of aggregate rules in accordance with a preferred embodiment;

FIG. 59 illustrates a set of coach items in accordance with a preferred embodiment;

FIG. 60 is an ICA Meeting Configuration tool display in accordance with a preferred embodiment;

As shown in FIG. 70 illustrates an Object Viewer Configuration in an Utilities menu in accordance with a preferred embodiment;

DETAILED DESCRIPTION

Figure 1:
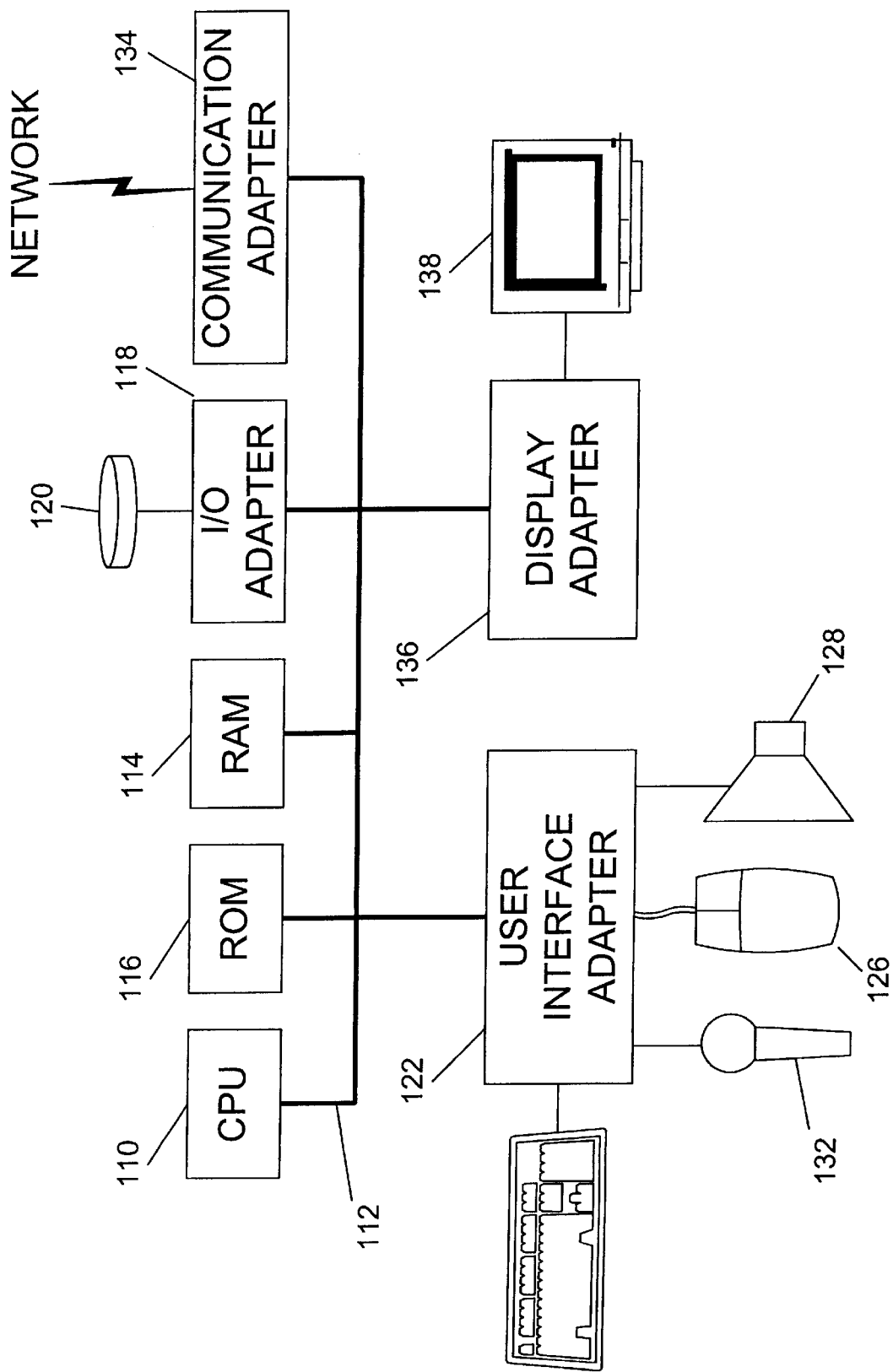
FIG. 1 is a block diagram of a representative hardware environment in accordance with a preferred embodiment.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

A simulation engine in accordance with a preferred embodiment is based on a Microsoft Visual Basic component developed to help design and test feedback in relation to a Microsoft Excel spreadsheet. These spreadsheet models are what simulate actual business functions and become a task that will be performed by a student The Simulation Engine accepts simulation inputs and calculates various outputs and notifies the system of the status of the simulation at a given time in order to obtain appropriate feedback.

Relationship of Components

The simulation model executes the business function that the student is learning and is therefore the center point of the application. An activity 'layer' allows the user to visually guide the simulation by passing inputs into the simulation engine and receiving an output from the simulation model. For example, if the student was working on an income statement activity, the net sales and cost of goods sold calculations are passed as inputs to the simulation model and the net income value is calculated and retrieved as an output. As calculations are passed to and retrieved from the simulation model, they are also passed to the Intelligent Coaching Agent (ICA). The ICA analyzes the Inputs and Outputs to the simulation model and generates feedback based on a set of rules. This feedback is received and displayed through the Visual Basic Architecture.

Figure 2:
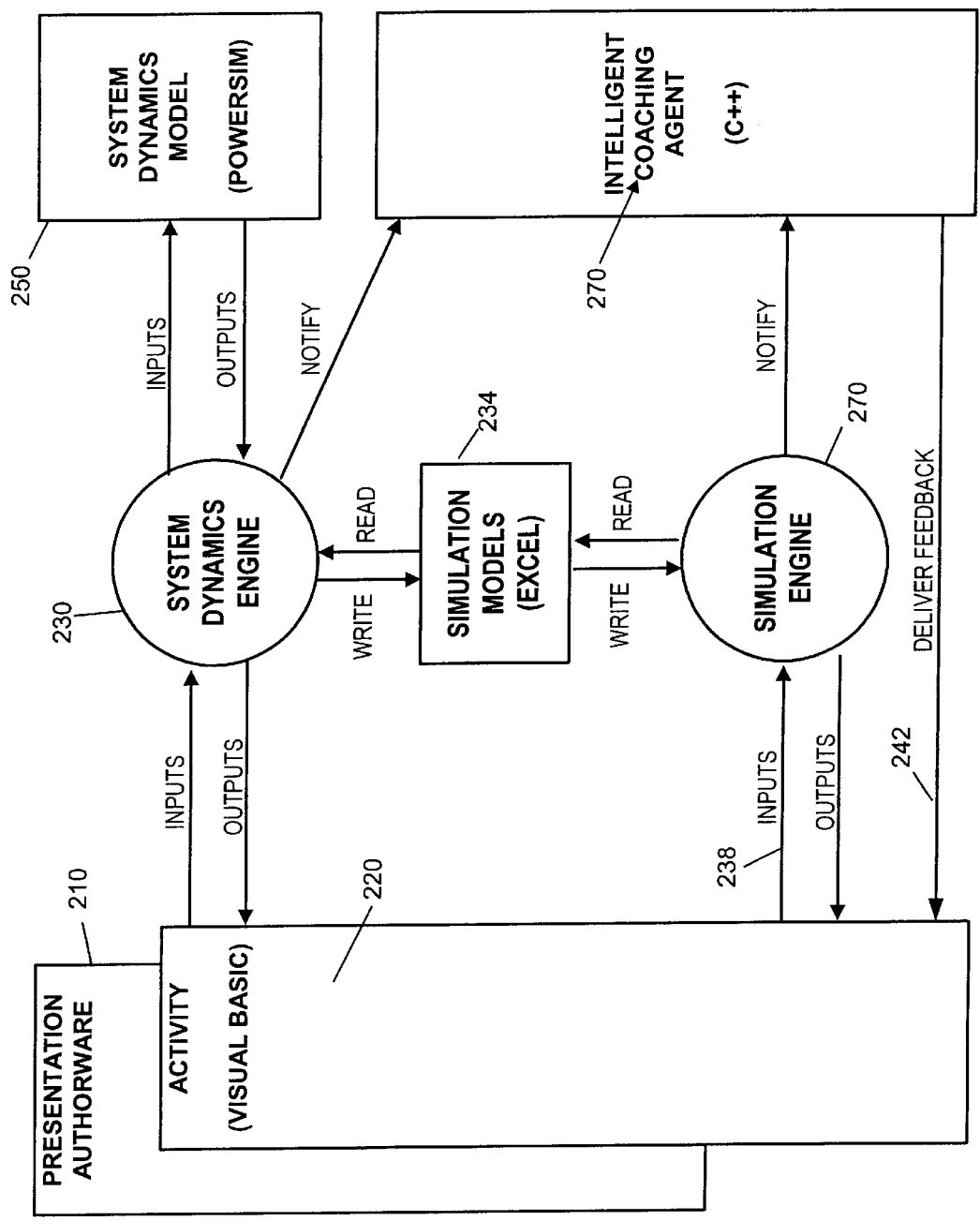
FIG. 2 is a block diagram of a system architecture in accordance with a preferred embodiment.

FIG. 2 is a block diagram of a system architecture in accordance with a preferred embodiment. The Presentation 'layer' 210 is separate from the activity 'layer' 220 and communication is facilitated through a set of messages 230 that control the display specific content topics. A preferred embodiment enables knowledge workers 200 & 201 to acquire complex skills rapidly, reliably and consistently across an organization to deliver rapid acquisition of complex skills. This result is achieved by placing individuals in a simulated business environment that "looks and feels" like real work, and challenging them to make decisions which support a business' strategic objectives utilizing highly effective learning theory (e.g., goal based learning, learn by doing, failure based learning, etc.), and the latest in multimedia user interfaces, coupled with three powerful, integrated software components. The first of these components is a software Solution Construction Aid (SCA) 230 consisting of a mathematical modeling tool 234 which simulates business outcomes of an individual's collective actions over a period of time. The second component is a knowledge system 250 consisting of an HTML content layer which organizes and presents packaged knowledge much like an online text book with practice exercises, video war stories, and a glossary. The third component is a software tutor 270 comprising an artificial intelligence engine 240 which generates individualized coaching messages based on decisions made by learner.

Feedback is unique for each individual completing the course and supports client cultural messages 242 "designed into" the course. A business simulation methodology that includes support for content acquisition, story line design, interaction design, feedback and coaching delivery, and content delivery is architected into the system in accordance with a preferred embodiment. A large number of "pre-designed" learning interactions such as drag and drop association of information 238, situation assessment/action planning, interviewing (one-on-one, one-to-many), presenting (to a group of experts/executives), metering of performance (handle now, handle later), "time jumping" for impact of decisions, competitive landscape shift (while "time jumping", competitors merge, customers are acquired, etc.) and video interviewing with automated note taking are also included in accordance with a preferred embodiment.

Business simulation in accordance with a preferred embodiment delivers training curricula in an optimal manner. This is because such applications provide effective training that mirrors a student's actual work environment. The application of skills "on the job" facilitates increased retention and higher overall job performance. While the results of such training applications are impressive, business simulations are very complex to design and build correctly. These simulations are characterized by a very open-ended environment, where students can go through the application along any number of paths, depending on their learning style and prior experiences/knowledge.

A category of learning approaches called Learn by Doing, is commonly used as a solution to support the first phase (Learn) of the Workforce Performance Cycle. However, it can also be a solution to support the second phase (Perform) of the cycle to enable point of need learning during job performance. By adopting the approach presented, some of the benefits of a technology based approach for building business simulation solutions which create more repeatable, predictable projects resulting in more perceived and actual user value at a lower cost and in less time are highlighted.

Most corporate training programs today are misdirected because they have failed to focus properly on the purpose of their training. These programs have confused the memorization of facts with the ability to perform tasks; the knowing of "that" with the knowing of "how". By adopting the methods of traditional schools, businesses are teaching a wide breadth of disconnected, decontextualized facts and figures, when they should be focused on improved performance. How do you teach performance, when lectures, books, and tests inherently are designed around facts and figures? Throw away the lectures, books, and tests. The best way to prepare for high performance is to perform; experience is the best teacher! Most business leaders agree that workers become more effective the more time they spend in their jobs. The best approach for training novice employees, therefore, would be letting them learn on the job, acquiring skills in their actual work environment. The idea of learning-by-doing is not revolutionary, yet it is resisted in business and academia. Why is this so, if higher competence is universally desired?

Learners are reluctant to adopt learning-by-doing because they are frightened of failure. People work hard to avoid making mistakes in front of others. Business leaders are hesitant to implement learning-by-doing because novice failure may have dramatic safety, legal and financial implications. Imagine a novice pilot learning-by-doing as he accelerates a large jet plane down a runway; likewise, consider a new financial analyst learning-by-doing as he structures a multi-million dollar financial loan. Few employers are willing to endure such failures to have a more competent workforce.

The concerns of employee and employer can be relieved if the training (and accompanying failure) didn't occur in front of co-workers and clients, if it didn't jeopardize a multi-million dollar aircraft or a multi-million dollar deal. What if the training was performed privately, in a richly modeled simulation of the workers actual job? In a simulated environment, failure would result in dedicated instruction instead of embarrassment, injury, or monetary losses. Simulated environments provide a sense of liberation for exploration that does not exist in the real world. Knowing that the consequences of experimentation will unlikely be dire, learners are able to explore the "what if . . . " inherent in us all. In this way, the best way to prepare for high performance is to simulate actual performance. New media technologies utilizing multimedia provide the possibility to create such business simulation experiences.

Even if companies didn't make the mistake of focusing on "what" learning vs. "how" learning, they still tend to have the overly narrow view of education/training as something that only occurs prior to workers being asked to actually perform their job. Learning is something that is constantly occurring, and doesn't cease once "real work" has begun. The closer new lessons occur in time with the application of those lessons, the greater the resultant learning. This fact helps to explain some of the reasoning behind the benefits of business simulation, described in the previous section. In those systems, all new lessons are taught in close relationship to their real world use; everything is in context and, most importantly, are presented at the appropriate time. But as the properly trained worker performs their job, the working environment changes. New demands occur, and new methods and rules are developed. As these events occur, there is a need for new support/training that, in most cases, must wait to be addressed until the next "pre-performance" training session.

In these cases, the need (or demand) for additional training doesn't match the supply. This lag between a training need and the fulfilling lesson has a dramatic negative impact on productivity, accuracy, and customer satisfaction. Workers need to have the opportunity to learn while they are performing. Just as during pre-performance training, one powerful mechanism for identifying and correcting (simulated) performance problems is to have an expert available at all time to watch your actions and remediate when appropriate. This, obviously, is too costly and time intensive of an approach to be practical with actual experts. But what if workers had access to a support system that provided the majority of the benefits of a real expert, transparently integrated into their work environment? Such a system would provide advice at key moments in the work flow for problem resolution and/or process improvement, tools to ease task completion, reference material of best practice knowledge, and point of need training courses. With a support system that proactively assists the worker in performance of their job tasks at a higher level of competency, productivity and customer satisfaction (both internal and external) would soar.

The key to such a support system is that it is seamlessly integrated into the business system that the knowledge worker uses to execute their job tasks. Workers don't need to go "off-line" or seek out cryptic information buried within paper manuals and binders for guidance or to find the answer to queries. All the support components are made available through the same applications the worker's use, at the point in which they need them, tailored to the individual to show "how", not just "what". Learning would be occurring all the time, with little distinction between performing and improving performance.

Establishing that training should focus on performance (how), rather than facts (what), and extending the model of learning to include assistance while performing, rather than only before performance, still leaves us dangerously exposed in preparing to compete in the new, chaotic economy. As was mentioned in the opening of this paper, the pace of change in business today is whiplash fast. Not only are new methods of doing business evolving every 18–24 months, new competitors emerge, dominate, and fade in time periods businesses used to take to perform demographic studies. Now more than ever, those who do not reinvent themselves on a regular basis will be fossilized by the pace of change.

Even the best pre-performance training and the most advanced performance support tools are destined to be outdated if there isn't a fresh supply of real-world requirements and lessons learned being fed back as inputs for the next go 'round. Innovation is a key step in the Workforce Performance Cycle. This step requires business to employ Stephen Covey's famous habit of "sharpening the saw", or "take time to be fast".

There is an untold wealth of information buried within the heads of business users responsible for implementing the steps outlined in their pre-performance training and performance support tools. No other group within an organization can more accurately assess the effectiveness of current methods, or project needed changes that will have dramatic future impact. This step of reflecting on the current and past state of affairs, uncovering new approaches by identifying what is working and what is not, and adapting accordingly for the future is the last phase of the learning/performance cycle.

Innovation to fuel future training and performance support comes directly from the community most closely tied to task performance. Effective businesses need to develop and cultivate a mechanism for communication and collaboration among the experts in these communities to more efficiently benefit from their collective wisdom. In today's business, that which is evident to your business is evident to nearly all your competitors as well. The competitive advantage lies in uncovering that which is unexpected or not immediately apparent, adapting your business processes to exploit the discovery, and quickly, but effectively, educating your workforce on the new policies and procedures, all before the competition catches on or the market changes again.

This innovation process is the critical final step in continuous education of the most effective and up-to-date policies, procedures, and information. Without formalized innovation, companies not only risk being a step behind the ever advancing competition, but compound the problem by continuing to train their personnel with outdated strategies and information. One way to formalize this vital step in the Workforce Performance Cycle is to construct Virtual Learning Communities, where many 'experts' can share experiences, submit ideas for improvements, play out "what-if" scenarios, and contribute on complex problems that may be insurmountable without significant collaboration with others. Such Learning Communities could nurture up-to-date discussion of what is actually happening within a business, eliminating the traditional information-passing lag that plagues many business as new data travels through corporate hierarchies. This increased nimbleness would help organizations quickly address new competitive trends and outdated strategies, identify potential solutions, and implement improved processes in the form of updated training and performance support reference materials.

Figure 3:
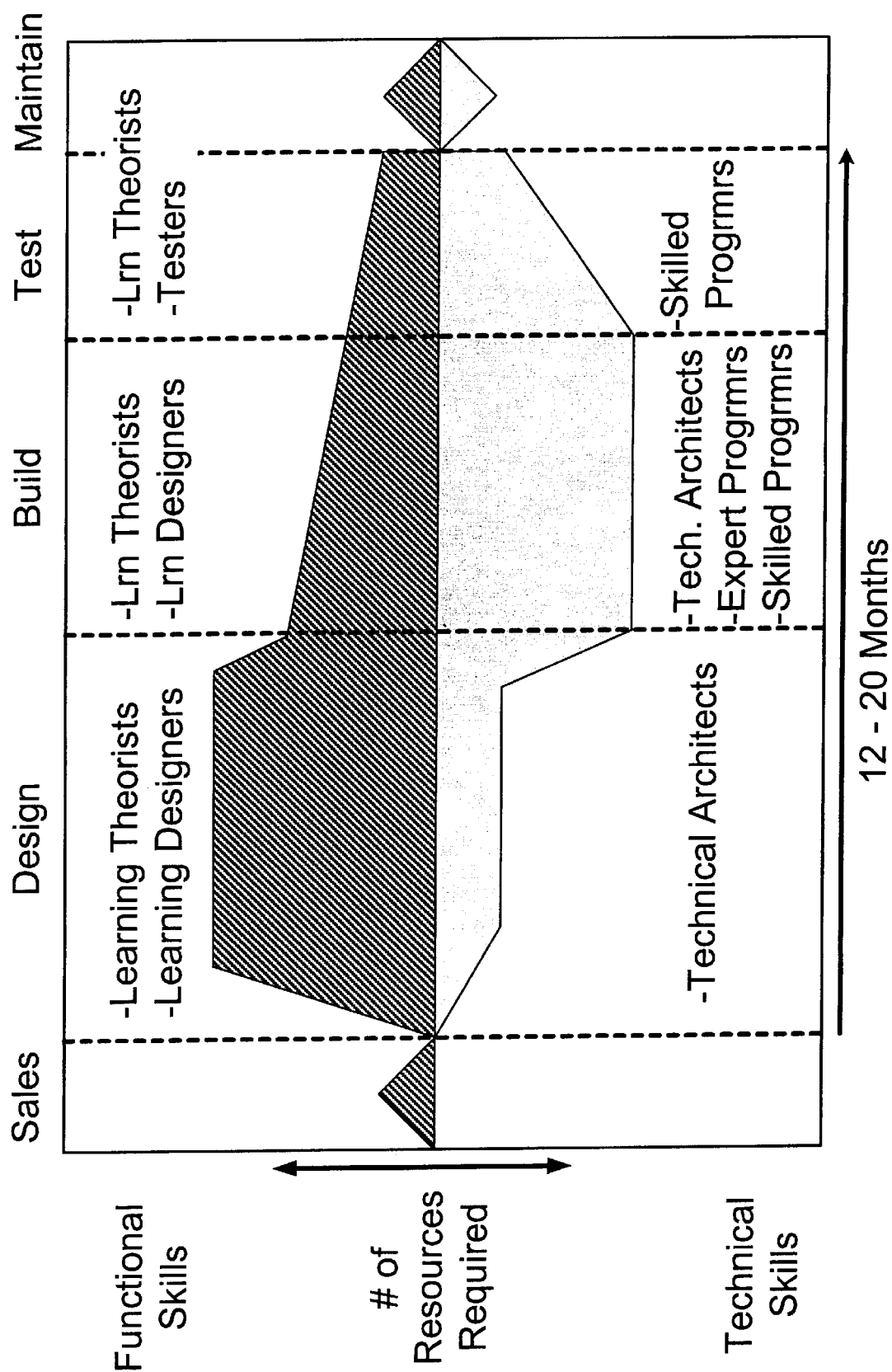
FIG. 3 depicts the timeline and relative resource requirements for each phase of development for a typical application development in accordance with a preferred embodiment.

Currently, a typical BusSim engagement takes between one and two years to complete and requires a variety of both functional and technical skills. FIG. 3 depicts the timeline and relative resource requirements for each phase of development for a typical application development in accordance with a preferred embodiment. The chart clearly depicts the relationship between the large number of technical resources required for both the build and test phases of development. This is because the traditional development process used to build BusSim solutions reflects more of a "one off" philosophy, where development is done from scratch in a monolithic fashion, with little or no reuse from one application to the next. This lack of reuse makes this approach prohibitively expensive, as well as lengthy, for future Bus-Sim projects.

The solution to this problem is to put tools in the hands of instructional designers that allows them to create their BusSim designs and implement them without the need for programmers to write code. And to put application architectures that integrate with the tools in the hands of developers, providing them with the ability to quickly deliver solutions for a number of different platforms. The reuse, then, comes in using the tools and architectures from one engagement to another. Both functional and technical resources carry with them the knowledge of how to use the technology, which also has an associated benefit of establishing a best-practice development methodology for Bus-Sim engagements.

Figure 4:
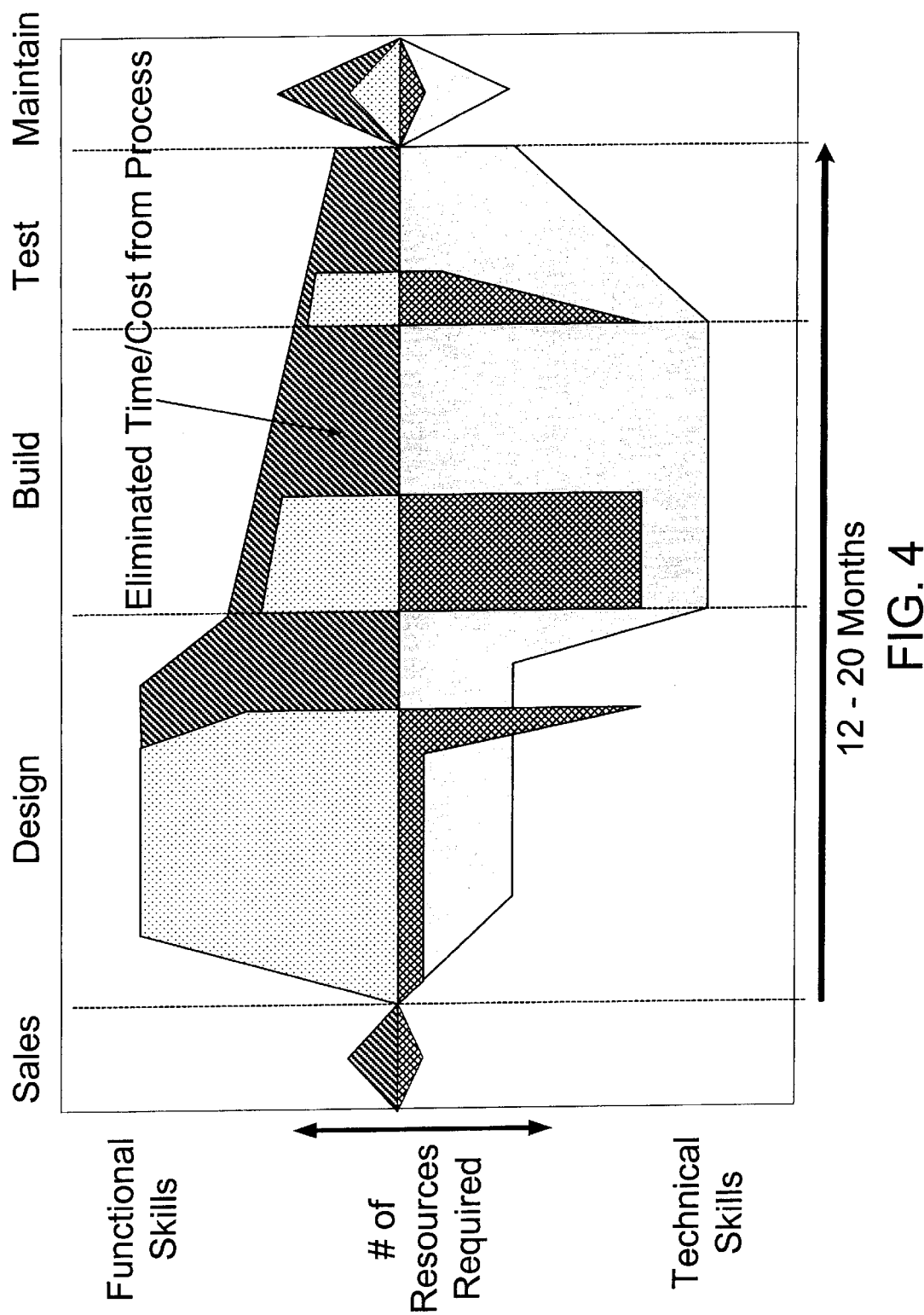
FIG. 4 depicts the potential savings in both functional and technical tasks in accordance with a preferred embodiment.

The tools and architectures described herein are part of a next-generation Business Simulation delivery framework that will reduce the total effort necessary to build solutions in accordance with a preferred embodiment. FIG. 4 depicts the potential savings in both functional and technical tasks in accordance with a preferred embodiment.

Development Cycle Activities

Design Phase

In the Design Phase, instructional designers become oriented to the content area and begin to conceptualize an instructional approach. They familiarize themselves with the subject matter through reading materials and interviews with Subject Matter Experts (SMEs). They also identify learning objectives from key client contacts. Conceptual designs for student interactions and interface layouts also begin to emerge. After the conceptual designs have taken shape, Low-Fi user testing (a.k.a. Conference Room Piloting) is performed. Students interact with interface mock-ups while facilitators observe and record any issues. Finally, detailed designs are created that incorporate findings. These detailed designs are handed off to the development team for implementation.

The design phase has traditionally been fraught with several problems. Unlike a traditional business system, BusSim solutions are not rooted in tangible business processes, so requirements are difficult to identify in a concrete way. This leaves instructional designers with a 'blue sky' design problem. With few business-driven constraints on the solution, shallow expertise in the content area, and limited technical skills, instructional designers have little help in beginning a design. Typically, only experienced designers have been able to conjure interface, analysis, and feedback designs that meet the learning objectives yet remain technically feasible to implement. To compound the problem, BusSim solutions are very open ended in nature. The designer must anticipate a huge combination of student behavior to design feedback that is helpful and realistic.

Build Phase

During the build phase, the application development team uses the detailed designs to code the application. Coding tasks include the interfaces and widgets that the student interacts with. The interfaces can be made up of buttons, grids, check boxes, or any other screen controls that allow the student to view and manipulate his deliverables. The developer must also code logic that analyzes the student's work and provides feedback interactions. These interactions may take the form of text and/or multimedia feedback from simulated team members, conversations with simulated team members, or direct manipulations of the student's work by simulated team members. In parallel with these coding efforts, graphics, videos, and audio are being created for use in the application. Managing the development of these assets have their own complications.

Risks in the build phase include misinterpretation of the designs. If the developer does not accurately understand the designer's intentions, the application will not function as desired. Also, coding these applications requires very skilled developers because the logic that analyzes the student's work and composes feedback is very complex.

Test Phase

The Test Phase, as the name implies, is for testing the application. Testing is performed to verify the application in three ways: first that the application functions properly (functional testing), second that the students understand the interface and can navigate effectively (usability testing), and third that the learning objectives are met (cognition testing). Functional testing of the application can be carried out by the development team or by a dedicated test team. If the application fails to function properly, it is debugged, fixed, recompiled and retested until its operation is satisfactory. Usability and cognition testing can only be carried out by test students who are unfamiliar with the application. If usability is unsatisfactory, parts of the interface and or feedback logic may need to be redesigned, recoded, and retested. If the learning objectives are not met, large parts of the application may need to be removed and completely redeveloped from a different perspective.

The test phase is typically where most of the difficulties in the BusSim development cycle are encountered. The process of discovering and fixing functional, usability, and cognition problems is a difficult process and not an exact science.

For functional testing, testers operate the application, either by following a test script or by acting spontaneously and documenting their actions as they go. When a problem or unexpected result is encountered, it too is documented. The application developer responsible for that part of the application then receives the documentation and attempts to duplicate the problem by repeating the tester's actions. When the problem is duplicated, the developer investigates further to find the cause and implement a fix. The developer once again repeats the tester's actions to verify that the fix solved the problem. Finally, all other test scripts must be rerun to verify that the fix did not have unintended consequences elsewhere in the application.

This process has inherent difficulty. If the tester is inaccurate in recording his actions, or the developer is inaccurate in repeating them, then the problem may never be duplicated and the defect never found. Furthermore, the problem may be dependent on some condition in the tester's environment that is not readily observable or is not even related to the application. This process has proven to be tedious, time-consuming, and of limited reliability.

For usability testing, test students operate the application as it will be operated in production. Ideally, their progress is only impeded by their lack of mastery of the content. As they gain proficiency, they are able to complete the activities and move on. As is often the case, however, they are impeded by unclear instructions, a non-intuitive interface, or other usability shortcomings. When these difficulties are encountered, the facilitators document the problems and student comments on what is needed to improve usability.

There are two major risks associated with usability testing. First, student action recording is not as rigorous because actual students are performing the testing, so functional problems that don't appear until now are difficult to reproduce. Second, resolutions to usability problems often involve significant modification to the application code and interface which requires repeating of portions of design, build, and test.

For cognition testing, students are surveyed and/or tested to determine their level of understanding of the material. If results indicate that the learning objectives are not being adequately met, the design is reevaluated. Changes proposed to improve the cognition may include massive redesign and rebuilding.

Execution Phase

The Execution Phase refers to the steady state operation of the completed application in its production environment. For some clients, this involves phone support for students. Clients may also want the ability to track students' progress and control their progression through the course. Lastly, clients may want the ability to track issues so they may be considered for inclusion in course maintenance releases.

One of the key values of on-line courses is that they can be taken at a time, location, and pace that is convenient for the individual student. However, because students are not centrally located, support is not always readily available. For this reason it is often desirable to have phone support for students.

Clients may also desire to track students' progress, or control their advancement through the course. Under this strategy, after a student completes a section of the course, he will transfer his progress data to a processing center either electronically or by physically mailing a disk. There it can be analyzed to verify that he completed all required work satisfactorily. One difficulty commonly associated with student tracking is isolating the student data for analysis. It can be unwieldy to transmit all the course data, so it is often imperative to isolate the minimum data required to perform the necessary analysis of the student's progress.

A Delivery Framework for Business Simulation

As discussed earlier, the traditional development process used to build BusSim solutions reflects more of a "one off" philosophy, where development is done from scratch in a monolithic fashion, with little or no reuse from one application to the next. A better approach would be to focus on reducing the total effort required for development through reuse, which, in turn would decrease cost and development time.

The first step in considering reuse as an option is the identification of common aspects of the different BusSim applications that can be generalized to be useful in future applications. In examination of the elements that make up these applications, three common aspects emerge as integral parts of each:

Interface
Analysis
Interpretation
Interface

Every BusSim application must have a mechanism for interaction with the student. The degree of complexity of each interface may vary, from the high interactivity of a high-fidelity real-time simulation task, to the less complex information delivery requirements of a business case background information task. Regardless of how sophisticated the User Interface (UI), it is a vital piece of making the underlying simulation and feedback logic useful to the end user.

Analysis

Every BusSim application does analysis on the data that defines the current state of the simulation many times throughout the execution of the application. This analysis is done either to determine what is happening in the simulation, or to perform additional calculations on the data which are then fed back into the simulation. For example, the analysis may be the recognition of any actions the student has taken on artifacts within the simulated environment (notebooks, number values, interviews conducted, etc.), or it may be the calculation of an ROI based on numbers the student has supplied.

Interpretation

Figure 5:
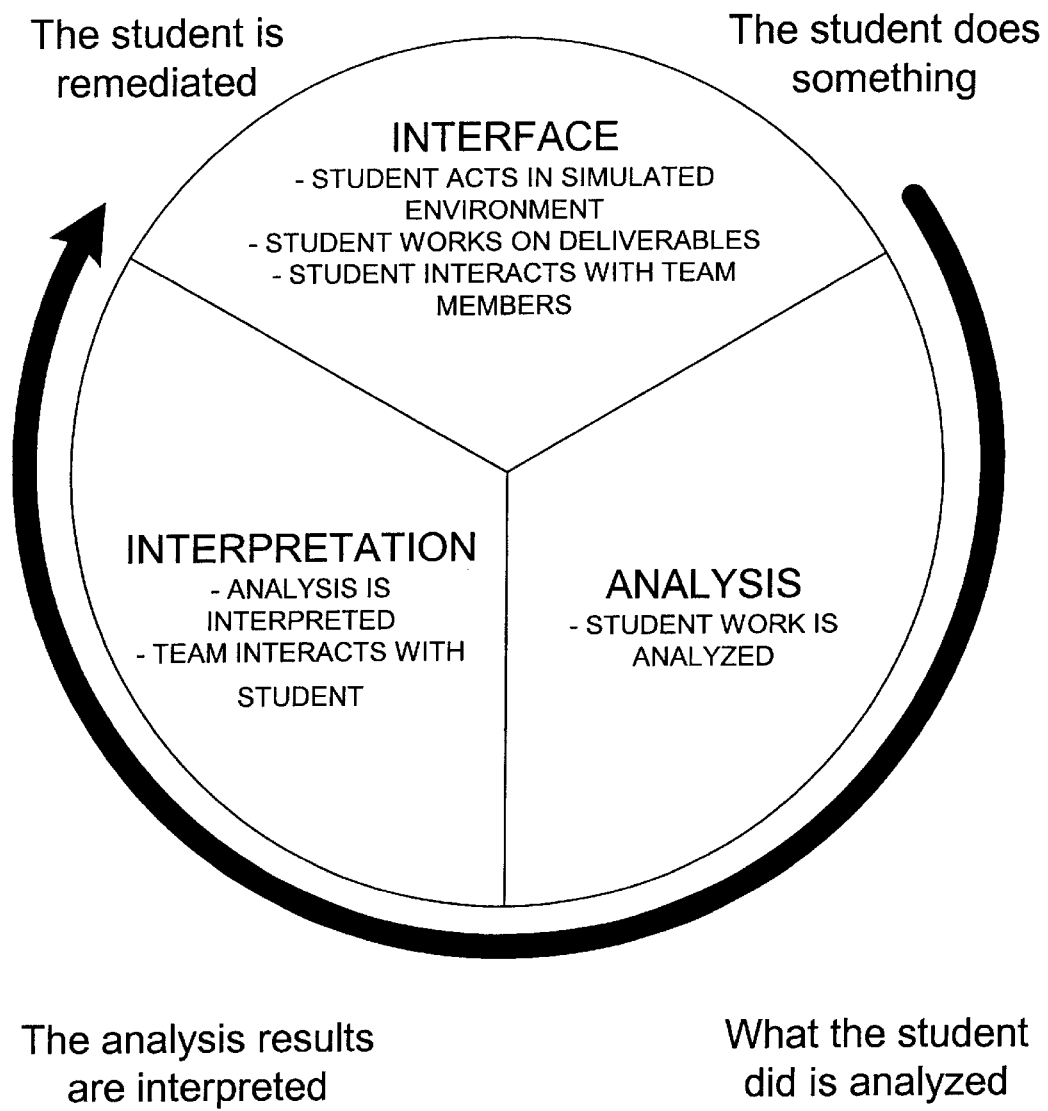
FIG. 5 illustrates commonalties in accordance with a preferred embodiment.

Substantive, useful feedback is a critical piece of any BusSim application. It is the main mechanism to communicate if actions taken by the student are helping or hurting them meet their performance objectives. The interpretation piece of the set of proposed commonalities takes the results of any analysis performed and makes sense of it. It takes the non-biased view of the world that the Analysis portion delivers (i.e., "Demand is up 3%") and places some evaluative context around it (i.e., "Demand is below the expected 7%; you're in trouble!", or "Demand has exceeded projections of 1.5%; Great job!"). FIG. 5 illustrates commonalties in accordance with a preferred embodiment.

Common Features of Business Simulation Applications

There are several approaches to capturing commonalties for reuse. Two of the more common approaches are framework-based and component-based. To help illustrate the differences between the two approaches, we will draw an analogy between building an application and building a house. One can construct a house from scratch, using the raw materials, 2×4s, nails, paint, concrete, etc. One can also construct an application from scratch, using the raw materials of new designs and new code. The effort involved in both undertakings can be reduced through framework-based and/or component-based reuse.

Framework-Based Reuse

Within the paradigm of framework-based reuse, a generic framework or architecture is constructed that contains commonalties. In the house analogy, one could purchase a prefabricated house framework consisting of floors, outside walls, bearing walls and a roof. The house can be customized by adding partition walls, wall-paper, woodwork, carpeting etc. Similarly, prefabricated application frameworks are available that contain baseline application structure and functionality. Individual applications are completed by adding specific functionality and customizing the look-and-feel. An example of a commonly used application framework is Microsoft Foundation Classes. It is a framework for developing Windows applications using C++. MFC supplies the base functionality of a windowing application and the developer completes the application by adding functionality within the framework. Framework-based reuse is best suited for capturing template-like features, for example user interface management, procedural object behaviors, and any other features that may require specialization.

Some benefits of using a framework include:

Extensive functionality can be incorporated into a framework. In the house analogy, if I know I am going to build a whole neighborhood of three bedroom ranches, I can build the plumbing, wiring, and partition walls right into the framework, reducing the incremental effort required for each house. If I know I am going to build a large number of very similar applications, they will have more commonalties that can be included in the framework rather than built individually.

Applications can override the framework-supplied functionality wherever appropriate.

If a house framework came with pre-painted walls, the builder could just paint over them with preferred colors. Similarly, the object oriented principle of inheritance allows an application developer to override the behavior of the framework.

Component-Based Reuse

In the paradigm of component-based reuse, key functionality is encapsulated in a component. The component can then be reused in multiple applications. In the house analogy, components correspond to appliances such as dishwashers, refrigerators, microwaves, etc. Similarly, many application components with pre-packaged functionality are available from a variety of vendors. An example of a popular component is a Data Grid. It is a component that can be integrated into an application to deliver the capability of viewing columnar data in a spreadsheet-like grid. Component-based reuse is best suited for capturing black-box-like features, for example text processing, data manipulation, or any other features that do not require specialization.

Some benefits of using components include:

Several applications on the same computer can share a single component. This is not such a good fit with the analogy, but imagine if all the houses in a neighborhood could share the same dishwasher simultaneously. Each home would have to supply its own dishes, detergent, and water, but they could all wash dishes in parallel. In the application component world, this type of sharing is easily accomplished and results in reduced disk and memory requirements.

Components tend to be less platform and tool dependent. A microwave can be used in virtually any house, whether it's framework is steel or wood, and regardless of whether it was customized for building mansions or shacks. You can put a high-end microwave in a low-end house and vice-versa. You can even have multiple different microwaves in your house. Component technologies such as CORBA, COM, and Java Beans make this kind of flexibility commonplace in application development.

The Solution: A Combined Approach

Often, the best answer to achieving reuse is through a combination of framework-based and component-based techniques. A framework-based approach for building Bus-Sim applications is appropriate for developing the user interface, handling user and system events, starting and stopping the application, and other application-specific and delivery platform-specific functions. A component-based approach is appropriate for black-box functionality. That is, functionality that can be used as-is with no specialization required.

In creating architectures to support BusSim application development, it is imperative that any assets remain as flexible and extensible as possible or reusability may be diminished. Therefore, we chose to implement the unique aspects of BusSim applications using a component approach rather than a framework approach. This decision is further supported by the following observations.

An application can only be based on one framework. Using the house analogy, if you like the first floor of one framework and the second floor of another, it is difficult or impossible to integrate the features of the two. Or, it is so costly as to erase the benefit of using a framework in the first place. Likewise with application frameworks. You can only use one framework when building an application You can't mix and match features from multiple frameworks, so any framework that we developed would have to compete against existing and future frameworks. With components, however, you can mix and match from multiple vendors.

Components are less platform and development tool dependent, leaving more options open for development teams. An appliance like a dishwasher is not restricted for use in a particular type of house. Similarly, component technologies exist that are independent of platform and development tool. For example ActiveX can be used in almost every development environment for Windows and Java Beans components can be used on a wide variety of platforms.

Frameworks become obsolete more quickly. Rapid emergence and evolution of technology has introduced a wealth of new feature requirements into application development. Frameworks that do not include the most current features become obsolete quickly. Components typically address a more focused feature set and are not as impacted by technology advances outside their core functionality areas.

Figure 6:
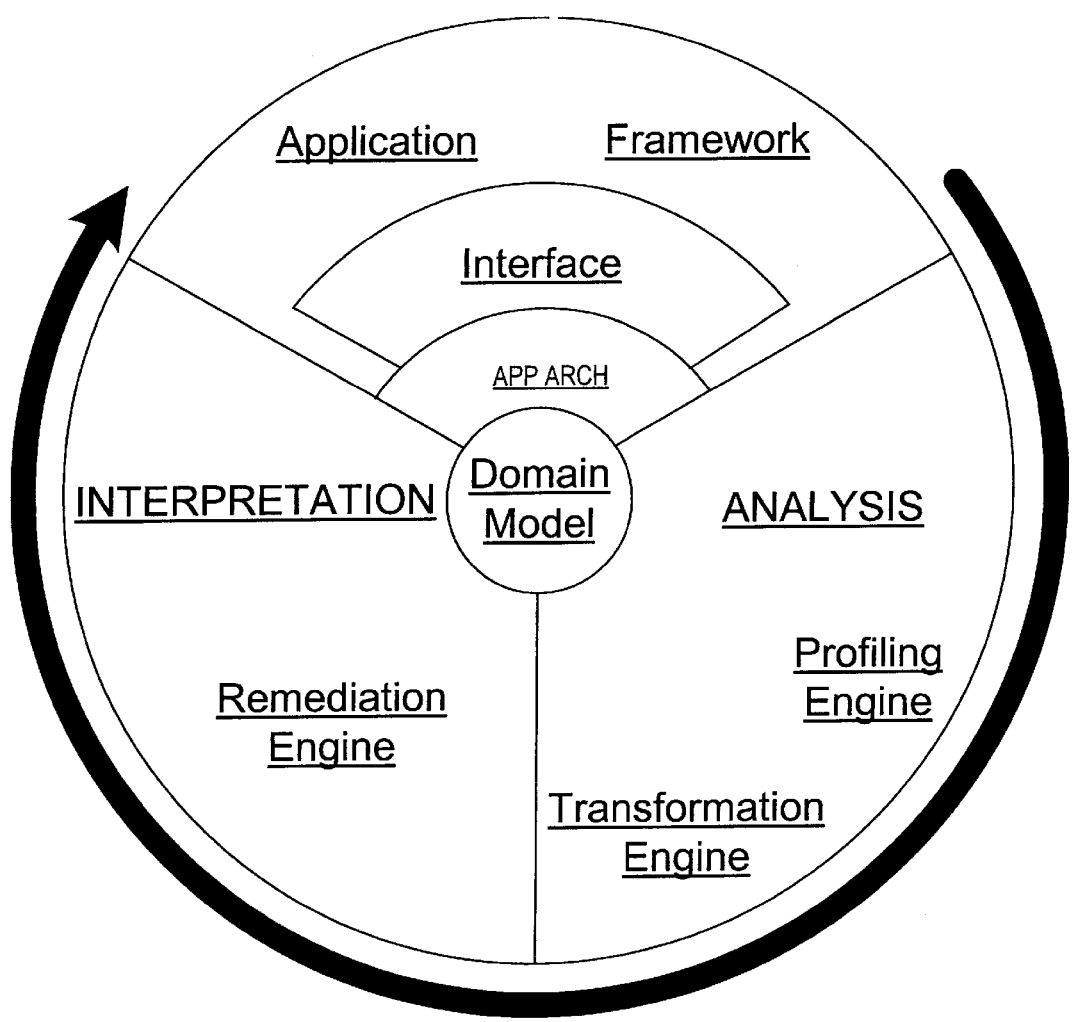
FIG. 6 illustrates a development architecture approach in accordance with a preferred embodiment.

Based on these observations, we believe a combined framework/component approach is optimal for achieving reuse. FIG. 6 illustrates a development architecture approach in accordance with a preferred embodiment.

Delivery Framework for Business Simulation

This diagram illustrates an ideal solution where components are combined with an Application Framework and an Application Architecture to achieve maximum reuse and minimum custom development effort. The Application Architecture is added to provide communication support between the application interface and the components, and between the components. This solution has the following features:

The components (identified by the icons) encapsulate key BusSim functionality.

The Application Architecture provides the glue that allows application-to-component and component-to-component communication.

The Application Framework provides structure and base functionality that can be customized for different interaction styles.

Only the application interface must be custom developed.

The next section discusses each of these components in further detail.

The Business Simulation Toolset

We have clearly defined why a combined component/framework approach is the best solution for delivering high-quality BusSim solutions at a lower cost. Given that there are a number of third party frameworks already on the market that provide delivery capability for a wide variety of platforms, the TEL project is focused on defining and developing a set of components that provide unique services for the development and delivery of BusSim solutions. These components along with a set of design and test workbenches are the tools used by instructional designers to support activities in the four phases of BusSim development. We call this suite of tools the Business Simulation Toolset. Following is a description of each of the components and workbenches of the toolset.

Components

A Component can be thought of as a black box that encapsulates the behavior and data necessary to support a related set of services. It exposes these services to the outside world through published interfaces. The published interface of a component allows you to understand what it does through the services it offers, but not how it does it. The complexity of its implementation is hidden from the user. The following are the key components of the BusSim Toolset.

Domain Component—provides services for modeling the state of a simulation

Profiling Component—provides services for rule-based evaluating the state of a simulation Transformation Component—provides services for manipulating the state of a simulation Remediation Component—provides services for the rule-based delivering of feedback to the student Domain Component The Domain Model component is the central component of the suite that facilitates communication of context data across the application and the other components. It is a modeling tool that can use industry-standard database such as Informix, Oracle, or Sybase to store its data. A domain model is a representation of the objects in a simulation. The objects are such pseudo tangible things as a lever the student can pull, a form or notepad the student fills out, a character the student interacts with in a simulated meeting, etc. They can also be abstract objects such as the ROI for a particular investment, the number of times the student asked a particular question, etc. These objects are called entities. Some example entities include:

Vehicles, operators and incidents in an insurance domain

Journal entries, cash flow statements and balance sheets in a financial accounting domain Consumers and purchases in a marketing domain An entity can also contain other entities. For example, a personal bank account entity might contain an entity that represents a savings account. Every entity has a set of properties where each property in some way describes the entity. The set of properties owned by an entity, in essence, define the entity. Some example properties include:

An incident entity on an insurance application owns properties such as "Occurrence Date", "Incident Type Code", etc.

A journal entry owns properties such as "Credit Account", "Debit Account", and "Amount"

Figure 7:
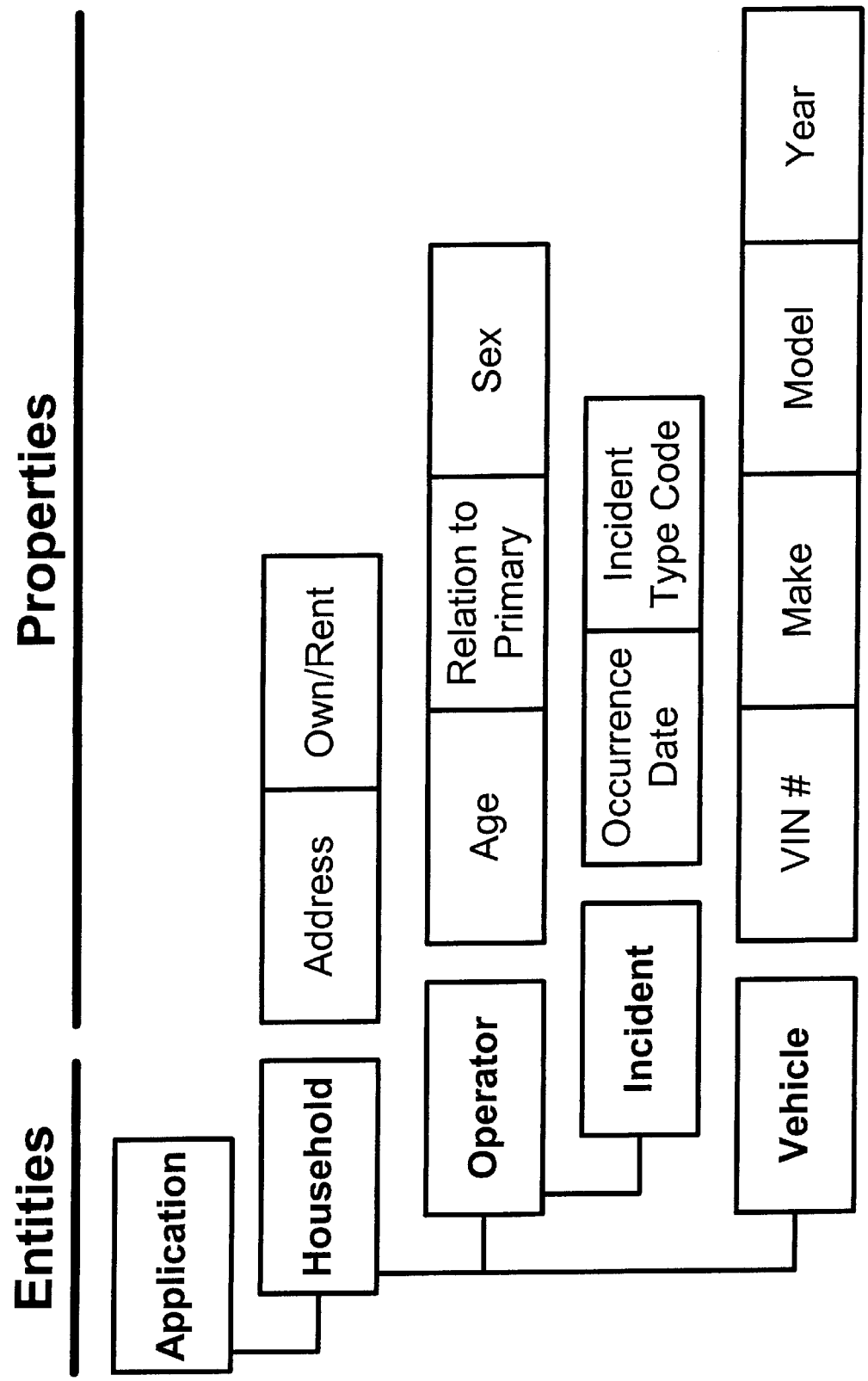
FIG. 7 illustrates a small segment of a domain model for claims handlers in the auto insurance industry in accordance with a preferred embodiment.

A revolving credit account entity on a mortgage application owns properties such as "Outstanding Balance", "Available Limit", etc. FIG. 7 illustrates a small segment of a domain model for claims handlers in the auto insurance industry in accordance with a preferred embodiment.

Example Domain Model

The domain model is created by the instructional designer in a visual editing design tool called the Knowledge Workbench. The designer creates the objects of the domain model using generic entities and properties; that is, not having specific values associated with the entities and properties.

Figure 8:
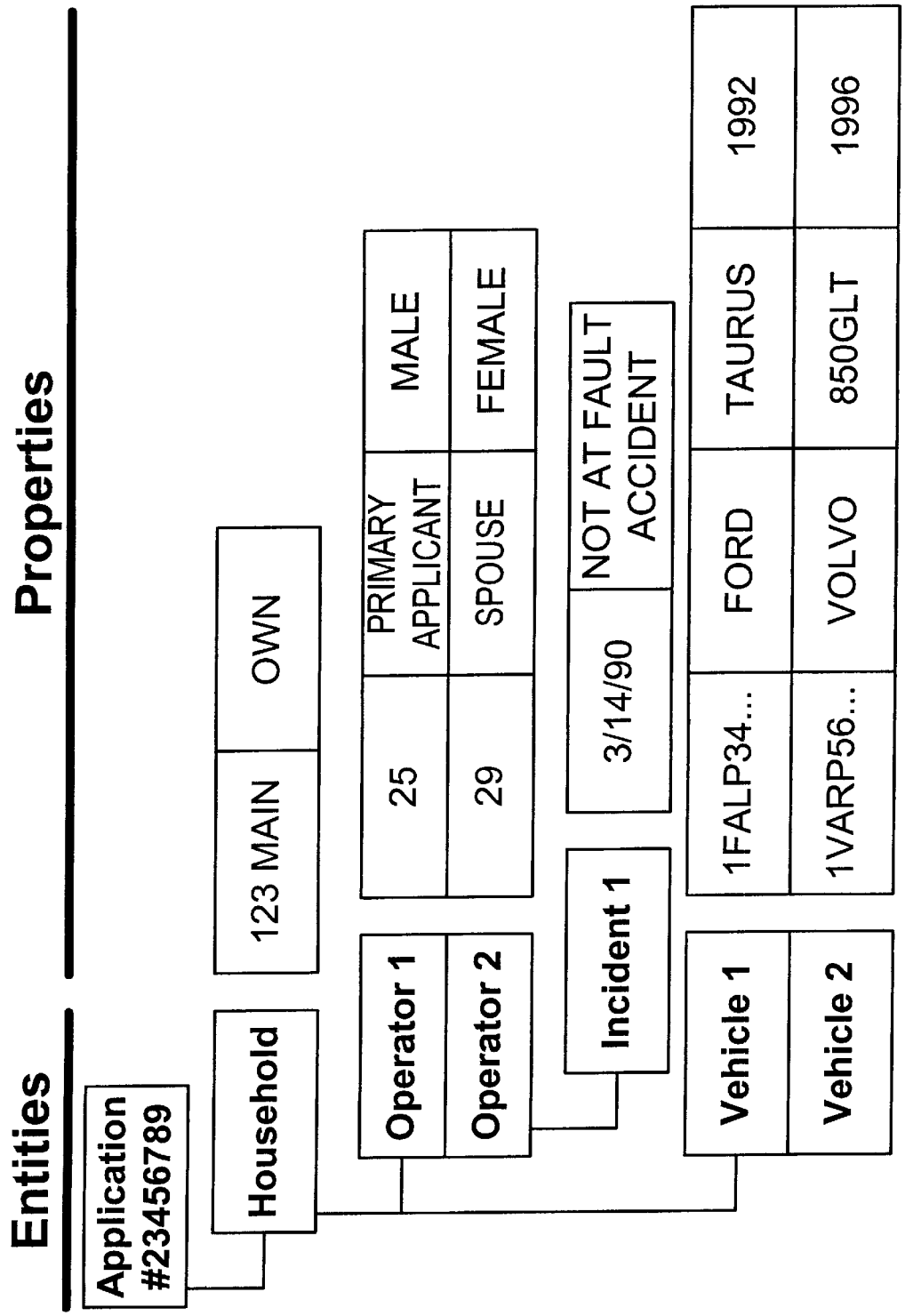
FIG. 8 illustrates an instantiated domain model in accordance with a preferred embodiment.

At runtime, an application's domain model is instantiated so that every entity and property is given a particular value that makes it unique. The result of a domain model instantiation is called the domain. The values of a domain's entities and properties can change throughout the course of the simulation based on student actions and updates from other components. FIG. 8 illustrates an instantiated domain model in accordance with a preferred embodiment.

Example Domain

Creating a domain model in data rather than in code facilitates reuse of the components in multiple applications in multiple domains without code changes. For example, a typical application in the Financial Services domain would have to define classes in code such as 'Customer', 'Account', etc. An Insurance Domain application might have classes such as 'Customer', 'Incident', 'Prior Policy', etc. To be able to perform analysis on any of these classes, the analysis logic must be coded to recognize the classes. This requires all logic to be custom-coded for every application; an effort-intensive undertaking that demands a high degree of technical skill.

By modeling the domain in data using generic objects, we can build standard generic analysis capability that can be applied to the domain. This allows implementation of analysis logic with much less effort by people with a low degree of technical skill. Functional experts can create the objects of the domain and apply various types of analysis from a pallet. All of this is accomplished in a visual development environment that supports the designer with visual feedback and only allows valid designs to be created.

Profiling Component

In the simplest terms, the purpose of the Profiling Component is to analyze the current state of a domain and identify specific things that are true about that domain. This information is then passed to the Remediation Component which provides feedback to the student. The Profiling Component analyzes the domain by asking questions about the domain's state, akin to an investigator asking questions about a case. The questions that the Profiler asks are called profiles. For example, suppose there is a task about building a campfire and the student has just thrown a match on a pile of wood, but the fire didn't start. In order to give useful feedback to the student, a tutor would need to know things like: was the match lit?, was the wood wet?, was there kindling in the pile?, etc. These questions would be among the profiles that the Profiling Component would use to analyze the domain. The results of the analysis would then be passed off to the Remediation Component which would use this information to provide specific feedback to the student.

Specifically, a profile is a set of criteria that is matched against the domain. The purpose of a profile is to check whether the criteria defined by the profile is met in the domain. Using a visual editing tool, instructional designers create profiles to identify those things that are important to know about the domain for a given task. During execution of a BusSim application at the point that feedback is requested either by the student or pro-actively by the application, the set of profiles associated with the current task are evaluated to determine which ones are true. Example profiles include:

Good productions strategy but wrong Break-Even Formula

Good driving record and low claims history

Correct Cash Flow Analysis but poor Return on Investment (ROI)

A profile is composed of two types of structures: characteristics and collective characteristics. A characteristic is a conditional (the if half of a rule) that identifies a subset of the domain that is important for determining what feedback to deliver to the student. Example characteristics include:

Wrong debit account in transaction 1

Perfect cost classification

At Least 1 DUI in the last 3 years

More than $4000 in claims in the last 2 years

More than two at-fault accidents in 5 years

A characteristic's conditional uses one or more atomics as the operands to identify the subset of the domain that defines the characteristic. An atomic only makes reference to a single property of a single entity in the domain; thus the term atomic. Example atomics include:

The number of DUI's >=1

ROI>10%

Income between $75,000 and $110,000

A collective characteristic is a conditional that uses multiple characteristics and/or other collective characteristics as its operands. Collective characteristics allow instructional designers to build richer expressions (i.e., ask more complex questions). Example collective characteristics include:

Bad Household driving record

Good Credit Rating

Marginal Credit Rating

Problems with Cash for Expense transactions

Problems with Sources and uses of cash

Once created, designers are able to reuse these elements within multiple expressions, which significantly eases the burden of creating additional profiles. When building a profile from its elements, atomics can be used by multiple characteristics, characteristics can be used by multiple collective characteristics and profiles, and collective characteristics can be used by multiple collective characteristics and profiles.

Figure 9:
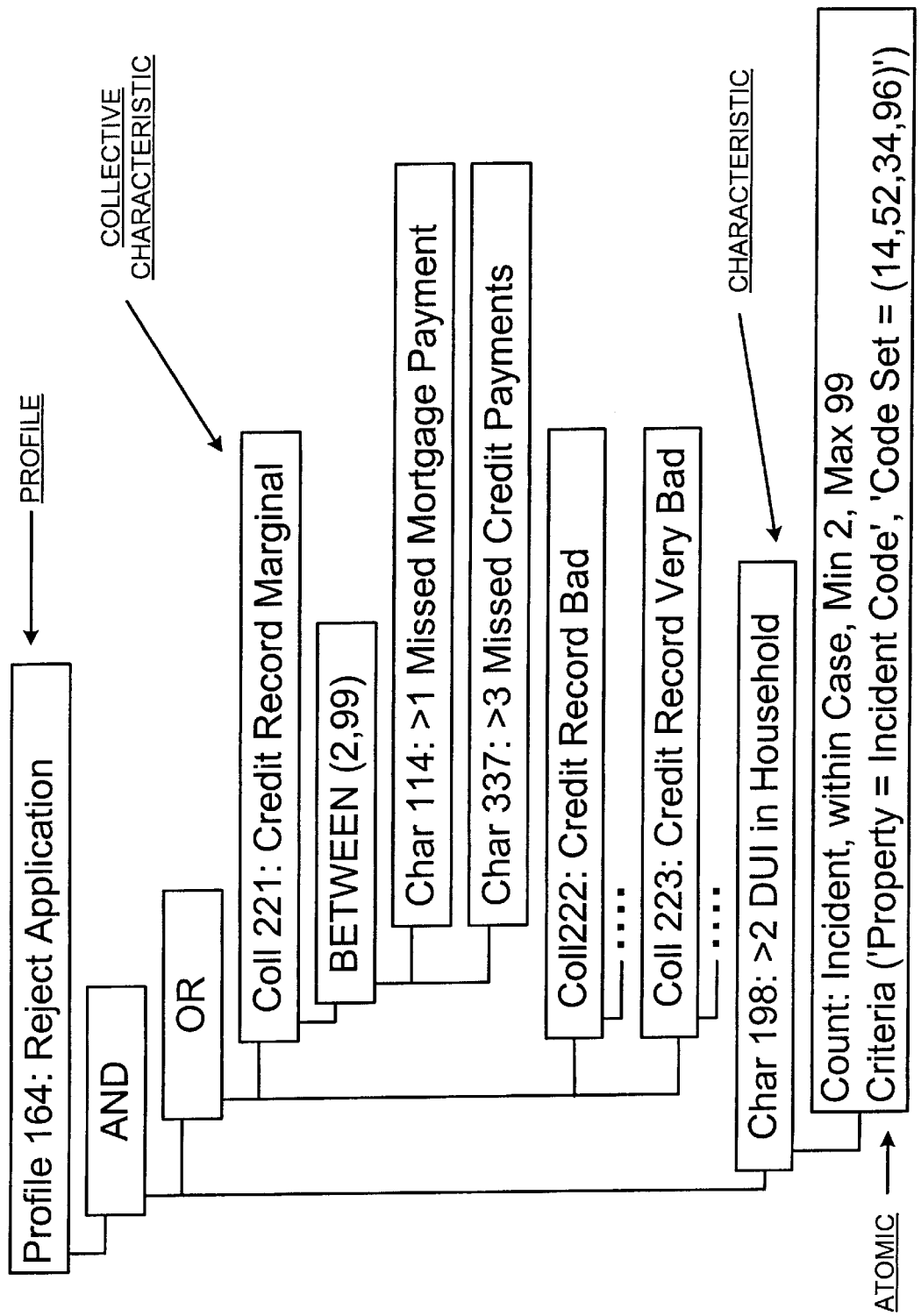
FIG. 9 illustrates an insurance underwriting profile in accordance with a preferred embodiment.

FIG. 9 illustrates an insurance underwriting profile in accordance with a preferred embodiment.

Example Profile for Insurance Underwriting

Transformation Component

Figure 10:
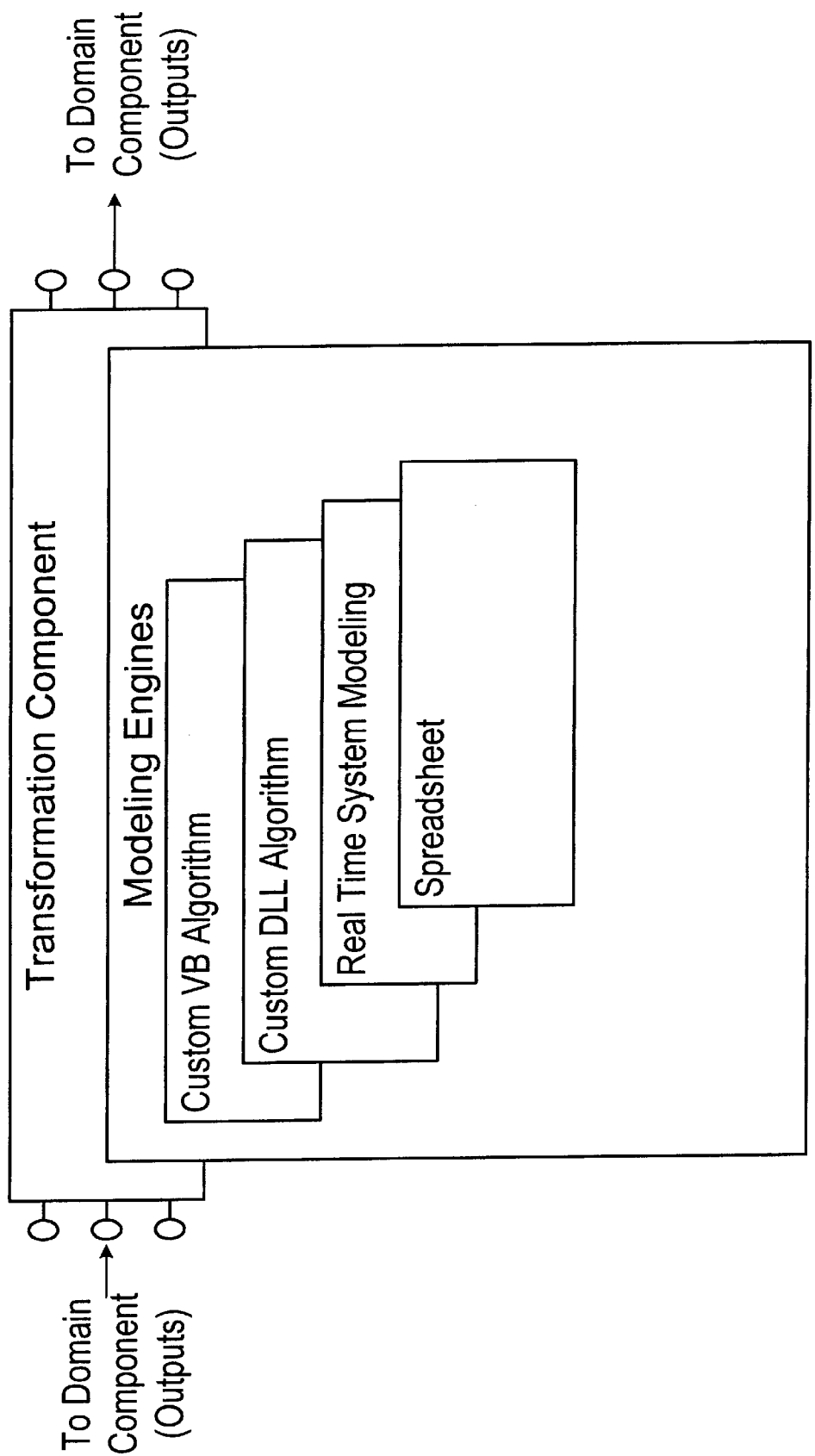
FIG. 10 illustrates a transformation component in accordance with a preferred embodiment.

Whereas the Profiling Component asks questions about the domain, the Transformation Component performs calculations on the domain and feeds the results back into the domain for further analysis by the Profiling Component. This facilitates the modeling of complex business systems that would otherwise be very difficult to implement as part of the application. Within the Analysis phase of the Interface/Analysis/Interpretation execution flow, the Transformation Component actually acts on the domain before the Profiling Component does its analysis. The Transformation Component acts as a shell that wraps one or more data modeling components for the purpose of integrating these components into a BusSim application. The Transformation Component facilitates the transfer of specific data from the domain to the data modeling component (inputs) for calculations to be performed on the data, as well as the transfer of the results of the calculations from the data modeling component back to the domain (outputs). FIG. 10 illustrates a transformation component in accordance with a preferred embodiment.

The data modeling components could be third party modeling environments such as spreadsheet-based modeling (e.g., Excel, Formula1) or discrete time-based simulation modeling (e.g., PowerSim, VenSim). The components could also be custom built in C++, VB, Access, or any tool that is ODBC compliant to provide unique modeling environments. Using the Transformation Component to wrap a third party spreadsheet component provides an easy way of integrating into an application spreadsheet-based data analysis, created by such tools as Excel. The Transformation Component provides a shell for the spreadsheet so that it can look into the domain, pull out values needed as inputs, performs its calculations, and post outputs back to the domain.

For example, if the financial statements of a company are stored in the domain, the domain would hold the baseline data like how much cash the company has, what its assets and liabilities are, etc. The Transformation Component would be able to look at the data and calculate additional values like cash flow ratios, ROI or NPV of investments, or any other calculations to quantitatively analyze the financial health of the company. Depending on their complexity, these calculations could be performed by pre-existing spreadsheets that a client has already spent considerable time developing.

Remediation Component

The Remediation Component is an expert system that facilitates integration of intelligent feedback into BusSim applications. It has the following features:

Ability to compose high quality text feedback.

Ability to compose multimedia feedback that includes video and/or audio.

Ability to include reference material in feedback such as Authorware pages or Web Pages.

Ability to actively manipulate the users deliverables to highlight or even fix users' errors.

A proven remediation theory embedded in its feedback composition algorithm.

Allows integration of digital assets into the Remediation of a training or IPS application.

The Remediation model consists of three primary objects:

Concepts

Coach Topics

Coach Items

Concepts are objects that represent real-world concepts that the user will be faced with in the interface. Concepts can be broken into sub-concepts, creating a hierarchical tree of concepts.

This tree can be arbitrarily deep and wide to support rich concept modeling. Concepts can also own an arbitrary number of Coach Topics.

Coach Topics are objects that represent a discussion topic that may be appropriate for a concept. Coach Topics can own an arbitrary number of Coach Items.

Coach Items are items of feedback that may include text, audio, video, URL's, or updates to the Domain Model. Coach Items are owned by Coach Topics and are assembled by the Remediation Component algorithm.

Details of the Remediation Component algorithm for feedback is discussed in The Intelligent Coaching Agent Tool whitepaper and can be found on the Knowledge Exchange at the Technology Enabled Learning ETA Home Page.

Workbenches

The BusSim Toolset also includes a set of workbenches that are used by instructional designers to design and build BusSim applications. A workbench is a tool that facilitates visual editing or testing of the data that the BusSim Components use for determining an application's run-time behavior. The BusSim Toolset includes the following workbenches:

Knowledge Workbench

The Knowledge Workbench is a tool for the creation of domain, analysis and feedback data that is used by the BusSim Components. It has the following features:

Allows the designer to 'paint' knowledge in a drag-and-drop interface.

Knowledge is represented visually for easy communication among designers.

The interface is intelligent, allowing designers to only paint valid interactions.

Designer's Task creations are stored in a central repository.

The workbench supports check-in/check-out for exclusive editing of a task.

Supports LAN-based or untethered editing.

Automatically generates documentation of the designs.

Generates the data files that drive the behavior of the components.

Simulated Student Test Workbench

The Simulated Student Test Workbench is a tool for the creation of data that simulates student's actions for testing BusSim Component behaviors. It has the following features:

The Test Bench generates a simulated application interface based on the Domain Model.

The designer manipulates the objects in the Domain Model to simulate student activity.

The designer can invoke the components to experience the interactions the student will experience in production.

The designer can fully test the interaction behavior prior to development of the application interface.

Regression Test Workbench

The Regression Test Workbench is a tool for replaying and testing of student sessions to aid debugging. It has the following features:

Each student submission can be individually replayed through the components.

An arbitrary number of student submissions from the same session can be replayed in succession.

Entire student sessions can be replayed in batch instantly.

The interaction results of the student are juxtaposed with the results of the regression test for comparison.

Development Cycle Activities

Design Phase

The design phase of a BusSim application is streamlined by the use of the Knowledge Workbench. The Knowledge Workbench is a visual editor for configuring the objects of the component engines to control their runtime behavior. The components are based on proven algorithms that capture and implement best practices and provide a conceptual framework and methodology for instructional design.

In conceptual design, the workbench allows the designer to paint a model of the hierarchy of Concepts that the student will need to master in the activity. This helps the designer organize the content in a logical way. The visual representation of the Concepts helps to communicate ideas to other designers for review. The consistent look and feel of the workbench also contributes to a streamlined Quality Assurance process. In addition, standard documentation can be automatically generated for the entire design.

As the design phase progresses, the designer adds more detail to the design of the Concept hierarchy by painting in Coach Topics that the student may need feedback on. The designer can associate multiple feedback topics with each Concept. The designer also characterizes each topic as being Praise, Polish, Focus, Redirect or one of several other types of feedback that are consistent with a proven remediation methodology. The designer can then fill each topic with text, video war stories, Web page links, Authorware links, or any other media object that can be delivered to the student as part of the feedback topic.

As the designer's thoughts for the interface become clearer, she can begin to model the domain objects in the Knowledge Workbench. The student's world is constructed using objects in the Domain Model.

The designer again uses the Knowledge Workbench to configure objects in the Transformation Component. The Transformation Component is used to perform calculations or other analysis of the student's domain. Lastly, the designer uses the workbench to configure objects in the Profiling Component. The Profiling Component examines the student's domain, looking for conditions that indicate what feedback topics are appropriate for delivery. More importantly, the Student Simulator Test Workbench allows the designer to exercise the designs. It allows the designer to manipulate the domain as if she were a student. The designer can interact with the simulated interface and invoke the component engines to see the feedback that the student would receive. This capability can also be utilized in a usability test such as a Conference Room Pilot. As the test student interacts with screen mock-ups, a facilitator can mimic his actions in the interface simulator and tell the student what the actual feedback will be. This results in much more rigorous testing prior to application construction. A big payoff is realized downstream in the form of reduced redesign after usability and cognition testing.

Throughout all these steps in the initial design, the workbench supports the design process by allowing the designer great flexibility within the framework of a proven methodology. This allows experienced users to design rich, realistic interactions, and inexperienced users to become competent in a shorter time by learning from the best practices embedded in the workbench. This greatly diminishes the 'blue sky' design problem. Also, since the designs can be tested prior to application construction, there is reduced rework after testing. Lastly, the visual knowledge representation enhances communication within the design team and greatly streamlines the QA process.

Build Phase

It is very clear how the tools support the Build Phase. The designs that the designer painted in the Knowledge Workbench drive the components at runtime. The application developer no longer has to write code that analyzes the student's work and provides feedback. The developer only has to build the interface and logic to report any student actions to the domain model. The components do the rest. What used to be the most difficult part of the build phase has been eliminated!

There is no chance for a developer to misinterpret the feedback designs because she never has to interpret them. In fact, the developer doesn't even have to know anything about the feedback behavior as long as she is familiar with the domain model. This also means the skill level required to develop the application can be greatly reduced. It's not hard to teach someone how to paint a screen in Visual Basic or Delphi and call API functions to notify the Domain Model of student actions.

In addition to the economies gained by the components, it is possible to use templates to further streamline design and development of commonly used interactions. We have created templates for several common interactions. For example, Journalizing of Transactions is an interaction that has appeared in several applications. We have built application and Knowledge Workbench templates for Journalization. All one must do to create a new Journalize task is to add graphics for new Transactions and fill in new data into placeholders in the Knowledge Workbench.

Test Phase

The toolset greatly reduces effort during functionality testing. The key driver of the effort reduction is that the components can automatically track the actions of the tester without the need to add code support in the application. Whenever the tester takes an action in the interface, it is reported to the domain model. From there it can be tracked in a database. Testers no longer need to write down their actions for use in debugging; they are automatically written to disk. There is also a feature for attaching comments to a tester's actions. When unexpected behavior is encountered, the tester can hit a control key sequence that pops up a dialog to record a description of the errant behavior.

Of far greater impact is the ability to replay the tester's actions automatically through the Regression Test Workbench. The designer does not need to spend hours trying to duplicate the error. She simply loads the tester's session into the Regression Test Workbench and replays it. In seconds the error is replicated and can be located and fixed using a variety of debugging utilities. After changes have been made, one more pass through the Regression Test Workbench verifies the fix.

The major difficulties of usability and cognition testing are also addressed by the toolset. First, since student tracking is no longer a manual activity, the precision of functional testing can also be applied to usability and cognition testing. Second, because of the increased rigor in the Conference Room Pilot, the risk of significant rework is greatly reduced.

Execution Phase

During the Execution Phase, the components are deployed to the student's platform. They provide simulated team member and feedback functionality with sub-second response time and error-free operation. If the client desires it, student tracking mechanisms can be deployed at runtime for evaluation and administration of students. This also enables the isolation of any defects that may have made it to production.

Scenarios for Using the Business Simulation Toolset

A good way to gain a better appreciation for how the BusSim Toolset can vastly improve the BusSim development effort is to walk through scenarios of how the tools would be used throughout the development lifecycle of a particular task in a BusSim application. For this purpose, we'll assume that the goal of the student in a specific task is to journalize invoice transactions, and that this task is within the broader context of learning the fundamentals of financial accounting. A cursory description of the task from the student's perspective will help set the context for the scenarios. Following the description are five scenarios which describe various activities in the development of this task. The figure below shows a screen shot of the task interface.

Figure 11:
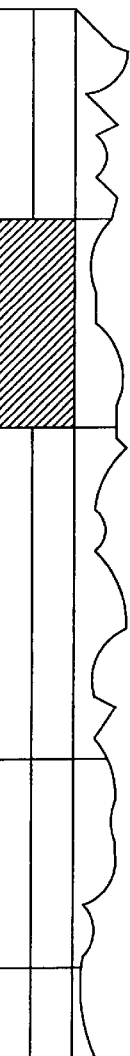
FIG. 11 illustrates the use of a toolbar to navigate and access application level features in accordance with a preferred embodiment.

FIG. 11 illustrates the use of a toolbar to navigate and access application level features in accordance with a preferred embodiment. A student uses a toolbar to navigate and also to access some of the application-level features of the application. The toolbar is the inverted L-shaped object across the top and left of the interface. The top section of the toolbar allows the user to navigate to tasks within the current activity. The left section of the toolbar allows the student to access other features of the application, including feedback. The student can have his deliverables analyzed and receive feedback by clicking on the Team button. In this task, the student must journalize twenty-two invoices and other source documents to record the flow of budget dollars between internal accounts. (Note: "Journalizing", or "Journalization", is the process of recording journal entries in a general ledger from invoices or other source documents during an accounting period. The process entails creating debit and balancing credit entries for each document. At the completion of this process, the general ledger records are used to create a trial balance and subsequent financial reports.)

In accordance with a preferred embodiment, an Intelligent Coaching Agent Tool (ICAT) was developed to standardize and simplify the creation and delivery of feedback in a highly complex and open-ended environment. Feedback from a coach or tutor is instrumental in guiding the learner through an application. Moreover, by diagnosing trouble areas and recommending specific actions based on predicted student understanding of the domain student comprehension of key concepts is increased. By writing rules and feedback that correspond to a proven feedback strategy, consistent feedback is delivered throughout the application, regardless of the interaction type or of the specific designer/developer creating the feedback. The ICAT is packaged with a user-friendly workbench, so that it may be reused to increase productivity on projects requiring a similar rule-based data engine and repository.

Definition of ICAT In Accordance with a Preferred Embodiment

The Intelligent Coaching Agent Tool (ICAT) is a suite of tools—a database and a Dynamic Link Library (DLL) run-time engine—used by designers to create and execute just-in-time feedback of Goal Based training. Designers write feedback and rules in the development tools. Once the feedback is set, the run-time engine monitors user actions, fires rules and composes feedback which describes the business deliverable.

I. The ICAT Remediation Model

The remediation model used within ICAT dynamically composes the most appropriate feedback to deliver to a student based on student's previous responses. The ICAT model is based on a theory of feedback which has been proven effective by pilot results and informal interviews. The model is embodied in the object model and algorithms of the ICAT. Because the model is built into the tools, all feedback created with the tool will conform to the model.

II. The Role of ICAT in Student Training

The ICAT plays two roles in student training. First, the ICAT is a teaching system, helping students to fully comprehend and apply information. Second, ICAT is a gatekeeper, ensuring that each student has mastered the material before moving on to additional information.

III. The Functional Definition of the ICAT

The ICAT is a self contained module, separate from the application. Separating the ICAT from the application allows other projects to use the ICAT and allows designers to test feedback before the application is complete. The ICAT Module is built on six processes which allow a student to interact effectively with the interface to compose and deliver the appropriate feedback for a student's mistakes.

IV. The ICAT Development Methodology for Creating Feedback

The ICAT development methodology is a seven step methodology for creating feedback. The methodology contains specific steps, general guidelines and lessons learned from the field. Using the methodology increases the effectiveness of the feedback to meet the educational requirements of the course.

V. Components

The processes each contain a knowledge model and some contain algorithms. Each process has specific knowledge architected into its design to enhance remediation and teaching.

VI. Testing Utilities, Reports and Methodology

There is a suite of testing tools for the ICAT. These tools allow designers and developers test all of their feedback and rules. In addition, the utilities let designers capture real time activities of students as they go through the course.

Expert Remediation Model Within the Tools

The tools and run-time engine in accordance with a preferred embodiment include expert knowledge of remediation. These objects include logic that analyzes a student's work to identify problem areas and deliver focused feedback. The designers need only instantiate the objects to put the tools to work. Embodying expert knowledge in the tools and engine ensures that each section of a course has the same effective feedback structure in place.

Any project which is creating a Goal-Based Scenario (GBS) business simulation or an Integrated Performance Support (IPS) system to help users understand and create business deliverables can profit from technology in accordance with a preferred embodiment. A GBS allows students to learn in a comprehensive simulated environment. Students work in a simulated environment to accomplish real world tasks, and when they make mistakes, remediation is provided to help identify and correct the mistakes. The hands-on experience of the simulated environment and the timely remediation account for the high retention rate from subjects presented utilizing a system in accordance with a preferred embodiment. A system in accordance with a preferred embodiment can be used in conjunction with an IPS to help users develop deliverables. If a customer service representative (CSR) is completing a form while conducting a phone conversation, the ICAT can be used to observe how the task is completed to provide a live analysis of mistakes.

A file structure in accordance with a preferred embodiment provides a standard system environment for all applications in accordance with a preferred embodiment. A development directory holds a plurality of sub-directories. The content in the documentation directory is part of a separate installation from the architecture. This is due to the size of the documentation directory. It does not require any support files, thus it may be placed on a LAN or on individual computers.

When the architecture is installed in accordance with a preferred embodiment, the development directory has an _Arch, _Tools, _Utilities, Documentation, QED, and XDefault development directory. Each folder has its own directory structure that is inter-linked with the other directories. This structure must be maintained to assure consistency and compatibility between projects to clarify project differences, and architecture updates.

The _Arch directory stores many of the most common parts of the system architecture. These files generally do not change and can be reused in any area of the project. If there is common visual basic code for applications that will continuously be used in other applications, the files will be housed in a folder in this directory.

The sub-directories in the _Arch directory are broken into certain objects of the main project. Object in this case refers to parts of a project that are commonly referred to within the project. For example, modules and classes are defined here, and the directory is analogous to a library of functions, APIs, etc. . . . that do not change. For example the IcaObj directory stores code for the Intelligent Coaching Agent (ICA). The InBoxObj directory stores code for the InBox part of the project and so on. The file structure uses some primary object references as file directories. For example, the IcaObj directory is a component that contains primary objects for the ICA such as functional forms, modules and classes.

The BrowserObj directory contains modules, classes and forms related to the browser functionality in the architecture.

The HTMLGlossary directory contains code that is used for the HTML reference and glossary component of the architecture.

The IcaObj directory contains ICA functional code to be used in an application. This code is instantiated and enhanced in accordance with a preferred embodiment.

The InBoxObj directory contains code pertaining to the inbox functionality used within the architecture. Specifically, there are two major components in this architecture directory. There is a new .ocx control that was created to provide functionality for an inbox in the application. There is also code that provides support for a legacy inbox application. The PracticeObj directory contains code for the topics component of the architecture. The topics component can be implemented with the HTMLGlossary component as well.

The QmediaObj directory contains the components that are media related. An example is the QVIDctrl.cls. The QVIDctrl is the code that creates the links between QVID files in an application and the system in accordance with a preferred embodiment.

The SimObj directory contains the Simulation Engine, a component of the application that notifies the tutor of inputs and outputs using a spreadsheet to facilitate communication.

The StaticObj directory holds any component that the application will use statically from the rest of the application. For example, the login form is kept in this folder and is used as a static object in accordance with a preferred embodiment.

The SysDynObj directory contains the code that allows the Systems Dynamics Engine (Powersim) to pass values to the Simulation Engine and return the values to the tutor.

The VBObj directory contains common Visual Basic objects used in applications. For example the NowWhat, Visual Basic Reference forms, and specific message box components are stored in this folder.

The _Tools directory contains two main directories. They represent the two most used tools in accordance with a preferred embodiment. The two directories provide the code for the tools themselves. The reason for providing the code for these tools is to allow a developer to enhance certain parts of the tools to extend their ability. This is important for the current project development and also for the growth of the tools.

The Icautils directory contains a data, database, default, graphics, icadoc, and testdata directory. The purpose of all of these directories is to provide a secondary working directory for a developer to keep their testing environment of enhanced Icautils applications separate from the project application. It is built as a testbed for the tool only. No application specific work should be done here. The purpose of each of these directories will be explained in more depth in the project directory section. The TestData folder is unique to the _Tools/ICAUtils directory. It contains test data for the regression bench among others components in ICAUtils.

Utilities

The Utilities directory holds the available utilities that a Business Simulation project requires for optimal results. This is a repository for code and executable utilities that developers and designers may utilize and enhance in accordance with a preferred embodiment. Most of the utilities are small applications or tools that can be used in the production of simulations which comprise an executable and code to go with it for any enhancements or changes to the utility. If new utilities are created on a project or existing utilities are enhanced, it is important to notify the managers or developers in charge of keeping track of the Business Simulation assets. Any enhancements, changes or additions to the Business Simulation technology assets are important for future and existing projects.

Documentation

A Documentation directory is used to store pertinent documentation. The documentation directory is structured as follows. Most of the directories are labeled after the specific information held within them. The following is a list of all the documentation directories and a description of what is contain in each.

Ref Website—This directory contains The Business Simulation Reference website, which is a general reference for many things. If the website has not been set up for users on a LAN or website, all you need to do is go into the root directory of website and double click on index.htm. This is the main page for the site.

Components—This directory contains any documentation on classes and modules that are used in the archtecture. For example there are documents here on the ICAMeeting class, the Inbox class etc.

Database—This directory contains any documents describing the databases that are included and used in the Architecture. For example the ICAObj overview doc contains a description of the model and each element in the database.

HTML Component—This directory contains relevant documentation about the HTML part of the architecture.

Process Models—This directory should contain the documents that describe the process of the application or related information.

ReferenceApp—This directory contains documents with descriptions and views of the reference app. (QED) for explanation and documentation. Testing conditions are stored in the Testing directory.

Standards&Templates—This directory contains any type of architecture relevant coding standard documents or templates that a developer is required to follow.

UserGuides—This directory has 6 sub-directories. Each one of these sub-directories contains user guides for a given tool or component in accordance with a preferred embodiment which include user guides for the architecture, the Tutor Suite, ICA Utilities, the simulation Engine and the System Dynamics Engine. There is also a directory for other documentation that contains user guides for any other tools or code like third party controls etc.

WorkFlows—This directory contains the WF_Develop.doc which includes the workflow documentation for an application.

Project Directory

The sample project directory, QED has the same structure that a real project would be designed after. The QED directory has all custom architecture code, databases, spreadsheets, and any other application specific files stored in it. The QED project directory stores a Design and SrcVB directory. The Design directory contains all relevant files for a designer. The SrcVB directory is used for a developer.

The root directory of the Design and SrcVB directory contain a few important files to note. Both have two .rtf files, a few log files and an .ini file. The .rtf files are the feedback that is output from the tutor, the logs are also output from the tutor and the .ini file is for ICAUtils initialization. The design directory has three subdirectories that contain a data directory, which stores .xls files, sim models, and any other important data like html and video. It also has a database directory that holds any relevant databases for development and application use. The last directory is the icadoc directory which includes all .tut files or .ica files, which are both created with the tutor.

The SrcVB directory stores all of the directories previously described. The reason for duplicating the data and database directories is to assure that a developer does not interfere with the designer's files. The developer tends to not do as much design work and can easily corrupt files. This duplication of directories provides a safer environment for the developer to test in. As was mentioned above, the developer tends to have a lot more to do with the application build than the design so there needs to be more content in the SrcVB directory. The SrcVB directory also contains an .exe and .vbp file which are created in a developers visual basic application.

The following are directories found in the SrcVB directory that are not found in the Design directory followed by a short definition:

The _CustomArch directory contains any application specific architecture. Look in the QED folder for an example.

The _CustomDistribution directory contains any files that need to be distributed with the application.

The Default directory contains any backup files that might need to be copied and reused later. Some files occasionally are corrupted and need to be replaced.

The Fonts directory contains application specific font libraries.

The Graphics directory contains any relevant graphics for the application.

The Help directory contains all files for a help reference layer in the application. This can be implemented in many ways but most commonly in an HTML form.

The Saved directory is for saved information that is produced by the application. This can be used for saving student information or saving temporary information for the application steps.

The StudentData directory is for storing any relevant student data, lists of students, their personal information or any relevant student data that needs to be saved.

XDefault Development:

The XDefault Development environment is used to provide a shell for any new project. A developer would rename this directory as an acronym of the project. QED is the default for the installation sample application. The XDefault development directory is a shell and serves as a building block for a startup project. A good idea is to use the QED sample application and build the XDefault Development project with the sample code in QED.

Shared Development

The last directory to be mentioned is the shared development directory which is placed on a LAN or central network area and is shared by all designers and developers of a project to assure that files in the project are up to date, managed properly and appropriately synchronized. There are many databases and files that will be shared in accordance with a preferred embodiment. These files need to be shared and have a location that someone can edit without having to worry about merging files later. A source control program is used to restrict access to a file to one application at a time.

The ICAT Model of Remediation

The ICAT has a model of remediation architected into the system in accordance with a preferred embodiment. Feedback should help students complete tasks and learn the underlying concepts. To achieve this goal, the ICAT reviews student's work with the following objectives in mind.

Identify Student Misconceptions

Identifying that a student does not understand a topic and then clearly explaining it is the goal of human and computer tutors alike. Human tutors, however, have many more clues—including facial expressions and body language—to help them identify student misconceptions. The computer tutor is much more limited and can only view the outputs—such as documents and reports—the student produces. If a computer tutor is looking for a misunderstanding about debits and credits, the computer analyzes all the mistakes a student made concerning debits and credits and tries to identify what misunderstanding would account for this pattern of mistakes.

Identify What Students Should Fix

If the coach cannot diagnose a student's misconception, or cannot do it with 100% accuracy, the coach must at least tell the student what he did wrong so that he can correct it. If at all possible, the coach should identify groups or types of problems the student is making so that the student can generalize the solution and answer.

Prompt Students to Reflect on Mistakes

When identifying problems, the tutor needs to prompt the student to reflect on a problem and start to point the student towards the answer. The tutor should not tell the student the answer, but instead should attempt to provide an appropriate answer or give the student a question to think about.

Reinforce Correct Concepts and Ideas

Once a student has gotten the correct answer, it is important to reinforce the learning. Students may feel uncertain about their understanding even after he has gotten the answer correct. To reinforce the student's understanding of the concept and provide a confidence boost, the tutor should walk the student through the answer so that it is completely understood. These goals are not just the goals of a computer tutor, but they are the goals of a human tutor as well. All tutors must look at a student's work to help identify and correct errors as well as learn the material. One of the most difficult tasks facing a tutor is the difficult task of balancing the appropriate amount of assistance provided the student to complete the task with the requirement to help the student learn the material.

Model of Feedback

A preferred embodiment utilizes feedback to address the balancing task. The theory is centered on the idea of severity. Severe errors require severe feedback while mild errors require mild feedback. If a student writes a paper on the wrong subject, a human tutor will spend little time reviewing the paper, but instead, identify it as a serious mistake and ask the student to rewrite the paper. If the student simply misses one paragraph of the argument, then the tutor will focus the student on that paragraph. Finally, if the paper is correct except for a couple of spelling mistakes, the tutor will point out the specific mistakes and ask the student to correct them. The point is that because a tutor and a student do not want to waste each others' time, they will match the severity of the error with the severity of the feedback.

In the ICAT model of feedback, there are four levels of severity of error and four corresponding levels of feedback. The tutor goes through the student's work, identifies the severity of the error and then provides the corresponding level of feedback.

Educational Categories of Feedback

| ERROR | | FEEDBACK | |
|---|---|---|---|
| Error Type | Description | Feedback Type | Description |
| 1. None | No errors exist. The student's work is perfect. | 1. Praise | Confirmation that the student completed the task correctly. Example: Great. You have journalized all accounts correctly. I am happy to see you recognized we are paying for most of our bills "on account". |
| 2. Syntactic | There may be spelling mistakes or other syntactic errors. As a designer, you should be confident that the student will have mastered the material at this point. | 2. Polish | Tells the student the specific actions he did incorrectly, and possibly correct them for him. Example: There are one or two errors in your work. It looks like you misclassified the purchase of the fax as a cash purchase when it is really a purchase on account. |
| 3. Local | A paragraph of a paper is missing or the student has made a number of mistakes all in one area. The student clearly does not understand this area. | 3. Focus | Focus the student on this area of his work. Point out that he does not understand at least one major concept. Example: Looking over your work, I see that you do not understand the concept of "on account". Why don't you review that concept and review your work for errors. |
| 4. Global | The student has written on the wrong subject or there are mistakes all over the student's work which indicates he does not understand most of the concepts in the activity. | 4. Re-direct | Restate the goal of the activity and tell the student to review main concepts and retry the activity. Example: There are lots of mistakes throughout your work. You need to think about what type of transaction each source document represents before journalizing it. |

Returning to the analogy of helping someone write a paper, if the student writes on the wrong subject, this as a global error requiring redirect feedback. If the student returns with the paper rewritten, but with many errors in one area of the paper, focus feedback is needed. With all of those errors fixed and only spelling mistakes—syntactic mistakes—polish feedback is needed. When all syntactic mistakes were corrected, the tutor would return praise and restate why the student had written the correct paper.

Focusing on the educational components of completing a task is not enough. As any teacher knows, student will often try and cheat their way through a task. Students may do no work and hope the teacher does not notice or the student may only do minor changes in hope of a hint or part of the answer. To accommodate these administrative functions, there are three additional administrative categories of feedback.

Administrative Categories of Feedback

| Error | Description | Feedback | Description |
|---|---|---|---|
| No work done since last review | The student has made no changes since the last time he asked for the tutor to review his work. | Mastermind | Tell the student that he has done no work and that a substantial amount of work needs to be completed before review.<br>Example:<br>You have done no work since I last reviewed your work. Please try and correct at least three journal entries before asking me to review your work again. |
| All work is not complete but a substantial amount of work has been done | If a designer wants to give an interim report of how the student is doing before everything is done, they he would use incomplete--continue. | Incomplete-continue | State that the student has not completed all of the work required, but you will review what the student has done so far.<br>Example:<br>It looks like you have not finished journalizing, but I will review what you have done up to this point. The first three entries are correct. |
| All work is not complete and a substantial amount of work is not complete | If a user has not completed enough work to receive feedback, this category is used. | Incomplete-stop | State that nothing has been attempted and point to the first action to be taken.<br>Example:<br>It looks like you have done no work journalizing. Why don't you start by trying to journalize the fax purchase. |

The administrative and the educational categories of feedback account for every piece of feedback a designer can write and a student can receive. To provide a better understanding of how the feedback works together, an example is provided below.

Feedback Example

The following example is a GBS training application in which new finance professionals are taught the fundamentals of finance management. A student has a toolbar to navigate and also to access some of the application-level features of the application. The toolbar is the L-shaped object across the top and left of the interface. The top section of the toolbar allows the user to navigate to tasks within the current Activity. The left section of the toolbar allows the student to access other features of the application, including feedback. The student can have his deliverables analyzed and receive feedback by clicking on a team button.

In this task, the student must journalize twenty-two invoices and other source documents to record the flow of budget dollars between internal accounts. (Note: "Journalizing", or "Journalization", is the process of recording journal entries in a general ledger from invoices or other source documents during an accounting period. The process entails creating debit and balancing credit entries for each document. At the completion of this process, the general ledger records are used to create a trial balance and subsequent financial reports.) The student has several controls on the screen that must be manipulated to complete the task. The upper left area of the screen shows the current transaction. Each transaction has a corresponding journal entry. The bottom of the screen shows the current journal entry. The Top two lines of the journal entry are for Debits (DR) and the bottom two lines are for Credits (CR). As the student uses the 'Back' and 'Next' buttons to page through the transactions, the journal entry is also paged to stay in sync.

Figure 12:
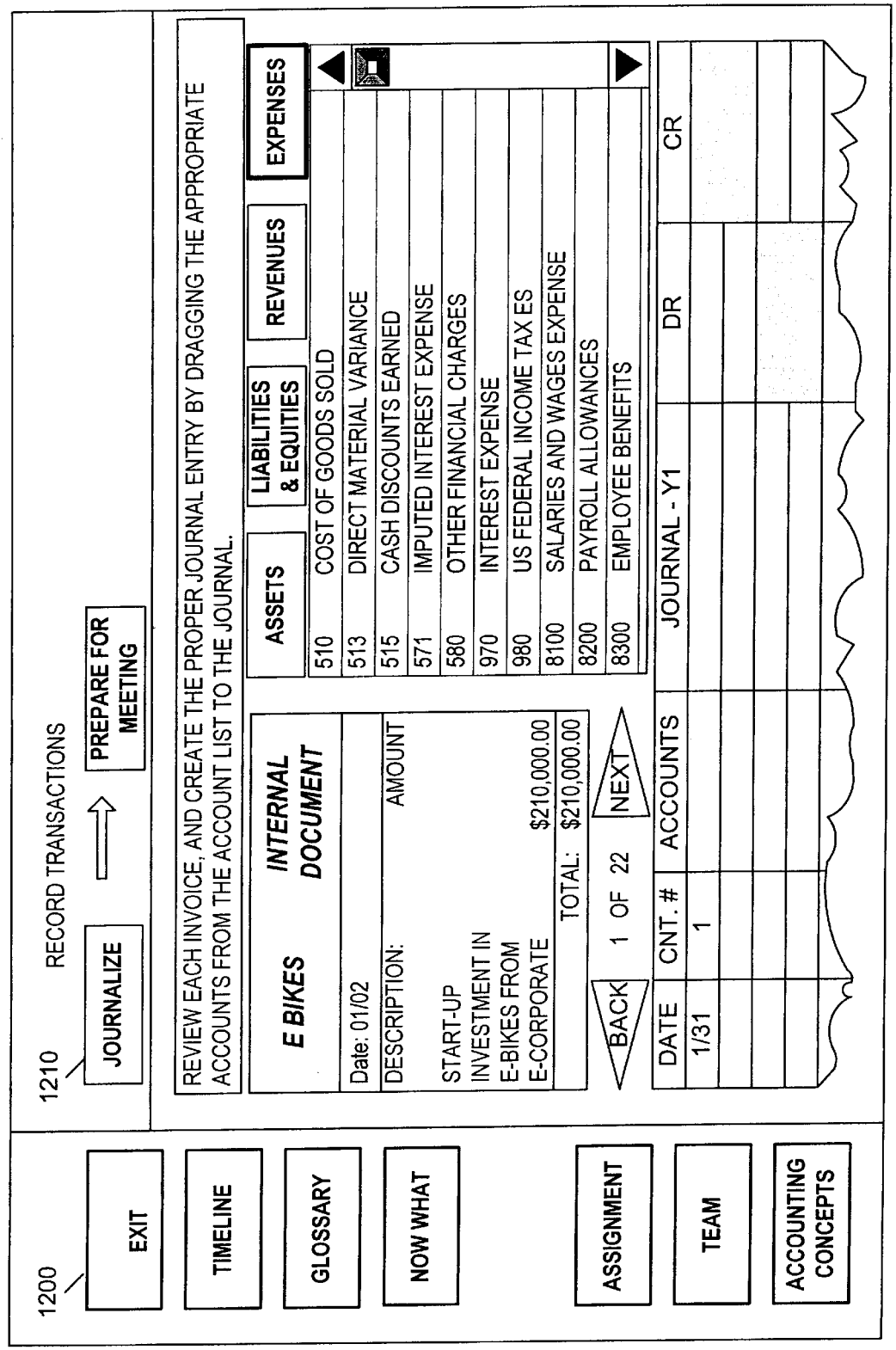
FIG. 12 is a GBS display in accordance with a preferred embodiment.

FIG. 12 is a GBS display in accordance with a preferred embodiment. The upper right area of the screen shows the account list. There are four types of accounts: Assets, Liabilities & Equity, Revenues, and Expenses. The user clicks on one of the tabs to show the accounts of the corresponding type. The student journalizes a transaction by dragging an account from the account list onto the journal entry Debits or Credits. The student then enters the dollar amounts to debit or credit each account in the entry. In the interface, as in real life, the student can have multi-legged journal entries (i.e., debiting or crediting multiple accounts).

A Toolbar 1200 and the first transaction of this Task 1210 appear prominently on the display. The student can move forward and back through the stack of transactions. For each transaction, the student must identify which accounts to debit and which to credit. When the student is done, he clicks the Team button.

Figure 13:
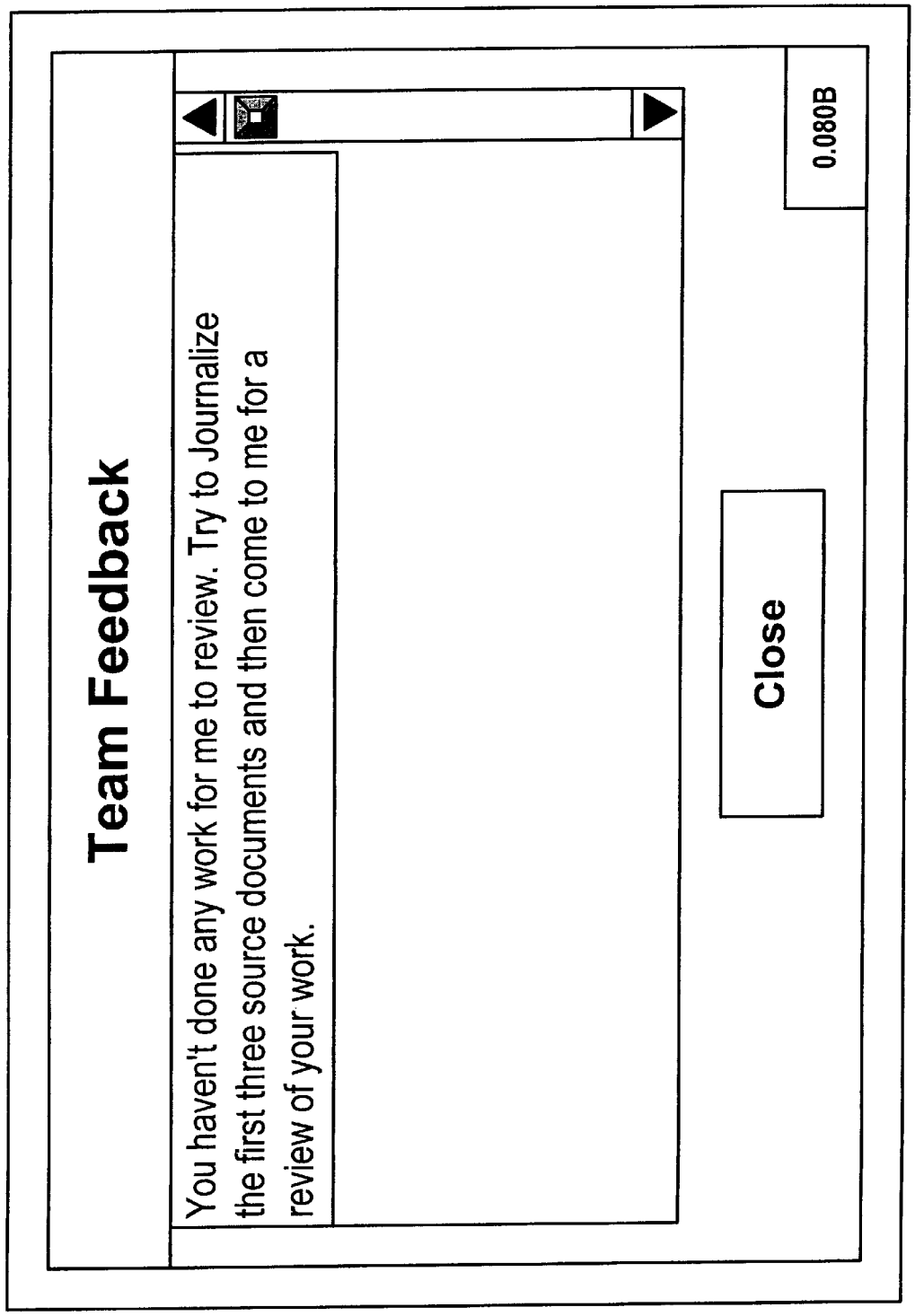
FIG. 13 is a feedback display in accordance with a preferred embodiment.

FIG. 13 is a feedback display in accordance with a preferred embodiment. The student may attempt to outsmart the system by submitting without doing anything. The ICAT system identifies that the student has not done a substantial amount of work and returns the administrative feedback depicted in FIG. 13. The feedback points out that nothing has been done, but it also states that if the student does some work, the tutor will focus on the first few journal entries.

FIG. 14 illustrates a display in which a student has made some mistakes in accordance with a preferred embodiment. The student tries to journalize the transaction depicted in FIG. 14 which reflects the capital needed to start the business. The student attempts to journalize the transaction by debiting the paid-in capital account and crediting the cash account for $210,000. Similarly, the student attempts to journalize the purchase of Government Bonds by debiting accounts receivable and crediting cash for $150,000 as shown in FIG. 15. FIG. 15 illustrates a journal entry simulation in accordance with a preferred embodiment.

FIG. 16 illustrates a simulated Bell Phone Bill journal entry in accordance with a preferred embodiment. The journal entry is accomplished by debiting Utilities Expenses and Crediting Cash for $700 each.

FIG. 17 illustrates a feedback display in accordance with a preferred embodiment. After attempting to journalize the first three transactions, the student submits his work and receives the feedback depicted in FIG. 17. The feedback starts by focusing the student on the area of work being evaluated. The ICAT states that it is only looking at the first three journal entries. The feedback states that the first two entries are completely wrong, but the third is close. If the student had made large mistakes on each of the first three transactions, then the ICAT may have given redirect feedback, thinking a global error occurred. The third bullet point also highlights how specific the feedback can become, identifying near misses.

Figure 18:
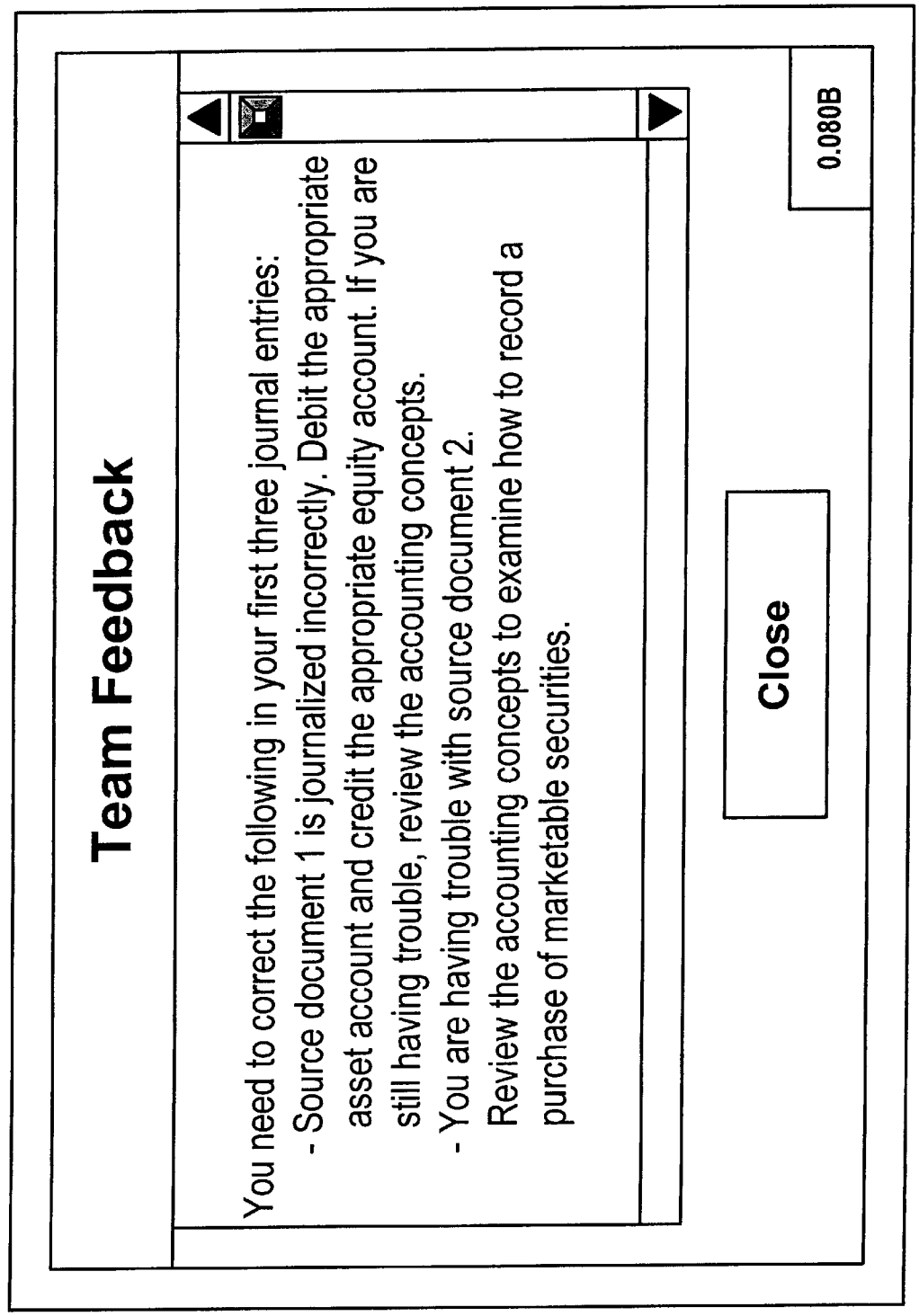

FIGS. 18 and 19 illustrate a feedback display in accordance with a preferred embodiment. As a student attempts to correct transactions one and two unsuccessfully, the tutor starts to provide hints, stating that the student should debit an asset account and credit an equity account. The ICAT continues to focus on the errors in the first three source documents and is giving progressively more specific hints.

Figure 20:
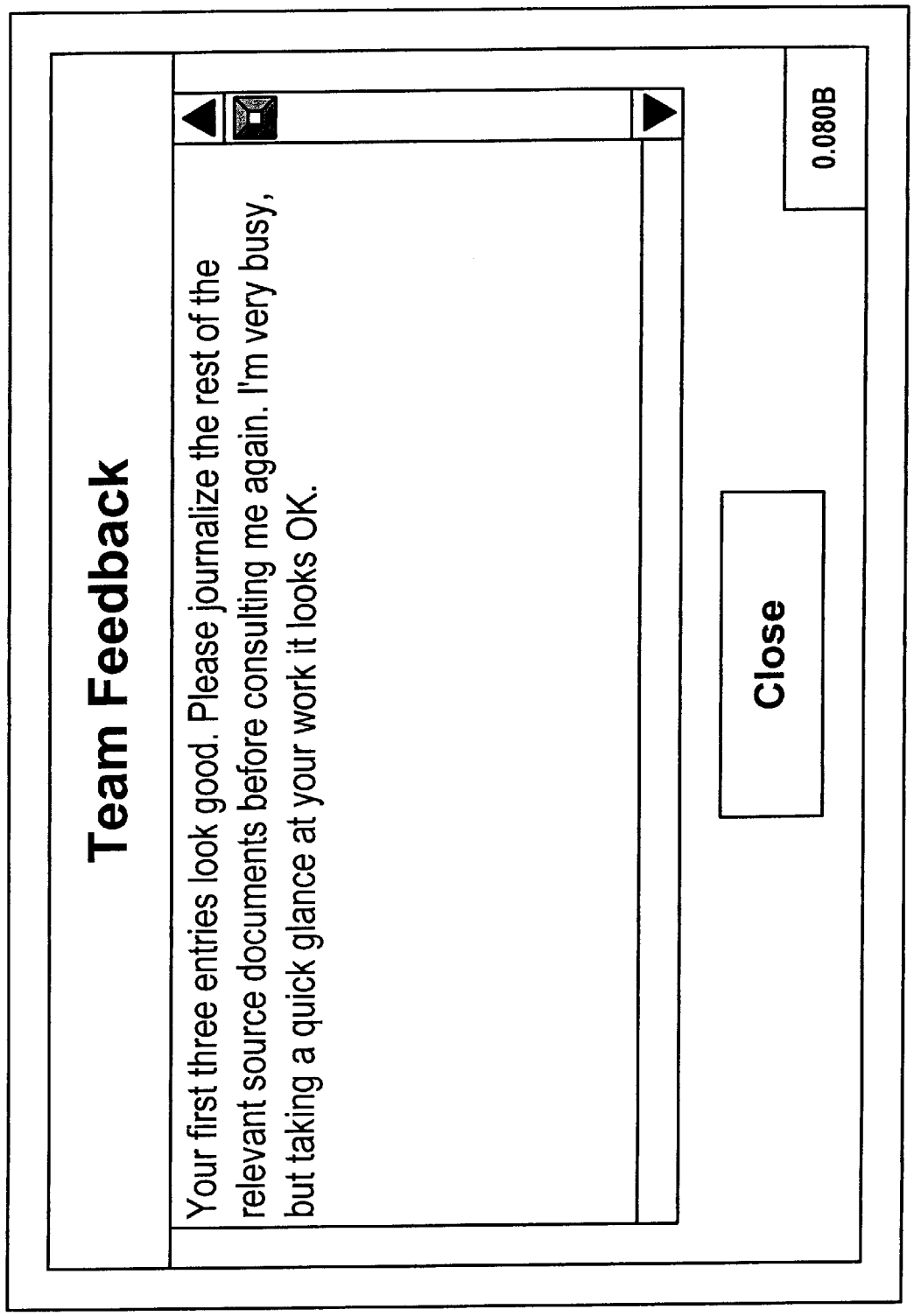
FIG. 20 illustrates a feedback display in accordance with a preferred embodiment.

FIG. 20 illustrates a feedback display in accordance with a preferred embodiment. With the specific hints provided as illustrated in FIG. 19, the student correctly journalizes the source document. The ICAT, however, continues to focus the student on these first three journal entries as illustrated in FIG. 20. The student finally completes the first three entries correctly. The feedback illustrated in FIG. 20 informs the student of his success and instructs him to try to complete the rest of the transaction before submitting his deliverable again. This example illustrates the use of an effective technique called "baby-stepping". The student is helped through a small portion of the work to get him introduced to the concepts and the interface.

After completing this, he is forced to attempt all of the remaining work before getting substantive feedback. This technique can be used to mimic the kind of interactions one could expect to receive from a mentor in real life. The three transactions above show a tiny fraction of the depth of student analysis and richness of remediation that the ICAT is capable of delivering.

As mentioned earlier in the Remediation Model section, the tutor plays two roles in any course. First, the tutor reviews the student's work and helps him/her understand the task and the associate concepts. Second the tutor is gatekeeper between sections. The tutor will not allow students to proceed to the next section of the course until they have gotten the current section correct. To monitor student progress, the course has been broken into two components:

Activity

An activity is a business event, such as planning a company's financials or closing the books. Business events set the context of the course. Students learn the content so that they can complete the goals associates with each business event. The power of a GBS is in how it embeds the content a student needs to learn within the context of the business events.

Task

A task is a business deliverable that must be completed as part of a business event. Example tasks include completing journal entries while closing the books. There may be many Tasks in an activity, just as there may be many deliverables required to react to a business event in the real world. Deliverables produced in this application include a break-even analysis, a transaction journal, a cost report, and a ratio analysis. The role of the tutor is to help the students complete the business deliverables associated with any business event. Students can always go backward, but they are limited from going forward, until the ICAT says that the business deliverable meets the required specifications. It is useful to think of the ICAT as a boss who reviews your work. The boss will not let you go on to the next task, or business deliverable, until you have correctly completed the current task. To help explain the concepts of an activity and task, here is a description of an ICAT implementation in accordance with a preferred embodiment.

A training application utilizing ICAT for a large product company is presented as an example. The training application is a revision of the first semester of a two year financial training program. Students learn finance by managing a simulated bicycle company for three years and using finance to solve business problems. At four places in the course, the students come together to present their analyses of the business. These presentations are live presentations to real business executives.

In preparation for the pitches, the students complete computer-based modules. There are two major sections to each module, the accounting concepts and the activities. Students learn the concepts and ideas in the accounting concepts and apply the concepts in the activities. All of the modules together represent the different phases associated with running a business: Start Operations, Analyze Operations and Improve Operations. Each computer-based activity represents a business event, such as closing the books of the company. These business events provide context for the content the students learn in the course. In this way, students not only learn what the concepts are but when, how and why they should use them.

| Business Events—Activities |
| --- |
| 1. Financial Planning |
| 2. Recording Transactions |
| 3. Recording Transactions |
| 4. Closing the Books |
| 5. Analyze the Books |
| 6. Improve Operations |

Figure 21:
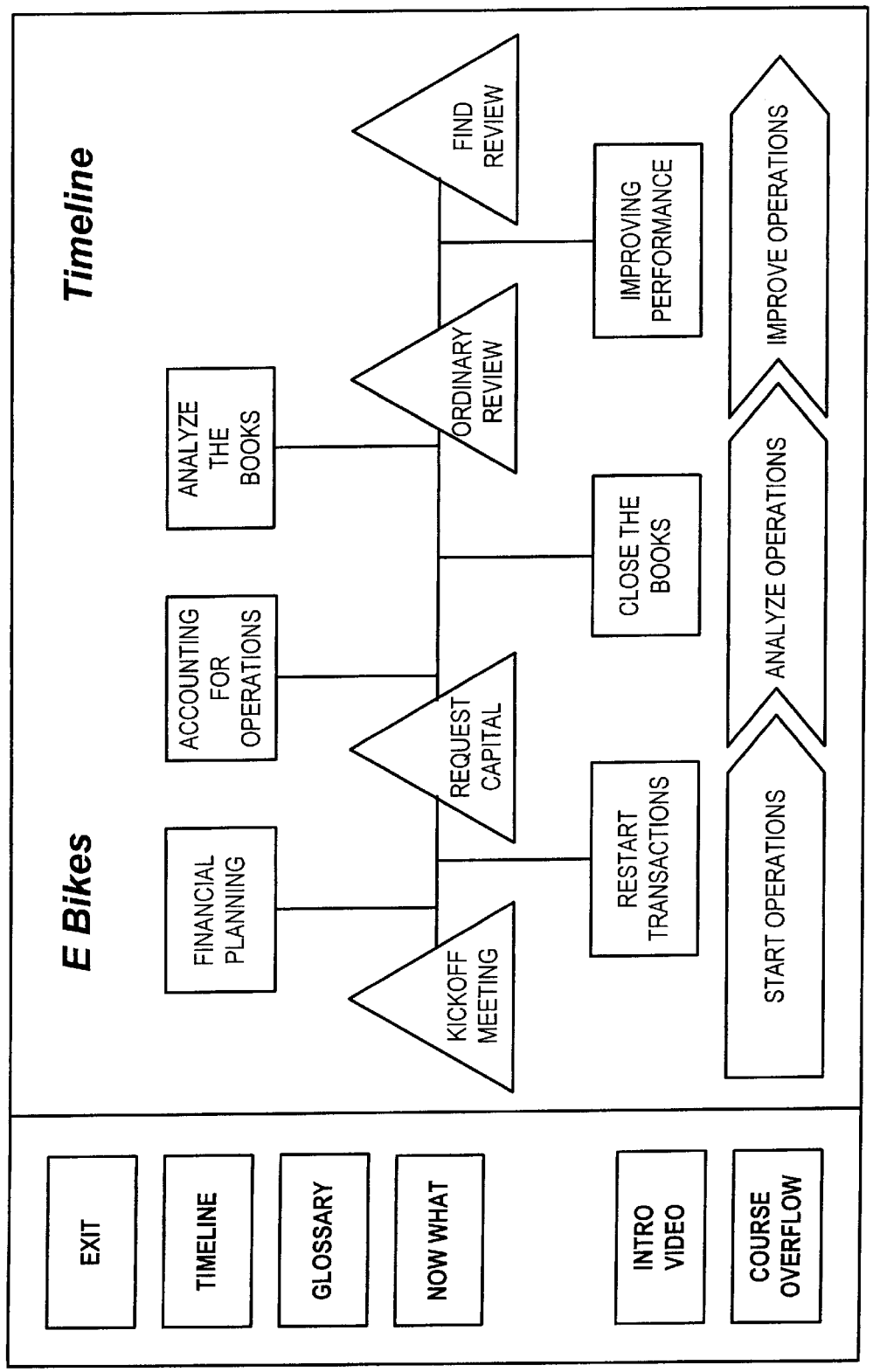
FIG. 21 illustrates a simulation display in accordance with a preferred embodiment.

FIG. 21 illustrates a simulation display in accordance with a preferred embodiment. To show how the business events impact the company on a day to day basis, students complete a set of deliverables associated with each business event. The business deliverables students create in the training application are varied in form and content. Some example business deliverables are listed below in accordance with a preferred embodiment.

1. An Analysis of Proforma Financial Statements

Students perform break-even analysis to determine which of twelve business strategies to pursue.

2. Journal Entries

Student journalize 20 of the transactions which occur in the third year of operations.

3. Summaries of Interviews with Employees about Operating Plan Variances

Students get behind the numbers and figure out what is driving the variances.

Design Scenario

Figure 22:
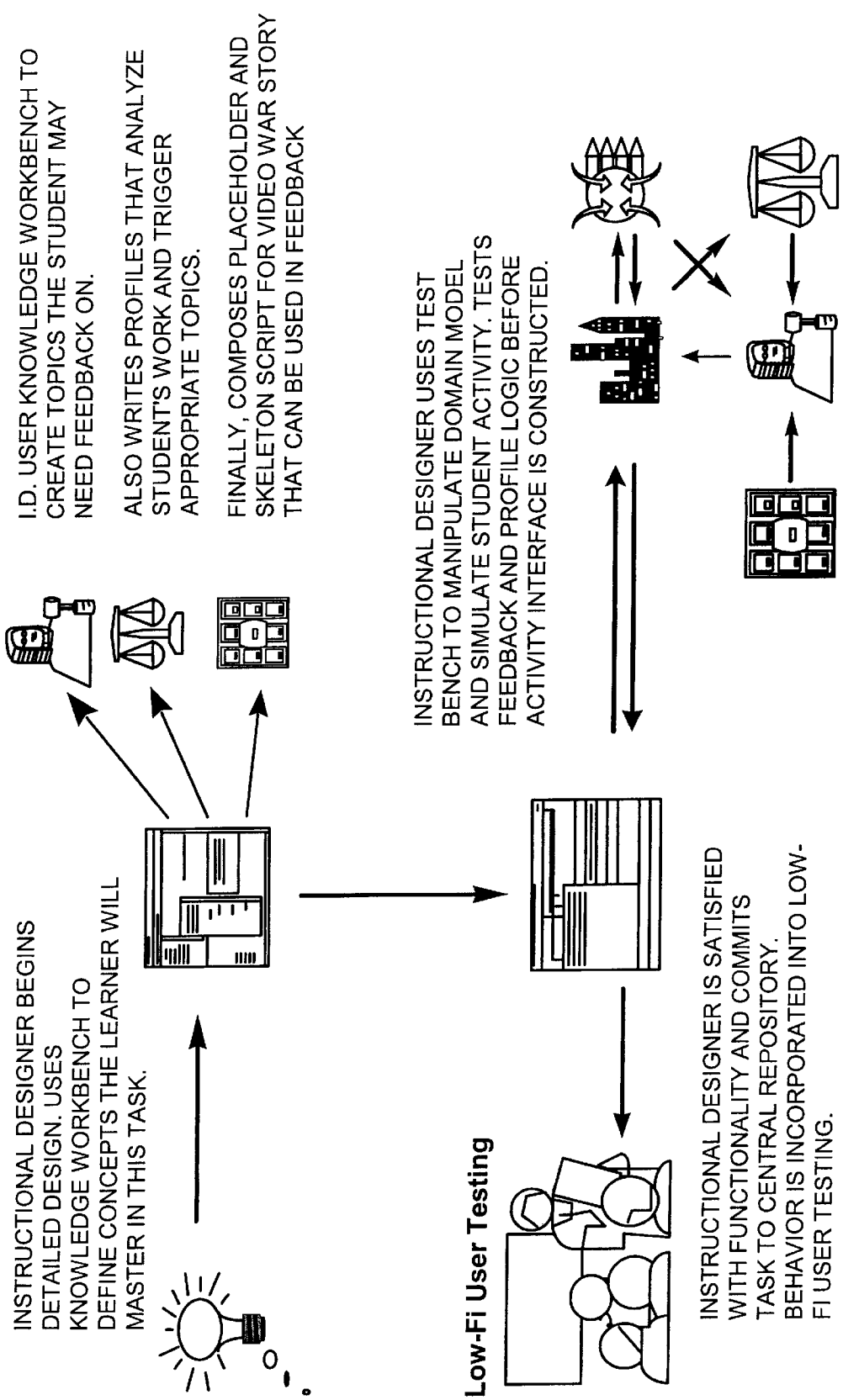
FIG. 22 illustrates the steps of the first scenario in accordance with a preferred embodiment.

This Scenario illustrates how the tools are used to support conceptual and detailed design of a BusSim application. FIG. 22 illustrates the steps of the first scenario in accordance with a preferred embodiment. The designer has gathered requirements and determined that to support the client's learning objectives, a task is required that teaches journalization skills. The designer begins the design first by learning about journalization herself, and then by using the Knowledge Workbench to sketch a hierarchy of the concepts she want the student to learn. At the most general level, she creates a root concept of 'Journalization'. She refines this by defining sub-concepts of 'Cash related transactions', 'Expense related Transactions', and 'Expense on account transactions'. These are each further refined to whatever level of depth is required to support the quality of the learning and the fidelity of the simulation.

The designer then designs the journalization interface. Since a great way to learn is by doing, she decides that the student should be asked to Journalize a set of transactions. She comes up with a set of twenty-two documents that typify those a finance professional might see on the job. They include the gamut of Asset, Expense, Liability and Equity, and Revenue transactions. Also included are some documents that are not supposed to be entered in the journal. These 'Distracters' are included because sometimes errant documents occur in real life. The designer then uses the Domain Model features in the Knowledge Workbench to paint a Journal. An entity is created in the Domain Model to represent each transaction and each source document. Based on the twenty-two documents that the designer chose, she can anticipate errors that the student might make. For these errors, she creates topics of feedback and populates them with text. She also creates topics of feedback to tell the student when they have succeeded. Feedback Topics are created to handle a variety of situations that the student may cause. The next step is to create profiles that the will trigger the topics in the concept tree (this task is not computational in nature, so the Transformation Component does not need to be configured). A profile resolves to true when its conditions are met by the student's work. Each profile that resolves to true triggers a topic.

To do some preliminary testing on the design, the designer invokes the Student Simulator Test Workbench. The designer can manipulate the Domain Model as if she were the student working in the interface. She drags accounts around to different transactions, indicating how she would like them journalized. She also enters the dollar amounts that she would like to debit or credit each account. She submits her actions to the component engines to see the feedback the student would get if he had performed the activity in the same way. All of this occurs in the test bench without an application interface.

The last step in this phase is low-fi user testing. A test student interacts with a PowerPoint slide or bitmap of the proposed application interface for the Journalization Task. A facilitator mimics his actions in the test bench and tells him what the feedback would be. This simplifies low-fi user testing and helps the designer to identify usability issues earlier in the design when they are much cheaper to resolve.

Build Scenario

Figure 23:
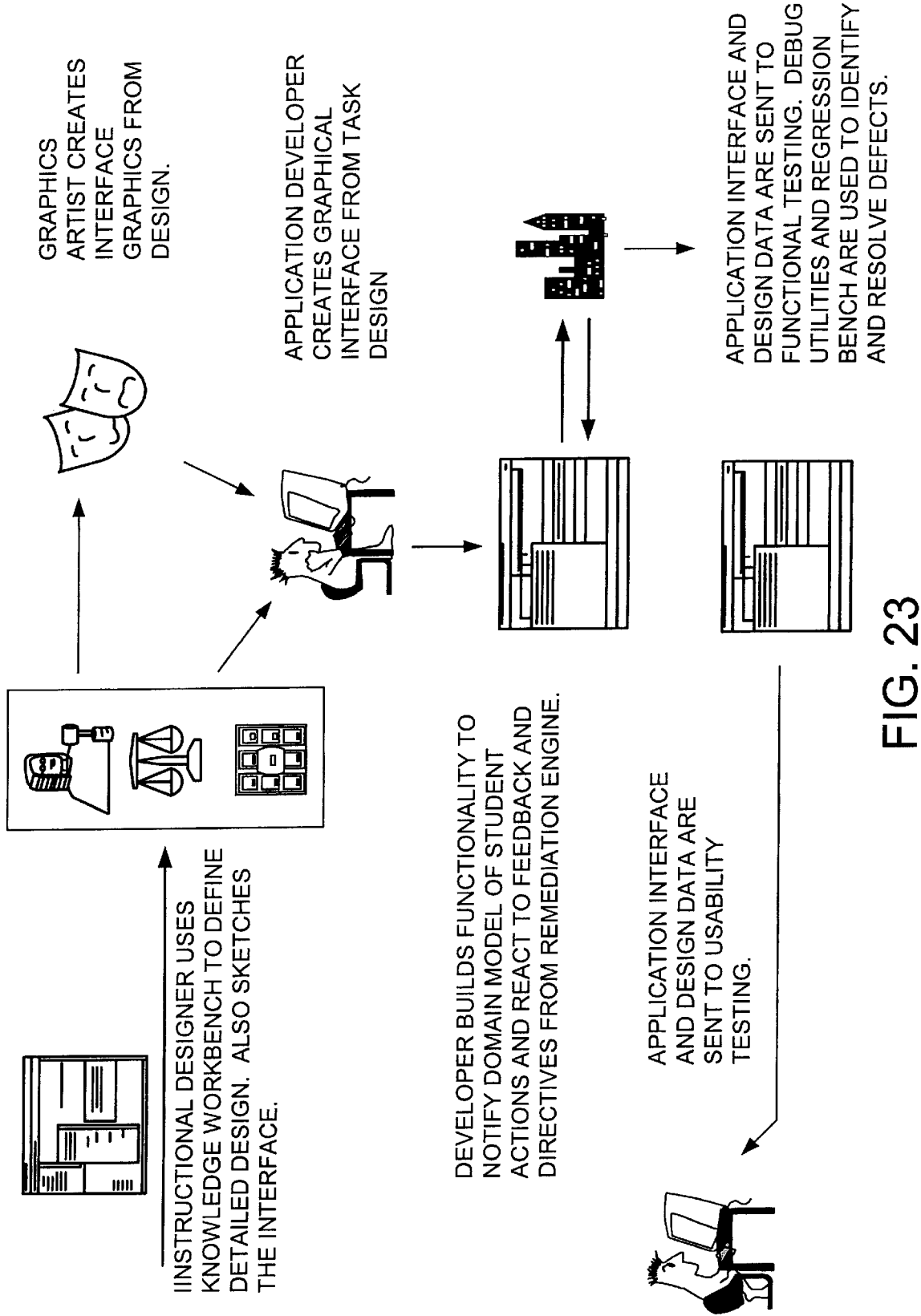
FIGS. 23 and 24 illustrate the steps associated with a build scenario in accordance with a preferred embodiment.
Figure 24:
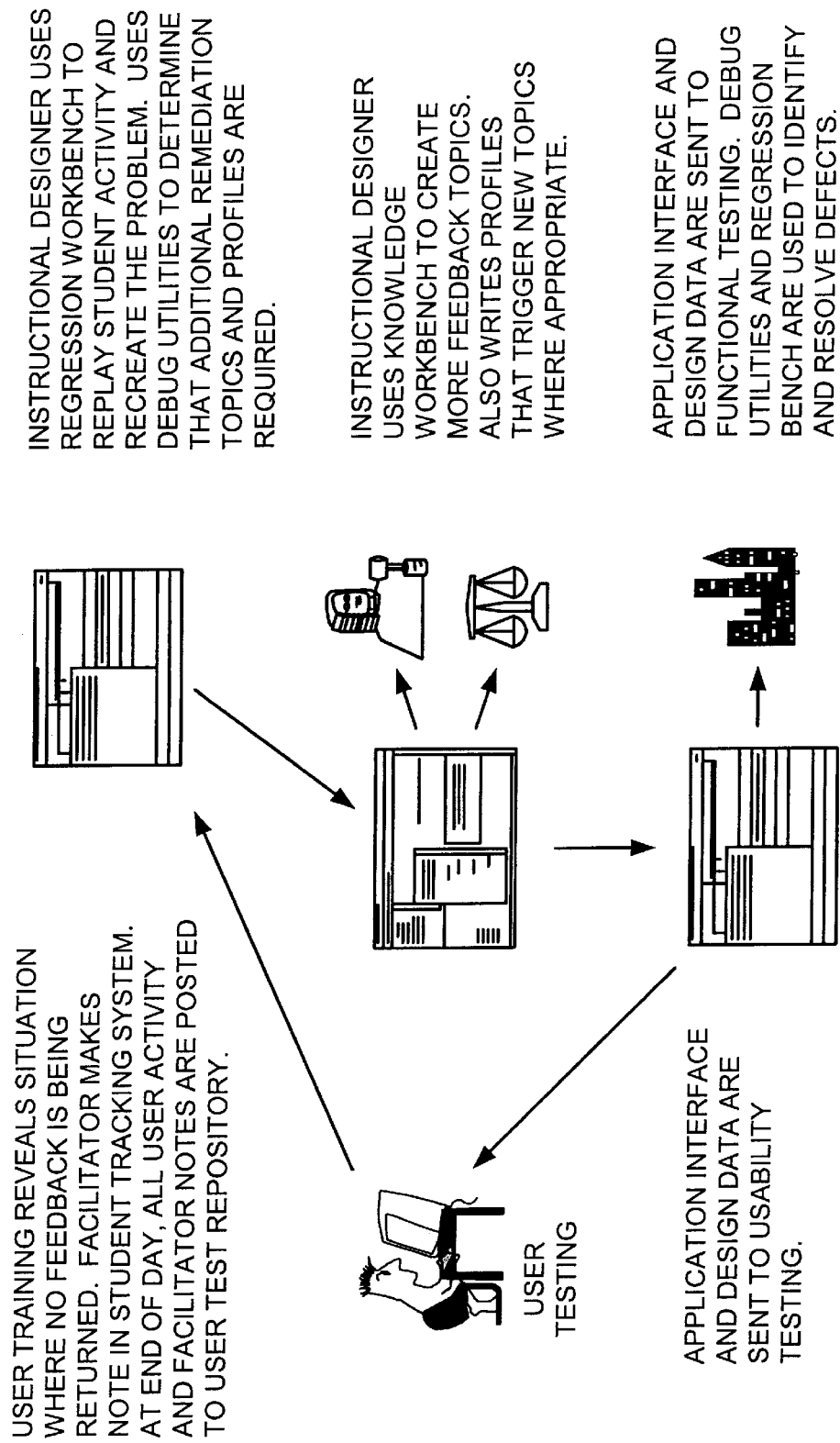

FIGS. 23 and 24 illustrate the steps associated with a build scenario in accordance with a preferred embodiment. The instructional designer completes the initial interaction and interface designs as seen in the previous Scenario. After low-fi user testing, the Build Phase begins. Graphic artists use the designs to create the bitmaps that will make up the interface. These include bitmaps for the buttons, tabs, and transactions, as well as all the other screen widgets. The developer builds the interface using the bitmaps and adds the functionality that notifies the Domain Model of student actions. Standard event-driven programming techniques are used to create code that will react to events in the interface during application execution and pass the appropriate information to the Domain Model. The developer does not need to have any deep knowledge about the content because she does not have to build any logic to support analysis of the student actions or feedback. The developer also codes the logic to rebuild the interface based on changes to the domain model.

A few passes through these steps will typically be required to get the application communicating correctly with the components. The debug utilities and Regression Test Workbench streamline the process. After the application interface and component communication are functioning as designed, the task is migrated to Usability testing.

Test Scenario

This scenario demonstrates the cycle that the team goes through to test the application. It specifically addresses usability testing, but it is easy to see how the tools also benefit functional and cognition testing. Again, we will use the Journalization Task as an example. FIG. 24 illustrates a test scenario in accordance with a preferred embodiment. The test students work through the journalization activity. One of the students has made it over half way through the task and has just attempted to journalize the sixteenth transaction. The student submits to the Financial Coach, but the feedback comes back blank. The student notifies the facilitator who right-clicks on the Financial Coach's face in the feedback window. A dialog pops up that shows this is the twenty-seventh submission and shows some other details about the submission. The facilitator (or even the student in recent efforts) enters a text description of the problem, and fills out some other fields to indicate the nature and severity of the problem. All the student's work and the feedback they got for the twenty-seven submissions is posted to the User Acceptance Test (UAT) archive database.

The instructional designer can review all the student histories in the UAT database and retrieve the session where the student in question attempted the Journalization Task. The designer then recreates the problem by replaying the student's twenty-seven submissions through the component engines using the Regression Test Workbench. The designer can then browse through each submission that the student made and view the work that the student did on the submission, the feedback the student got, and the facilitator comments, if any. Now the designer can use the debugging tools to determine the source of the problem. In a few minutes, she is able to determine that additional profiles and topics are needed to address the specific combinations of mistakes the student made. She uses the Knowledge Workbench to design the new profiles and topics. She also adds a placeholder and a script for a video war story that supports the learning under these circumstances. The designer saves the new design of the task and reruns the Regression Test Workbench on the student's session with the new task design. After she is satisfied that the new profiles, topics, and war stories are giving the desired coverage, she ships the new task design file to user testing and it's rolled out to all of the users.

This example illustrates how a high effort, uncertain process (that once took days) can be reduced to a few hours using the BusSim Toolset. Cycle time can be reduced dramatically, and complexity, risk and difficulty can be almost eliminated. It shows the sharp contrast with the traditional development approach where new designs and new code can have many unintended consequences that are difficult to test.

Execution Scenario: Student Administration

Figure 25:
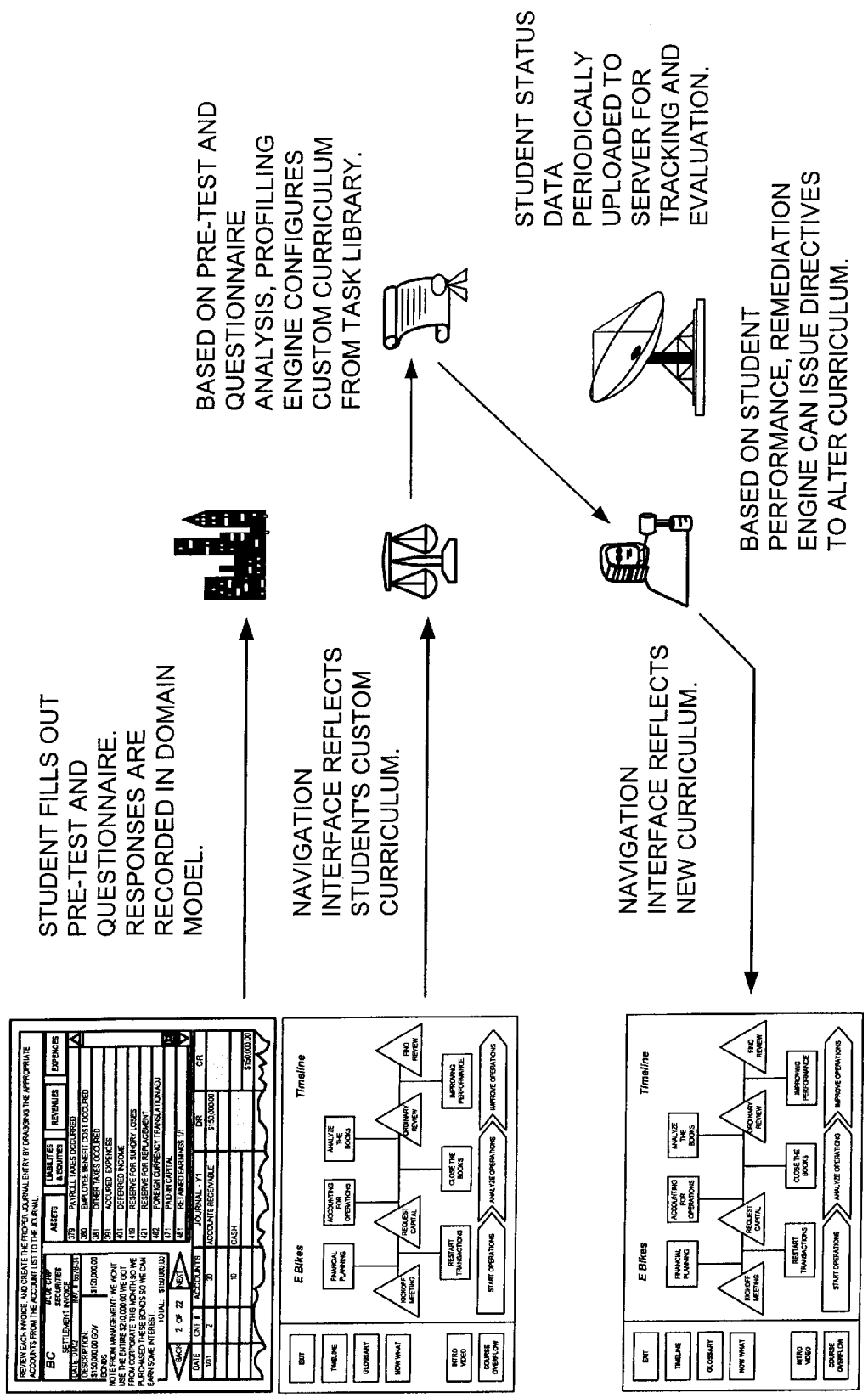
FIG. 25 illustrates how the tool suite supports student administration in accordance with a preferred embodiment.

FIG. 25 illustrates how the tool suite supports student administration in accordance with a preferred embodiment. When a student first enters a course she performs a pre-test of his financial skills and fills out an information sheet about his job role, level, etc. This information is reported to the Domain Model. The Profiling Component analyzes the pre-test, information sheet, and any other data to determine the specific learning needs of this student. A curriculum is dynamically configured from the Task Library for this student. The application configures its main navigational interface (if the app has one) to indicate that this student needs to learn Journalization, among other things.

As the student progresses through the course, his performance indicates that his proficiency is growing more rapidly in some areas than in others. Based on this finding, his curriculum is altered to give him additional Tasks that will help him master the content he is having trouble with. Also, Tasks may be removed where he has demonstrated proficiency. While the student is performing the work in the Tasks, every action he takes, the feedback he gets, and any other indicators of performance are tracked in the Student Tracking Database. Periodically, part or all of the tracked data are transmitted to a central location. The data can be used to verify that the student completed all of the work, and it can be further analyzed to measure his degree of mastery of the content.

Execution Scenario: Student Interaction

FIG. 26 illustrates a suite to support a student interaction in accordance with a preferred embodiment. In this task the student is trying to journalize invoices. He sees a chart of accounts, an invoice, and the journal entry for each invoice. He journalizes a transaction by dragging and dropping an account from the chart of accounts onto the 'Debits' or the 'Credits' line of the journal entry and entering the dollar amount of the debit or credit. He does this for each transaction.

As the student interacts with the interface, all actions are reported to and recorded in the Domain Model. The Domain Model has a meta-model describing a transaction, its data, and what information a journal entry contains. The actions of the student populates the entities in the domain model with the appropriate information. When the student is ready, he submits the work to a simulated team member for review. This submission triggers the Analysis-Interpretation cycle. The Transformation Component is invoked and performs additional calculations on the data in the Domain Model, perhaps determining that Debits and Credits are unbalanced for a given journal entry.

The Profiling Component can then perform rule-based pattern matching on the Domain Model, examining both the student actions and results of any Transformation Component analysis. Some of the profiles fire as they identify the mistakes and correct answers the student has given. Any profiles that fire activate topics in the Remediation Component. After the Profiling Component completes, the Remediation Component is invoked. The remediation algorithm searches the active topics in the tree of concepts to determine the best set of topics to deliver. This set may contain text, video, audio, URLs, even actions that manipulate the Domain Model. It is then assembled into prose-like paragraphs of text and media and presented to the student. The text feedback helps the student localize his journalization errors and understand why they are wrong and what is needed to correct the mistakes. The student is presented with the opportunity to view a video war story about the tax and legal consequences that arise from incorrect journalization. He is also presented with links to the reference materials that describe the fundamentals of journalization.

The Analysis-Interpretation cycle ends when any coach items that result in updates to the Domain Model have been posted and the interface is redrawn to represent the new domain data. In this case, the designer chose to highlight with a red check the transactions that the student journalized incorrectly.

III. The Functional Definition of the ICAT

This section describes the feedback processes in accordance with a preferred embodiment. For each process, there is a definition of the process and a high-level description of the knowledge model. This definition is intended to give the reader a baseline understanding of some of the key components/objects in the model, so that he can proceed with the remaining sections of this paper. Refer to the Detailed Components of the ICAT for a more detailed description of each of the components within each knowledge model. To gain a general understanding of the ICAT, read only the general descriptions. To understand the ICAT deeply, read this section and the detailed component section regarding knowledge models and algorithms. These processes and algorithms embody the feedback model in the ICAT. There are six main processes in the ICAT, described below and in more detail on the following pages.

Remediation Process Diagram

Figure 27:
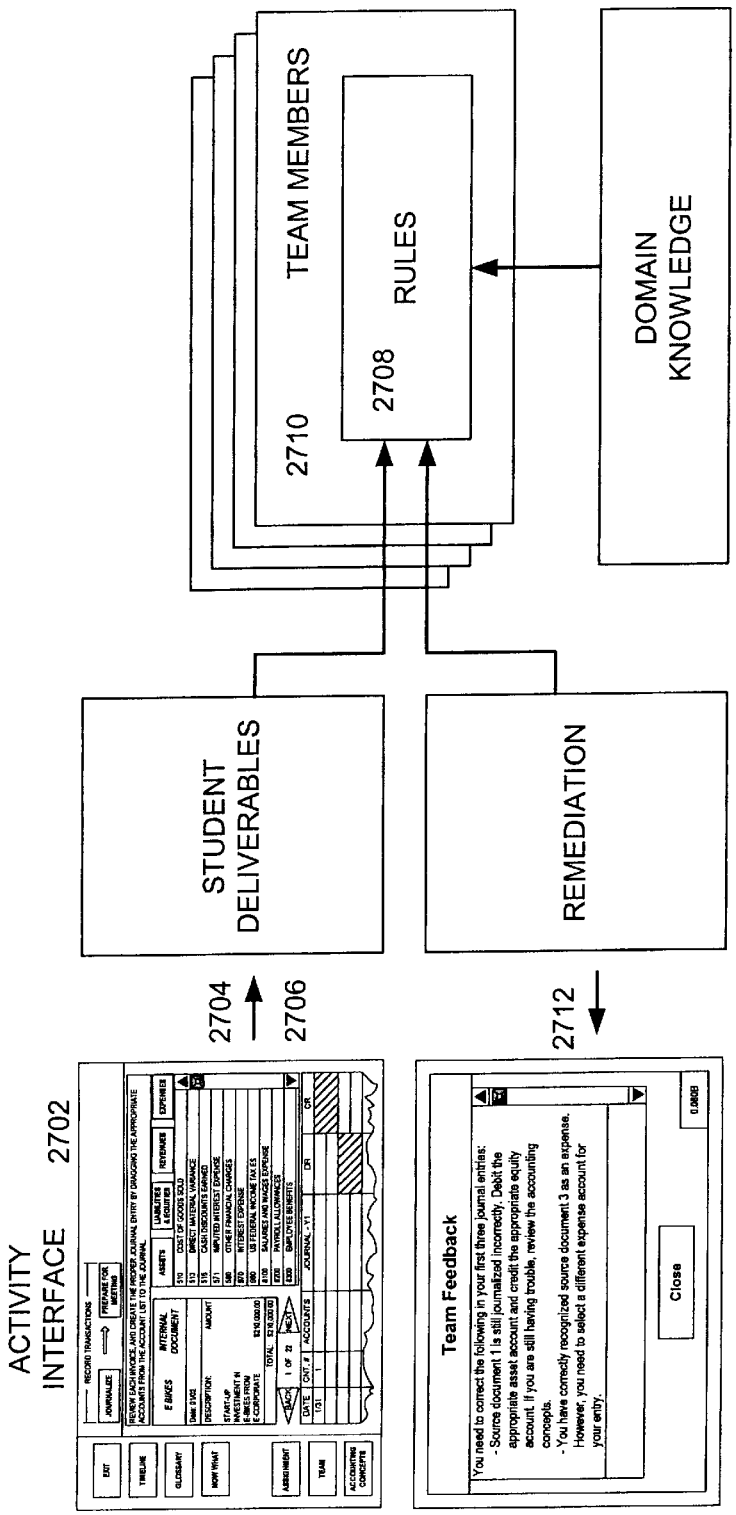
FIG. 27 illustrates the remediation process in accordance with a preferred embodiment.

FIG. 27 illustrates the remediation process in accordance with a preferred embodiment. Remediation starts as students interact with the application's interface (process #1). As the student tries to complete the business deliverable, the application sends messages to the ICAT about each action taken (process #2). When the student is done and submits work for review, the ICAT compares how the student completed the activity with how the designer stated the activity should be completed (this is called domain knowledge). From this comparison, the ICAT get a count of how many items are right, wrong or irrelevant (process #3). With the count complete, the ICAT tries to fire all rules (process #4). Any rules which fire activate a coach topic (process #5). The feedback algorithm selects pieces of feedback to show and composes them into coherent paragraphs of text (process #6). Finally, as part of creating feedback text paragraphs, the ICAT replaces all variables in the feedback with specifics from the student's work. This gives the feedback even more specificity, so that it is truly customized to each student's actions.

1. Student Interacts with Interface to Create Business Deliverable

Description

Figure 28:
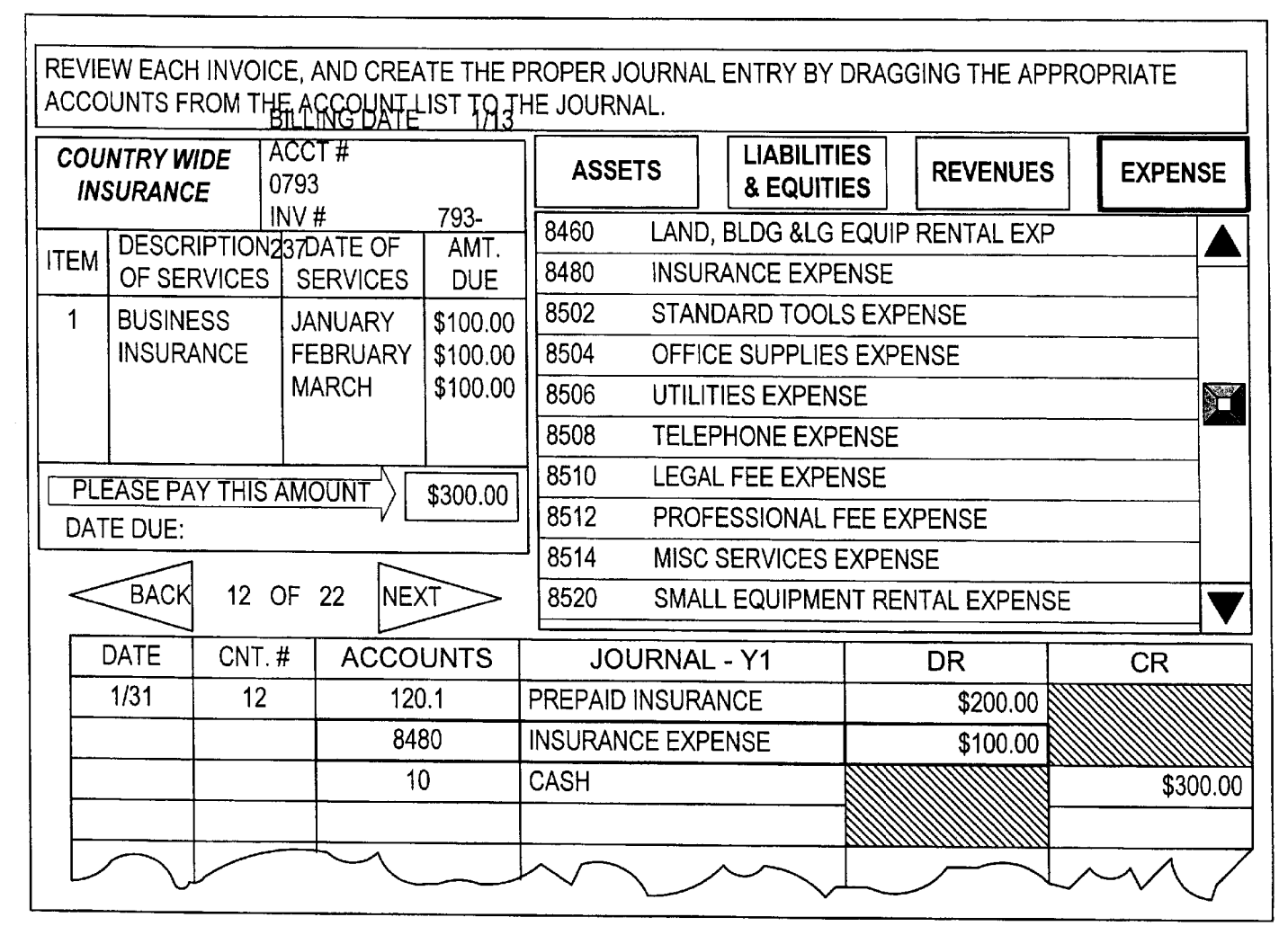

The student completes the deliverables of the Task by interacting with the interface objects. These actions may be button clicks, dragging of text, selection of items from a list, etc. An example is the Journalization task shown below. FIG. 28 illustrates a display of journalization transactions in accordance with a preferred embodiment. To interact with the display, the student must journalize the twenty-four transactions presented. To journalize a transaction, the student clicks the "next" and "previous" buttons to move between transactions. Once at a transaction, the student clicks and drags an account name from the chart of accounts—which is split into Assets, Liabilities, Revenues and Expenses—onto the debit or credit side of the journal entry. Once the journal entry has been made, the student must type in how much to debit or credit. Each one of these buttons, draggable items, and text fields are interface objects which can be manipulated.

Knowledge Model

Interface Objects

In any GBS Task, the student must manipulate controls on the application interface to complete the required deliverables. FIG. 29 illustrates the objects for the journalization task in accordance with a preferred embodiment.

The Following Abstract Objects are Used to Model all the Various Types of Interface Interactions.

SourceItem

A SourceItem is an object the student uses to complete a task. In the journalization example, the student makes a debit and credit for each transaction. The student has a finite set of accounts with which to respond for each transaction. Each account that appears in the interface has a corresponding SourceItem object. In other words, the items the student can manipulate to complete the task (account names) are called SourceItems.

Source

A Source is an object that groups a set of SourceItem objects together. Source objects have a One-To-Many relationship with SourceItem objects. In the journalization example, there are four types of accounts: Assets, Liabilities and Equity, Revenues, and Expenses. Each Account is of one and only one of these types and thus appears only under the appropriate tab. For each of the Account type tabs, there is a corresponding Source Object.

Target

A Target is a fixed place where students place SourceItems to complete a task. In the journalization example, the student places accounts on two possible targets: debits and credits. The top two lines of the journal entry control are Debit targets and the bottom two lines are Credit targets. These two targets are specific to the twelfth transaction.

TargetPage

A TargetPage is an object that groups a set of Target objects together. TargetPage objects have a One-To-Many relationship with Target objects (just like the Source to SourceItem relationship). In the journalization example, there is one journal entry for each of the twenty-two transactions. For each journal entry there is a corresponding TargetPage object that contains the Debits Target and Credits Target for that journal entry.

2. Reporting Student Actions to the ICAT

Description

Figure 30:
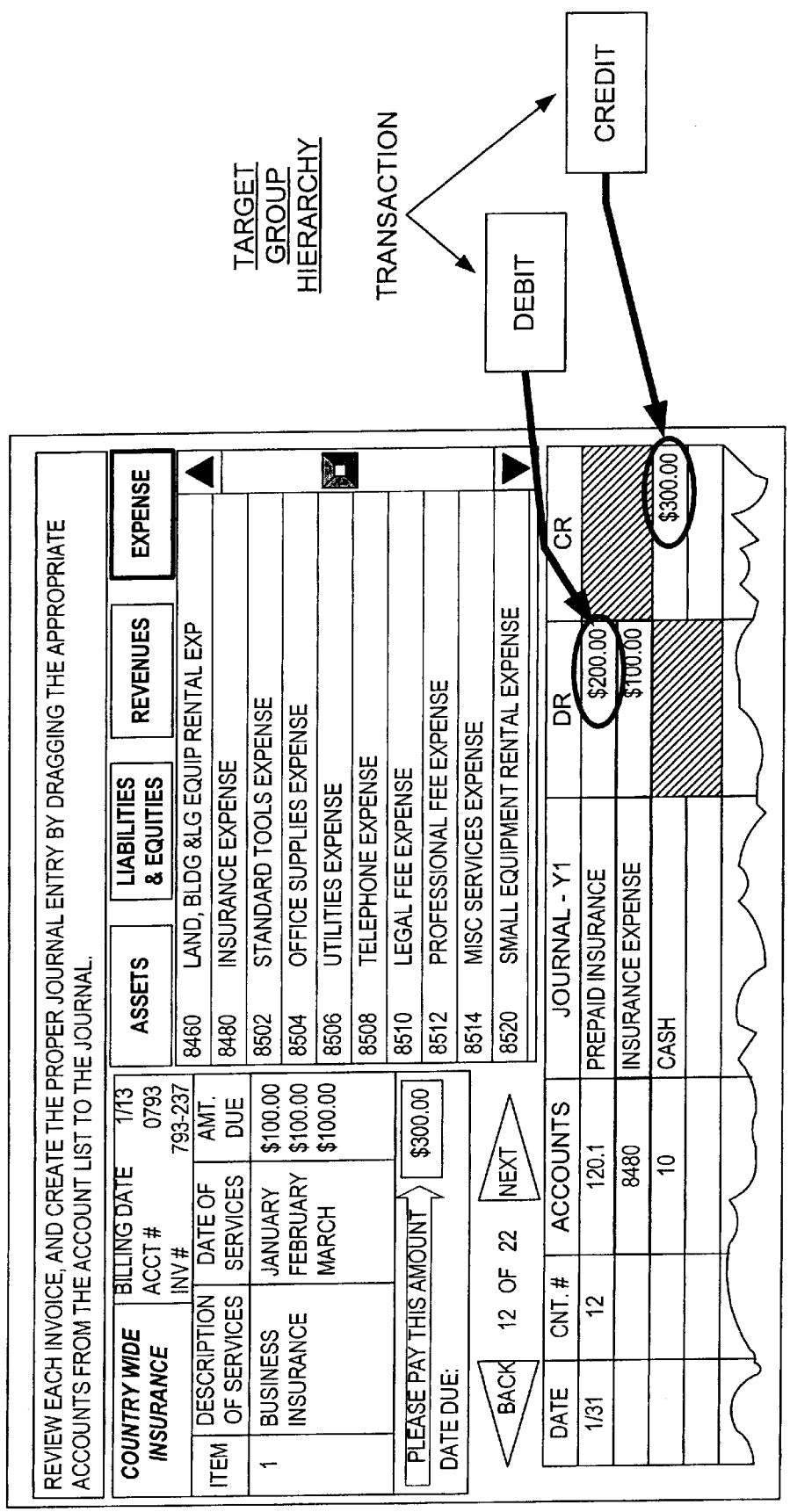
FIG. 30 illustrates the mapping of a source item to a target item in accordance with a preferred embodiment.

As the student manipulates the application interface, each action is reported to the ICAT. In order to tell the ICAT what actions were taken, the application calls to a database and asks for a specific interface control's ID. When the application has the ID of the target control and the SourceItem control, the application notifies the ICAT about the Target to SourceItem mapping. In other words, every time a student manipulates a source item and associates it with a target (e.g., dragging an account name to a debit line in the journal), the user action is recorded as a mapping of the source item to the target. This mapping is called a UserSourceItemTarget. FIG. 30 illustrates the mapping of a source item to a target item in accordance with a preferred embodiment.

3. Student Submits Deliverables to one Team Member

Description

Figure 31:
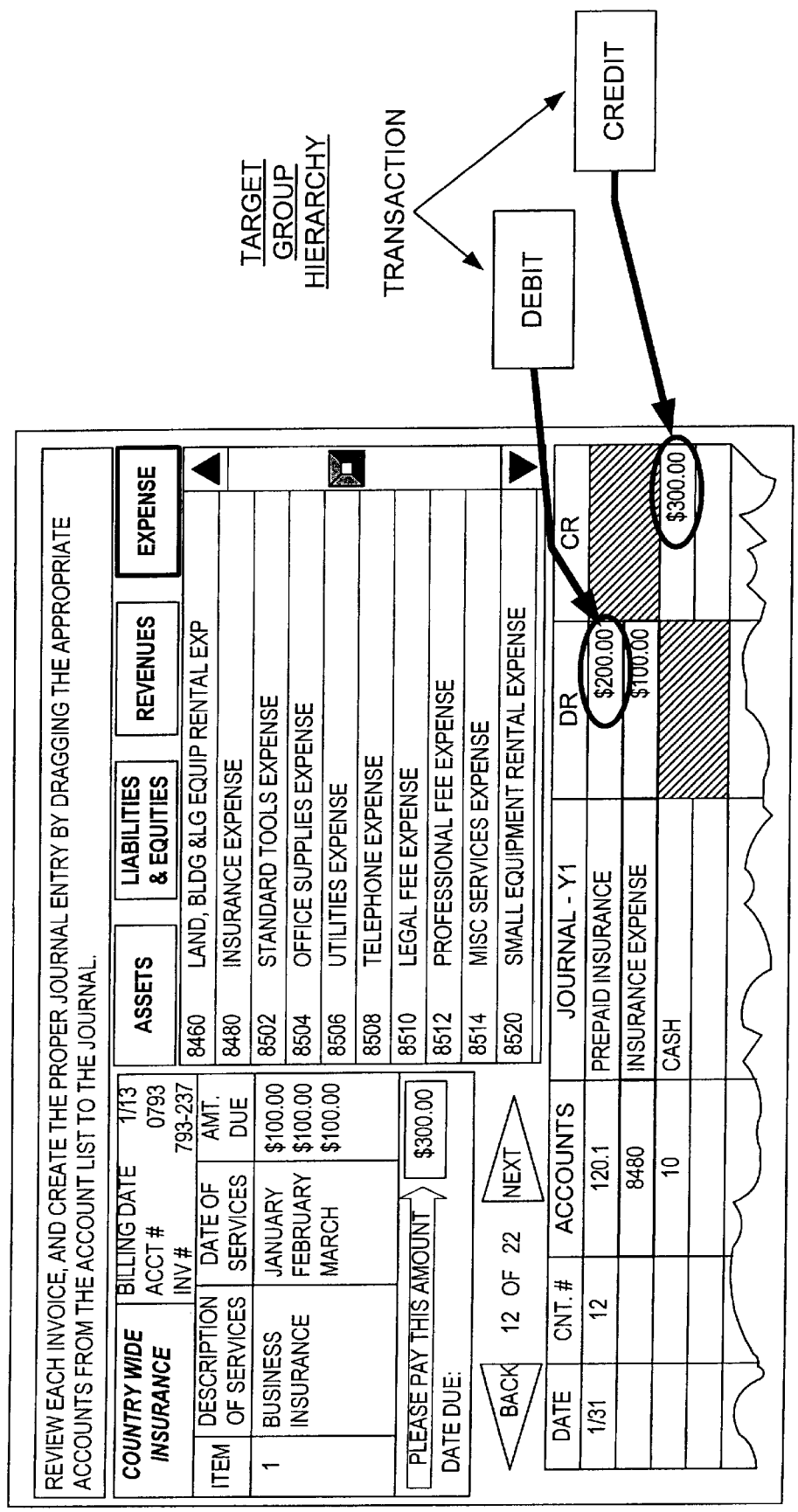
FIG. 31 illustrates target group bundles in accordance with a preferred embodiment.

When the student is ready, he submits his work to one of the simulated team members by clicking on the team member's icon. When the ICAT receives the student's work, it calculates how much of the work is correct by concept. Concepts in our journalization activity will include Debits, Credits, Asset Accounts, etc. For each of these concepts, the ICAT will review all student actions and determine how many of the student actions were correct. In order for the ICAT to understand which targets on the interface are associated with each concept, the targets are bundled into target groups and prioritized in a hierarchy. FIG. 31 illustrates target group bundles in accordance with a preferred embodiment. For each target group—or concept, such as debit—a number of aggregate values will be calculated. These aggregate values determine how many student actions were right, wrong or irrelevant.

Knowledge Model

TargetGroup

A TargetGroup object represents a concept being learned. It is a group of Target objects related on a conceptual level. The TargetGroup objects in a Task are arranged in a hierarchy related to the hierarchy of concepts the student must learn. By analyzing the student's responses to the Targets in a TargetGroup, the ICAT can determine how well a student knows the concept. By utilizing the conceptual hierarchy of TargetGroups the ICAT can determine the most appropriate remediation to deliver to help the student understand the concepts.

TargetGroup Hierarchy

Figure 32:
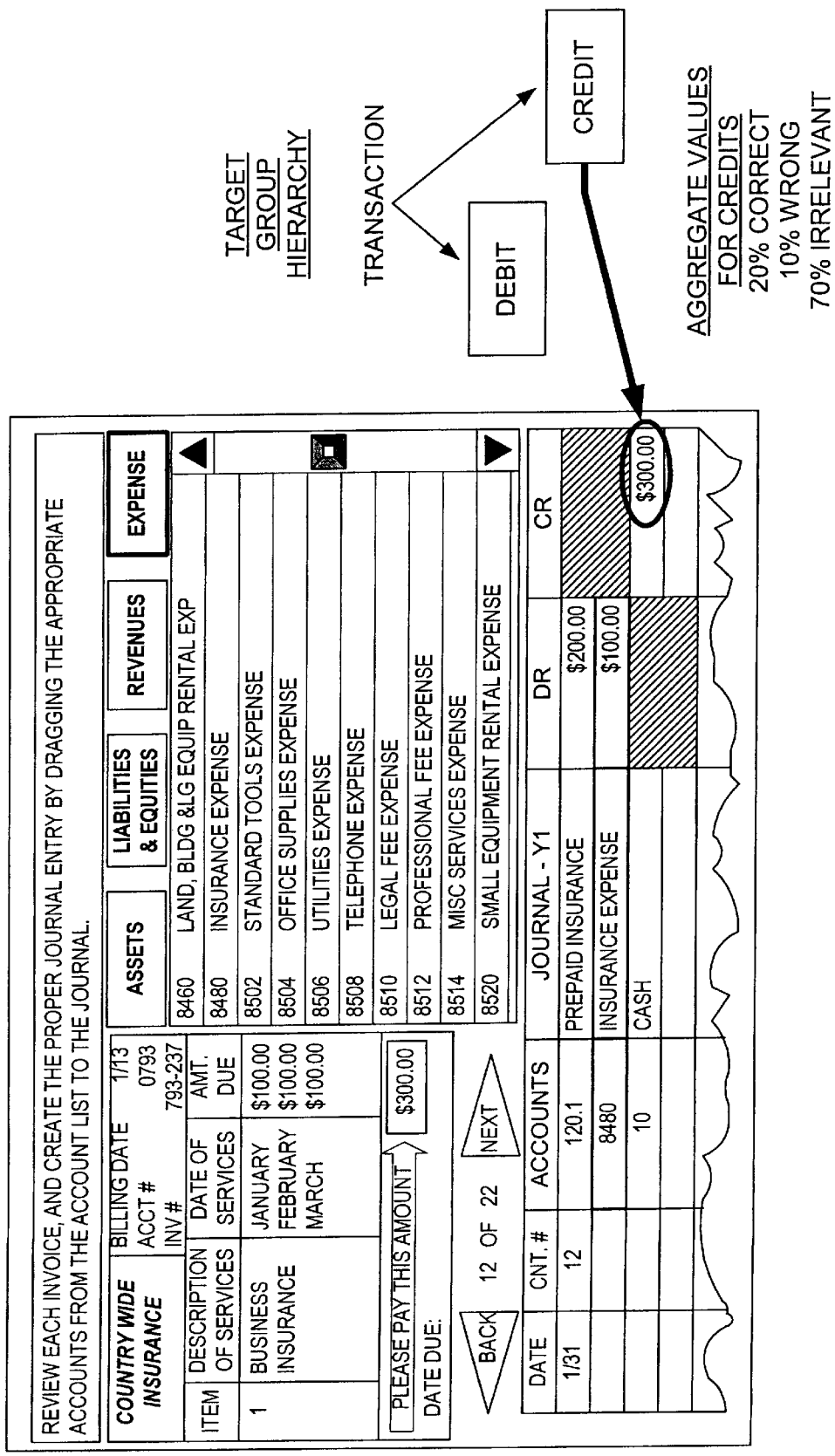
FIG. 32 illustrates a TargetGroup Hierarchy in accordance with a preferred embodiment.

The TargetGroup objects in a Task are arranged in a hierarchical tree structure to model the varying specificity of concepts and sub-concepts being learned in the Task. The designer defines the parent-child relationships between the TargetGroups to mimic the relationships of the real world concepts. This hierarchy is used in the determination of the most appropriate feedback to deliver. Concepts that are higher (more parent-like) in the TargetGroup structure are remediated before concepts that are modeled lower (children, grandchildren, etc.) in the tree. FIG. 32 illustrates a TargetGroup Hierarchy in accordance with a preferred embodiment.

In the journalization example, the main concept being taught is journalization. The concept of journalization can be divided into more specific sub-concepts, for example journalizing cash-for-expense transactions and journalizing expense-on-account transactions. These may further be divided as necessary. The designer teaches this conceptual knowledge to the ICAT by creating a TargetGroup called "Journalizing Transactions" with two child TargetGroups "Journalizing Cash for Expense Transactions" and "Journalizing Expense On Account Transactions". The top-most TargetGroup in the Task, "Journalizing Transactions" contains all of the transactions in the Task. Child target groups will include just the first three transactions and transactions four to twenty.

Figure 33:
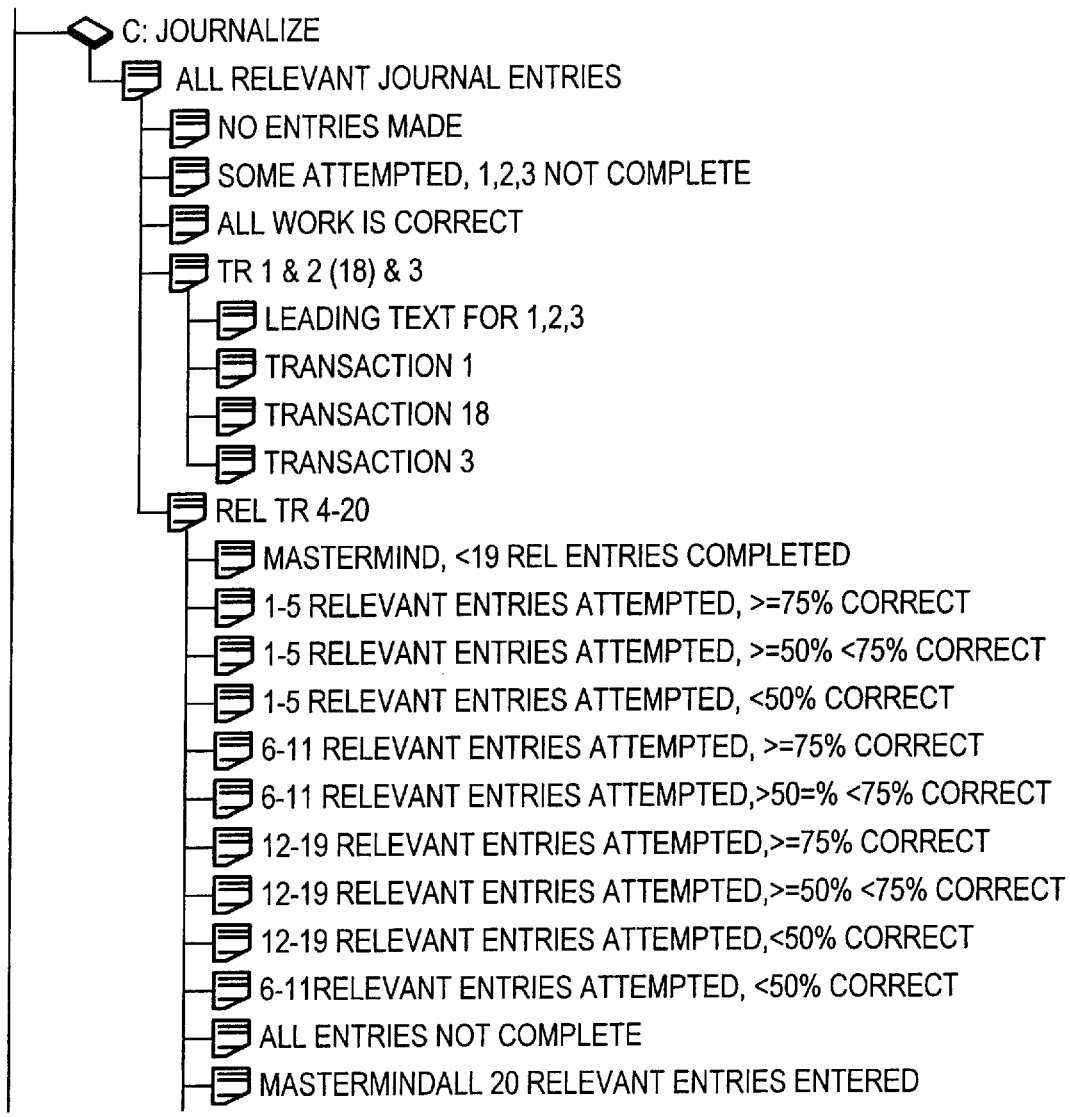
FIG. 33 illustrates a small section the amount of feedback in accordance with a preferred embodiment.

Therefore when the when the ICAT determines how much of the task is correct, it will calculate values for the first three journal entries and the next sixteen. Calculating these two separate numbers will allow the ICAT to provide specific feedback about the first three and separate feedback about the next sixteen transactions. Here is a section of the target group hierarchy for the journalize task. FIG. 33 illustrates a small section the amount of feedback in accordance with a preferred embodiment. By analyzing the responses to the targets in the each of the targetgroups, we can determine how many of the transactions the student has attempted, whether mistakes were made, what the mistakes were, etc. We can then assemble feedback that is very specific to the way the student completed the deliverables. By analyzing the student's responses to a group of conceptually related requests, we can determine the degree of success with which the student is learning the concept.

4. ICAT Analyzes Deliverables with Rules

Description

Figure 34:
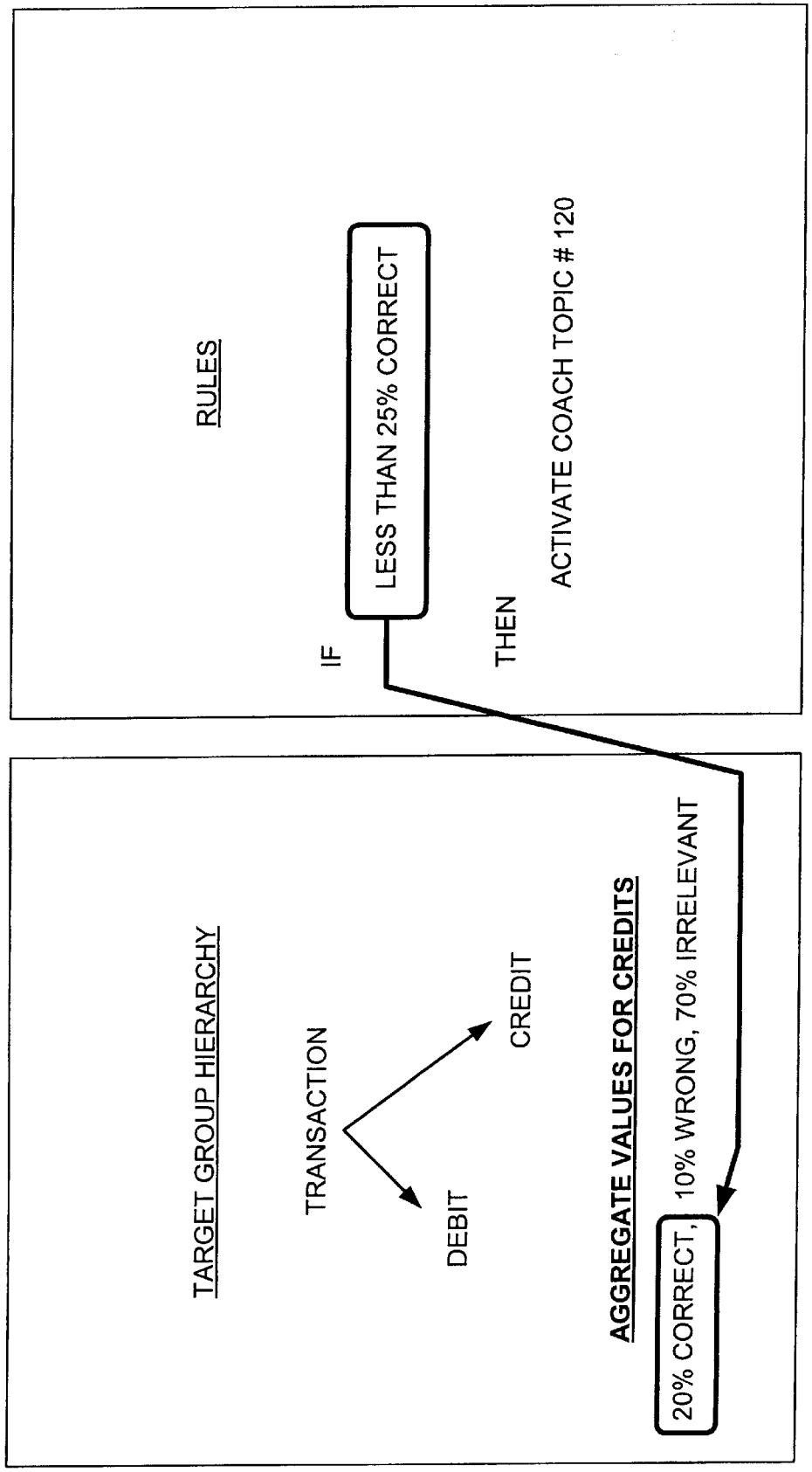
FIG. 34 illustrates an analysis of rules in accordance with a preferred embodiment.

After the ICAT has calculated the aggregate values for the student's deliverables, it analyzes the deliverables by attempting to fire all of the Rules for that task. Rules that can fire, activate CoachTopics. FIG. 34 illustrates an analysis of rules in accordance with a preferred embodiment.

5. Select Appropriate Remediation Coach Topics

Description

Figure 35:
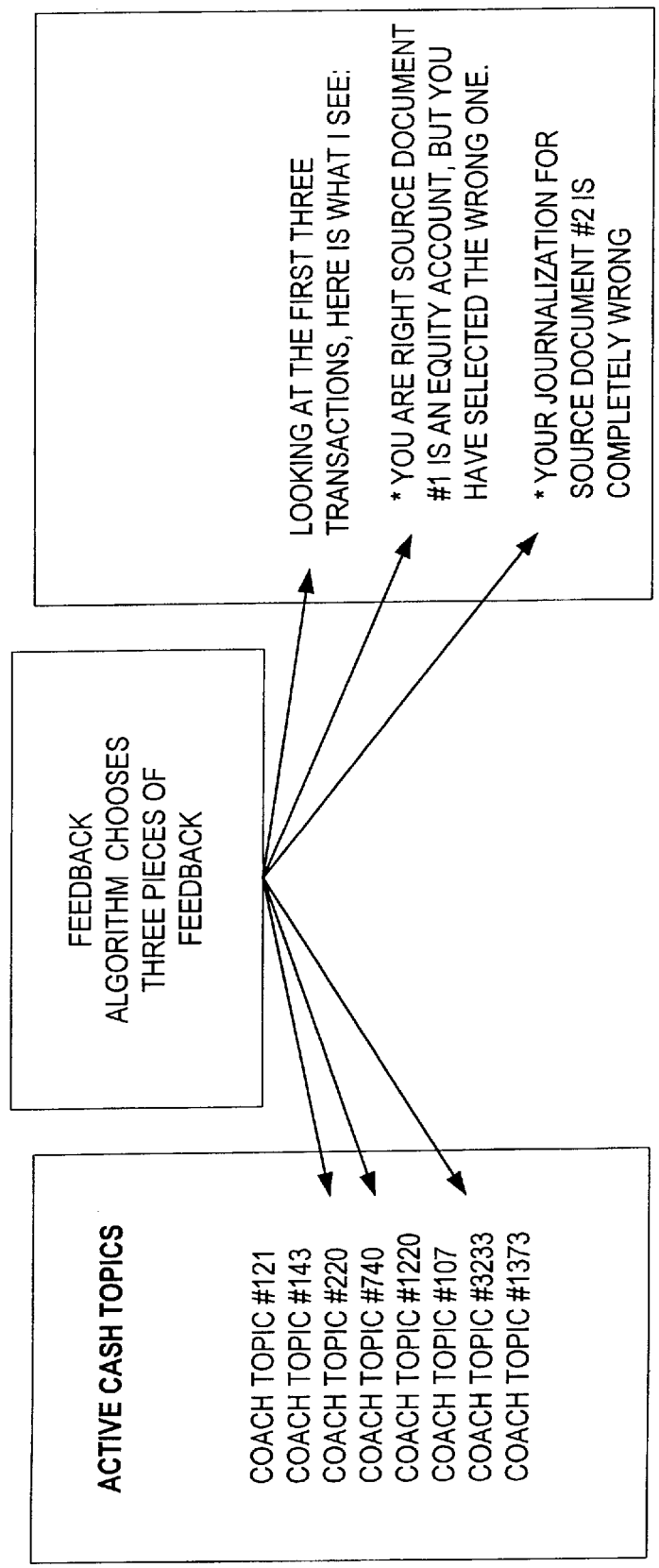
FIG. 35 illustrates a feedback selection in accordance with a preferred embodiment.
Figure 36A:
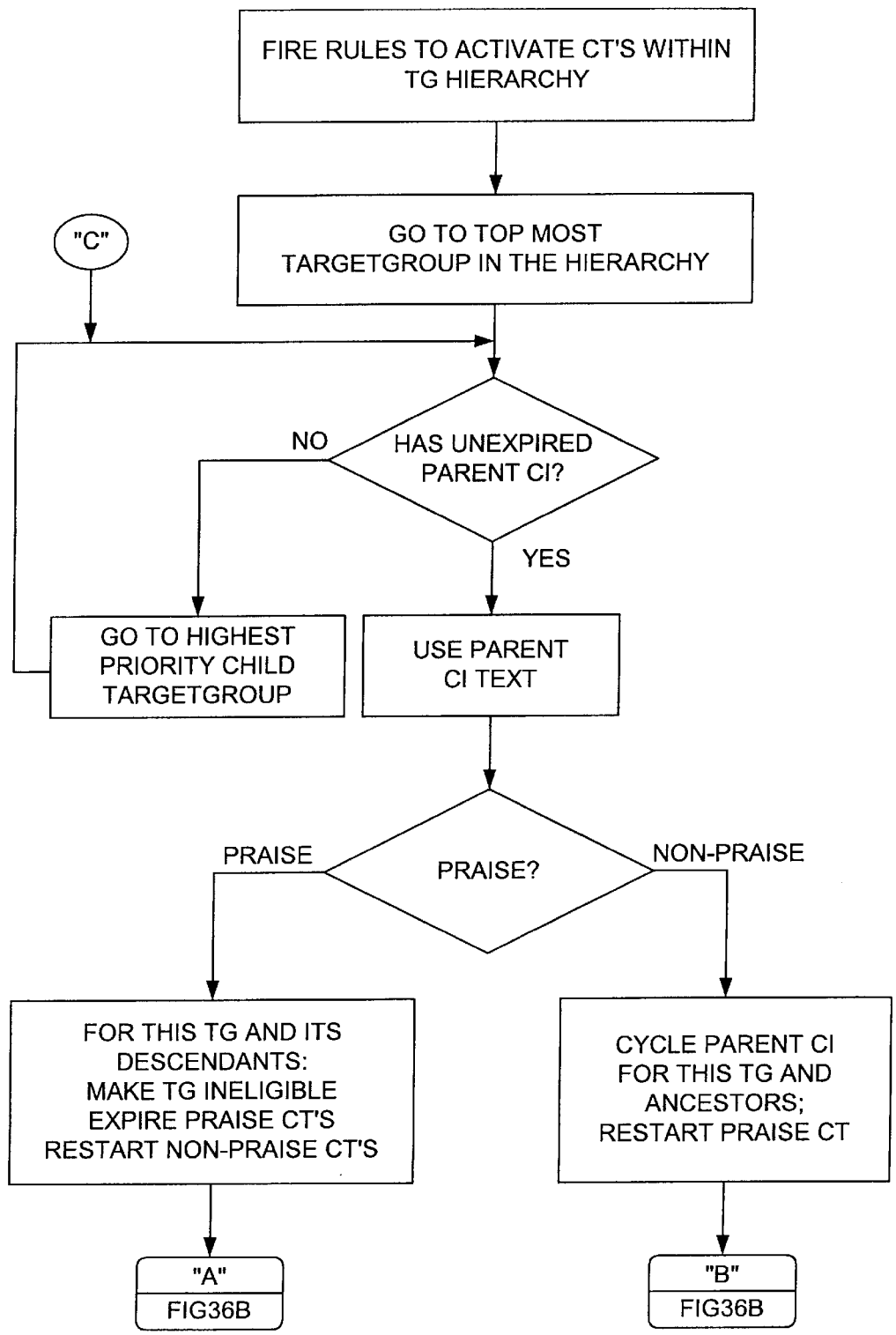
FIG. 36 is a flowchart of the feedback logic in accordance with a preferred embodiment.
Figure 36B:
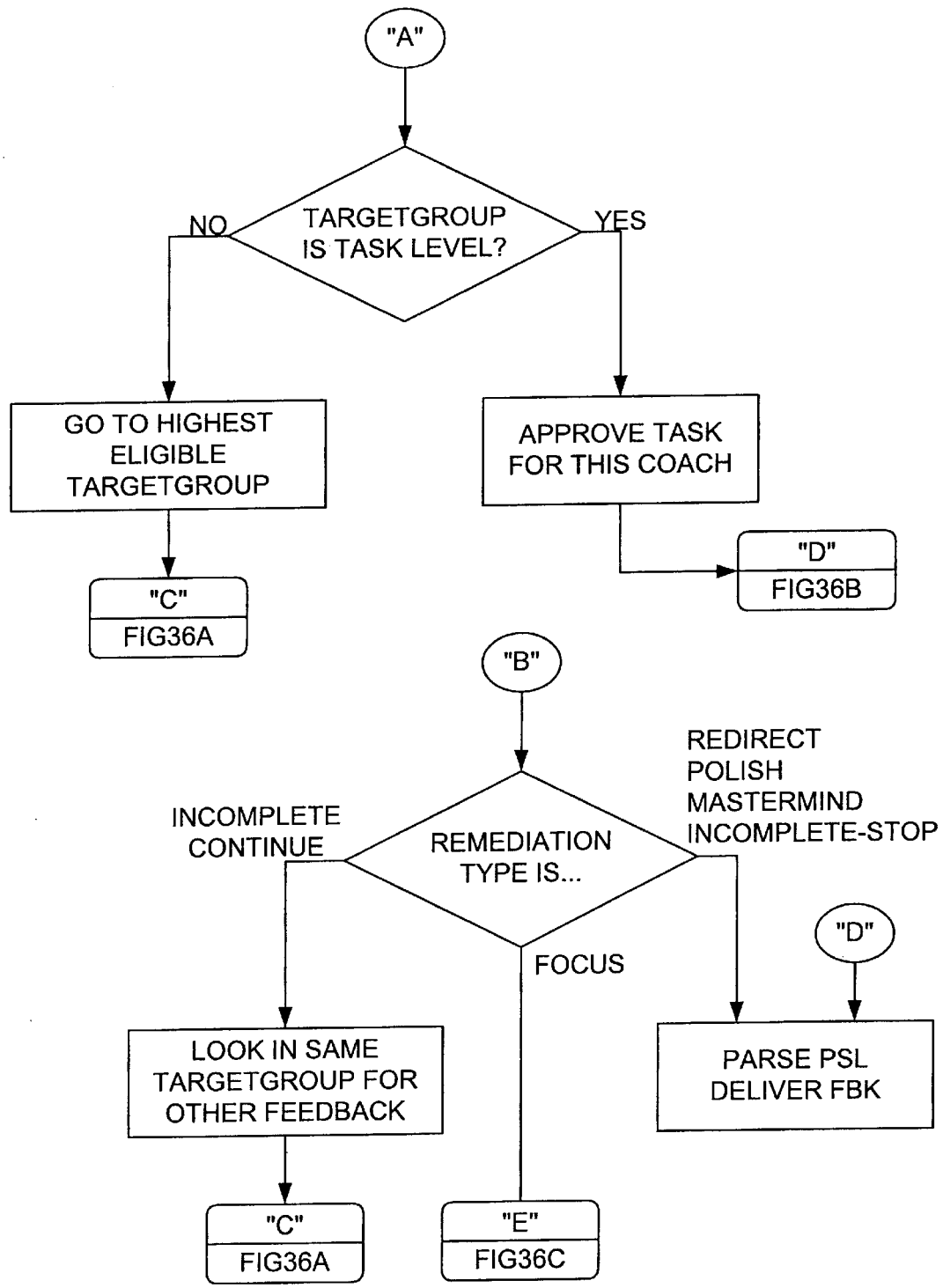
Figure 36C:
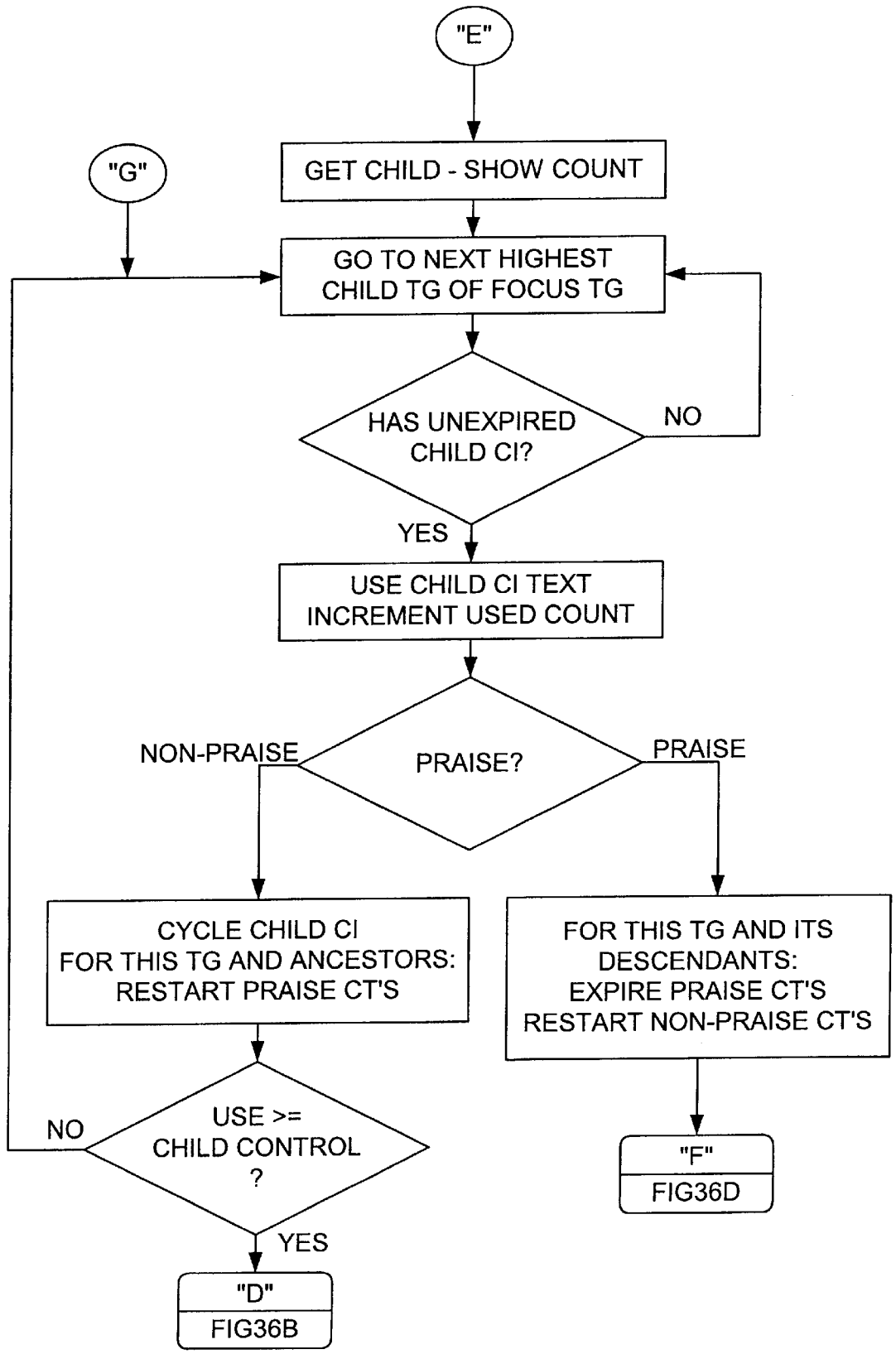
Figure 36D:
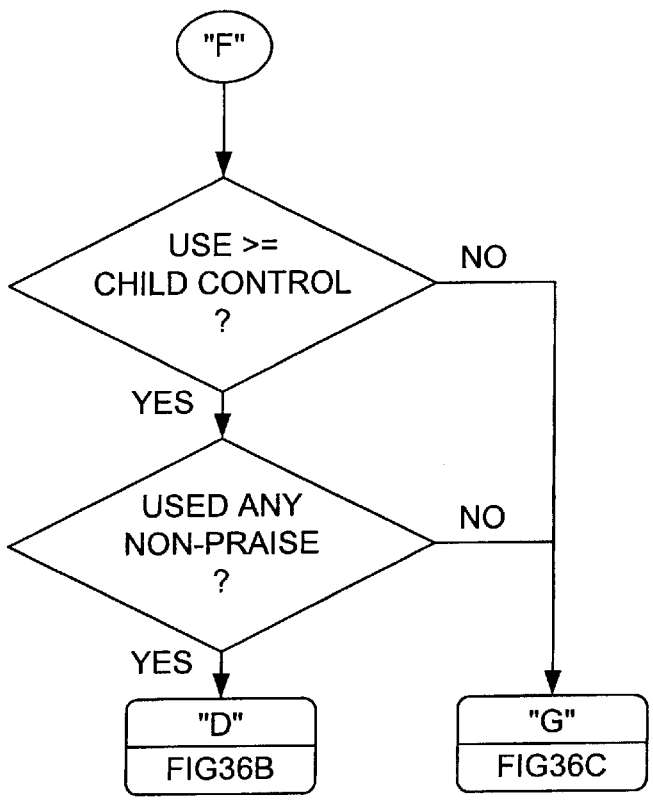

Once all possible coach topics are activated, a feedback selection analyzes the active pieces of remediation within the concept hierarchy and selects the most appropriate for delivery. The selected pieces of feedback are then assembled into a cohesive paragraph of feedback and delivered to the student. FIG. 35 illustrates a feedback selection in accordance with a preferred embodiment.

Feedback Selection Algorithm

After the ICAT has activated CoachTopics via Rule firings, the Feedback Selection Algorithm is used to determine the most appropriate set of CoachItems (specific pieces of feedback text associated with a CoachTopic) to deliver. The Algorithm accomplishes this by analyzing the concept hierarchy (TargetGroup tree), the active CoachTopics, and the usage history of the CoachItems. FIG. 36 is a flowchart of the feedback logic in accordance with a preferred embodiment. There are five main areas to the feedback logic which execute sequentially as listed below. First, the algorithm looks through the target groups and looks for the top-most target group with an active coach topic in it. Second, the algorithm then looks to see if that top-most coach item is praise feedback. If it is praise feedback, then the student has correctly completed the business deliverable and the ICAT will stop and return that coach item. Third, if the feedback is not Praise, then the ICAT will look to see if it is redirect, polish, mastermind or incomplete-stop. If it is any of these, then the algorithm will stop and return that feedback to the user. Fourth, if the feedback is focus, then the algorithm looks to the children target groups and groups any active feedback in these target groups with the focus group header. Fifth, once the feedback has been gathered, then the substitution language is run which replaces substitution variables with the proper names.

Once the ICAT has chosen the pieces of feedback to return, the feedback pieces are assembled into a paragraph. With the paragraph assembled, the ICAT goes through and replaces all variables. There are specific variables for SourceItems and Targets. Variables give feedback specificity. The feedback can point out which wrong SourceItems were placed on which Targets. It also provides hints by providing one or two SourceItems which are mapped to the Target.

IV. The ICAT Development Methodology for creating Feedback

The Steps Involved in Creating Feedback

The goal of feedback is to help a student complete a business deliverable. The tutor needs to identify which concepts the student understands and which he does not. The tutor needs to tell the student about his problems and help him understand the concepts.

There are seven major steps involved in developing feedback for an application.

First, creating a strategy—The designer defines what the student should know.

Second, limit errors through interface—The designer determines if the interface will identify some low level mistakes.

Third, creating a target group hierarchy—The designer represents that knowledge in the tutor.

Fourth, sequencing the target group hierarchy—The designer tells the tutor which concepts should be diagnosed first.

Fifth, writing feedback—The designer writes feedback which tells the student how he did and what to do next.

Sixth, writing Levels of Feedback—The designer writes different levels of feedback in case the student makes the same mistake more than once.

Seventh, writing rules—The designer defines patterns which fire the feedback.

Creating a Feedback Strategy

A feedback strategy is a loose set of questions which guide the designer as he creates rules and feedback. The strategy describes what the student should learn, how he will try and create the business deliverable and how an expert completes the deliverable. The goal of the application should be for the student to transition from the novice model to the expert model.

What should the student know after using the application?

The first task a designer needs to complete is to define exactly what knowledge a student must learn by the end of the interaction. Should the student know specific pieces of knowledge, such as formulas? Or, should the student understand high level strategies and detailed business processes? This knowledge is the foundation of the feedback strategy. The tutor needs to identify if the student has used the knowledge correctly, or if there were mistakes. An example is the journal task. For this activity, students need to know the purpose of the journalizing activity, the specific accounts to debit/credit, and how much to debit/credit. A student's debit/credit is not correct or incorrect in isolation, but correct and incorrect in connection with the dollars debited/credited.

Because there are two different types of knowledge—accounts to debit/credit and amounts to debit/credit—the feedback needs to identify and provide appropriate feedback for both types of mistakes.

How will a novice try and complete the task?

Designers should start by defining how they believe a novice will try and complete the task. Which areas are hard and which are easy for the student. This novice view is the mental model a student will bring to the task and the feedback should help the student move to an expert view. Designers should pay special attention to characteristic mistakes they believe the student will make. Designers will want to create specific feedback for these mistakes. An example is mixing up expense accounts in the journal activity. Because students may mix up some of these accounts, the designer may need to write special feedback to help clear up any confusion.

How does an expert complete the task?

This is the expert model of completing the task. The feedback should help students transition to this understanding of the domain. When creating feedback, a designer should incorporate key features of the expert model into the praise feedback he writes. When a student completes portion of the task, positive reinforcement should be provided which confirms to the student that he is doing the task correctly and can use the same process to complete the other tasks.

These four questions are not an outline for creating feedback, but they define what the feedback and the whole application needs to accomplish. The designer should make sure that the feedback evaluates all of the knowledge a student should learn. In addition, the feedback should be able to remediate any characteristic mistakes the designer feels the student will make. Finally, the designer should group feedback so that it returns feedback as if it were an expert. With these components identified, a designer is ready to start creating target group hierarchies.

Limit Errors Through Interface

Figure 37:
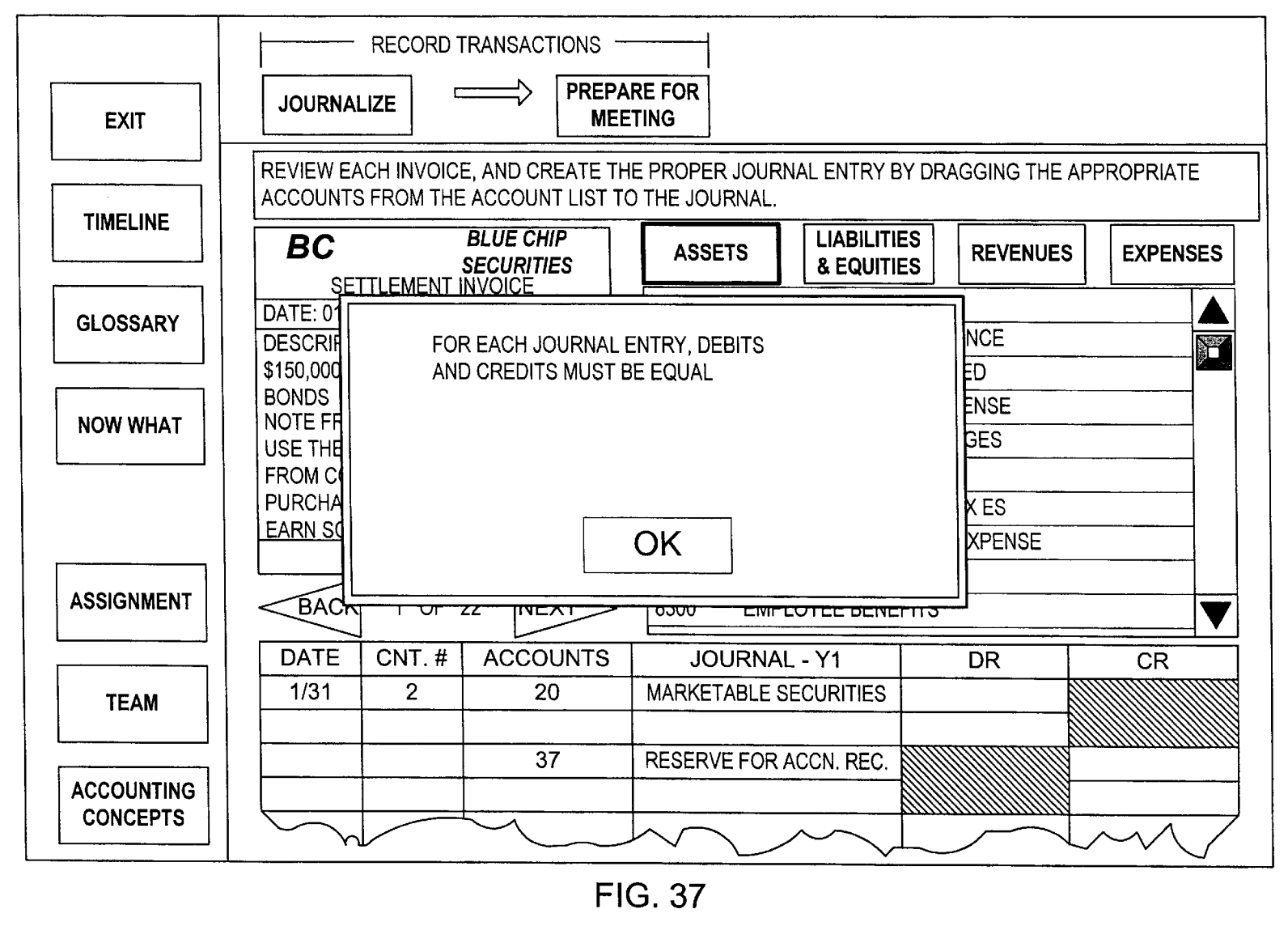

When the designer defines a feedback strategy, the designer defines the skills he wants the student to learn and the mistakes he thinks the student will make. Not all of the mistakes need to be corrected with ICAT generated feedback, some can be limited with or remediated through the interface. Limiting mistakes with the interface simply means that the system pops-up a message as the student works, identifying a mistake. An example interface corrected error is in the journalization activity when the interface points out that debits do not equal credits. Here, this is a low level mistake which is more appropriate to remediate through the interface than through the ICAT. The application simply check to see if the debit number equal the credit number and if they do not then the system message is returned. FIG. 37 illustrates an example of separating out some mistakes for the interface to catch and others for the ICAT to catch has positive and negative impacts in accordance with a preferred embodiment.

Positive

The most obvious reason for eliminating mistakes through the interface is that can be easier for the designer and developer to catch them at this level than to leave them for the ICAT.

Negative

The reason to avoid interface-driven feedback is that it splinters the feedback approach which can make the job of creating a coherent feedback approach more difficult.

Because there are positive and negative repercussions, designers need to select the when to remediate through the interface carefully. The criteria for making the decision is if the mistake is a low level data entry mistake or a high level intellectual mistake. If the mistake is a low level mistake, such as miss-typing data, it may be appropriate to remediate via the interface. If the designer decides to have the interface point out the mistakes, it should look as if the system generated the message. System generated messages are mechanical checks, requiring no complex reasoning. In contrast, complex reasoning, such as why a student chose a certain type of account to credit or debit should be remediated through the ICAT.

System Messages

It is very important that the student know what type of remediation he is going to get from each source of information. Interface based remediation should look and feel like system messages. They should use a different interface from the ICAT remediation and should have a different feel. In the journalization task described throughout this paper, there is a system message which states "Credits do not equal debits." This message is delivered through a different interface and the blunt short sentence is unlike all other remediation.

The motivation for this is that low level data entry mistakes do not show misunderstanding but instead sloppy work. Sloppy-work mistakes do not require a great deal of reasoning about why they occurred instead, they simply need to be identified. High-level reasoning mistakes, however, do require a great deal of reasoning about why they occurred, and the ICAT provides tools, such as target groups, to help with complex reasoning. Target group hierarchies allow designers to group mistakes and concepts together and ensure that they are remediated at the most appropriate time (i.e., Hard concepts will be remediated before easy concepts). Timing and other types of human-like remediation require the ICAT; other low-level mistakes which do not require much reasoning include:

Incomplete

If the task requires a number of inputs, the interface can check that they have all been entered before allowing the student to proceed. By catching empty fields early in the process, the student may be saved the frustration of having to look through each entry to try and find the empty one.

Empty

A simple check for the system is to look and see if anything has been selected or entered. If nothing has been selected, it may be appropriate for the system to generate a message stating "You must complete X before proceeding".

Numbers not Matching

Another quick check is matching numbers. As in the journalization activity, is often useful to put a quick interface check in place to make sure numbers which must match do. Small data entry mistakes are often better remediated at the interface level than at the tutor or coach level (when they are not critical to the learning objectives of the course).

There are two main issues which must be remembered when using the interface to remediate errors. First, make sure the interface is remediating low level data entry errors. Second, make sure the feedback looks and feels different from the ICAT feedback. The interface feedback should look and feel like it is generated from the system while the ICAT feedback must look as if it were generated from an intelligent coach who is watching over the student as he works.

Creating the Target Group Hierarchy

Target groups are sets of targets which are evaluated as one. Returning to the severity principle of the feedback theory, it is clear that the tutor needs to identify how much of the activity the student does not understand. Is it a global problem and the student does not understand anything about the activity? Or, is it a local problem and the student simply is confused over one concept? Using the feedback algorithm described earlier, the tutor will return the highest target group in which there is feedback. This algorithm requires that the designer start with large target groups and make sub-groups which are children of the larger groups. The ICAT allows students to group targets in more than one category. Therefore a debit target for transaction thirteen can be in a target group for transaction thirteen entries as well as a target group about debits and a target group which includes all source documents. Target should be grouped with four key ideas in mind. Target groups are grouped according to:

Concepts taught

Interface constraints

Avoidance of information overload

Positive reinforcement

The most important issue when creating target groups is to create them along the concepts students need to know to achieve the goal. Grouping targets into groups which are analogous to the concepts a student needs to know, allows the tutor to review the concepts and see which concepts confuse the student. As a first step, a designer should identify in an unstructured manner all of the concepts in the domain. This first pass will be a large list which includes concepts at a variety of granularities, from small specific concepts to broad general concepts. These concepts are most likely directly related to the learning objectives of the course.

With all of the concepts defined, designers need to identify all of the targets which are in each target group. Some targets will be in more than one target group. When a target is in more than one target group, it means that there is some type of relationship such as a child relationship or a part to whole relationship. The point is not to create a structured list of concepts but a comprehensive list. Structuring them into a hierarchy will be the second step of the process.

Figure 38:
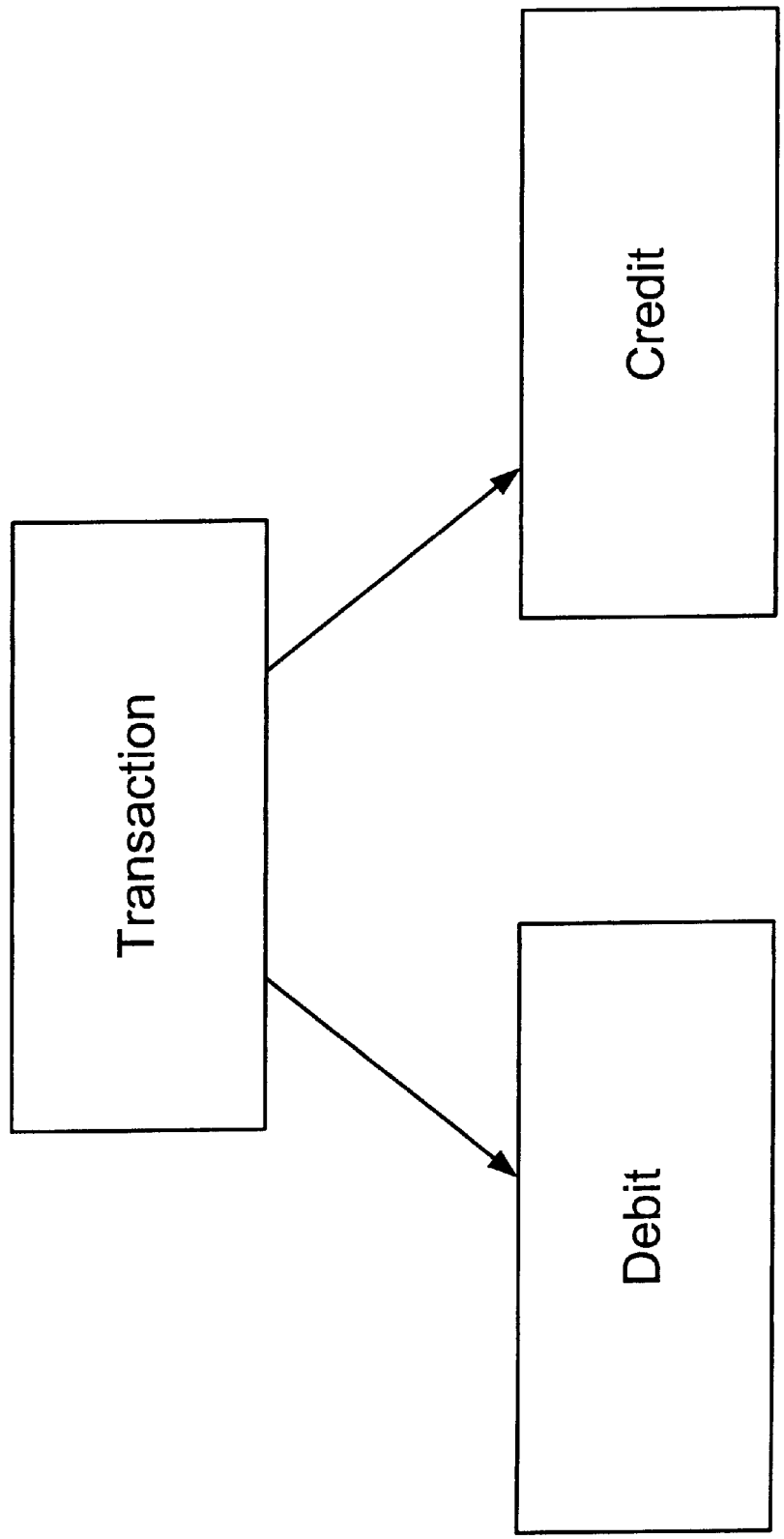
FIG. 38 is a block diagram of the hierarchical relationship of a transaction in accordance with a preferred embodiment.

In the journalization activity, the largest concept is the recording a transaction. Other important ideas are debits and credits. Debit and credit targets, however, are included in the overall transaction target group which means that it is either a part-whole relationship or a child relationship. FIG. 38 is a block diagram of the hierarchical relationship of a transaction in accordance with a preferred embodiment.

Concepts Taught: Part-whole Concepts

With all of the target groups laid out, the designer needs to identify the relationships between concepts. One type of relationship is the part-whole relationship. Part-whole relationships—as the name denotes—identified which sub-components make up larger concepts. Identifying these relationships is important because the tutor will want to see if the student does not understand the whole concept or just one part. If there are no major errors in the concept as a whole, then the tutor will look to see if the student made any major errors in one part of the concept.

Example:

In the journalizing activity, there will be a target group called transaction. In transaction, there are two parts: debits and credits. When the tutor reviews the student's work, if there are no problems with the target group transactions, then the tutor will go to the next level and look for errors in the target group debits and credits. Because debits and credits are included in an overall transaction, there is a part-whole relationship to the concept transaction.

Concept Taught: Child Concepts

In addition to part-whole relationships, designers need to identify child-parent relationships. In contrast to part-whole relationships, child-parent relationships define instances of abstract concepts. An example is "The dictionary is a book". "Dictionary" is a child concept to "book". The "dictionary" concept has all of the attributes of the "book" concept, and it is an instance of the concept which means that it contains extra attributes. Students may understand the concept in general but may be confused about a particular instance.

Example:

In the journalization activity, the concept transaction can be broken down into two sections: the debit and the credit. And each of those can be specialized into specialization categories, such as a credit to "Accounts payable". Students may not be confused about debits but the instance "Accounts Payable".

Interface Constraints

Interface Constraint: Business Deliverable

When creating target group hierarchies, designers need to consider the type of deliverable the student is creating. For each of the sections of the deliverable, the designer needs to create a target group. The target groups should contain an orderly structure, such as moving from top to bottom. Reviewing the deliverable in the order it is created structures the critique so that students know where to look next, after receiving feedback. In the current Intelligent Tutoring Agent, this structuring of feedback around the student-created deliverable can be accomplished in two ways. First, the designer can make every section of the deliverable a target. In addition, the designer can make some sections targets and some modifying attributes. Modifying attributes can be remediated on specifically, or in conjunction with the target.

In the journalization activity, the sections of the product—the journal entry—mirrors the concepts involved—debits and credits. But there are a few extra items on the journal which are (in most cases) not involved in the main concepts being taught, and these are the dollar amounts to be journalized. The dollar amounts which are journalized are associated with the journal entry as an attribute. Attributes modify the source item (account name), which makes it possible to tell if the source item is correct alone or with the attribute attached. As a designer, feedback should be created which takes all of this into account. Students should be told if they have the journal entry correct and the amount wrong, or if they have the whole thing wrong.

Interface Constraint: Screen Space

Many times one concept will span many sections of the interface. It is important to group the target groups so that they are interface specific. Therefore, even though one product may span multiple interfaces, the target groups should be centered around the interfaces so that the students receive feedback only about what they can see.

In the journalization activity, the sections of the deliverable—the collection of journal entries in the ledger—span many separate interfaces. Each source document must be seen individually. Therefore, some target groups are organized across all source documents—such as all debits—and others are specific to the individual source documents—such as that source document's debits. The target group's hierarchy must include a section for across source documents—across interfaces—and those within one source document—one interface.

Information Overload

As with any real-life tutor, you do not want to give too much information for the student to digest at once. If there are twenty-five problems, the tutor should not give feedback about all errors simultaneously. Instead, the tutor should give feedback about just two or three things which the student can correct before asking for more feedback.

In the journalization activity, there are a limited number of targets on the interface at one time—one debit and one credit. But if it were the whole General Ledger, it could have too many pieces of feedback for the student to digest at once and could overwhelm the student. In this case, the designer should scale the feedback so that just a handful come back at once. This is best done by having small target groups defined, but can also be done by identifying to the tutor how many different pieces of remediation are appropriate to deliver at one time.

Positive Reinforcement

In addition to creating target groups which are small in size, designers may want to create target groups which evaluate the first few steps a student makes. These early target groups will allow the student to see if he is on track and understand the goal of the interaction. This is, in general, a good remediation strategy, but may not be relevant in all learning situations.

In the journalization activity, there are twenty source documents to journalize. Students should NOT be encouraged to ask for feedback at every step, but when they have completed all of their work. This will ensure that students try and learn all of the information first and not rely completely on the hints of the tutor. But, target groups defined for just the first three entries allow for feedback and hints to be provided at the onset of the task, diminishing once these entries are correct.

Sequencing the Target Group Hierarchy

For feedback to be as effective as possible, it needs to provide the right information at the right time. If feedback is given too early, it is confusing; if feedback is given too late it is frustrating. In the ICAT, feedback is returned according to Target Groups. The tutor will look at the highest target group, if there is no feedback in that target group, the tutor will look at the children target groups in order of priority.

Figure 39:
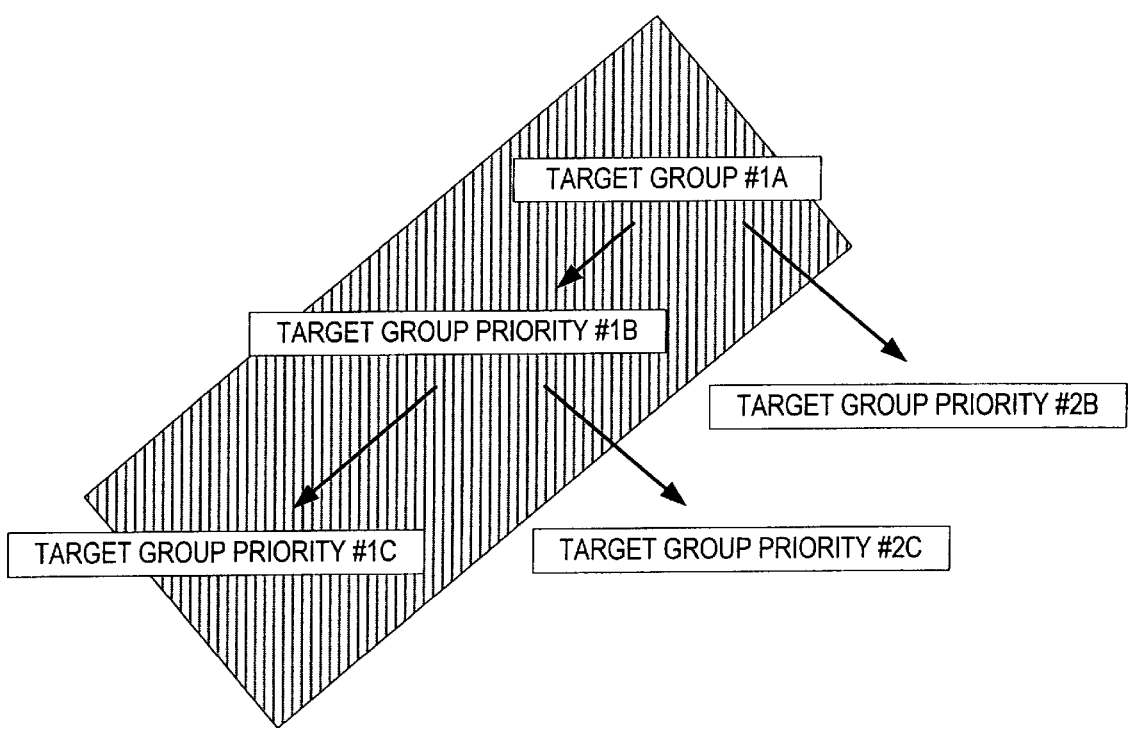
FIG. 39 is a block diagram illustrating the feedback hierarchy in accordance with a preferred embodiment.

FIG. 39 is a block diagram illustrating the feedback hierarchy in accordance with a preferred embodiment. In FIG. 39, the tutor will first look for any relevant feedback to be delivered in target group #1A. If there is nothing there, then the tutor will look in the highest prioritized child target group—in the B tier. If there is nothing in that target group, then the tutor will look in the highest child target group of target group #1B which is target group #1C. Because the target group priority determines where the tutor looks for feedback within tier, a great deal of thought needs to be given to what comprises a target group and how they are structured. There are four guiding principles which will help structure target groups to provide the right information at the right time and help the student make the most of the information provided.

Positive Reinforcement First

Designers should identify the first few components a student will try and complete first and sequences them first. This target group will evaluate just the first few moves a student makes and will tell him how he is doing and how to apply the knowledge gained from the first few steps to the rest of the work he has to do.

In the journalization activity, students need to have reinforcement that they are on the right track before trying all of the journal entries. Therefore, the first three are grouped together and students can feedback on how they completed this sub-group before having to complete the rest.

Completing this subsection gives students the positive reinforcement they need to complete the rest.

Easy Before Hard

If all of the target groups are of equivalent size, designers need to sequence easier concepts before more complicated concepts. By placing easier concepts first, a student will gain confidence in their understanding of the domain and in their ability to complete the deliverable. In addition, most complicated concepts are built on easier ones so that presenting easier concepts first will allow the student to gain the experience they need to complete the most complicated concepts. In the journalization activity, two legged journal entries are inherently easier than three legged and four legged journal entries. Therefore when a designer must sequence target groups of equal size, the designer should sequence the two legged journal entries before the three and four legged entries.

First Things First

Besides sequencing easier concepts before hard concepts, another strategy is to sequence target groups in order that they need to be completed. If completing one section of the deliverable is a prerequisite for completing another section of the deliverable, it makes sense to sequence those targets first. In the journalization activity, a source document needs to be journalized in terms of the account name and in terms of the dollar amount. However, the account name must be identified before the amount is entered. It makes no difference whether the dollar figure of the account is right or wrong, until the student has the correct account name.

Writing Feedback

Creating and structuring target group hierarchies determines what is evaluated and the order the feedback is returned. Once the hierarchy has been created and structured, designers need to write feedback which will help the student complete his goal. Going back to the goals of the tutor as educator, feedback needs to accomplish the following goals:

Identify concepts students do not understand
Identify student mistakes
Prompt students to reflect on their mistakes
Reinforce correct concepts and ideas These goals can be thought of in two sections. The first two are evaluative and the second two are instructive. Evaluation and instruction are two of the three main components of a piece of feedback text. The third component is Scope. These three components are described in more detailed below, beginning with Scope, as it is generally the first portion of a piece of feedback text.

What the Feedback is Evaluating (Scope)

The most important information feedback provides a student is what the tutor is reviewing. In most instances, the student will have completed lots of different actions before asking the tutor to review his work. Because the student has completed a lot of different actions, the tutor first needs to describe what portion of the activity or deliverable is being reviewed. There are generally three ways to scope what the tutor is reviewing.

All Work

The tutor is looking at everything the student did. Some instances when feedback should look at everything the student has done are praise level feedback and redirect level feedback. I looked at all of the journal entries and there are problems in many of them. Why don't you . . .

A Localized Area of Work

The tutor is looking at a subset of work the student completed. The greatest use of localized scoping if focus feedback. The feedback is focusing the student on one area of difficulty and asking him to correct it. I am looking at the first five journal entries you made, and here are the first three problems I found. The first . . .

A Specific Problem or Error

The tutor is focusing on one error and/or problem and helping the student understand that error. Specific problem scoping is good for classic mistakes a student may make and the designer may want to remediate. In the first journal entry, you incorrectly debited Accounts Payable. Review that transaction . . .

How the Student Did (Evaluation)

The second section of the feedback text should describe how the student did. This is where the severity principle is applied and the feedback is either redirect, focus, polish or praise.

Redirect

Redirect feedback is appropriate for very severe errors: severe mistake sand misconceptions. This degree of severity can be assessed aggregately by recognizing there are problems throughout the student's work or it can be done specifically by recognizing some basic items are incorrect.

Example:

I am looking at the first five journal entries you made, and there are problems in most of them. Why don't you . . . I am looking at the first five journal entries you made, and you have made some basic mistakes with debits and credits. Why don't you . . .

Focus

Focus feedback is appropriate for localized mistakes or misconceptions. Focus level mistakes can be identified aggregately by identifying an area in which there are a number of mistakes or specifically by identifying that some of the building block ideas are wrong.

Example:

I am looking at the first five journal entries you made, and there are problems in many of the debits. Why don't you . . .

I am looking at the first five journal entries you made, I see problems when transactions are "on account". Why don't you . . .

Polish

Polish level feedback is for syntactic problems. Student understand the main ideas and have no local problems. There may be just one or two mistakes the student has made. Polish feedback should specify where the mistake is.

Example:

I am looking at the first five journal entries you made, and the third journal entry has the debit incorrect. Why don't you . . .

Praise

Praise level feedback is reserved for instances of "correctness"; the deliverable is correct and ready to be used in the business.

Example:

I am looking at the first five journal entries you made, and they are all correct. remember . . .

Mastermind

Mastermind feedback is reserved for instances where the student is not trying to learn a topic but trying to cheat his way through by repeatedly asking for feedback. The feedback needs to be written so that the student recognizes that the tutor wants more work completed before providing feedback.

Example:

You have not changed much of your work since the last time you asked me to review it. Review . . .

Incomplete

Incomplete feedback is reserved for instances where the student has not completed all of the required work. It should be remembered that sometimes it is desired to give substantive feedback before everything is complete so the student learns the process and concepts before trying to complete the whole deliverable.

Example:

You have not done all of your work. I would like you to try completing all journal entries before asking for my review.

What the Student Should Do Next (Instruction)

The final piece of information the student needs is what to do next. The student knows what the tutor reviewed and knows how he performed. The only thing the student does not know is what to do next. The type of instruction does not have to correspond with the severity of the error.

The instructions can be mixed and matched with the type of error. Some of the actions a student could be asked to perform are as follows.

Review the General Concept

If the tutor recognizes that there are many errors throughout the deliverable, the tutor may suggest that the student go through a review of the supporting materials provided to gain an understanding of the ideas and skills needed to complete the task.

Example:

There are problems in many journal entries, why don't you review how to journalize transactions and then review your journal entries.

Review a Section of the Student's Work

If the student has many errors in one section, then the tutor may suggest that the student go and review that section of their work.

Example:

There are problems in the first five journal entries, why don't you review them.

Review Work with a Hint

If there is a certain idea or concept which the tutor believes the student does not understand, then the tutor may give a hint in the form of a question or statement for the student to think about before trying to fix the problems.

Example:

There are problems in the first five journal entries. It looks like you have made some errors with the expense debits. Remember that expenses are not capitalized. Why don't you review the first five journal entries looking for journal entries which contained incorrect debits to expense accounts.

Review Work Looking for Type of Error

If there is a specific type of error that the student has made throughout his work, then the tutor may tell the student the specific type of error and ask him to go through his work correcting this error.

Example:

There are problems in the first five journal entries. You have switched all of your journal entries on account debits. Why don't you go and fix them.

Review Work Looking for Specific Error

If there is a specific error that the student has committed, the tutor may tell the student the specific error committed and where the error is.

Example:

There is a problem with your third journal entry. The debit should not be "Accounts Payable."

Review work because it is correct and the student will want to use this analysis technique in the future.

Example:

Your first three journal entries are correct. Remember that the major distinction between paying for something "On Account" or in cash. This is a distinction you will need to make in the future.

Do More Work

If it can be determined that the student is simply asking for feedback to "Cheat" his way through the course, feedback should be provided to tell the student that he needs to try and correct many more entries before receiving substantive feedback.

Example:

You have not changed much of your work since the last time you asked me to review it. Please review all of your journal entries and correct many of them.

Complete Your Work

When it can be determined that all of the work which should be complete is not, the feedback needs to tell the student to complete the work required.

Example:

You have not completed all of your work. I would like you to try completing all journal entries before asking for my review.

Writing Levels of Feedback

Even with effective feedback, students will often make the same types of mistakes again or in different situations. The question is what to tell the student the second time he makes the same or similar mistakes. We assume that telling the student the same thing over and over is not the right answer. Therefore instead of telling the student the same thing, the feedback cycles to a lower, or secondary, level. At this time, we believe that three levels of feedback is appropriate for most instances. If the target group is particularly complex, however, additional levels of feedback may be required.

First Level of Feedback

The first level of feedback should focus more on telling the student what is wrong and letting the student try and figure it out on his own. Therefore using the paradigm described above, the student should be told what the tutor is reviewing, how he did and asked to retry it or referred to some reference which could be used to find the answer.

Example:

There are problems in many journal entries. Why don't you review how to journalize transactions and then review your work.

Second Level of Feedback

The second level of feedback should give hints and provide pieces of the puzzle. I can be assumed that students cannot figure out the problem on their own and need some help. It is appropriate at this point to ask the student to review their work with a specific hint in mind or with a question to think about. Also, if there are specific points in the reference system to review, this is the time to provide them.

Example:

There are problems in the first five journal entries. It looks like you have made some errors with expense debits. Remember that expenses are not capitalized. Why don't you review the first five journal entries looking for journal entries which contain incorrect debits to expense accounts.

Third Level of Feedback

The third level of feedback is appropriate for examples. Use the parameter substitution language to insert an example of an error they made into the feedback. Walk the student through the thought process he should use to solve the problem and provide and example of how they did the work right and how they did the work wrong.

Example:

There are problems in many of your journal entries. It looks like you have made some errors distinguishing between "on account" and "cash" credits. In particular, you characterized journal entry #12 as a cash purchase when in fact it is an "on account" purchase. Remember bills which are not paid immediately are paid on account.

Writing Rules

With the hierarchies created and sequenced and the feedback written, the designer is ready to write rules. Rules fire the particular pieces of feedback the student reads. To write effective rules, designers must realize the piece of feedback and the rule are one and the same. The only difference is the language used. The feedback is written in English and the rules are written as patterns.

Example Rule:

If the student has attempted all of the first three journal entries

And they all contain at least one mistake

Then provide feedback "In the first three journal entries you have made at least one mistake in each. Why don't you review them and see if you can find the mistakes."

In the above example, the rules has two conditions (attempt all three journal entries and have at least one mistake in each). The feedback is an explicit statement of that rule. The feedback states "In the first three journal entries you have made at least one mistake in each. Why don't you review them and see if you can find any mistakes."

The rule and the feedback are exactly the same. Keeping the rules and the feedback tightly linked ensures that the student receives the highest quality feedback. The feedback exactly explains the problem the rules found. If the feedback is more vague than the rule, then the students will not understand the exact nature of the problem. The feedback will simply hint at it. If the feedback is more specific than the rule, students will become confused. The student may not have made the specific error the feedback is referring to under the umbrella rule.

Types of Rules

Because the rules need to map to the feedback, there will be six types of rules associated with the six types of feedback: Praise, Polish, Focus, and Redirect, along with Mastermind and Incomplete.

Praise

Praise rules need to look for one hundred percent correct and NO errors. If the rule does not explicitly look for no errors, the rule will also fire when the student has all of the right answers but also some of the wrong ones.

If 100% of the targets in the first three journal entries are correct

And they all contain no mistakes

Then provide praise feedback

Praise rules can be applied in many places other than the highest task level. Praise rules can fire for instances where a student got an item right. In general, these rules should be written for any instance which poses a difficult problem and a student may need reinforcement as to how to complete the process and complete the deliverable.

Polish

Polish rules need to fire when almost everything in the target group is correct and the student is making small and insignificant mistakes.

If 80%–99% of the targets in the first three journal entries are correct

And the first three journal entries have been tried

Then provide polish feedback

This polish rule shows two things. First, the rule is scoped so that it will not fire when any of the first three journal entries have not been attempted. In addition, the rule will not fire if all of the journal entries are 100% correct. With these boundaries in place the rule will only fire when the student has attempted all of the first three journal entries and they are 80%–99% correct. Note: The determination of the exact percentages which must be correct to receive "polish" versus "focus" or "redirect" feedback will be determined by the designer, and are most likely specific to the particular task being completed.

Focus

Focus rules are the most common type of rule. Focus rules should fire when the student knows enough to complete the task but not enough to get the task correct.

If 40%–79% of the targets in the first three journal entries are correct

And the first three journal entries have been tried

Then provide focus feedback

This focus rule also shows scoping. The rules are scoped to fire between 40% and 79%. Below 40% is redirect and above 79% is polish. The rule also fires only when all of the required work has been attempted.

Redirect

Redirect rules should fire when it is clear that the student does not have a good understanding of how to complete the task. This is evidenced by a significant number of errors found in the student's work.

If less than 40% of the first three journal entries are correct

And the first three journal entries have been tried.

Then provide redirect feedback

This redirect rule is to catch those who are truly lost. If the student has tried to complete all of the work, and they are less than 40% correct, then they need a great deal of help to continue the task.

Mastermind

Mastermind rules need to track down situations when the student is simply trying to cheat his way through the application.

If less than 40% of the first three journal entries are correct

And the student has made only one change twice in a row.

Then provide mastermind feedback

This mastermind rule catches those who are making one change, asking for feedback over and over. One thing to keep in mind is that as a student gets towards praise they need to make small changes and then ask for feedback. To allow this, the above rule is scoped so that if the student has more than 40% of the work right the rule will not fire.

Incomplete

In many activities the student should try and complete most if not all of the work before asking for feedback. One of the goals of many training applications is to mimic the real world, and it is rare for an employee to ask for a review after every little step they complete. Most employers want to see a significant amount of work done before asking for a review.

If all of journal entries have NOT been tried,

Then provide incomplete feedback

Forcing a student to attempt all of his work first will require him to gain confidence in his ability to complete the work. Therefore, incomplete rules should be used after baby-step feedback so that students feel that they have the tools and ability to complete the whole task before asking for feedback.

Principles of Rule Design

There are a couple of general rules which make rule creation and maintenance easier.

Use percentages whenever possible

It may seem easier at the time to write rules which look for specific numbers of right and wrong items. But when a rule is written which looks for a specific number, it means that if the data ever changes, you will need to get back into that rule and tweak it so that it still fires at the right time. It is far better to write percentage rules which fire whenever a certain percentage of work is either right or wrong. Then if the data ever changes and more right answers are added or some removed, then the rules may not need to be rewritten.

Scope the Rules as Tightly as Possible

As stated previously, it is very important to make the rules mirror the written feedback. If the feedback is vaguer than the rule, then the students will not understand the exact nature of the problem. The feedback will simply hint at it. If the feedback is more specific than the rule, students will become confused. The student may not have made the specific error the feedback is referring to under the umbrella rule.

Data Dictionary In Accordance With
A Preferred Embodiment

Domain Knowledge Model Data Dictionary

| Column | Type | Len | Description |
|---|---|---|---|
| Source | | | |
| SourceID | Counter | | Unique key for this table |
| Source | String | 50 | Name of this object |
| SourceDesc | String | 255 | Documentation String that appears with this object in auto-documentation reports |
| SourceCaption | String | 50 | String that can be dynamically embedded into feedback text using Parameter Substitution Language (PSL) |
| SourceItem | | | |
| SourceItemID | Counter | | Unique key for this table |
| SourceItem | String | 50 | Name of this Object |
| SourceItemDesc | String | 255 | Documentation String that appears with this object in auto-documentation reports |
| SourceItemText | String | 50 | String that Can be dynamically embedded into feedback text using Parameter Substitution Language (PSL) |
| TargetPage | | | |
| TargetPageID | Counter | | Unique key for this table |
| TargetPage | String | 50 | Name of this object |
| TargetPageDesc | String | 255 | Documentation String that appears with this object in auto-documentation reports |
| TargetPageCaption | String | 50 | String that Can be dynamically embedded into feedback text using Parameter Substitution Language (PSL) |
| Target | | | |
| TargetID | Counter | | Unique key for this table |
| Target | String | 50 | Name of this object |
| TargetDesc | String | 255 | Documentation String that appears with this object in auto-documentation reports |
| TargetCaption | String | 50 | String that Can be dynamically embedded into feedback text using Parameter Substitution Language (PSL) |
| SourceItemTarget | | | |
| SourceItemID | Long | | SourceItemID of the association |
| TargetID | Long | | TargetID of the association |
| Relevance | Float | | Value between −1 and 1 that indicates the relative relevance of this association between a SourceItem and a Target. A negative value indicates that this association is incorrect. A positive value indicates that it is correct. A value of zero indicates that this association is irrelevant. |
| Attribute | | | |
| SourceItemID | Long | | SourceItemID of the association |
| TargetID | Long | | TargetID of the association |
| AttributeID | Counter | | Unique key for this table |
| Attribute | String | 50 | Name of this object |
| CorrectInd | Bool | | Boolean value that indicates whether this Attribute is correct or incorrect for this association of SourceItem and Target |
| AttributeMin | Double | | The lower bound for the range of this attribute. |
| AttributeMax | Double | | The upper bound for the range of this attribute. |
| ControlSourceItem | | | |
| ModuleName | String | 50 | Name of module the control is on |
| ControlName | String | 50 | Name of Control the SourceItem is mapped to |
| ItemNo | Integer | | A single control may be mapped to multiple SourceItem depending on how it is viewed. If one control is used on four different tabs to show four different values, the ItemNo will change as the tabs change, but the ControlName |

-continued

Domain Knowledge Model Data Dictionary

| Column | Type | Len | Description |
|---|---|---|---|
| SourceItemID | Long | | will stay the same. ID of SourceItem that this control is mapped to |
| Start | Integer | | For controls that contain text, this is the start position of the text that the SourceItem is associated with. |
| End | Integer | | For controls that contain text, this is the end position of the text that the SourceItem is associated with. |
| TaskID | Long | | This is the TaskID the module is in |
| Description | Text | 255 | Comment Information that can appear in the generated documentation reports. |
| ControlTarget | | | |
| ModuleName | String | 50 | Name of module the control is |
| ControlName | String | 50 | Name of Control the SourceItem is mapped to |
| ItemNo | Integer | | A single control may be mapped to multiple Targets depending on how it is viewed. If one control is used on four different tabs to show four different values, the ItemNo will change as the tabs change, but the ControlName will stay the same. |
| TargetID | Long | | ID of Target that this control is mapped to |
| Start | Integer | | For controls that contain text, this is the start position of the text that the Target is associated with. |
| End | Integer | | For controls that contain text, this is the end position of the text that the Target is associated with. |
| TaskID | Long | | This is the TaskID the module is in |
| Description | Text | 255 | Comment Information that can appear in the generated documentation reports. |

Student Data Model Data Dictionary

| Column | Type | Len | Description |
|---|---|---|---|
| Student | | | |
| SourceID | Counter | | Unique key for this table |
| Source | String | 50 | Name of this object |
| SourceDesc | String | 255 | Documentation String that appears with this object in auto-documentation reports |
| SourceCaption | String | 50 | String that Can be dynamically embedded into feedback text using Parameter Substitution Language (PSL) |
| StudentSubmission | | | |
| SourceItemID | Counter | | Unique key for this table |
| SourceItem | String | 50 | Name of this Object |
| SourceItemDesc | String | 255 | Documentation String that appears with this object in auto-documentation reports |
| SourceItemText | String | 50 | String that Can be dynamically embedded into feedback text using Parameter Substitution Language (PSL) |
| UserSourceItemTarget | | | |
| SourceItemID | Counter | | Unique key for this table |
| SourceItem | String | 50 | Name of this object |
| SourceItemDesc | String | 255 | Documentation String that appears with this object in auto-documentation reports |
| SourceItemText | String | 50 | String that Can be dynamically embedded into feedback text using Parameter Substitution Language (PSL) |

Rule Model Data Dictionary

| Column | Type | Len | Description |
|---|---|---|---|
| Rule | | | |
| TaskID | Long | | ID of Task for which this rule is in scope |
| CoachID | Long | | ID of Coach for which this rule is in scope |
| RuleID | Counter | | Unique key for this table |
| Rule | String | 50 | Name of this object |
| RuleDesc | String | 255 | Documentation String that appears with this object in auto-documentation reports |
| RuleCondCountMin | Integer | | Minimum number of conditions that must be true for this Rule to fire |
| RuleCondCountMax | Integer | | Maximum number of conditions that must be true for this Rule to fire |
| CoachTopicID | Long | | ID of CoachTopic that is activated when this rule fires |
| RuleAggregateAnds | | | |
| RuleID | Long | | ID of Rule of which this object is a condition |
| RuleCondID | Counter | | Unique key for this table |
| TargetGroupID | Long | | ID of TargetGroup whose aggregate values are compared to the aggregate boundaries of this condition |
| AggRelevanceMin AggRelevanceMax | Float | | The TargetGroup's Calculated Aggregate Relevance must fall between this Min and Max for this condition to be true |
| AggUserCntPosMin AggUserCntPosMax | Integer | | The positive-relevance associations the user has made using Targets in this TargetGroup are counted to produce an Aggregate value called 'UserCntPos'. This TargetGroup's UserCntPos must fall between this condition's AggUserCntPosMin and AggUserCntPosMax for this condition to be true. |
| AggUserCntNegMin AggUserCntNegMax | Integer | | The negative-relevance associations the user has made using Targets in this |

-continued

Rule Model Data Dictionary

| Column | Type | Len | Description |
|---|---|---|---|
| | | | TargetGroup are counted to produce an Aggregate value called 'UserCntNeg'. This TargetGroup's UserCntNeg must fall between this condition's AggUserCntNegMin and AggUserCntNegMax for this condition to be true. |
| AggUserCntZeroMin AggUserCntZeroMax | Integer | | The zero-relevance associations the user has made using Targets in this TargetGroup are counted to produce an Aggregate value called 'UserCntZero'. This TargetGroup's UserCntZero must fall between this condition's AggUserCntZeroMin and AggUserCntZeroMax for this condition to be true. |
| AggUserSumPosMin AggUserSumPosMax | Float | | The relevance values of the positive-relevance associations the user has made using Targets in this TargetGroup are summed to produce an Aggregate value called 'UserSumPos'. This TargetGroup's UserSumPos must fall between this condition's AggUserSumPosMin and AggUserSumPosMax for this condition to be true. |
| AggUserSumNegMin AggUserSumNegMax | Float | | The relevance values of the negative-relevance associations the user has made using Targets in this TargetGroup are summed to produce an Aggregate value called 'UserSumNeg'. This TargetGroup's UserSumNeg must fall between this condition's AggUserSumNegMin and AggUserSumNegMax for this condition to be true. |
| AggUserCntPos2Min AggUserCntPos2Max | Integer | | The positive-relevance associations the user has made using Targets in this TargetGroup where the user's Attribute are counted to produce an Aggregate value called 'UserCntPos2'. This TargetGroup's UserCntPos2 must fall between this condition's AggUserCntPos2Min and AggUserCntPos2Max for this condition to be true. |
| RuleSpecificMappingAnds | | | |
| RuleID | Long | | ID of Rule of which this object is a condition |
| SourceItemID | Long | | SourceItemID of the association |
| TargetID | Long | | TargetID of the association |
| SourceItemID | Long | | Unique key for this table |
| AttributeMatchType | Byte | | |
| AttributeID | Long | | Documentation String that appears with this object in auto-documentation reports |
| AttributeMatchType | | | |
| AttributeMatchType | Byte | | Unique key for this table |
| AttributeMatchTypeDesc | String | 255 | Brief text description of each AttributeMatchType Type |

Feedback Model Data Dictionary

| Column | Type | Len | Description |
|---|---|---|---|
| CoachTopic | | | |
| TaskID | Long | | ID of Task for which this object is in scope |
| TargetGroupID | Long | | ID of TargetGroup which this topic of remediation relates to |
| CoachTopicID | Counter | | Unique key for this table |
| CoachTopic | String | 50 | Name of this object |
| CoachTopicDesc | String | 255 | Documentation String that appears with this object in auto-documentation reports |
| CoachTopicPriority | String | 3 | Priority of this CoachTopic with respect to other CoachTopics in the same TargetGroup |
| RemediationType | String | 50 | Type of remediation that this CoachTopic is. This determines how the CoachTopic is handled at runtime. |
| CoachItemStandAloneReentrySeqID | String | 50 | when all the Stand Alone CoachItems in this CoachTopic have been used, they are restarted on the CoachItemStandAloneReentry SeqID. If the CoachItemStandAloneReentry SeqID = 0 the StandAlone half of the CoachTopic is expired and no longer used. |
| CoachItemChildReentrySeqID | String | 50 | When all the Child CoachItems in this CoachTopic have been used, they are restarted on the CoachItemChildReentrySeqID. If the CoachItemChildReentrySeqID = 0 the Child half of the CoachTopic is expired and no longer used. |
| RemediationType | | | |
| SourceItemID | Counter | | Unique key for this table |
| SourceItem | String | 50 | Name of this Object |
| SourceItemDesc | String | 255 | Documentation String that appears with this object in auto-documentation reports |
| SourceItemText | String | 50 | String that Can be dynamically embedded into feedback text using Parameter Substitution Language (PSL) |
| CoachItem | | | |
| SourceItemID | Counter | | Unique key for this table |

-continued

| Feedback Model Data Dictionary | | | |
|---|---|---|---|
| Column | Type | Len | Description |
| SourceItem | String | 50 | Name of this Object |
| SourceItemDesc | String | 255 | Documentation String that appears with this object in auto-documentation reports |
| SourceItemText | String | 50 | String that Can be dynamically embedded into feedback text using Parameter Substitution Language (PSL) |

Source Code In Accordance With A Preferred Embodiment

```
//////////////////////////////////////////////////////////////////
// tutxport.h
//////////////////////////////////////////////////////////////////
/*
*******************************************
// Control Functions
* Name:        TuResumeStudent
* Purpose:     To Resume a Student In progress.
* Author:      Mike Smialek / Andersen Consulting
* Input
* Parameters:    long StudentID
*                   The Unique ID of the Student to load
*
*                long TaskID
*                   The Unique ID of the Task to Load
*
*                int fromSubmissionSeqID
*                   The Submission from which the Student continues the Task
*                   <0 :Resume Task from latest submission
*                   =0 :Restart Task
*                   >0 :Continue from a specific submission
*
*                Output
* Parameters:    none
* Function Return
* Variables:    TUT_ERR_DB_COULDNT_OPEN_DATABASE
*               TUT_ERR_DOC_COULDNT_LOAD_TASK_DOC
*               TUT_ERR_LOD_NO_COACHTOPICS_FOUND
*               TUT_ERR_LOD_NO_COACHITEMS_FOUND
*               TUT_ERR_LOD_NO_COACHES_FOUND
*               TUT_ERR_LOD_NO_SOURCEITEMTARGETS_FOUND
*               TUT_ERR_LOD_NO_SOURCES_FOUND
*               TUT_ERR_LOD_NO_SOURCEITEMS_FOUND
*               TUT_ERR_LOD_NO_TARGETGROUPS_FOUND
*               TUT_ERR_LOD_NO_TARGETS_FOUND
*               TUT_ERR_LOD_NO_TARGETPAGES_FOUND
*               TUT_ERR_LOD_NO_TARGETGROUPTARGETS_FOUND
*               TUT_ERR_LOD_NO_RULES_FOUND
*               TUT_ERR_DB_COULDNT_OPEN_RECORDSET
*
*               TUT_ERR_OK
*
* Notes:       Loads from Database or Document based on values
*              of m_StorageTypeTask and m_StorageTypeStudent
*
*******************************************
*/
extern "C"
{
  long _export WINAPI TuResumeStudent(long StudentID, long TaskID, int
fromSubmissionSeqID); // Resumes a Student's work for the Task at the specified Submission
}
extern "C"
{
  long _export WINAPI TuLoadArchivedSubmissions(long StudentID, long TaskID, int
fromSubmissionSeqID, int toSubmissionSeqID); // Loads Archived Submissions For a
Student's work in a Task
```

-continued

```
}
extern "C"
{
   long _export WINAPI TuUseArchivedSubmissions(int n); // Replays n Archived
submissions for debugging
}
extern "C"
{
   long _export WINAPI TuSavecurrentStudent( ); // Saves Current Student's work to DB
}
extern "C"
{
   long _export WINAPI TuSimulateStudent(long StudentID, long TaskID, float Intelligence,
float Tenacity, int MaxTurns); // Not operational
}
extern "C"
{
   long _export WINAPI TuWriteUserDebugInfo( ); // writes active CoachTopics to DB for
Debugging
}
extern "C"
{
   long _export WINAPI KillEngine( long lTaskID ); // Delete all Dynamic objects before
shutdown
}
/*
*****************************************
* Name:        LoadTaskInfo
* Purpose:     To load data for a Task only. Student data is not loaded
* Author:      Mike Smialek / Andersen Consulting
* Input
* Parameters:     long TaskID
*                 The Unique ID of the Task to Load
* Output
* Parameters:     none
*
* Function Return
* Variables:      TUT_ERR_DB_COULDNT_OPEN_DATABASE
*              TUT_ERR_DOC_COULDNT_LOAD TASK_DOC
*              TUT_ERR_LOD_NO_COACHTOPICS_FOUND
*              TUT_ERR_LOD_NO_COACHITEMS_FOUND
*              TUT_ERR_LOD_NO_COACHES_FOUND
*              TUT_ERR_LOD_NO_SOURCEITEMTARGETS_FOUND
*              TUT_ERR_LOD_NO SOURCES_FOUND
*              TUT_ERR_LOD_NO_SOURCEITEMS_FOUND
*              TUT_ERR_LOD_NO_TARGETGROUPS_FOUND
*              TUT_ERR_LOD_NO_TARGETS_FOUND
*              TUT_ERR_LOD_NO_TARGETPAGES_FOUND
*              TUT_ERR_LOD_NO_TARGETGROUPTARGETS_FOUND
*              TUT_ERR_LOD_NO_RULES_FOUND
*              TUT_ERR_DB_COULDNT_OPEN_RECORDSET
*
*              TUT_ERR_OK
*Notes:
*****************************************
*/
extern "C"
{
   long _export WINAPI LoadTaskInfo( long lTaskID ); // Clear and (re)load info for TaskID
}
/*
*****************************************
*
* Name:        TuLoadTaskDoc
* Purpose:     Loads a Tutor Document containing Task Data
* Author:      Mike Smialek / Andersen Consulting
* Input
* Parameters:     long lTaskID
*                 TaskID To Load
* Output
* Parameters      none
*
* Function Return
* Variables:      TUT_ERR_DOC_COULDNT_LOAD_TASK_DOC
*              TUT_ERR_LOD_NO_COACHTOPICS_FOUND
*              TUT_ERR_LOD_NO_COACHITEMS FOUND
*              TUT_ERR_LOD_NO_COACHES_FOUND
*              TUT_ERR_LOD_NO_SOURCEITEMTARGETS_FOUND
*              TUT_ERR_LOD_NO_SOURCES_FOUND
```

-continued

```
*            TUT_ERR_LOD_NO_SOURCEITEMS_FOUND
*            TUT_ERR_LOD_N&_TARGETGROUPS_FOUND
*            TUT_ERR_LOD_NO_TARGETS_FOUND
*            TUT_ERR_LOD_NO_TARGETPAGES_FOUND
*            TUT_ERR_LOD_NO_TARGETGROUPTARGETS_FOUND
*            TUT_ERR_LOD_NO_RULES_FOUND
*
*            TUT_ERR_OK
*
*Notes:      TaskID is used to format the file name of the Document.
*
*****************************************
*/
extern "C"
{
   long _export WINAPI TuLoadTaskDoc( long lTaskID ); // Clear and (re)load info for
TaskID from TaskDoc
}
/*
*****************************************
* Name:       TuSaveTaskDoc
* Purpose:    Saves The Task data as a Tutor Document
* Input
* Parameters:    long lTaskID
*               TaskID To Save
* Output
* Parameters:    none
*
* Function Return
* Variables:     TUT_ERR_DOC_COULDNT_SAVE_TASK_DOC
*
*              TUT_ERR_OK
*
* Notes:      TaskID is currently only used to format the file name of the Document.
*             If a TaskID is passed in that is different than the loaded Task,
*             it will save the loaded data as if it were data for Task ID
*****************************************
*/
extern "C"
{
   long _export WINAPI TuSaveTaskDoc( long lTaskID ); // Save info for TaskID into
TaskDoc
}
/*
*****************************************
* Name:       TuGo
* Purpose:    Kicks off Submission or Secret Submission
* Input
* Parameters:    long lCoachID
*               CoachID submitting to
*               >0 :Submit to Specific Coach
*               =0 :Secret Submission to all Coaches
* Output
* Parameters:    none
*
* Function Return
* Variables:     TUT_ERR_OK
*
* Notes:
*****************************************
*/
extern "C"
{
   long _export WINAPI TuGo( long lCoachID ); // kick off algorithm
}
/*
*****************************************
* Name:       TuIsDirty
* Purpose:    Gets the Dirty Status of the Task or of an individual Coach
* Input
* Parameters:    long lCoachID
*               CoachID for which to determine Dirty Status
*               >0 :Determines Dirty Status for specific Coach
*               =0 :Determines Dirty Status for whole Task
* Output
* Parameters:    LPINT IsDirty
*               TRUE indicates this Coach or Task is Dirty
*               FALSE indicates this Coach or Task is not Dirty
*               If one or more Coaches is dirty the Task is Dirty
```

-continued

```
* Function Return
* Variables:        TUT_ERR_LOD_NO_COACHES_FOUND
*                   TUT_ERR_LOD_COACHID_NOT_FOUND
*                   TUT_ERR_OK
* Notes:
*****************************************
*/
extern "C"
{
  long _export WINAPI TuIsDirty(long TaskID, long lCoachID, LPINT IsDirty );
}
/*
*****************************************
* Name:         TuGetSubmissionSeqID
* Purpose:      Returns the current SubmissionSeqID
* Author:       Mike Smialek / Andersen Consulting
* Input
* Parameters:       long TaskID
*                   The TaskID for which you want the SubmissionSeqID
* Output
* Parameters:       none
*
* Function Return
* Variables:        SubmissionSeqID of the current Submission
*
* Notes:
*****************************************
*/
extern "C"
{
  long _export WINAPI TuGetSubmissionSeqID(long TaskID );
}
/*
*****************************************
* Name:         TuGetFeedbackPrevCoachID
* Purpose:      Returns the CoachID of The Coach That delivered the previous feedback
* Function Return
* Variables:    CoachID of The Coach That delivered the previous feedback
* Notes:
*****************************************
*/
extern "C"
{
  long _export WINAPI TuGetFeedbackPrevCoachID( );
}
/*
*****************************************
* Name:         TuGetApprovalStatus
* Purpose:      Gets the Approval Status of the Task or of an individual Coach
* Input
* Parameters:       long lCoachID
*                   CoachID for which to determine Approval
*                   >0 :Determines approval for specific Coach
*                   =0 :Determines approval for whole Task
* Output
* Parameters:       LPINT ApprovalRequired
*                   TRUE indicates this Coach or Task requires approval
*                   FALSE indicates this Coach or Task does not require approval
*                   (Always TRUE when input CoachID = 0)
*
*                   LPINT Approved
*                   TRUE indicates this Coach or Task is approved
*                   FALSE indicates this Coach or Task is not approved
*
* Function Return
* Variables:        TUT_ERR_LOD_NO_COACHES_FOUND
*                   TUT_ERR_LOD._COACHID_NOT_FOUND
*
*                   TUT_ERR_OK
*
* Notes:
*****************************************
*/
extern "C"
{
  long _export WINAPI TuGetApprovalStatus( long lCoachID, LPINT ApprovalRequired,
LPINT Approved ); // return approval status for CoachID
}
/*
```

-continued

```
/****************************************
* Name:         TuCanProceed
* Purpose:      Determines if Task is in state in which user can proceed to another Task
* Input
* Parameters:       long lTaskID
*                   TaskID to examine
* Output
* Parameters:       LPINT CanProceed
*                   TRUE indicates user can proceed from this Task
*                   FALSE indicates user can not proceed from this Task
* Function Return
* Variables:        TUT_ERR_LOD_NO_COACHES_FOUND
*
*                   TUT_ERR_OK
* Notes:
****************************************
*/
extern "C"
{
    long _export WINAPI TuCanProceed( long lTaskID, LPINT CanProceed );
}
/*
****************************************
* Name:         TuMenu
* Purpose:      Opens Menu Dialog
* Author:       Mike Smialek / Andersen Consulting
* Input
* Parameters:       none
* Output
* Parameters:       none
* Function Return
* Variables:        TUT_ERR_OK
* Notes:
****************************************
*/
extern "C"
{
    long _export WINAPI TuMenu( );
}
/*
****************************************
* Name:         TuTesterComment
* Purpose:      Opens Tester Comment Dialog
* Input
* Parameters:       none
* Output
* Parameters:       none
* Function Return
* Variables:        TUT_ERR_OK
* Notes:
****************************************
*/
extern "C"
{
    long _export WINAPI TuTesterComment( );
}
////////////////////////////////////////////////////////////////////////
////////////////////////////////////////////////////////////////////////
// Notification Functions
/*
****************************************
* Name:         TuCreateMap
* Purpose:      To Create an association between a SourceItem and a Target
*               with a modifying Attribute value
* Input
* Parameters:       long SIID
*                   SourceItemID of existing association to create
*
*                   long TID
*                   TargetID of association to create
*
*                   double Attr
*                   Attribute value of association to create
*
* Output
* Parameters:       none
*
* Function Return
* Variables:        TUT_ERR_TUF_USIT_TARGET_NOT_FOUND
```

```
*                TUT_ERR_TUF_USIT_DUPLICATE_FOUND
*
*                TUT_ERR_OK
* Notes:
*****************************************
*/
extern "C"
{
   long _export WINAPI TuCreateMap( long SIID, long TID, double Attr );
}
/*
*****************************************
* Name:      TuModifyMap
* Purpose:   To Modify an association between a SourceItem and a Target
*            with a new modifying Attribute value
* Input
* Parameters:    long SIID
*                  SourceItemID of existing association to Modify
*                long TID
*                  TargetID of existing association to Modify
*                double Attr
*                  New Attribute value for association
* Output
* Parameters:    none
* Function Return
* Variables:     TUT_ERR_TUF_USIT_TARGET_NOT_FOUND
*                TUT_ERR_TUF_USIT_DUPLICATE_FOUND
*
*                TUT_ERR_OK
*
* Notes:         This function calls TuDeleteMap / TuCreateMap
*
*****************************************
*/
extern "C"
{
   long _export WINAPI TuModifyMap( long SIID, long TID, double Attr );
}
/*
*****************************************
* Name:      TuDeleteMap2
* Purpose:   To Delete an association between a SourceItem and a Target
* Input
* Parameters:    long SIID
                   SourceItemID of association to delete
*
*                long TID
*                  TargetID of association to delete
*
*                double Attr
*                  Attribute value of association to delete
* Output
* Parameters:    none
* Function Return
* Variables:     TUT_ERR_TUF_USIT TARGET_NOT_FOUND
*                TUT_ERR_TUF_USIT_NOT_FOUND
*
*                TUT_ERR_OK
*
* Notes:         This function ignores the Attribute value and calls
*                TuDeleteMap( long SIID, long TID )
*****************************************
*/
extern "C"
{
   long _export WINAPI TuDeleteMap2( long SIID, long TID, double Attr );
}
/*
*****************************************
* Name:      TuDeleteMap
* Purpose:   To Delete and association between a SourceItem and a Target
* Input
* Parameters:    long SIID
*                  SourceItemID of association to delete
*
*                long TID
*                  TargetID of association to delete
*
* Output
```

-continued

```
* Parameters:      none
*
* Function Return
* Variables:       TUT_ERR_TUF_USIT_TARGET_NOT_FOUND
*                  TUT_ERR_TUF_USIT_NOT_FOUND
*                  TUT_ERR_OK
* Notes:
*****************************************
*/
extern "C"
{
  long _export WINAPI TuDeleteMap( long SIID, long TID );
}
///////////////////////////////////////////////////////////////////////////
///////////////////////////////////////////////////////////////////////////
// Configuration Functions
/*
*****************************************
* Name:           TuSetODBCConnect
* Purpose:        To set ODBC Connect String for the Task Data Database
* Input
* Parameters:     LPCSTR ODBCConnect
*                 ODBC Connect String for the Task Data Database
* Output
* Parameters:     none
*
* Function Return
* Variables:      TUT_ERR_OK
*
* Notes:
*****************************************
*/
extern "C"
{
  long _export WINAPI TuSetODBCConnect( LPCSTR ODBCConnect );
}
/*
*****************************************
* Name:           TuSetODBCConnectTrack
* Purpose:        To set ODBC Connect String for the Student Tracking Database
* Input
* Parameters:     LPCSTR ODBCConnect
*                 ODBC Connect String for the Student Tracking Database
* Output
* Parameters:     none
* Function Return
* Variables:      TUT_ERR_OK
* Notes:
*****************************************
*/
extern "C"
{
  long _export WINAPI TuSetODBCConnectTrack( LPCSTR ODBCConnect );
}
/*
*****************************************
* Name:           TuSetTaskDocPathName
* Purpose:        To set path and name of the Task Document file
* Input
* Parameters:     LPCSTR fnm
*                 Path and name of the Task Document file
* Output
* Parameters:     none
*
* Function Return
* Variables:      TUT_ERR_OK
*
* Notes:
*****************************************
*/
extern "C"
{
  long _export WINAPI TuSetTaskDocPathName( LPCSTR fnm );
}
/*
*****************************************
* Name:           TuSetFeedbackFileName
* Purpose:        To set path and name of file to use for holding feedback
* Input
```

```
* Parameters:      LPCSTR fmn
*                  Path and name of file to use for holding feedback
* Output
* Parameters:      none
*
* Function Return
* Variables:       TUT_ERR OK
*
* Notes:
*****************************************
*/
extern "C"
{
    long _export WINAPI TuSetFeedbackFileName( LPCSTR fnm );
}
/*
*****************************************
* Name:           TuSetFeedbackPrevFileName
* Purpose:        To set path and name of file to use for holding previous feedback
* Input
* Parameters:     LPCSTR film
*                 Path and name of file to use for holding previous feedback
* Output
* Parameters:     none
*
* Function Return
* Variables:      TUT_ERR_OK
* Notes:
*****************************************
*/
extern "C"
{
    long _export WINAPI TuSetFeedbackPrevFileName( LPCSTR fnm );
/*
*****************************************
* Name:           TuSetLogFileName
* Purpose:        To set path and name of file to use for full logging
* Input
* Parameters:     LPCSTR fnm
*                 Path and name of file to use for full logging
* Output
* Parameters:     none
*
* Function Return
* Variables:      TUT_ERR_OK
* Notes:
*****************************************
*/
extern "C"
{
    long _export WINAPI TusetLogFileName( LPCSTR fnm );
}
/*
*****************************************
* Name:.          TuSetLogLoadFileName
* Purpose:        To set path and name of file to use for load logging
* Input
* Parameters:     LPCSTR fmn
*                 Path and name of file to use for load logging
* Output
* Parameters:     none
*
* Function Return
* Variables:      TUT_ERR_OK
*
* Notes:
*****************************************
*/
extern "C"
{
    long _export WINAPI TuSetLogLoadFileName( LPCSTR fnm );
}
/*
*****************************************
* Name:           TuSetLogStudentFileName
* Purpose:        To set path and name of file to use for student logging
* Input
* Parameters:     LPCSTR fnm
*                 Path and name of file to use for student logging
```

-continued

```
* Output
* Parameters:     none
*
* Function Return
* Variables:      TUT_ERR_OK
*
* Notes:
*****************************************
*/
extern "C"
{
   long _export WINAPI TuSetLogStudentFileName( LPCSTR fnm );
}
/*
*****************************************
Name:            TuSetLogSubmissionFileName
* Purpose:       To set path and name of file to use for submission logging
* Input
* Parameters:       LPCSTR fnm
*                   Path and name of file to use for submission logging
* Output
* Parameters:     none
*
* Function Return
* Variables:      TUT_ERR_OK
*
* Notes:
*****************************************
*/
extern "C"
{
   long _export WINAPI TuSetLogSubmissionFileName( LPCSTR fnm );
}
/*
*****************************************
* Name:          TuSetLogErrFileName
* Purpose:       To set path and name of file to use for error logging
* Input
* Parameters:       LPCSTR fnm
*                   Path and name of file to use for error logging
* Output
* Parameters:     none
*
* Function Return
* Variables:      TUT_ERR_OK
* Notes:
*****************************************
*/
extern "C"
{
   long _export WINAPI TuSetLogErrFileName( LPCSTR fnm );
}
/*
*****************************************
* Name:          TuSetTrace
* Purpose:       To turn Trace on and off
* Input
* Parameters:       int TraceStatus
*                   TUT_TRACE_ON  :Turn Trace On
*                   TUT_TRACE_OFF :Turn Trace Off
* Output
* Parameters:     none
*
* Function Return
* Variables:         Previous Trace Status Value
*                    TUT_TRACE_ON
*                    TUT_TRACE_OFF
*
*                 TUT_ERR_INVALID_TRACE_STATUS
* Notes:
*****************************************
*/
extern "C"
{
   long _export WINAPI TuSetTrace( int TraceStatus );
}
/*
*****************************************
* Name:          TuSetTrack
```

-continued

```
* Purpose:      To turn Tracking on and off. While tracking is on
*               all work the user does and all feedback the user receives
*               is kept. While Tracking is off only the most recent work is kept.
* Input
* Parameters:   int TrackStatus
*                 TUT_TRACK_ON  :Turn Tracking On
*                 TUT_TRACK_OFF :Turn Tracking Off
* Output
* Parameters:   none
* Function Return
* Variables:    Previous Trace Status Value
*                 TUT_TRACK_ON
*                 TUT_TRACK_OFF
*
*                 TUT_ERR_INVALID_TRACK_STATUS
* Notes:
****************************************
*/
extern "C"
{
  long _export WINAPI TuSetTrack( int TrackStatus );
}
/*
****************************************
* Name:         TuSetShowExceptionPopup
* Purpose:      To Exception popups on and off.
* Input
* Parameters:   int PopupStatus
*                 TUT_POPUP_ON  :Turn Exception popups On
*                 TUT_POPUP_OFF :Turn Exception popups Off
* Output
* Parameters:   none
*
* Function Return
* Variables:    Previous Exception popup Status Value
*                 TUT_POPUP_ON
*                 TUT_POPUP_OFF
*
*                 TUT_ERR_INVALID_POPUP_STATUS
* Notes:
****************************************
*/
extern "C"
{
  long _export WINAPI TuSetShowExceptionPopup( int PopupStatus );
}
/*
****************************************
* Name:         TuSetStorageType
* Purpose:      To Direct Task and Student data to be loaded and saved
*               using a Document or Database
* Input
* Parameters:   long StorageTypeTask
*                 TUT_STORAGE_TYPE_DOCUMENT :Load and Save Task Data using Document
*                 TUT_STORAGE_TYPE_DATABASE :Load and Save Task Data using Database
*
*               long StorageTypeStudent
*                 TUT_STORAGE_TYPE_DOCUMENT :Load and Save Student Data using Document
*                 TUT_STORAGE_TYPE_DATABASE :Load and Save Student Data using Database
* Output
* Parameters:   none
*
* Function Return
* Variables:    TUT_ERR_INVALID_STORAGE_TYPE_TASK
*               TUT_ERR_INVALID_STORAGE_TYPE_STUDENT
*
*               TUT_ERR_OK
* Notes:
****************************************
*/
extern "C"
```

-continued

```
{
  long _export WINAPI TuSetStorageType( int StorageTypeTask, int StorageTypeStudent );
}
////////////////////////////////////////////////////////////////////////////
////////////////////////////////////////////////////////////////////////
```

Simulation Engine

Figure 40:
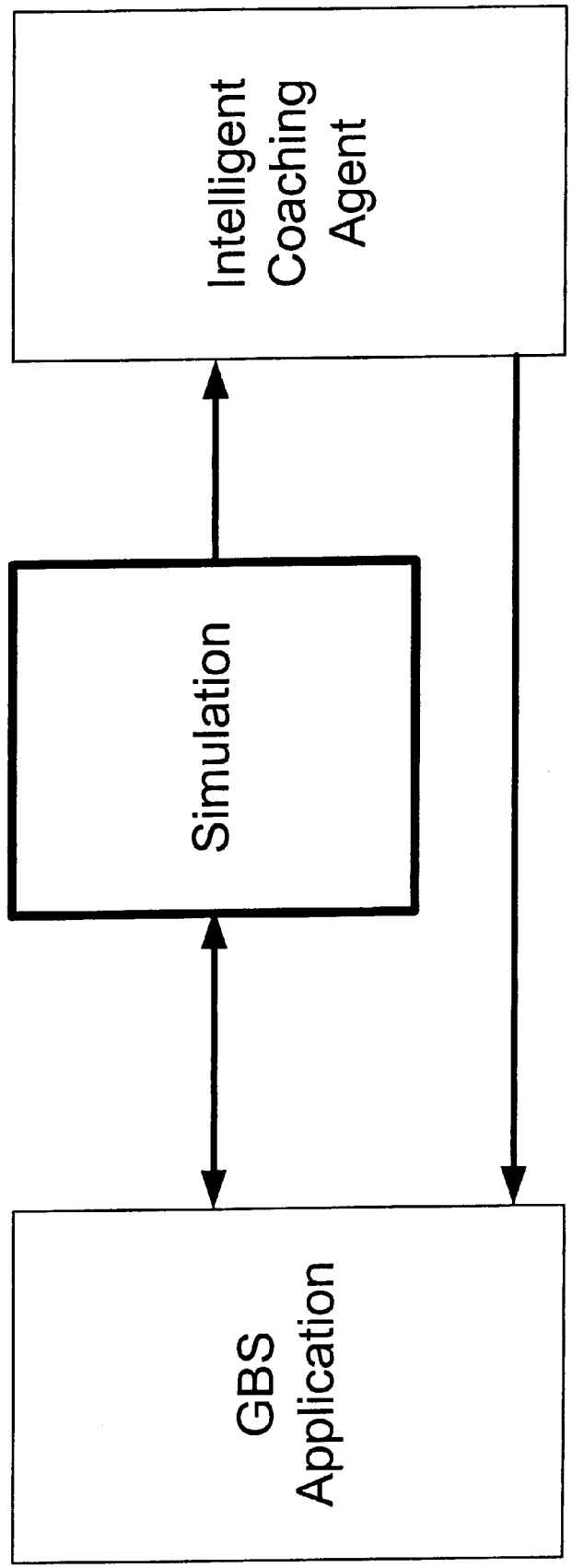
FIG. 40 is a block diagram illustrating how the simulation engine is architected into a preferred embodiment of the invention.

The idea is for the designer to model the task that he wants a student to accomplish using an Excel spreadsheet. Then, have an algorithm or engine that reads all the significant cells of the spreadsheet and notifies the Intelligent Coaching Agent with the appropriate information (SourceItemID, TargetID and Attribute). This way, the spreadsheet acts as a central repository for student data, contains most of the calculations required for the task and in conjunction with the engine handles all the communication with the ICA. The task is self contained in the spreadsheet, therefore the designers no longer need a graphical user interface to functionally test their designs (smart spreadsheet). FIG. 40 is a block diagram illustrating how the simulation engine is architected into a preferred embodiment of the invention.

Once the model and feedback for it are completely tested by designers, developers can incorporate the spreadsheet in a graphical user interface, e.g., Visual Basic as a development platform. The simulation spreadsheet is usually invisible and populated using functions provided by the engine. It is very important that all modifications that the ICA needs to know about go through the engine because only the engine knows how to call the ICA. This significantly reduced the skill level required from programmers, and greatly reduced the time required to program each task. In addition, the end-product was less prone to bugs, because the tutor management was centralized. If there was a tutor problem, we only had to check on section of code. Finally, since the simulation engine loaded the data from a spreadsheet, the chance of data inconsistency between the tutor and the application was nil.

Object Model

Figure 41:
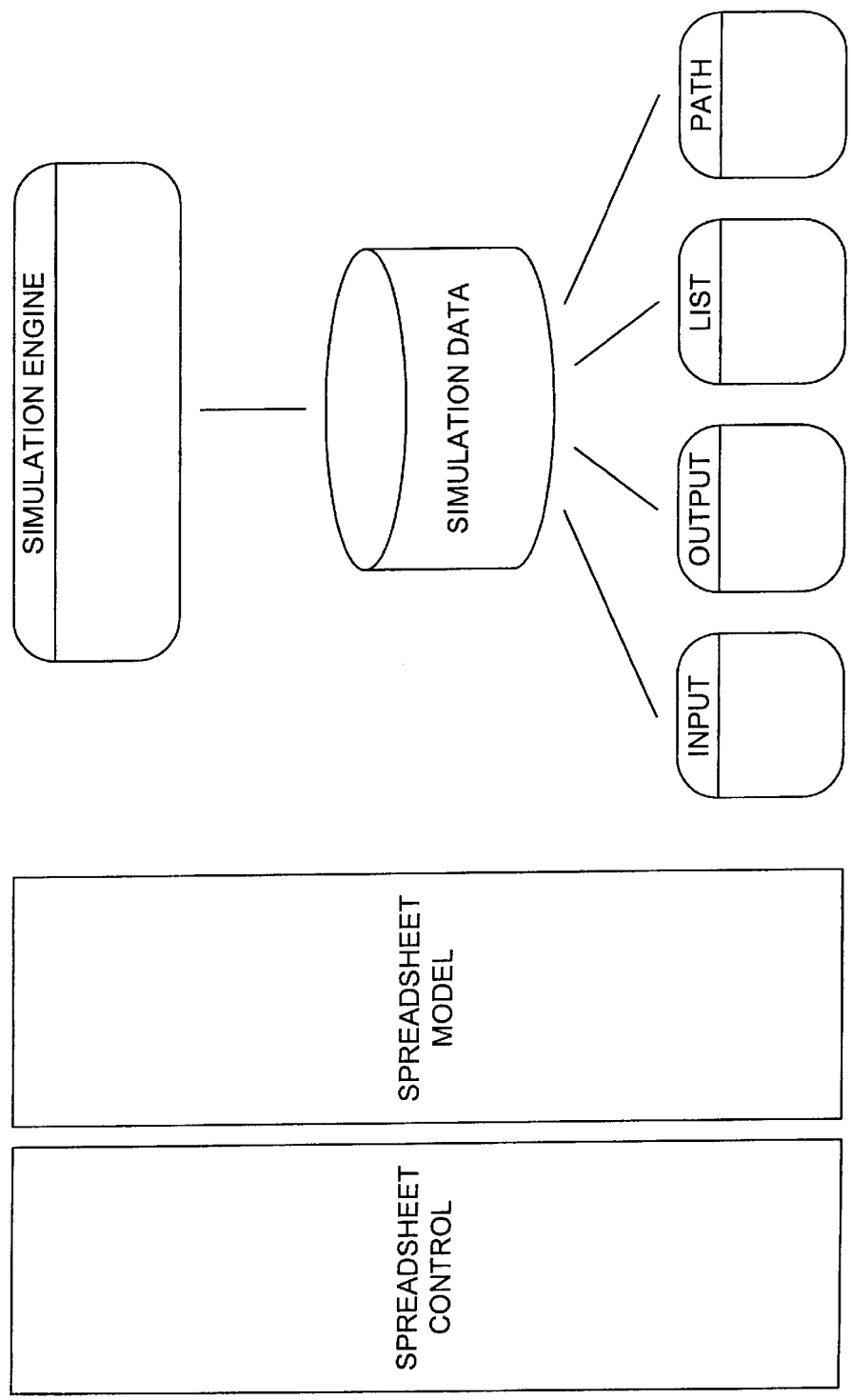
FIG. 41 is a block diagram setting forth the architecture of a simulation model in accordance with a preferred embodiment.

FIG. 41 is a block diagram setting forth the architecture of a simulation model in accordance with a preferred embodiment. The Simulation Object Model consists of a spreadsheet model, a spreadsheet control object, a simulation engine object, a simulation database, input objects, output objects, list objects and path objects.

Spreadsheet Object

The first object in our discussion is the Spreadsheet object. The Spreadsheet is the support for all simulation models. A control object that is readily integrated with the Visual Basic development plat. The control supports printing and is compatible with Microsoft Excel spreadsheets. With that in mind, designers can use the power of Excel formulas to build the simulation. The different cells contained in the spreadsheet model can be configured as Inputs, Outputs or Lists and belong to a simulation Path.

| Field Name | Data Type | Description |
|---|---|---|
| InputID | long | Primary Key for the table |
| TaskID | long | TaskID of the task associated with the input |
| PathID | long | PathID of the path associated with the input |
| InputName | string*50 | Name of the input |
| InputDesc | string*255 | Description of the input |
| ReferenceName | string*50 | Name of the spreadsheet cell associated with the input |
| TutorAware | boolean | Whether the ICA should be notified of any changes to the input |
| SourceItemID | long | SourceItemID if input is a distinct input 0 if input is a drag drop input |
| TargetID | long | TargetID of the input |
| Row | long | Spreadsheet row number of the input → speed optimization |
| Column | long | Spreadsheet column number of the input → speed optimization |
| SheetName | string*50 | Sheet name were the input is located → speed optimization |

Input object

All cells in the spreadsheet that need to be manually entered by the designer or the student via the GBS application are represented by input objects. Every input has the following interface:

This information is stored for every input in the Input table of the simulation database (ICASim.mdb). Refer to the example below.

When designers construct their simulation model, they must be aware of the fact that there are 2 types of Inputs:
1. Distinct Input
2. Drag & Drop Input Distinct Input The Distinct Input consists of a single spreadsheet cell that can be filled by the designer at design time or by the GBS application at run time via the simulation engine object's methods. The purpose of the cell is to provide an entry point to the simulation model. This entry point can be for example an answer to a question or a parameter to an equation. If the cell is TutorAware (all inputs are usually TutorAware), the ICA will be notified of any changes to the cell. When the ICA is notified of a change two messages are in fact sent to the ICA:

1. An ICANotifyDestroy message with the input information i.e., SourceItemID, TargetID and null as Attribute. This message is to advise the ICA to remove this information from its memory.
2. An ICANotifyCreate message with the input information i.e., SourceItemID, TargetID, Attribute (cell numeric value). This message is to advise the ICA to add this information to its memory.

A Distinct Input never requires that a user answer a mathematics question. These are the steps required to configure that simulation. FIG. 42 illustrates the arithmetic steps in accordance with a preferred embodiment.

1. Define a name for cell C2 in Excel. Here we have defined "Distinct_Input".
2. In the ICA, define a task that will be assigned to the simulation. Ex: a TaskID of 123 is generated by the ICA.

3. In the ICA, define a Target for the input. Ex: a TargetID of 4001 is generated by the ICA.
4. In the ICA, define a SourceItem for the input. Ex: a SourceItemID of 1201 is generated by the ICA.
5. Associate the input to a path (refer to Path object discussion).
6. Add the information in the Input table of the simulation engine database.

A record in an Input table is presented below.

| InputID: | 12345 |
|---|---|
| TaskID: | 123 |
| PathID: | 1234 |
| InputName: | Question 1 input |
| InputDesc: | Distinct input for Question 1 |
| ReferenceName: | Distinct_Input |
| TutorAware: | True |
| SourceItemID | 1201 |
| TargetID: | 4001 |
| Row: | 2 |
| Column: | 3 |
| SheetName: | Sheet1 |

The Row, Column and SheetName are filled in once the user clicks "Run Inputs/Outputs". The simulation engine decodes the defined name (Reference Name) that the designer entered, and populates the table accordingly. This is an important step. We had several occasions when a designer would change the layout of a spreadsheet, i.e., move a defined name location, then forget to perform this step. As such, bizarre data was being passed to the tutor; whatever data happened to reside in the old row and column. Once the configuration is completed, the designer can now utilize the ICA Utilities to test the simulation.

Drag & Drop Input

The drag & drop input consist of two consecutive spreadsheet cells. Both of them have to be filled by the designer at design time or by the GBS application at run time via the simulation engine object's methods. This type of input is used usually when the user must choose one answer among a selection of possible answers. Drag & drop inputs are always TutorAware. The left most cell contains the SourceItemID of the answer picked by the user (every possible answer needs a SourceItemID) and the rightmost cell can contain a numeric value associated to that answer. You need to define a name or ReferenceName in the spreadsheet for the rightmost cell.

ICA will be notified of any changes to either one of the cells. When the ICA is notified of a change two messages are in fact sent to the ICA:

1. An ICANotifyDestroy message with the input information i.e., SourceItemID before the change occurred, TargetID of the input and the Attribute value before the change occurred.
2. An ICANotifyCreate message with the input information i.e., SourceItemID after the change occurred, TargetID of the input and the Attribute value after the change occurred.

Let's demonstrate the use of a drag & drop input building on top of the previous example. Here, the user is asked to answer yet another mathematics question. These are the steps required to configure that section of the simulation. FIG. 43 illustrates a drag & drop input operation in accordance with a preferred embodiment.

1. Define a name for cell C11 in Excel. Here we have defined "DragDrop_Input".

2. Let's use the same TaskID as before since Question 2 is part of the same simulation as Question 1. Ex: TaskID is 123.
3. In the ICA, define a Target for the input. Ex: a TargetID of 4002 is generated by the ICA.
4. In the ICA, define a SourceItem for every possible answer to the question. Ex: SourceItemIDs 1202 to 1205 are generated by the ICA.
5. Associate the input to a path (refer to Path object discussion).
6. Add the information in the Input table of the simulation engine database.

A record in the Input table in accordance with a preferred embodiment is presented below.

| InputID: | 12346 |
|---|---|
| TaskID: | 123 |
| PathID: | 1234 |
| InputName: | Question 2 input |
| InputDesc: | Drag & Drop input for Question 2 |
| ReferenceName: | DragDrop_Input |
| TutorAware: | True |
| SourceItemID | 0        *** |
| TargetID: | 4002 |
| Row: | 11 |
| Column: | 3 |
| SheetName: | Sheet1 |

List Object

Figure 44:
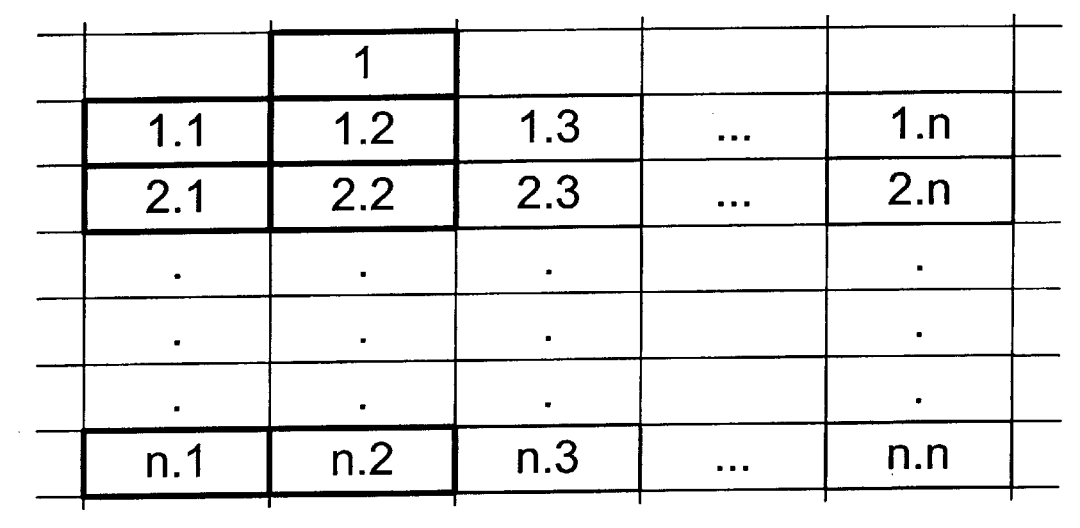

FIG. 44 illustrates list object processing in accordance with a preferred embodiment. The list object consists of one cell identifying the list (cell #1) and a series of placeholder rows resembling drag & drop inputs (cells #1.1–1.n to cells #n.1–n.n). The list is used usually when the user must choose multiple elements among a selection of possible answers. Cell #1 must have a uniquely defined name also called the list name. Cells #1.1 to #n.1 can contain the SourceItemID of one possible answer picked by the user (every possible answer needs a SourceItemID). The content of these cells must follow this format: ~ListName~SourceItemID. Cells #1.2 to #n.2 will hold the numeric value (attribute) associated with the SourceItemID in the cell immediately to the left. Cells #1.3–1.n to #n.3–n.n are optional placeholders for data associated with the answer. KEY NOTE: When implementing a list object the designer must leave all the cells under #n.1 to #n.n blank because this range will shift up every time an item is removed from the list.

Every list has the following interface:

| Field Name | Data Type | Description |
|---|---|---|
| ListID | long | Primary Key for the table |
| TaskID | long | TaskID of the task associated with the list |
| PathID | long | PathID of the path associated with the list |
| ListName | string*50 | Name of the list |
| ListDesc | string*255 | Description of the list |
| ReferenceName | string*50 | Name of the spreadsheet cell associated with the list |
| TutorAware | boolean | Whether the ICA should be notified of any changes to the list |
| TargetID | long | TargetID of the output |
| TotalColumns | long | Total number of data columns |
| Row | long | Spreadsheet row number of the output → speed optimization |

-continued

| Field Name | Data Type | Description |
|---|---|---|
| Column | long | Spreadsheet column number of the output → speed optimization |
| SheetName | string*50 | Sheet name were the input is located → speed optimization |

Use of a list is demonstrated by continuing our math test. The math question in this example invites the user to select multiple elements to construct the answer. These are the steps required to configure that section of the simulation. FIG. 45 illustrates the steps for configuring a simulation in accordance with a preferred embodiment.

1. Define a name for cell C23 in Excel. Here we have defined "The_List".
2. Let's use the same TaskID as before since Question 3 is part of the same simulation as Question 1 and 2. Ex: TaskID is 123.
3. In the ICA, define a Target for the list. Ex: a TargetID of 4006 is generated by the ICA.
4. In the ICA, define a SourceItem for every item that could be placed in the list. Ex: the following SourceItemIDs 1209, 1210, 1211, 1212, 1213, 1214 are generated by the ICA.
5. Associate the list to a path (refer to Path object discussion).
6. Add the information in the List table of the simulation engine database.

A record in the List table in accordance with a preferred embodiment is presented in the table appearing below.

| | |
|---|---|
| ListID: | 12346 |
| TaskID: | 123 |
| PathID: | 1234 |
| ListName: | Question 3 list |
| ListDesc: | List for Question 3 |
| ReferenceName: | The_List |
| TutorAware: | True |
| TargetID: | 4006 |
| TotalColumns: | 1 |
| Row: | 23 |
| Column: | 3 |
| SheetName: | Sheet1 |

Output Object

All cells in the spreadsheet that are result of calculations (do not require any external input) can be represented by output objects. Every output has an interface as outlined in the table below.

| Field Name | Data Type | Description |
|---|---|---|
| OutputID | long | Primary Key for the table |
| TaskID | long | TaskID of the task associated with the output |
| PathID | long | PathID of the path associated with the output |
| OutputName | string*50 | Name of the output |
| OutputDesc | string*255 | Description of the output |
| ReferenceName | string*50 | Name of the spreadsheet cell associated with the output |
| TutorAware | boolean | Whether the ICA should be notified of any changes to the output |
| SourceItemID | long | SourceItemID of the output |

-continued

| Field Name | Data Type | Description |
|---|---|---|
| TargetID | long | TargetID of the Output |
| Row | long | Spreadsheet row number of the output → speed optimization |
| Column | long | Spreadsheet column number of the output → speed optimization |
| SheetName | string*50 | Sheet name were the input is located → speed optimization |

All this information is stored for every output in the Output table of the simulation database (ICASim.mdb). When designers construct their simulation model, they must be aware of the fact that there is only 1 type of Outputs: the Distinct Output.

Distinct Output

A Distinct Output consists of one and only one spreadsheet cell that contains a formula or a result of calculations. The existence of Output cells is the main reason to have a simulation model. If the cell is TutorAware, the ICA will be notified of any changes to the cell when all outputs are processed otherwise the ICA will be unaware of any changes. When the ICA is notified of a change two messages are in fact sent to the ICA:

1. An ICANotifyDestroy message with the output information i.e., SourceItemID, TargetID and null as Attribute. This message is to advise the ICA to remove this information from its memory.
2. An ICANotifyCreate message with the output information i.e., SourceItemID, TargetID, Attribute (cell numeric value). This message is to advise the ICA to add this information to its memory. As opposed to Distinct Inputs and Drag & Drop Inputs which notify the ICA on every change, Distinct Outputs are processed in batch just before asking the ICA for feedback.

To notify the ICA of the total dollar amount of the items in the list. We definitely need a Distinct Output for that. The output will contain a sum formula. FIG. 46 illustrates a distinct output in accordance with a preferred embodiment. The steps required to configure that section of the simulation taking in consideration that the list is already configured are presented below.

1. Define a name for cell C24 in Excel. Here we have defined "Distinct_Output".
2. Let's use the same TaskID as before since Question 3 is part of the same simulation as Question 1 and 2. Ex: TaskID is 123.
3. In the ICA, define a Target for the output. Ex: a TargetID of 4005 is generated by the ICA.
4. In the ICA, define a SourceItem for the output. Ex: a SourceItemID of 1215 is generated by the ICA.
5. Associate the output to a path (refer to Path object discussion).
6. Add the information in the Output table of the simulation engine database.

A record in an Output table in accordance with a preferred embodiment is presented below.

| | |
|---|---|
| OutputID: | 12347 |
| TaskID: | 123 |
| PathID: | 1234 |
| OutputName: | Question 3 output |

-continued

| | |
|---|---|
| OutputDesc: | Distinct Output for Question 3 |
| ReferenceName: | Distinct_Output |
| TutorAware: | True |
| SourceItemID | 1215 |
| TargetID: | 4005 |
| Row: | 24 |
| Column: | 6 |
| SheetName: | Sheet1 |

Path Object

Paths are used to divide a simulation model into sub-Simulations meaning that you can group certain inputs, outputs and lists together to form a coherent subset or path. Every path has the following interface:

| Field Name | Data Type | Description |
|---|---|---|
| PathID | long | Primary Key for the table |
| TaskID | long | TaskID of the task associated with the path |
| PathNo | long | Numeric value associated to a path |
| PathName | string*50 | Name of the path |
| PathDesc | string*255 | Description of the path |

Simulation Engine

The simulation engine is the interface between the model, the simulation database and the Intelligent Coaching Agent. The simulation engine is of interest to the designer so that he can understand the mechanics of it all. But it is the developer of applications using the engine that should know the details of the interface (methods & properties) exposed by the engine and the associated algorithms.

Once the designer has constructed the simulation model (Excel Spreadsheet) and configured all the inputs, outputs & lists, he is ready to test using the test bench included in the ICA Utilities (refer to ICA Utilities documentation). The developer, in turn, needs to implement the calls to the simulation engine in the GBS application he's building. The following list identifies the files that need to be included in the Visual Basic project to use the simulation workbench:

| | |
|---|---|
| wSimEng.cls | Simulation Engine class |
| wSimEng.bas | Simulation Engine module (this module was introduced only for speed purposes because all the code should theoretically be encapsulated in the class) |
| wConst.bas | Intelligent Coaching Agent constant declaration |
| wDeclare.bas | Intelligent Coaching Agent DLL interface |
| wIca.cls | Intelligent Coaching Agent class |
| wIca.bas | Intelligent Coaching Agent module (this mode was introduced only for speed purposes because all the code should theoretically be encapsulated in the class) |

To have a working simulation, a developer places code in different strategic areas or stages of the application. There's the Initial stage that occurs when the form containing the simulation front-end loads. This is when the simulation model is initialized. There's the Modification stages that take place when the user makes changes to the front-end that impacts the simulation model. This is when the ICA is notified of what's happening. There's the Feedback stage when the user requests information on the work done so far. This is when the simulation notifies the ICA of all output changes. Finally, there's the Final stage when the simulation front-end unloads. This is when the simulation is saved to disk.

The different stages of creating a simulation, including the Visual Basic code involved, are presented below.

Initial Stage

1. Creating the ICA & the Simulation Engine Objects
Code:
  Set moSimEngine=New classSimEngine
  Set moICA=New classICA
  Description: The first step in using the simulation engine is to create an instance of the class classSimEngine and also an instance of the class classICA. Note that the engine and ICA should be module level object "mo" variables.

2. Loading the Simulation
Code:
  1Ret=moSimEngine.OpenSimulation(App.Path & DIR_DATA & FILE_SIMULATION, Me.bookSimulation)
  1Ret=moSimEngine.LoadSimulation(m1ICATaskID, App.Path & DIR_DATABASE & DB_SIMULATION, 1)
  Description: After the object creation, the OpenSimulation and LoadSimulation methods of the simulation engine object must be called. The OpenSimulation method reads the specified Excel 5.0 spreadsheet file into a spreadsheet control. The LoadSimulation method opens the simulation database and loads into memory a list of paths, a list of inputs, a list of outputs and a list of lists for the specific task. Every method of the simulation engine will return 0 if it completes successfully otherwise an appropriate error number is returned.

3. Initializing and Loading the Intelligent Coaching Agent
Code:
  1Ret=moICA.Initialize(App.Path & "\" & App.EXEName & ".ini", App.Path & DIR_DATABASE, App.Path & DIR_ICADOC, App.Path & "\")
  1Ret=moICA.LoadTask(m1ICATaskID, ICAStudentStartNew)
  Description: The simulation engine only works in conjunction with the ICA. The Initialize method of the ICA object reads the application .ini file and sets the Tutor32.dll appropriately. The LoadTask method tells the ICA (Tutor32.dll) to load the .tut document associated to a specific task in memory. From that point on, the ICA can receive notifications.
  Note: The .tut document contains all the element and feedback structure of a task. Ex: SourcePages, SourceItems, TargetPages, Targets, etc. . . .

4. Restoring the Simulation
Code:
  <<Code to reset the simulation when starting over>>
  <<Code to load the controls on the simulation front-end>>
  1Ret=moSimEngine.RunInputs(sPaths, True)
  1Ret=moSimEngine.RunOutputs(sPaths, True)
  1Ret=moSimEngine.RunLists(sPaths, True)
  Call moICA.Submit(0)
  Call moICA.SetDirtyFlag(0, False)
  Description: Restoring the simulation involves many things:
    clearing all the inputs and lists when the user is starting over
    loading the interface with data from the simulation model
    invoking the RunInputs, RunOutputs and RunLists methods of the simulation engine object in order to bring the ICA to it's original state
    calling the Submit method of the ICA object with zero as argument to trigger all the rules
    calling the SetDirtyFlag of the ICA object with 0 and false as arguments in order to reset the user's session.

Running inputs involves going through the list of TutorAware inputs and notifying the ICA of the SourceItemID, TargetID and Attribute value of every input.

Running lists involves going through the list of TutorAware lists and notifying the ICA of the SourceItemID, TargetID and Attribute value of every item in every list. The TargetID is unique for every item in a list.

Running outputs involves going through the list of TutorAware outputs and notifying the ICA of the SourceItemID, TargetID and Attribute value of every output.

Modification Stage

1. Reading Inputs & Outputs

Code:

```
Dim sDataArray(2) as string
Dim vAttribute as variant
Dim lSourceItemID as long
Dim lTargetID as long
lRet=moSimEngine.ReadReference("Distinct_Input",
    vAttribute, lSourceItemID, lTargetID, sDataArray)
```

Description: The ReadReference method of the simulation object will return the attribute value of the input or output referenced by name and optionally retrieve the SourceItemID, TargetID and related data. In the current example, the attribute value, the SourceItemID, the TargetID and 3 data cells will be retrieved for the input named Distinct_Input.

2. Modifying Distinct Inputs

Code:

```
Dim vAttribute as variant
Dim lSourceItemID as long
Dim sDataArray(2) as string
vAttribute=9999
sDataArray(0)="Data Cell #1"
sDataArray(1)="Data Cell #2"
sDataArray(2)="Data Cell #3"
lRet=moSimEngine.WriteReference("Distinct_Input",
    vAttribute, sDataArray)
```

Description: Modifying a distinct input is as simple as calling the WriteReference method of the simulation object passing the input name, the new attribute value and optionally a data array. The simulation engine takes care of notifying the ICA of the change.

3. Modifying Drag&Drop Inputs

Code:

```
Dim vAttribute as variant
Dim lSourceItemID as long
Dim sDataArray(2) as string
lSourceItemID=1202
vAttribute=9999
sDataArray(0)="Data Cell #1"
sDataArray(1)="Data Cell #2"
sDataArray(2)="Data Cell #3"
lRet=moSimEngine.WriteReference("DragDrop_
    Input", vAttribute, lSourceItemID,
sDataArray)
```

Description: Modifying a drag&drop input is as simple as calling the WriteReference method of the simulation object passing the input name, the new attribute value, the new SourceItemID and optionally a data array. The simulation engine takes care of notifying the ICA of the change.

4. Reading Lists

Code:

```
lRet=moSimEngine.ListRead(sListName, lListIndex,
vAttribute, lSourceItemID, lTargetID, sDataArray)
```

Description: All list in the simulation model can be read one item at a time using the ListRead method of the simulation engine object. Passing the list name and the index of the item to retrieve, the function will return the Attribute value and optionally the SourceItemID, TargetID and data array of the item specified. Use a looping structure to read entire lists into memory, or to search for and retrieve a particular line item. This will be done quite often as designers generally allow users to manipulate items from lists. For example, if a user begins to drag an element of a list, you will need to retrieve this data from the list item they are dragging.

5. Modifying Lists

Code:

```
lRet=moSimEngine.ListAdd(sListName, vAttribute,
    lSourceItemID, sDataArray)
lRet=moSimEngine.ListCount(sListName, lTotalItems)
lRet=moSimEngine.ListModify(sListName, lListIndex,
    vAttribute, lSourceItemID, sDataArray)
lRet=moSimEngine.ListDelete(sListName, lListIndex)
```

Description: The simulation engine object provides basic functionality to manipulate lists.

The ListAdd method appends an item(SourceItemID, Attribute, Data array) to the list. Let's explain the algorithm. First, we find the top of the list using the list name. Then, we seek the first blank cell underneath the top cell. Once the destination is determine, the data is written to the appropriate cells and the ICA is notified of the change. The ListCount method returns the number of items in the specified list. The algorithm works exactly like the ListAdd method but returns the total number of items instead of inserting another element.

The ListModify method replaces the specified item with the provided data. Let's explain the algorithm. First, we find the top of the list using the list name. Second, we calculate the row offset based on the item number specified. Then, the ICA is notified of the removal of the existing item. Finally, the data related to the new item is written to the appropriate cells and the ICA is notified of the change.

The ListDelete method removes the specified item. The algorithm works exactly like the ListModify method but no new data is added and the cells (width of the list set by 'Total Columns') are deleted with the 'move cells up' parameter set to true. Keep this in mind, as designers often enter the wrong number of columns in the Total Columns parameter. When they overestimate the Total Columns, ListDelete will modify portions of the neighboring list, which leads to erratic behavior when that list is displayed.

Feedback Stage

1. Running the Simulation

Code:

```
lRet=moSimEngine.RunOutputs(sPaths, True)
```

Description: Inputs and lists notify the ICA when changes happen but not outputs. Therefore, the RunOutputs method must be invoked before submitting the work for feedback.

2. Triggering the ICA Rule Engine

Code:

```
lRet=moICA.Submit(lCoachID)
```

Description: Once the simulation has been processed, the Submit method of the ICA object must be called to trigger all the rules and deliver the feedback. This feedback will be written by the Tutor32.dll to two RTF formatted files. One file for previous feedback and one file for the current feedback.

3. Displaying ICA Feedback
Code:
  Set oViewer=New CFeedbackViewer
  oViewer.CoachID=v1CoachID
  Call oViewer.DisplayFeedBack(moApp)
  Description: The only thing required to display feedback information is to have an RTF control on a form and read-in the feedback files produced by the Submit method of the ICA object.
Final Stage
  1. Saving the Simulation
Code:
  1Ret=moSimEngine.SaveSimulation(App.Path & DIR_DATA & FILE_SIMULATION)
  Description: The SaveSimulation method of the simulation engine object will save the specified Excel spreadsheet to disk.

SYSTEM DYNAMICS IN ACCORDANCE WITH A PREFERRED EMBODIMENT

To use system dynamics models in the architecture, an engine had to be created that would translate student work into parameters for these models. A complex system dynamics model to interact with an existing simulation architecture is discussed below. The system dynamics model provides the following capabilities.

1. Allow designers to build and test their system dynamics models and ICA feedback before the real interface is built.
2. Reduce the programming complexity of the activities.
3. Centralize the interactions with the system dynamics models.

System Dynamics Engine

As with the simulation engine, the designer models the task that he/she wants a student to accomplish using a Microsoft Excel spreadsheet. Here, however, the designer also creates a system dynamics model (described later). The system dynamics engine will read all of the significant cells within the simulation model (Excel) and pass these values to the system dynamics model and the ICA. After the system dynamics model runs the information, the output values are read by the engine and then passed to the simulation model and the ICA.

Figure 47:
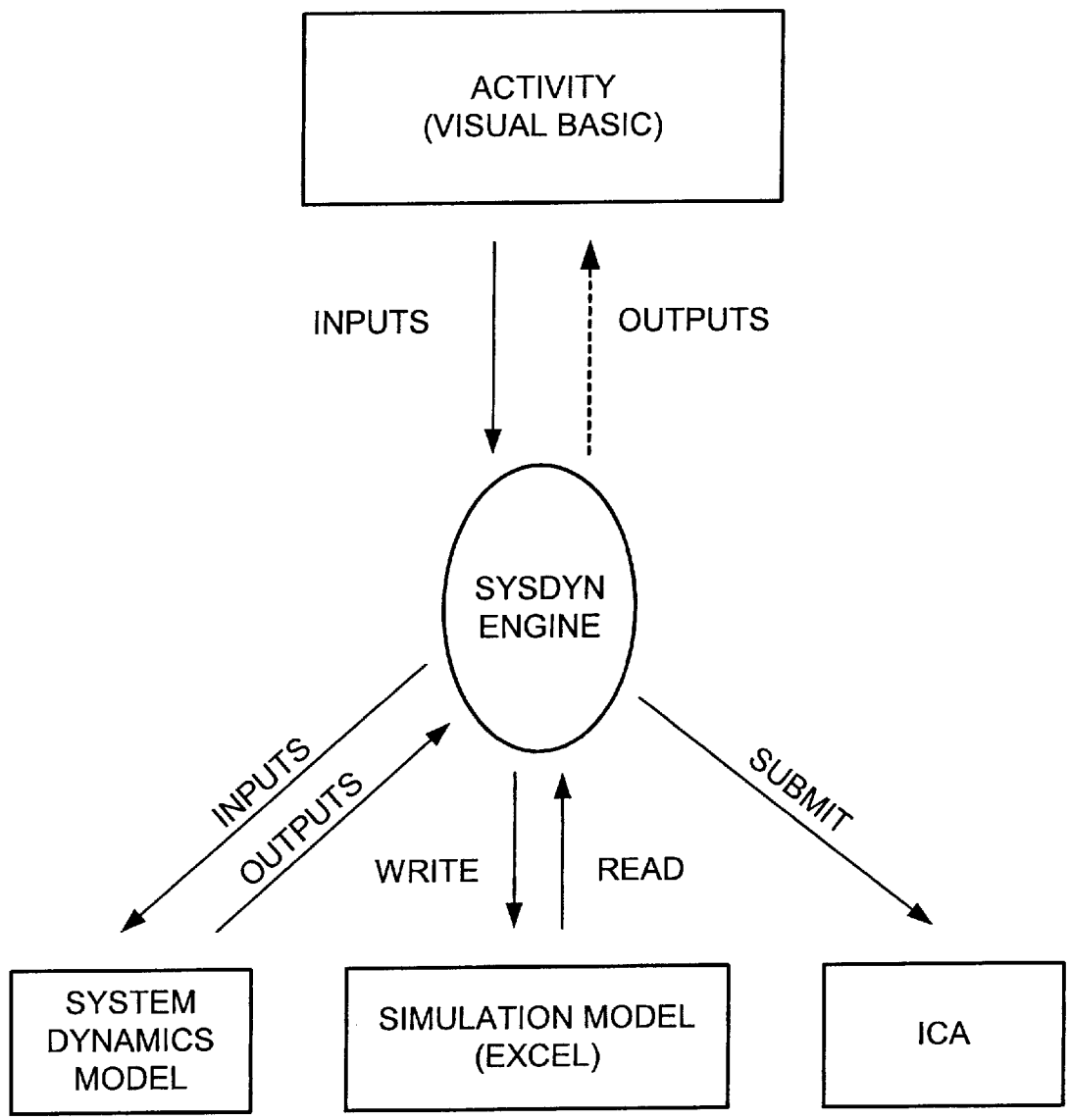
FIG. 47 is a block diagram presenting the detailed architecture of a system dynamics model in accordance with a preferred embodiment.

FIG. 47 is a block diagram presenting the detailed architecture of a system dynamics model in accordance with a preferred embodiment. Once the simulation model, system dynamics model and feedback are completely tested by designers, developers can incorporate the spreadsheet in a graphical user interface, e.g., Visual Basic as a development platform. FIG. 47 illustrates that when a student completes an activity, the values are passed to the system dynamics engine where the values are then passed to the system dynamics model (as an input), written to the simulation model and submitted to the ICA. When the system dynamics model is played, the outputs are pulled by the engine and then passed to the simulation model and the ICA. Note that the simulation model can analyze the output from the system dynamics model and pass the results of this analysis to the ICA as well. The simulation model can then be read for the output values and used to update on-screen activity controls (such as graphs or reports).

It is very important that all modifications that the ICA and system dynamics model need to know about go through the engine because only the engine knows how to call these objects. This significantly reduces the skill level required from programmers, and greatly reduces the time required to program each task. In addition, the end-product is less prone to bugs, because the model and tutor management will be centralized. If there is a problem, only one section of code needs to be checked. Finally, since the engine loads the data from the spreadsheet, the chance of data inconsistency between the ICA, the system dynamics model and the application is insignificant.

Figure 48:
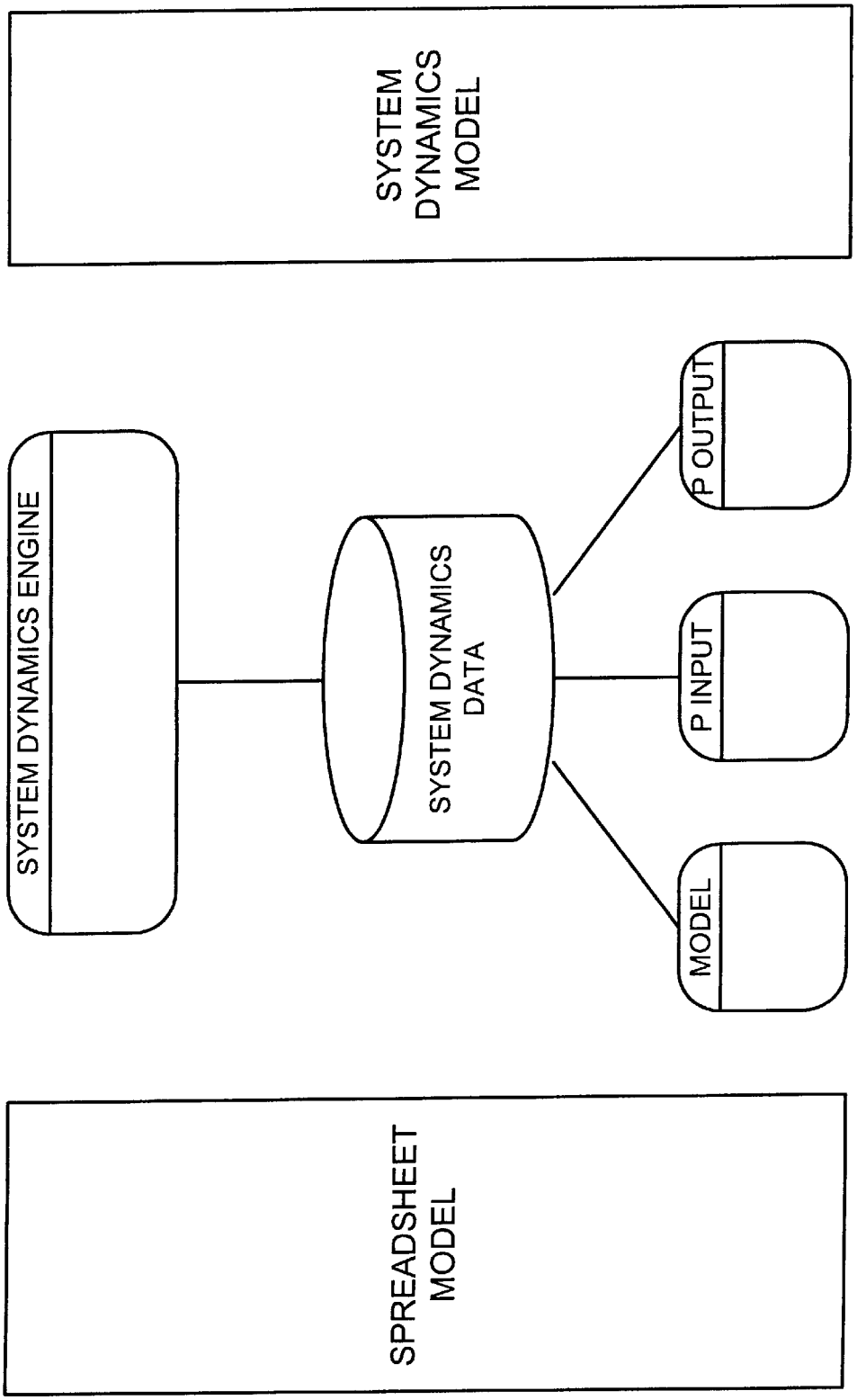
FIG. 48 is graphical representation of the object model which is utilized to instantiate the system dynamic engine in accordance with a preferred embodiment.

FIG. 48 is graphical representation of the object model which is utilized to instantiate the system dynamic engine in accordance with a preferred embodiment. The System Dynamics Object Model consists of a spreadsheet object, a system dynamics object, a simulation database, model objects, parameter input objects and parameter output objects. The first object in our discussion is the Spreadsheet object. The Spreadsheet is the support for all simulation models. The spreadsheet object is integrated with a Visual Basic development platform in accordance with a preferred embodiment. The control supports printing and is compatible with Microsoft Excel spreadsheets. With that in mind, designers can use the power of Excel formulas to build the simulation. These spreadsheets can sort or make calculations on the time interval data that is received from the system dynamics model, which allows the ability to show trends. This functionality allows a large amount of the calculations and number-crunching to occur in the spreadsheet and not in the code, placing more control with the activity designers.

The different cells in the spreadsheet model can be configured as parameter inputs or parameter outputs for a system dynamics model. This is what the system dynamics engine uses to write and read data from the system dynamics model, pass values to the ICA and update the student's work in the on-line activities. By making the spreadsheet object the central repository for the system dynamics data, we ensure that the system dynamics model, simulation model, activity and ICA are all in synch.

The system dynamics model generates simulation results over time, based on relationships between the parameters passed into it and other variables in the system. A system dynamics object is used to integrate with Visual Basic and the spreadsheet object. The object includes logic that controls the time periods as well as read and write parameters to the system dynamics model. With Visual Basic, we can pass these parameters to and from the model via the values in the simulation object.

The system dynamics object also controls the execution of the system dynamics model. What this means is that after all of the parameter inputs are passed to the system dynamics model, the engine can run the model to get the parameter outputs. The system dynamics object allows for the system dynamics models to execute one step at a time, all at once, or any fixed number of time periods.

When the system dynamics model runs, each step of the parameter input and parameter output data is written to a 'backup' sheet for two reasons. First, the range of data that is received over time (the model playing multiple times) can be used to create trend graphs or used to calculate statistical values. Second, the system dynamics model can be restarted and this audit trail of data can be transmitted into the model up to a specific point in time. What this means is that the engine can be used to play a simulation back in time.

When any event occurs within the system dynamics engine, a log is created that tells the designers what values are passed to the simulation model, system dynamics model and ICA as well as the current time and the event that occurred. The log is called "SysDyn.log" and is created in the same location as the application using the engine. As with the spreadsheet object, the system dynamics object allows a large amount of the calculations to occur in the system dynamics model and not in the activity code, again placing more control with the activity designers.

Model objects are used to configure the system dynamics models with regard to the time periods played. Models are what the parameter inputs and parameter outputs (discussed later) relate to, so these must be created first. Every model has the following application programming interface:

| Field Name | Data Type | Description |
| --- | --- | --- |
| ModelID | Long | Primary Key for the table |
| TaskID | Long | TaskID of the task associated with the model |
| ModelName | String*50 | Name of the model (informational purposes) |
| ModelDesc | String*50 | Description of the model (informational purposes) |
| SysDynModel | String*50 | Filename of the actual system dynamics model |
| Start | Long | Start time to play model |
| Stop | Long | Stop time to play model |
| Step | Long | Interval at which to play one model step and record data |

This information is stored in the model table of the simulation database (ICASim.mdb). All of the values that will need to be manually entered by the student that are passed into the system dynamics model are configured as parameter inputs (PInputs) objects. Every PInput has an interface as detailed below.

| Field Name | Data Type | Description |
| --- | --- | --- |
| PinputID | long | Primary Key for the table |
| TaskID | long | TaskID of the task associated with the parameter input |
| ModelID | long | ID of the model associated with the parameter input |
| InputName | string*50 | Name of the parameter input (informational purposes) |
| InputDesc | string*255 | Description (informational purposes) |
| ReferenceName | string*50 | Name of the spreadsheet cell associated with the parameter input[1] |
| SimReferenceName | string*50 | Name of the associated parameter in the system dynamics model |
| TutorAware | boolean | Whether the ICA should be notified of any changes to the parameter input |
| SourceItemID | long | SourceItemID of the parameter input |
| TargetID | long | TargetID of the parameter input |
| Row | long | Spreadsheet row number of the parameter input (used for speed optimization) |
| Column | long | Spreadsheet column number of the parameter input (used for speed optimization) |
| SheetName | string*50 | Sheet name were the parameter input is located (used for speed optimization) |

[1]PowerSim allows designers to create parameters as arrays. If this is the case, then each array item MUST have one parameter input. What this means is that dynamics arrays can not be used by the System Dynamics engine.

All of this information is stored for every parameter input in the PInput table of the simulation database (ICASim.mdb).

PInputs consist of one spreadsheet cell that can be populated by a designer at design time or by the GBS application at run time via the system dynamics engine object's methods. The purpose of the cell is to provide an entry point to the simulation and system dynamics models. An example of an entry point would be the interest rate parameter in the interest calculation example. The ICA is notified of any changes to the cell when an appropriate activity transpires. When the ICA is notified of a change two messages are sent to the ICA. The first is an ICANotifyDestroy message with the parameter input information i.e., SourceItemID, TargetID and null as an attribute. This message is sent to inform the ICA to remove information from its memory. The second message is an ICANotifyCreate message with the parameter input information i.e., SourceItemID, TargetID, Attribute (cell numeric value). This message advises the ICA to add this information to its memory.

To demonstrate the use of a parameter input, the interest rate calculation example is again used as a backdrop to illuminate various features. FIGS. 49 is a PInput Cell for a simulation model in accordance with a preferred embodiment. FIG. 50 is a PInput backup cell in a simulation model in accordance with a preferred embodiment. Interest Rate is the parameter input for this model which will then be used to calculate balance and interest accumulations. A defined name will also have to be created for the backup of the PInput as each time interval is played. A requirement for this cell is that it has the same name as the original PInput, but also have the "__BU" extension. The example here would be "Interest_Rate__BU." This cell will also have to be created in a column where no other data exists, since all of the backups are written below this cell. In the ICA, define a task that will be assigned to the simulation. For example, a TaskID of 123 is generated by the ICA. For this example, we will assume that we want to give feedback on the interest rate selected by the student. In the ICA, define a Target for the parameter input.

A PInput table record in accordance with a preferred embodiment is presented below.

| | |
| --- | --- |
| PInputID: | 12345 |
| TaskID: | 123 |
| ModelID: | 1 |
| InputName: | Interest Rate input |
| InputDesc: | Interest Rate input into interest calculation model |
| ReferenceName: | Interest_Rate |
| SimReferenceName | Param_Interest_Rate |
| TutorAware: | True |
| SourceItemID | 1201 |
| TargetID: | 4001 |
| Row: | 6 |
| Column: | 3 |
| SheetName: | Sheet1 |

Once the configuration is completed, the designer can also use the ICA Utilities to test the simulation. The Row, Column and SheetName values are automatically populated when the designer runs the parameters in the System Dynamics Workbench in the ICA Utilities. The reason for obtaining the cell coordinates is that the processing of cell data is significantly faster with cell positions than simply using the defined name. The system dynamics engine decodes the defined name (Reference Name) that the designer entered, and populates the table accordingly. This is an important step because there have been occasions when a designer would change the layout of a spreadsheet, i.e., move a defined name location, and then forget to perform this step. As such, bizarre data was being passed to the tutor; whatever data happened to reside in the old row and column.

Cells in the spreadsheet that are the output from a system dynamics models can be represented by parameter output objects (POutputs). Every POutput has an interface as detailed below.

| Field Name | Data Type | Description |
|---|---|---|
| PoutputID | Long | Primary Key for the table |
| TaskID | Long | TaskID of the task associated with the parameter output |
| ModelID | Long | ID of the model associated with the parameter output |
| OutputName | String*50 | Name of the parameter output (informational purposes) |
| OutputDesc | String*255 | Description (informational purposes) |
| ReferenceName | String*50 | Name of the spreadsheet cell associated with the parameter output |
| SimReferenceName | String*50 | Name of the associated parameter in the system dynamics model |
| TutorAware | Boolean | Whether the ICA should be notified of any changes to the parameter output |
| SourceItemID | Long | SourceItemID of the parameter output |
| TargetID | Long | TargetID of the parameter output |
| Row | Long | Spreadsheet row number of the parameter output (used for speed optimization) |
| Column | Long | Spreadsheet column number of the parameter output (used for speed optimization) |
| SheetName | String*50 | Sheet name were the parameter output is located (used for speed optimization) |

All of this information is stored for every output in the Output table of the simulation database (ICASim.mdb). Each POutput object conprises a spreadsheet cell that is an output from the system dynamics model. This is the information that shows the student the results of their choices and is the main reason for using system dynamics. The POutput can be made TutorAware, which will notify the ICA of any changes to the cell when all the POutputs are processed otherwise the ICA will be unaware of any changes. When the ICA is notified of a change, two messages are in fact sent to the ICA:

1. An ICANotifyDestroy message with the parameter output information i.e., SourceItemID, TargetID and null as Attribute. This message is to advise the ICA to remove this information from its memory.
2. An ICANotifyCreate message with the parameter output information i.e., SourceItemID, TargetID, Attribute (cell numeric value). This message is to advise the ICA to add this information to its memory.

As opposed to PInputs which notify the ICA on every change, POutputs are processed in batch just before asking the ICA for feedback.

POutputs use is illuminated below by an example that builds on the previous interest calculation example. Here, we want to notify the ICA of the balance as it results from changes in the interest rate. FIG. 51 is a display illustrating a POutput cell in accordance with a preferred embodiment. The steps required to configure the POutput are presented below.

1. Define a name for cell G4 in Excel. Here we have defined "Balance."
2. Define the name of the backup cell as "Balance_BU" in a blank column.
3. Let's use the same TaskID as before since the Balance parameter is part of the same simulation as the Interest Rate parameter. Ex: TaskID is 123.
4. In the ICA, define a Target for the parameter output. Ex: a TargetID of 4005 is generated by the ICA.
5. In the ICA, define a SourceItem for the parameter output. Ex: a SourceItemID of 1215 is generated by the ICA.
6. Associate the parameter output to a system dynamics model (refer to Model object discussion).
7. Add the information in the POutput table of the simulation engine database. This configuration can also be done within the ICA Utilities.

The record in the POutput table would look something like this:

| | |
|---|---|
| OutputID: | 12347 |
| TaskID: | 123 |
| ModelID: | 1234 |
| OutputName: | Balance Value |
| OutputDesc: | Value of Balance after model has been run |
| ReferenceName: | Balance |
| SimReferenceName | Param_Balance |
| TutorAware: | True |
| SourceItemID | 1215 |
| TargetID: | 4005 |
| Row: | 4 |
| Column: | 7 |
| SheetName: | Sheet1 |

The following information provides details describing the interaction components in accordance with a preferred embodiment.

| Title | Description |
|---|---|
| Procedural tasks (w/drag drop) | Tasks which require the construction of some kind of report with evidence dragged and dropped to justify conclusions |
| Procedural tasks (w/o drag drop) | New task designs that are procedural in nature, have very little branching, and always have a correct answer. |
| Ding Dong task | Tasks that interrupt the student while working on something else. This template includes interviewing to determine the problem, and a simple checkbox form to decide how to respond to the situation. |
| Analyze an Decide (ANDIE) task | Most commonly used for static root cause analysis, or identification tasks. Developed on SBPC as a result of 3 projects of experience redesigning for the same skill. |
| Evaluate Options (ADVISE) | Used for tasks that require learner to evaluate how different options meet stated goals or requirements. Developed at SBPC after 4 projects experience redesigning for the same skill. Does not allow drag drop as evidence. |
| Run a company task | Time based simulation where student "chooses own adventure". Each period the student selects from a pre-determined list of actions to take. Developed on SBPC as a simplified version of the BDM manage task. |
| Use a model task | When user needs to interact with a quantitative model to perform what if analysis. May be used for dynamic root cause analysis - running tests on a part to analyze stress points. |
| ICA Dynamic Meeting Task | Developed on BDM to mimic interaction styles from Coach and ILS EPA. Supports dynamic-rule based branching - will scale to support interactions like EnCORE defense meetings and YES. |
| Manage Task | Time based simulation where student manages resources. Human Resources Management, managing a budget, manage an FX portfolio. |
| QVID Static Meeting Task | Developed on Sim2 to support agenda-driven meetings where user is presented with up to 5 levels of follow-up questions to pursue a line of questioning. As |

| Title | Description |
|---|---|
| | they ask each question, it's follow-ups appear. |
| Flow Chart Task | Will support most VISIO diagrams. Developed on Sim2 to support simple flow chart decision models. |
| QVID Gather Data Component | Static flat list of questions to ask when interviewing someone. Not used when interviewing skills are being taught (use QVID Static meeting task). Supports hierarchical questions and timed transcripts. |
| Journalize Task | Created to support simple journal entry tasks with up to 2 accounts per debit or credit. |
| New Complex Task | A new task that requires a simulation component |

Systems Dynamic Engine

The system dynamics engine is the interface between the simulation model, the system dynamics model, the simulation database and the Intelligent Coaching Agent. The system dynamics engine is of interest to the designer so that she can understand the mechanics of it. Once the designer has constructed the simulation model (Excel Spreadsheet), built the system dynamics model (PowerSim) and configured all of the parameter inputs and parameter outputs, a test can be performed using the workbench included in the ICA Utilities (refer to ICA Utilities documentation). The developers, in turn, need to implement the calls to the system dynamics engine in the GBS application that is being built. The following list identifies the files that need to be included in the Visual Basic project to use the system dynamics engine.

| | |
|---|---|
| WSysDynEng.cls | System dynamics Engine class |
| wSysDynEng.bas | System dynamics Engine module (this module was introduced only for speed purposes because all the code should theoretically be encapsulated in the class) |
| wConst.bas | Intelligent Coaching Agent constant declaration |
| wDeclare.bas | Intelligent Coaching Agent DLL interface |
| wIca.cls | Intelligent Coaching Agent class |
| wIca.bas | Intelligent Coaching Agent module (this module was introduced only for speed purposes because all of the code should theoretically be encapsulated in the class) |

To utilize the system dynamics engine fully, the developer must place code in different strategic areas or stages of the application.
1) Initial stage—the loading of the form containing the simulation front-end. This is when the simulation model and system dynamic engine are initialized.
2) Modification stage—Takes place when the user makes changes to the front-end that impacts the simulation model PInputs). This is when the ICA is notified of what's happening.
3) Run stage—The system dynamics model is run and parameter outputs are received.
4) Feedback stage—The user requests feedback on the work that they have performed. This is when the simulation notifies the ICA of all output changes.
5) Final stage—The simulation front-end unloads. This is when the simulation model is saved.

These stages will be explained by including the Visual Basic code involved as well as a short description of that code.

Initial Stage Code In Accordance With A Preferred Embodiment

1. Creating the ICA & the Simulation Engine Objects
Code:
   Set moSysDynEngine=New classSysDynEngine
   Set moICA=New classICA
   Description: The first step in using the system dynamics engine is to create an instance of the classSysDynEngine class and also an instance of the classICA class. Note that the engine and
   ICA should be module level object "mo" variables.
2. Loading the Simulation
Code:
   1Ret=moSysDynEngine.OpenSimulation(FILE_SIM, Me.bookSim, True)
   1Ret=moSysDynEngine.LoadSysDyn(m1ICATaskID, DB_SIMULATION, 1)
   1Ret=moSysDynEngine.LoadModel(MODEL_NAME, mbTaskStarted)
   Description: After the object creation, the OpenSimulation, LoadSimulation and LoadModel methods of the system dynamics engine object must be called. The OpenSimulation method reads the specified Excel 5.0 spreadsheet file (FILE_SIM) into a spreadsheet control (bookSim). The LoadSysDyn method opens the simulation database (DB_SIMULATION) and loads into memory a list of parameter inputs and a list of parameter outputs. The LoadModel method opens a system dynamics model (MODEL_NAME). Every method of the system dynamics engine will return 0 if it completes successfully otherwise an appropriate error number is returned.
3. Initializing and Loading the Intelligent Coaching Agent
Code:
   1Ret=moICA.Initialize(App.Path & "\" & App.EXEName & ".ini", App.Path & DIR_DATABASE, App.Path & DIR_ICADOC, App.Path & "\")
   1Ret=moICA.LoadTask(m1ICATaskID, ICAStudentStartNew)
   Description: The system dynamics engine only works in conjunction with the ICA. The Initialize method of the ICA object reads the application .ini file and sets the Tutor32.dll appropriately. The LoadTask method tells the ICA (Tutor32.dll) to load the .tut document associated to a specific task in memory. From that point on, the ICA can receive notifications. Note: The .tut document contains all the element and feedback structure of a task. Ex: SourcePages, SourceItems, TargetPages, Targets, etc. . . .
4. Restoring the Simulation
Code:
   1Ret=moSysDynEngine.RunPInputs(MODEL_NAME, True)
   1Ret=moSysDynEngine.RunPOutputs(MODEL_NAME, True)
   1Ret=moSysDynEngine.PassPInputsAll
   Call moICA.Submit(0)
   Call moICA.SetDirtyFlag(0, False)
   Description: Restoring the simulation involves many things:
   clearing all of the parameter inputs and outputs when the user is starting over
   loading the interface with data from the simulation model
   invoking the PassPInputsAll method of the system dynamics engine object in order to bring the ICA to its original state
   invoking the RunPInputs and RunPOutputs methods of the system dynamics engine object in order to bring the system dynamics model to it's original state calling the Submit method of the ICA object to trigger the ICA to play all of the rules calling the SetDirtyFlag of the ICA object to reset the user's session.

Running parameters involves going through the list of TutorAware PInputs and POutputs and notifying the ICA of the SourceItemID, TargetID and Attribute value of every one.

Modification Stage

1. Reading Parameter Inputs & Outputs

Code:

Dim sDataArray(2) as string
Dim vAttribute as variant
Dim lSourceItemID as long, lTargetID as long
lRet=moSysDynEngine.ReadReference("Input_Name", vAttribute, lSourceItemID, lTargetID, sDataArray)

Description: The ReadReference method of the system dynamics object will return the attribute value of the parameter input or output referenced by name and optionally retrieve the SourceItemID, TargetID and related data. In the current example, the attribute value, the SourceItemID, the TargetID and 3 data cells will be retrieved for the parameter input named Input_Name.

2. Modifying Parameter Inputs

Code:

Dim vAttribute as variant
Dim lSourceItemID as long
Dim sDataArray(2) as string
vAttribute=9999
sDataArray(0)="Data Cell #1"
sDataArray(1)="Data Cell #2"
sDataArray(2)="Data Cell #3"
lRet=moSysDynEngine.WriteReference("Input_Name", vAttribute, sDataArray)

Description: To modify a parameter input, call the WriteReference method of the system dynamics object and pass the PInput reference name, the new attribute value and optionally a data array (an additional information to store in the simulation model). The system dynamics engine notifies the ICA of the change.

Run Stage

1. Playing the System Dynamics Model

Code:

lRet=moSysDynEngine.PlayModel(SYSDYN_PLAYSTEP)
lblCurrentTime.Caption=moSysDynEngine.CurrentTime
lblLastTime.Caption=moSysDynEngine.LastTime Description: Playing the system dynamics model is also handled by the system dynamics engine. There are three ways that the models can be played, all at once, one step at a time (shown above) or until a specific point in time. These are the parameters that are passed into the PlayModel method. Playing of the model generates the parameter output values and passes the Tutor Aware POutputs to the ICAT. The engine also keeps track of time and these values can be read using the CurrentTime and LastTime properties.

2. Jumping Back in a System Dynamics Model

Code:

lRet=moICA.LoadTask(mlICATaskID, ICAStudentStartNew)
lRet=moSysDynEngine.JumpBack(TIME_TO_JUMP_TO)

Description: Because the system dynamics engine writes backup copies of the parameters passed to and from it, it can start over and resubmit these values back to the system dynamics model until a given period of time. To do this, the code would need to restart the ICA and then call the system dynamics engine to jump back to a given time (TIME_TO_JUMP_TO).

Feedback Stage

1. Triggering the ICA Rule Engine

Code:

lRet=moICA.Submit(lCoachID)

Description: Once the simulation has been processed, the Submit method of the ICA object must be called to trigger all the rules and deliver the feedback. This feedback will be written by the Tutor32.dll to two RTF formatted files. One file for previous feedback and one file for the current feedback.

2. Displaying ICA Feedback

Code:

Set oViewer=New CFeedbackViewer
oViewer.CoachID=vlCoachID
Call oViewer.DisplayFeedBack(moApp)

Description: The only thing required to display feedback information is to have an RTF control on a form and read-in the feedback files produced by the Submit method of the ICA object.

Final Stage

1. Saving the Simulation Model

Code:

lRet=moSysDynEngine.SaveSimulation(FILE_SIMULATION)

Description: The SaveSimulation method of the system dynamics engine will save the specified Excel spreadsheet to disk.

Source Items and Targets relate to specific on-line objects. When these objects are selected in an activity, an associated Source Item and Target are 'mapped' into an ICA, which then looks at all of the configured rules and displays an appropriate feedback (known in the ICA as a Coach Item). For example, if an activity required users to drag an account name (Source Item) to a Journal Entry (Target), the ICA would be notified of this association and feedback would be delivered based on a set of predefined rules.

Feedback (Coach Items) can be displayed in two ways, as a parent or as a child. Parent feedback can be Stand Alone text where it is the only piece of feedback delivered, or it can be used as a header which will support many 'children' pieces of feedback. An example of a Parent header would be feedback that stated "Look at your Journal Entries, here is what I see . . . " Below this would be multiple line items that relate to specific feedback given to the student about a Journal Entry.

This structure will be used for the on-line meetings as well. Instead of the association of Source Items and Targets occurring when an item is dragged, it occurs when a question is selected by the student. Rules will be configured based on these mappings to fire specific feedback. The Parent header, instead of being text, will include video information such as the video to be played. The children feedback includes all associated follow-up questions.

ICA Configuration in Accordance with a Preferred Embodiment

Figure 52:
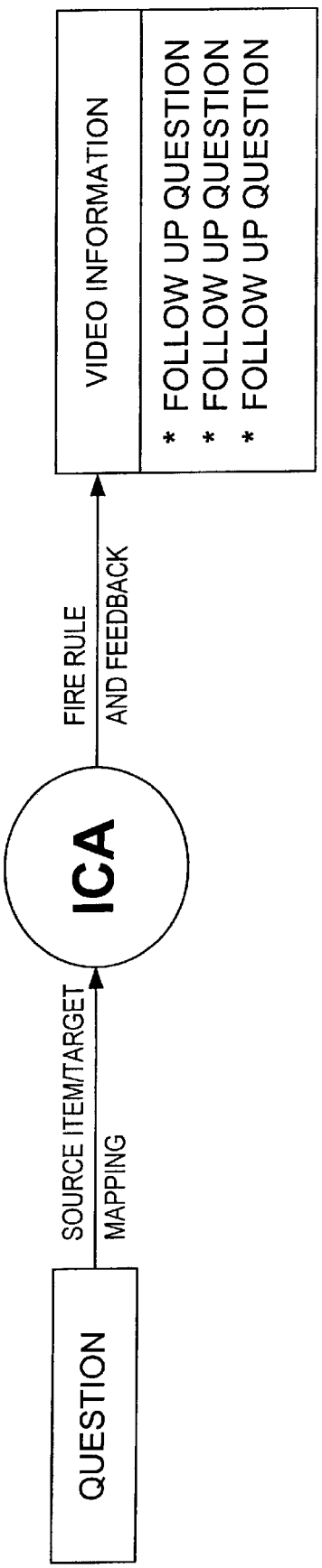
FIG. 52 is an overview diagram of the logic utilized for initial configuration in accordance with a preferred embodiment.

FIG. 52 is an overview diagram of the logic utilized for initial configuration in accordance with a preferred embodiment. Since the structure of the feedback is the same as other on-line activities, the ICA can also be configured in the same manner. For ease of creation and maintenance of ICA feedback, it is recommended that the feedback is constructed so that only one rule fires at any point in time. Note that the organization of the example is one of many ways to structure the feedback.

Step 1: Create a Map of Questions and Follow-up Questions

Before designers start configuring the ICA, they should draw a map of the questions, videos and follow-up questions that they wish to use in the on-line meeting. This will give them a good understanding of the interactions as they configure the ICA.

Step 2: Create a Coach

All feedback is given by a coach. Create a specific coach for the on-line meeting.

Step 3: Create the Source Items and Targets

Figure 53:
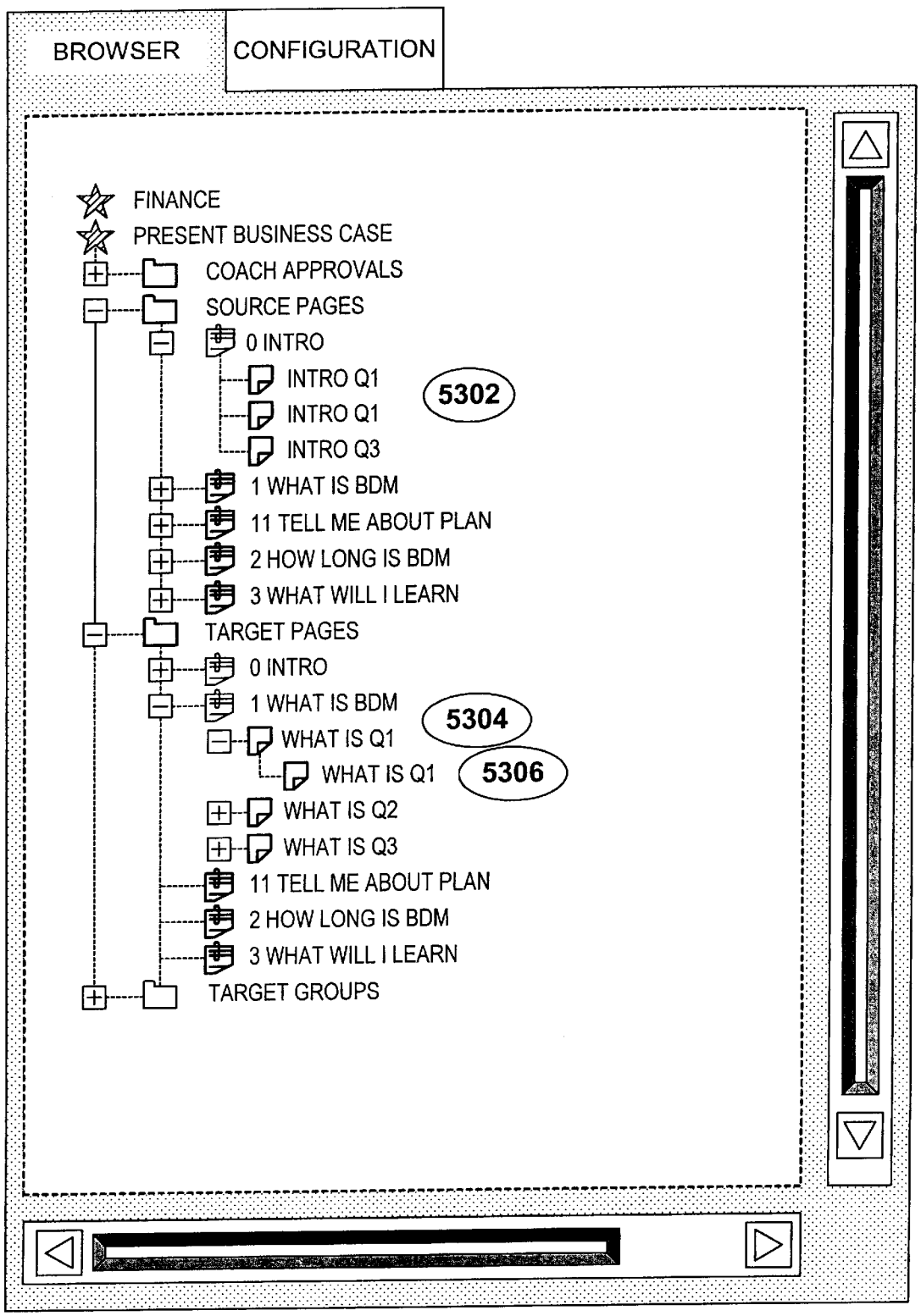
FIG. 53 is a display of the source item and target configuration in accordance with a preferred embodiment.

FIG. 53 is a display of the source item and target configuration in accordance with a preferred embodiment. Every question will have one Source Item (1) and Target (2) associated with it. These will be used by the ICA to show videos and follow-up questions. For organizational purposes and ease of reading, it is recommended that each Source Page ("0 Intro") contain all of the follow up questions ("Intro Q1", "Intro Q2", "Intro Q3"). Targets can be created one per Source Item (shown here) or one per many Source Items. This is not very important, so long as there are distinct Source Item and Target associations. Once the Source Items and Targets have been created, associate them into SourceItemTargets (3) and give them a relevance of one. These are the unique identifiers which the ICA will use to fire rules and to provide feedback to the student.

Step 4: Create the Parent Header (Video Information)

Figure 54:
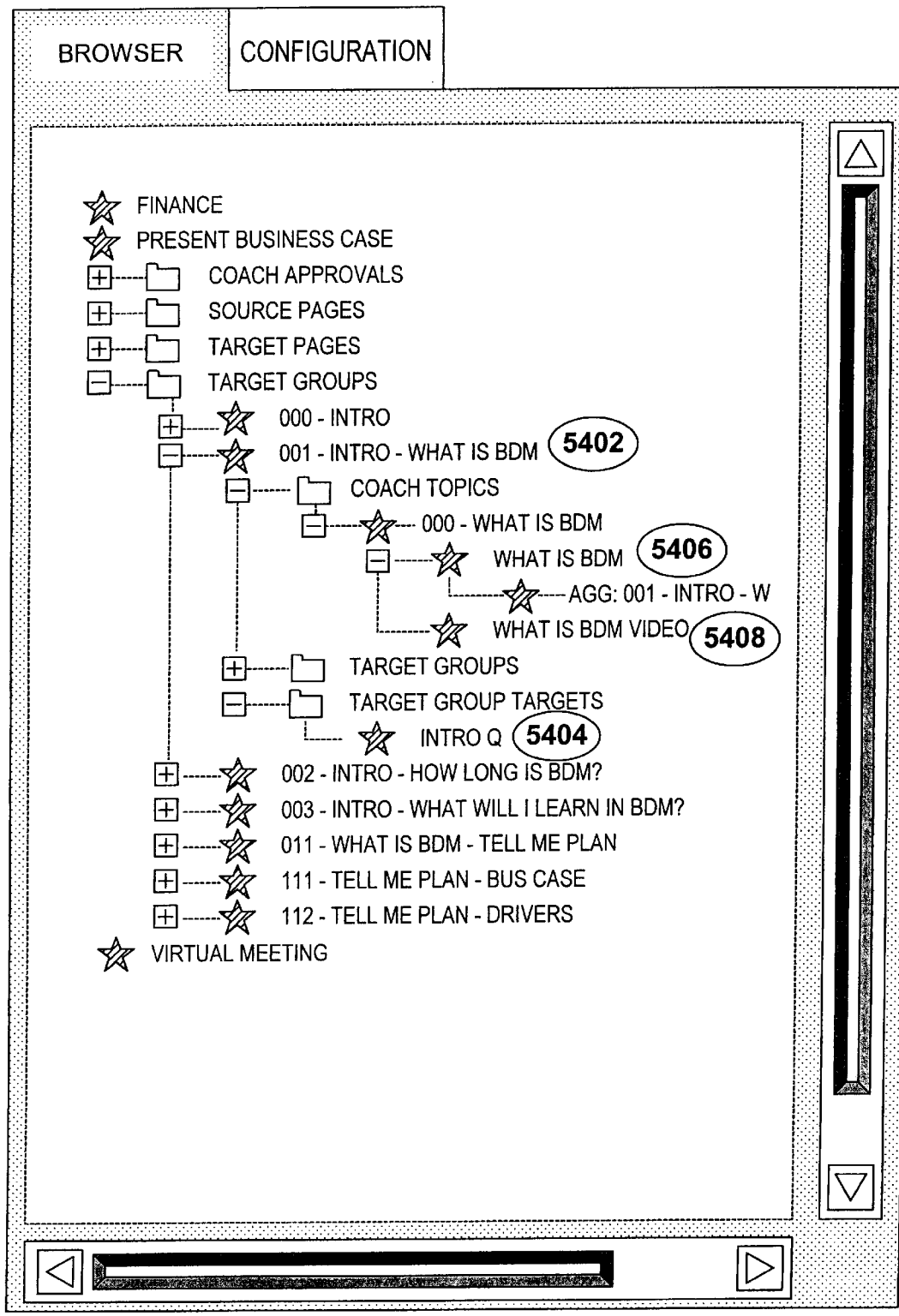
FIG. 54 is a display of video information in accordance with a preferred embodiment.

FIG. 54 is a display of video information in accordance with a preferred embodiment.

Feedback (Coach Items) are organized into Target Groups (1). In FIG. 54, each on-line question has one Target Group for ease of maintenance. Each TargetGroup must have at least one related Target (4). These are the SourceItemTarget mappings that were made at the end of Step 3. Next, Rules (2) are created to fire when the SourceItemTarget is mapped (a question is clicked). Coach Items (3) are associated to a rule and represent the feedback which will be shown if the rule is fired.

FIG. 55 illustrates a display depicting configured rules in accordance with a preferred embodiment. Rules are configured to fire when specific Source Items and Targets are mapped (when a user clicks on a question). For this reason, Aggregate Rules are configured that only look to see if this mapping has occurred. To have the rules query these mappings, the Target Group field (1) is equated to the Target that was mapped to this Target Group. For the rule to fire, special criteria have to be satisfied. The Source Item and Target are assigned a relevance of one so they will be recognized as a correct mapping (or UCP). Therefore, this rule fires if there is a minimum of one correct mapping, or UCP (2). Using this format, only one rule will fire at any point in time because only one question will be selected at any point in time.

Figure 56:
FIG. 56 illustrates feedback for configured rules in accordance with a preferred embodiment.

FIG. 56 illustrates feedback for configured rules in accordance with a preferred embodiment. Each rule has associated feedback (Coach Items) that depict when a rule is fired. To configure this feedback as a header, this Coach Item must be configured as a parent (1). Since this Coach Item is a header and will show other children feedback, the number of children displayed must also be set (2). This will be the number of follow up questions for the selected question. The feedback window is where the header text is configured relating the video information that will appear as a result of a question being selected (the SourceItem and Target mapping).

To separate the video information, the feedback text includes specific tags. To state the filename for the video played, the name must be inside the <F> and </F> tags. The start time for the video to play uses the <I> and </I> tags and the stop time uses the <O> and </O> tags. Transcripts can also be used to show on screen or for the purposes of testing feedback without video. The tags for transcripts are <T> and </T>.

Step 5: Create the Children (Follow-Up Questions)

Figure 57:
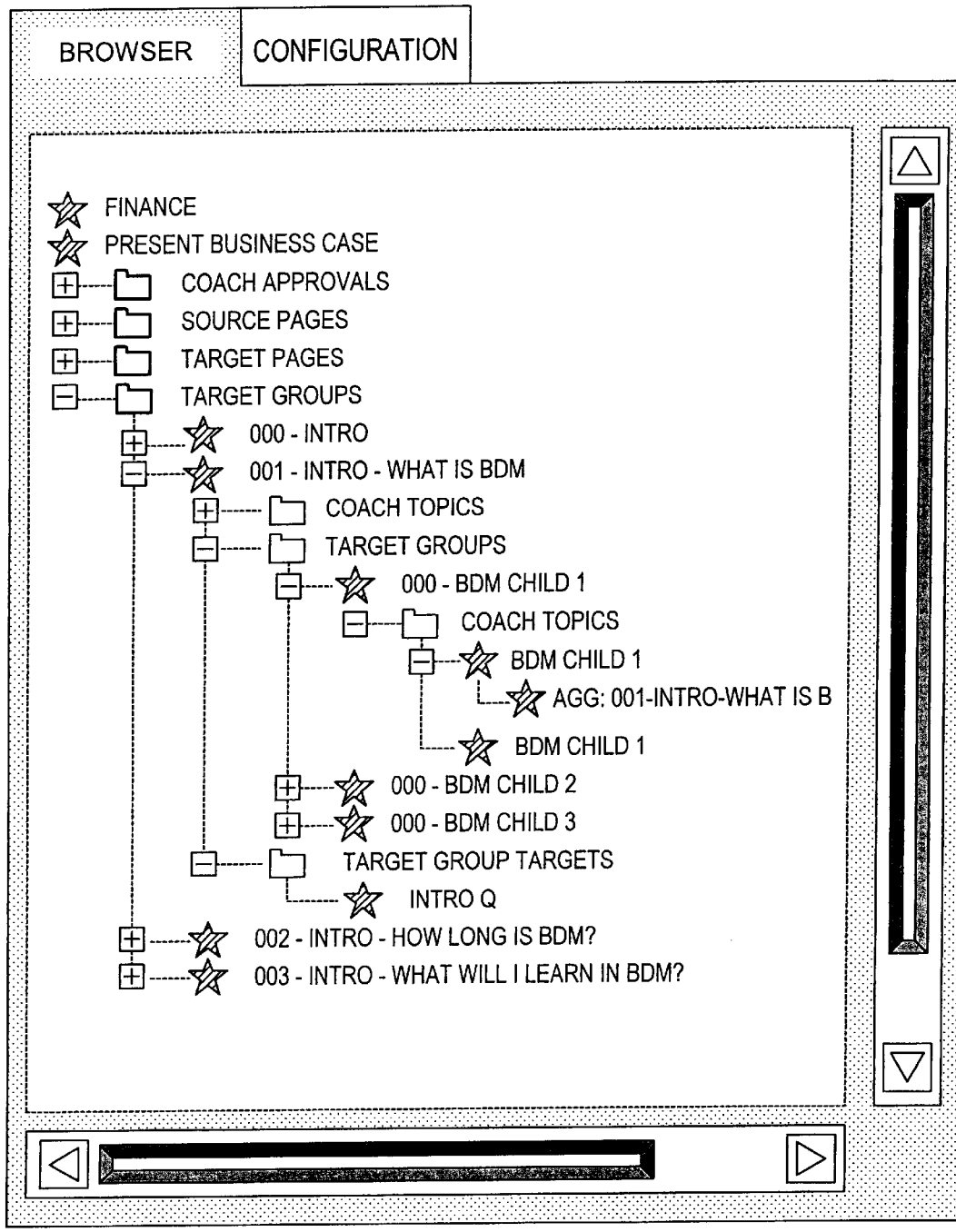
FIG. 57 illustrates a display with follow-up configuration questions in accordance with a preferred embodiment.
Figure 61:
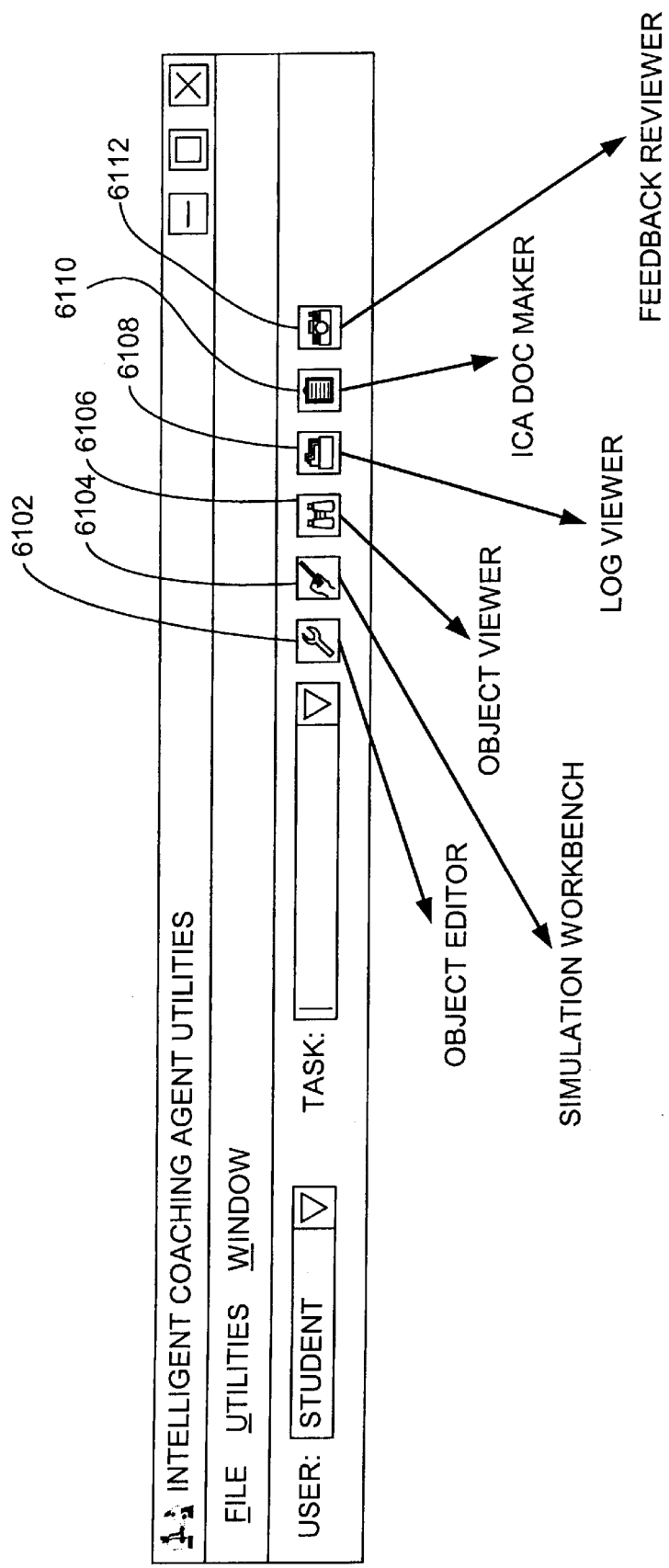
FIG. 61 illustrates an ICA utility in accordance with a preferred embodiment.

FIG. 57 illustrates a display with follow-up configuration questions in accordance with a preferred embodiment. To configure the follow-up questions, each follow-up question is defined as a child in the same target group as the header. Remember that the header here was configured to have three children and there are also three follow-up question children configured. Each child also has one Rule and Coach Item associated with it.

FIG. 58 illustrates configuration of aggregate rules in accordance with a preferred embodiment. The Aggregate Rules for the children are configured exactly the same as the parent header. Notice that the Target Group Target is the same Target as the parent. The Rule is also firing when this Target Group has a positive mapping (UCP of one). These rules are created in the same way so that the parents and children all fire at the same time.

FIG. 59 illustrates a set of coach items in accordance with a preferred embodiment. The Coach Items for the children represent the follow-up questions. The coach items must be configured as children (1) so that they are properly associated with their respective parent. The feedback text (2) is the caption for the follow-up question.

Configuring Utilities

Once the ICA configuration is complete, there is one last step to the process. In order for the selection of a question to drive other questions and videos, each question must relate to one Source Item and one Target. This way, when any question is selected, the ICA is notified and the next video and group of follow-up questions can be displayed. In the ICA Utilities Suite, in accordance with a preferred embodiment, there is an ICAMeeting Configuration tool which maps the individual Coach Items (Questions) to a Source Item and a Target. The Coach Item ID to be Initialize class and pass in Question Button, Rich text control, Video picturebox and Transcript Text Field Call moICAMeeting.Initialize(cmdQuestion( ), rtxtHeader, picVideo, txtTranscript)

Set Question Click Event and pass in index of control array button clicked Call moICAMeeting.OnQuestionClick(Index)

Set Restart method (if desired) and pass in the ID of the task as configured in the ICA Call moICAMeeting.RestartMeeting(mlICATaskID)

Debugging

When debugging the on-line meeting, check that the following requirements exist. If any of these criteria are not met, the meeting will not work properly.

Target Groups

Target Groups

Must have a Target that relates to a Source Item and Target Mapping ( )

Should contain the header and a few children

Parent Coach Items (Video Information)

Rules
Must use the coach defined for the activity
Aggregate Rule
Must have the Target that was assigned to the Target Group ( )
Must have a UCP minimum of 1
Coach Items
Must be designated as a parent
Must contain at least one child
Feedback must be configured using the <F>,<I>,<O> and <T> tags
Children Coach Items (Follow Up Questions)
Rules
Must use the coach defined for the activity
Aggregate Rule
Must have the Target that was assigned to the Target Group
Must have a UCP minimum of 1
Coach Items
Must be designated as a child
Feedback must include text for a follow up question

Intelligent Coaching Agent (ICA) Utilities

The Intelligent Coaching Agent Tool (also known as the tutor) was used to create remediation for the activities within the course and the architecture passed values to the tutor. One drawback was that the architecture did all of the processing and, therefore, all of the simulation. This was not the most data driven or most efficient way of creating business simulation because any changes to activities had to made within code.

Figure 62:
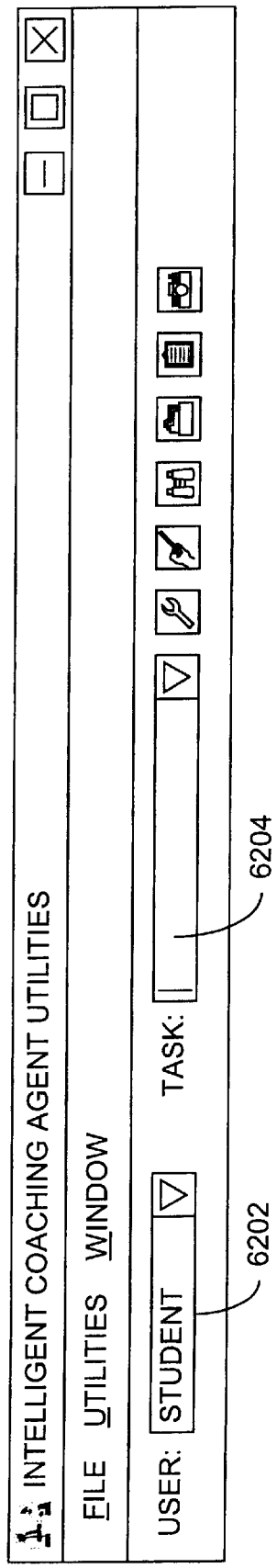
FIG. 62 illustrates a configuration utility display in accordance with a preferred embodiment.

The ICA Utilities incorporate business simulation into a multimedia application. What this means is that there is now a middle layer between the application and the ICAT. These utilities, along with the simulation engine (described later), allow the architecture to be a front end to the simulation. Now, any changes to a simulation model do not need to be incorporated into code. The ICA Utilities and simulation engine work with simulation models created in Microsoft Excel. After the model is created, the designer uses the Defined Name function in Excel to flag specific cells that are to be used by the application and the ICA Utilities in accordance with a preferred embodiment. FIG. 62 illustrates an ICA utility in accordance with a preferred embodiment. The ICA Utilities consist of six utilities that work with the Intelligent Coaching Agent Tool (ICAT) to incorporate business simulation with the multimedia application. Below is a description of each utility, which will be discussed in detail following this introduction.

The Object Editor is used for the configuration of objects that translate simulation variables into values passed to the ICAT. This is really where the "middle layer" of the simulation is configured.

The Simulation Workbench allows designers to test their spreadsheets once they have configured the simulation. Therefore, the testing of feedback can start well before testing, or even before any code is written at all!

The Object Viewer is a tool that shows the designer the ICAT objects. This can be used for viewing purposes without using the ICAT.

The Log Viewer shows all of the logs associated with the ICAT. This is helpful in debugging feedback received in the Simulation Workbench.

The ICA Doc Maker also designers to create TutorDoc files. These are the final outputs of the ICAT, which are used by the application to remediate.

The Feedback Reviewer utility allows designers to resubmit previously submitted work to the ICAT.

Navigation:

FIG. 62 illustrates a configuration utility display in accordance with a preferred embodiment. When first entering the Utilities, a user must select their user name (1) and the Task they wish to work on (2). User names can be added in the Object Editor (discussed later). Some of the utilities require user names to be selected and will not open without them. To open any of the ICA Utilities, users select the utility from a toolbar (3), or use the Utilities menu item which is accessible from any screen. Depending on which utility is open, other menu options become available. Because the ICA Utilities have six different utilities that can be opened at one time, these windows can be arranged for ease in viewing. The Window menu item, which is accessible from any screen allows multiple windows to be cascaded, tiled horizontally or tiled vertically.

At the bottom of the ICA Utilities, there is a status bar that relays information to the user. When the mouse is moved over key items in the utilities, such as the toolbar icons or utility buttons a description of what these objects do appears on this status bar. The status bar also displays information when processing is occurring as to what the utility is currently doing.

The Object Editor:

The Object Editor is used to translate application information into values for the ICAT, which can then be remediated upon.

Figure 63:
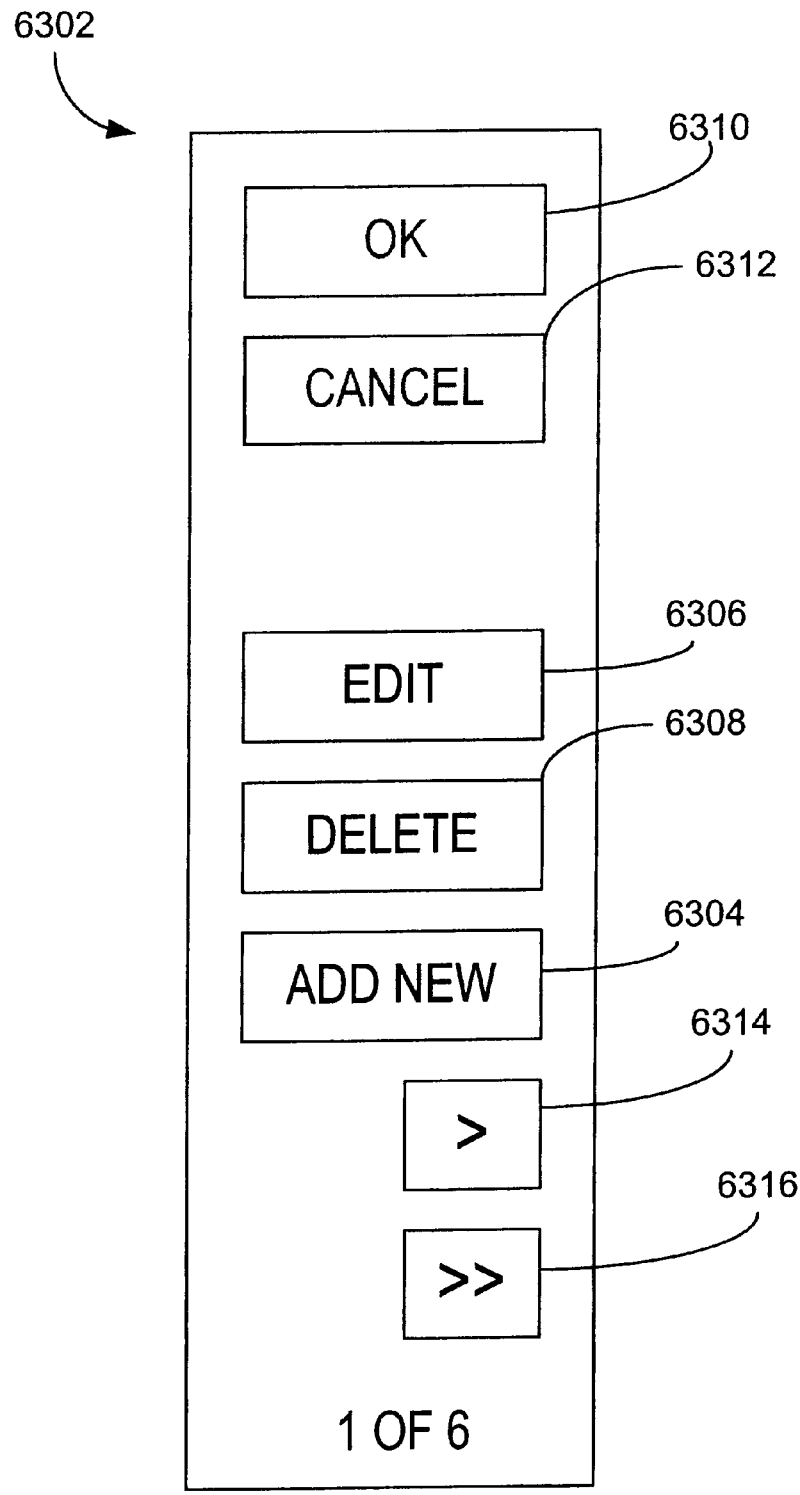
FIG. 63 illustrates an object editor toolbar in accordance with a preferred embodiment.

FIG. 63 illustrates an object editor toolbar in accordance with a preferred embodiment. The Object Editor uses this toolbar on the side of each configuration display. To add a new object, the Add New button is selected. To edit an existing object, highlight that object and click on the Edit button. To delete an existing object, highlight the object and click the Delete button. When an object is being added or edited, the OK and Cancel buttons become enabled. To save changes, the OK button is selected and to cancel any changes, the Cancel button is selected. Objects are scrolled by using the arrow buttons on the bottom of the toolbar. There is also a counter that displays the current record and how many total records are currently defined.

Figure 64:
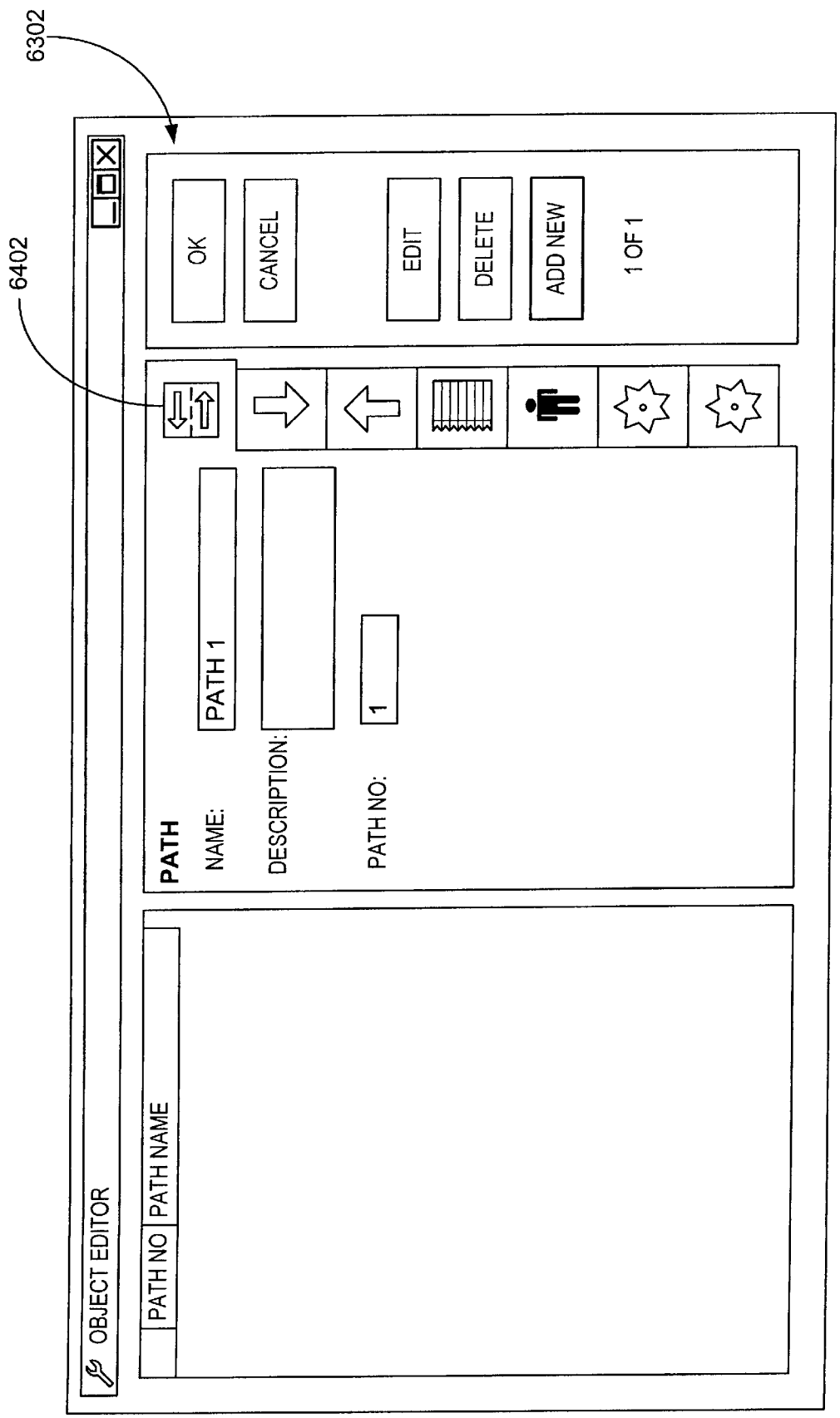
FIG. 64 illustrates the seven areas that can be configured for a simulation in accordance with a preferred embodiment.
Figure 65:
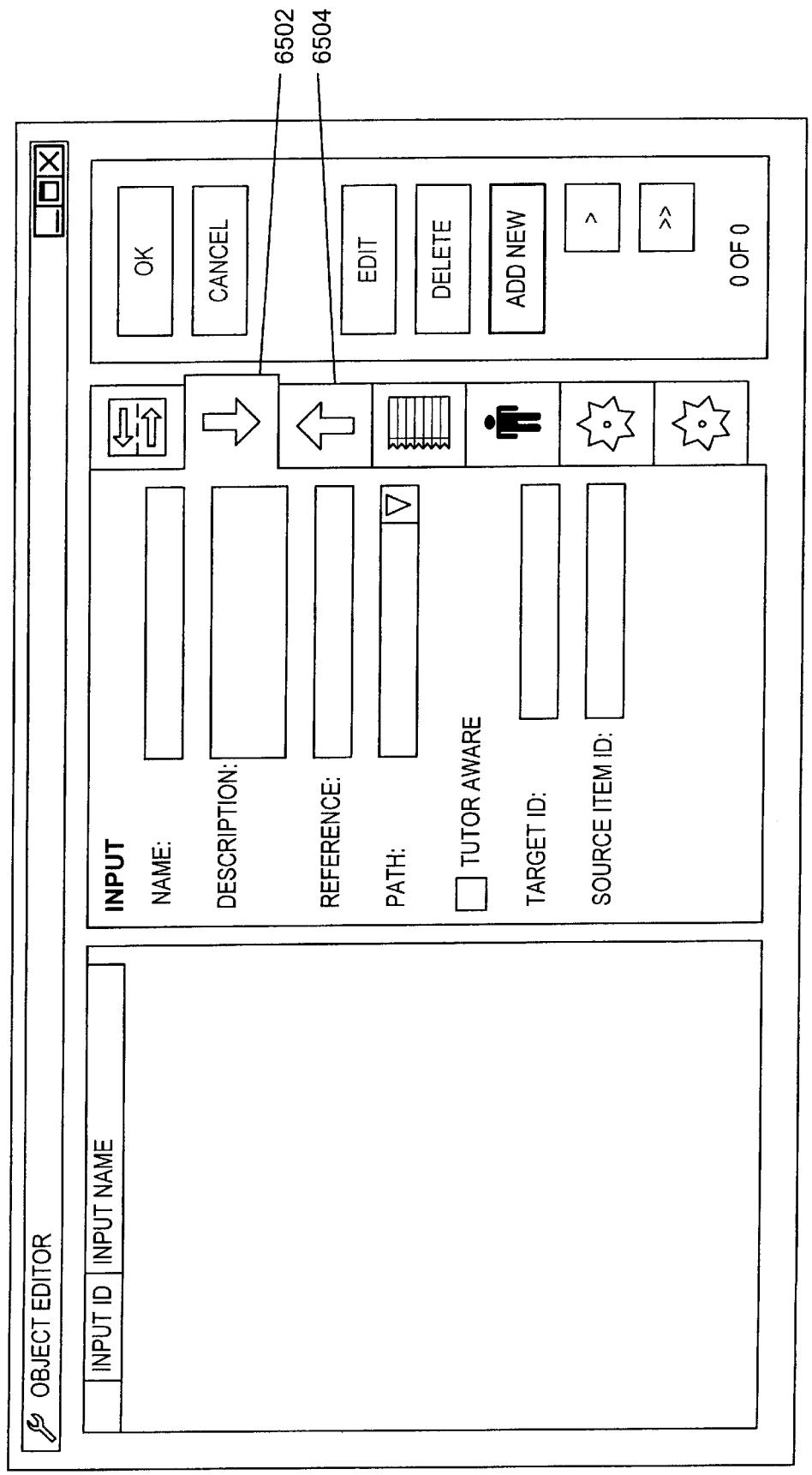
FIG. 65 illustrates a display that defines inputs in accordance with a preferred embodiment.

FIG. 64 illustrates the seven areas that can be configured for a simulation in accordance with a preferred embodiment.

Paths are used to pass select information to the ICAT. If specific data needs to be passed to one coach (the ICAT allows for multiple team members to give feedback), while other data needs to be passed to a different coach, two Paths can be used to allow all of the data to be stored in one simulation model.

FIG. 64 illustrates a display that defines inputs in accordance with a preferred embodiment. Inputs are configured for the contributions in a simulation model. Using a model of a+b=c, "a" and "b" would be inputs. To configure an input, a name and description are given for informational purposes. A reference must also be provided. This is the Defined Name on the simulation spreadsheet where the input value resides. This reference is used by the Simulation Engine to locate the sheet and cell location of the input. Note that the Simulation Workbench can configure and view these defined names. These defined names can be typed in or dragged from the Simulation Workbench utility. A path must also be selected for an input. This is where a designer can be selective as to what information to pass to a coach in the ICAT. Because of this, at least one path must be created before an input can be properly configured.

Inputs can also be used by the application, but not passed to the ICAT. To pass objects to the ICAT, a designer must specify the awareness of the Input tutor of the input. If the Input is to be passed to the ICAT, then a TargetID must be given to this input. Here is where the Object Viewer can be used. Target Ids can be typed in or dragged from the Object Viewer.

SourceItemIDs can also be configured here. This should only be done if the Input has only one choice (such as a textbox). Multiple choices, such as a combobox or option buttons, allow for multiple SourceItemIDs and therefore, in those cases, this field should be left blank. Outputs are configured for outputs in the simulation model. Using the same example as above (a+b=c), "c" would be the output. Outputs are derived from inputs into a model. Outputs are configured exactly the same as inputs.

Figure 66:
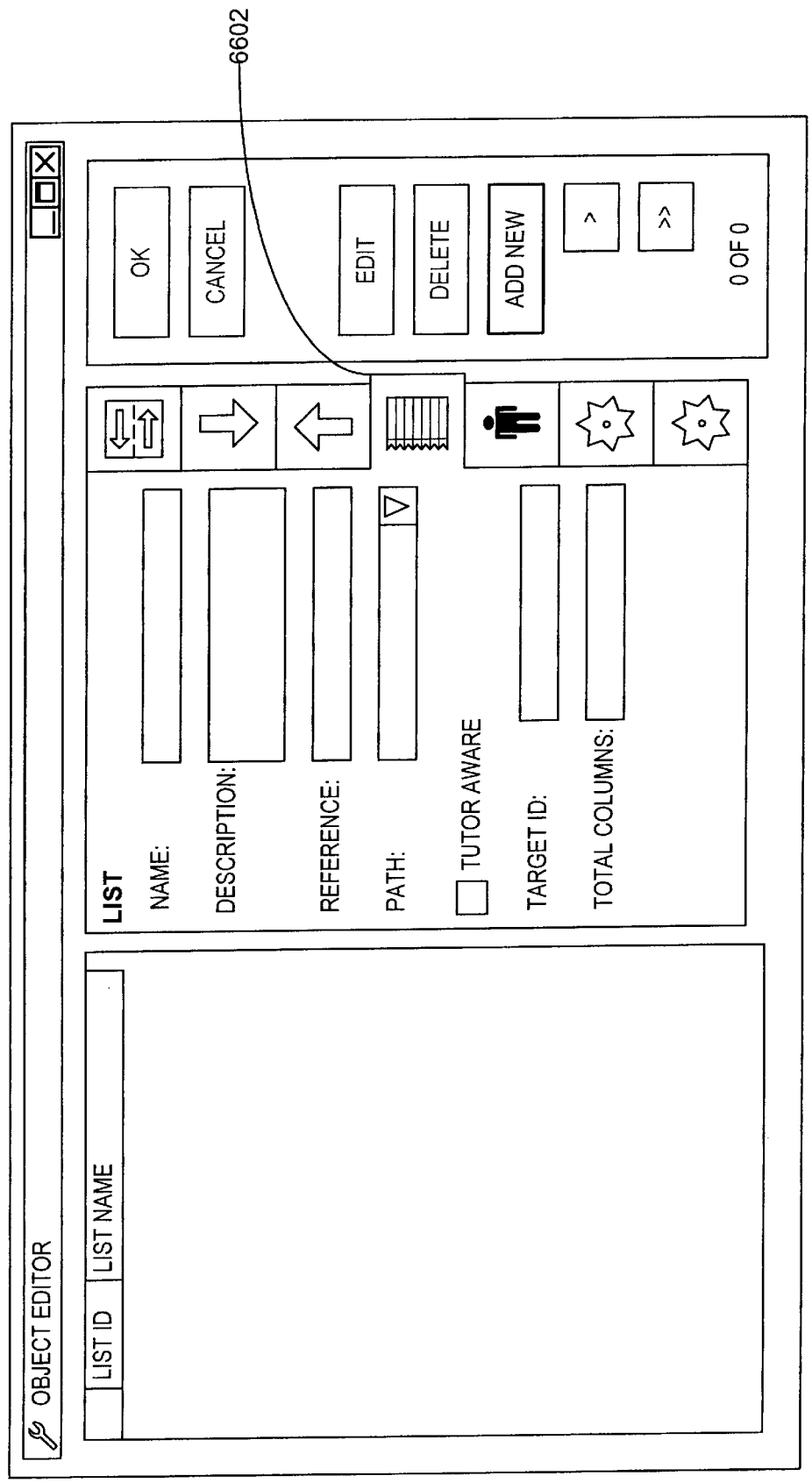
FIG. 66 illustrates a list editor in accordance with a preferred embodiment.

FIG. 66 illustrates a list editor in accordance with a preferred embodiment.

Lists are used to pass multiple objects to the ICAT. This is useful when there are many items to be passed to the tutor that are not static. For example, a drag-drop area where any number of items can be dragged over can be configured as a List. Dragging points over would add to the list, and dragging points off would delete from the list (and the ICAT). To configure a list, the designer must use multiple columns in the simulation model and no other information can be used in these columns. This is because when a list deletes an item, it shifts up all other cells below it. The defined name for the list is the first row where the first value resides. Lists also use the Name, Description, Reference and Path fields. Note that lists can also be Tutor Aware and must be assigned to a target. The one field used by a list that is different than an input or an output is the Total Columns field. This process defines how many columns are used by the list, including the defined name of the list.

Figure 67A:
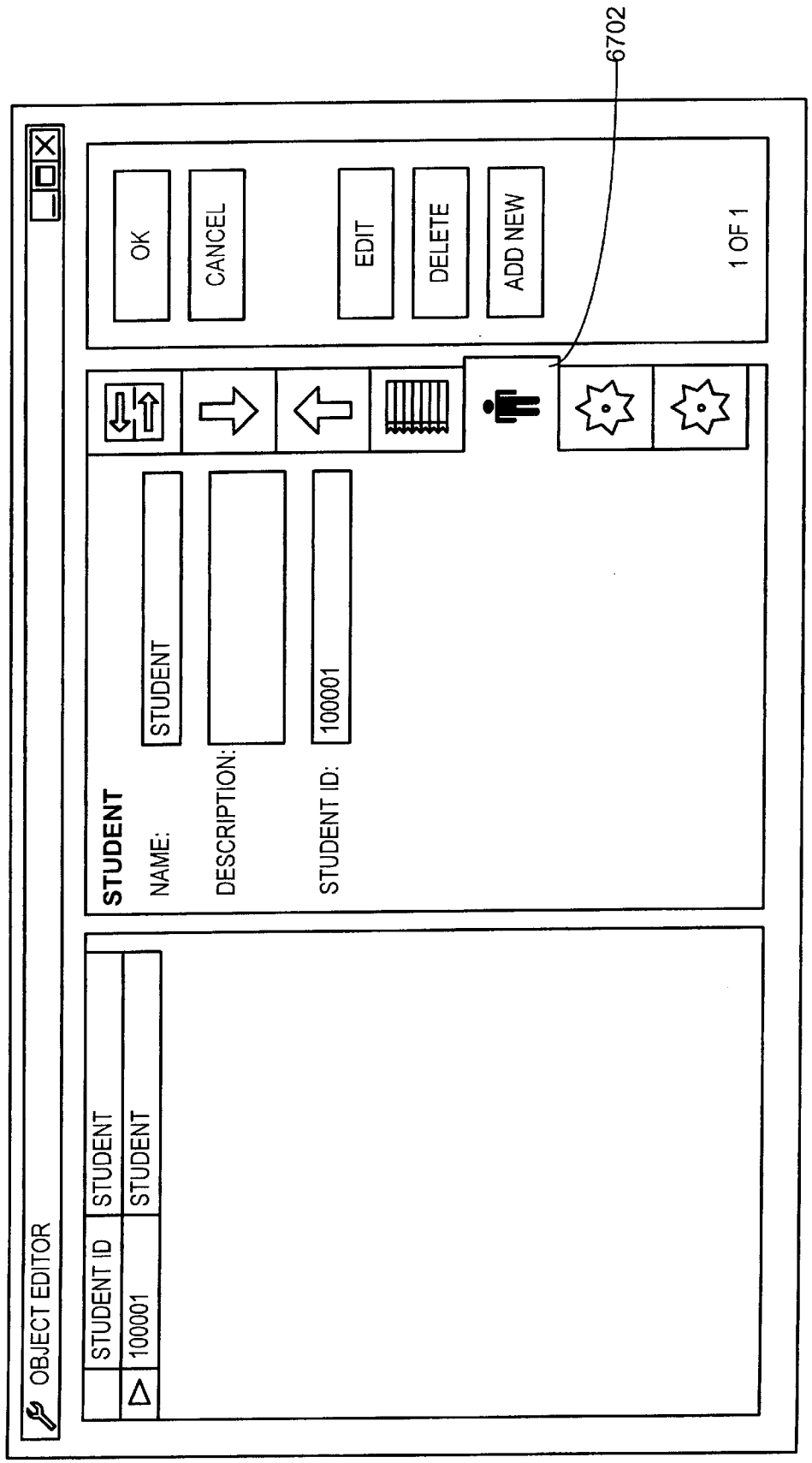
FIG. 67A illustrates a define student display in accordance with a preferred embodiment.

Students are configured for the ICA Utilities. FIG. 67A illustrates a define student display in accordance with a preferred embodiment. Students are the designers of the simulation models. A student must be selected before the other utilities can be used. Therefore, adding students should be the first task when using the utilities. Student name and description are used for informational purposes. The student ID is an identifier for the user and can be any number.

Figure 67B:
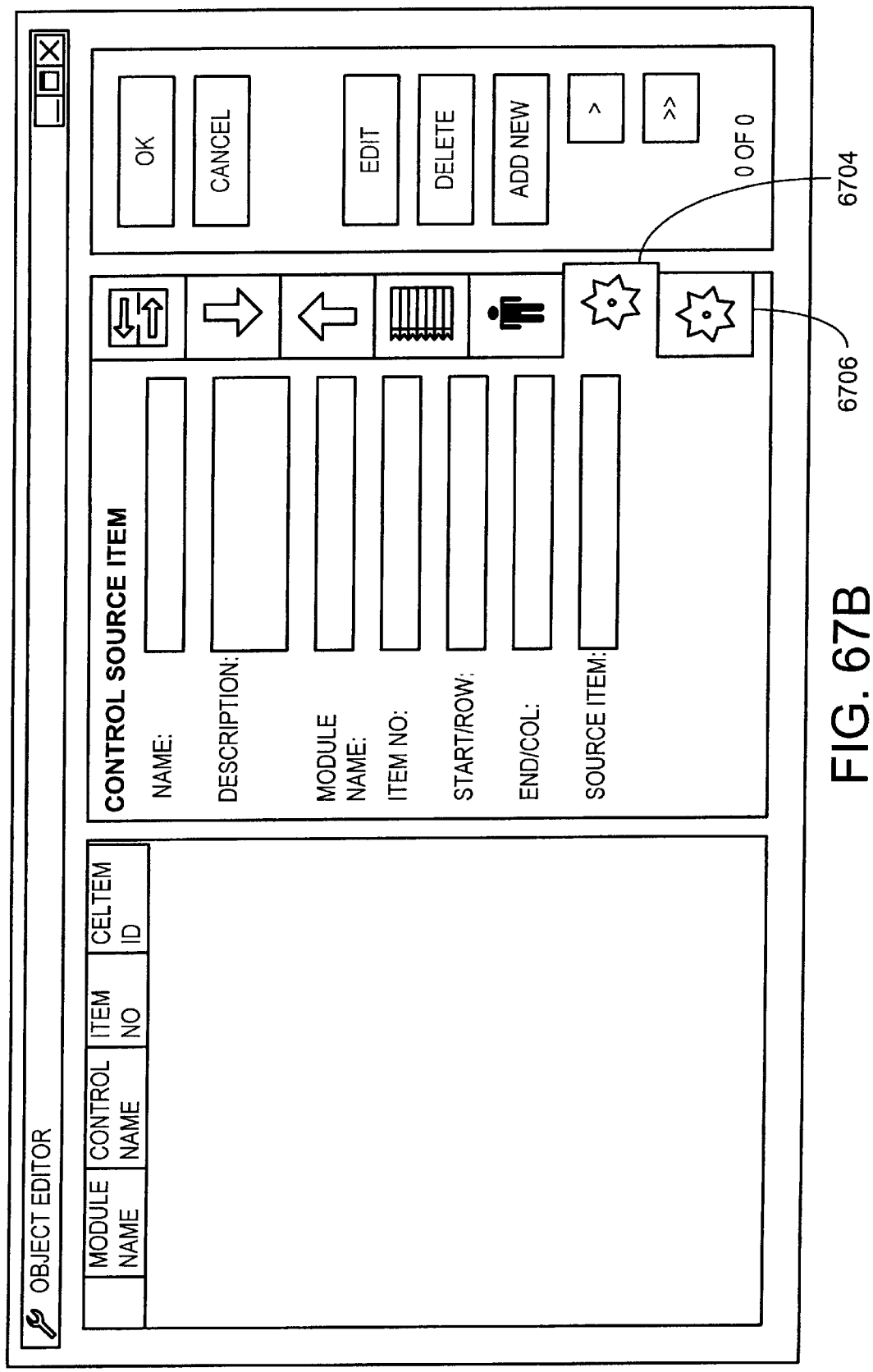
FIG. 67B illustrates a ControlSourceItem display in accordance with a preferred embodiment.

ControlSourceItems are SourceItemID values that can be stored to be used by the application. FIG. 67B illustrates a ControlSourceItem display in accordance with a preferred embodiment. SourceItemIDs are Ids that the application must pass to the simulation engine, which then passes them to the ICAT. A SourceItemID relates to one data object that is being remediated on, such as a text field of account number. Using ControlSourceItems, the SourceItemIDs no longer have to stay hard-coded in the application and can change without any effects on code. ControlSourceItems can be configured for a combobox of all twelve months. Therefore, the first item in the combobox can be January, the second can be February and so on. When the user selects a month, the application uses the index of the combobox to find the ControlSourceItem and pass that to the simulation engine.

ControlSourceItems are configured using a name and description for informational purposes. Module Name refers to the task that these items reside in. These can be used for logical groupings of ControlSourceItems. The Item number is an index used to distinguish between ControlSourceItems (for example, the combobox listindex property). The SourceItemID for that ControlSourceItem is also needed and can be dragged from the object editor.

ControlTargets are like ControlSourceItemIDs, but instead of storing SourceItemIDs they store TargetIDs. If a SourceItem is something that is dragged from, then a Target is something that is dragged to.

Figure 68:
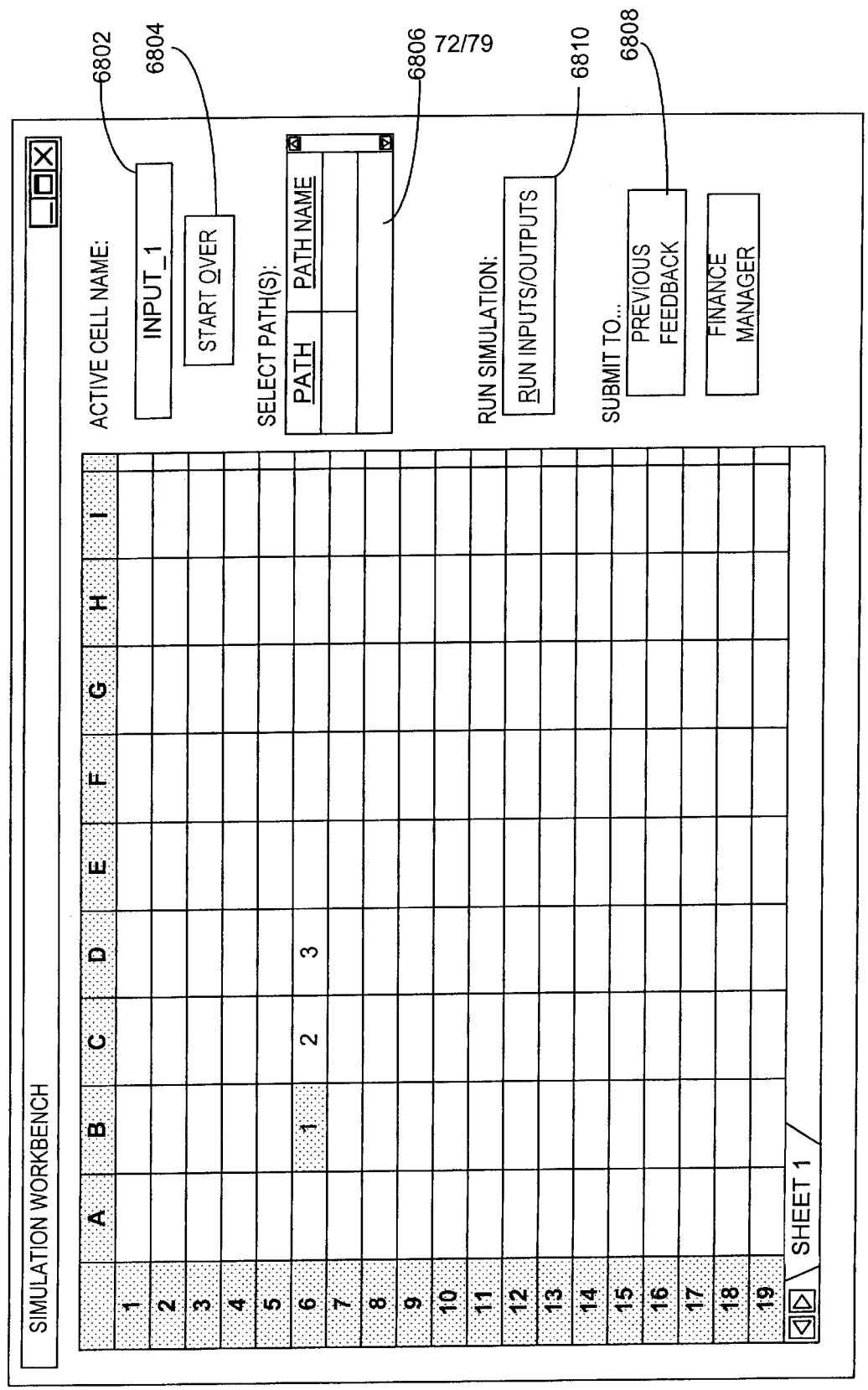
FIG. 68 illustrates a simulation workbench in accordance with a preferred embodiment.

The Simulation Workbench:

The Simulation Workbench is used by designers to test the feedback created in the ICAT. It can also be used to configure simulation models. Simulation models can be imported by using the File menu path and then Open. FIG. 68 illustrates a simulation workbench in accordance with a preferred embodiment. Once a simulation model has been loaded, the designer can enter values into their inputs and outputs and test the feedback. Notice here that the example of 1+2=3 is used with 1 and 2 being configured as inputs and 3 an output.

When a cell with a defined name is highlighted (here it is call B6), the Defined Name appears in the Active Cell Name field (1). This defined name can be dragged from this field to the Object Editor for configuration purposes. To run a simulation, the utilities need to be started. Click on the Start Over button (2). At this time, all of the Paths associated with that task will populate the Path list (3). Also, any coaches configured in the ICAT will populate as buttons on the bottom of the toolbar (5) with an associated path. To run a simulation, select the simulation and click on the Run Simulation button (4). By running the simulation, all of the defined inputs, outputs and lists are passed to the simulation engine which then passes the TutorAware objects to the ICAT. The remediation can now be viewed by clicking on any of the coaches on the bottom of the toolbar (5). By utilizing a Simulation Workbench, a designer can change inputs and outputs to simulate what the application will do and see their feedback, without any code being written yet.

Figure 69:
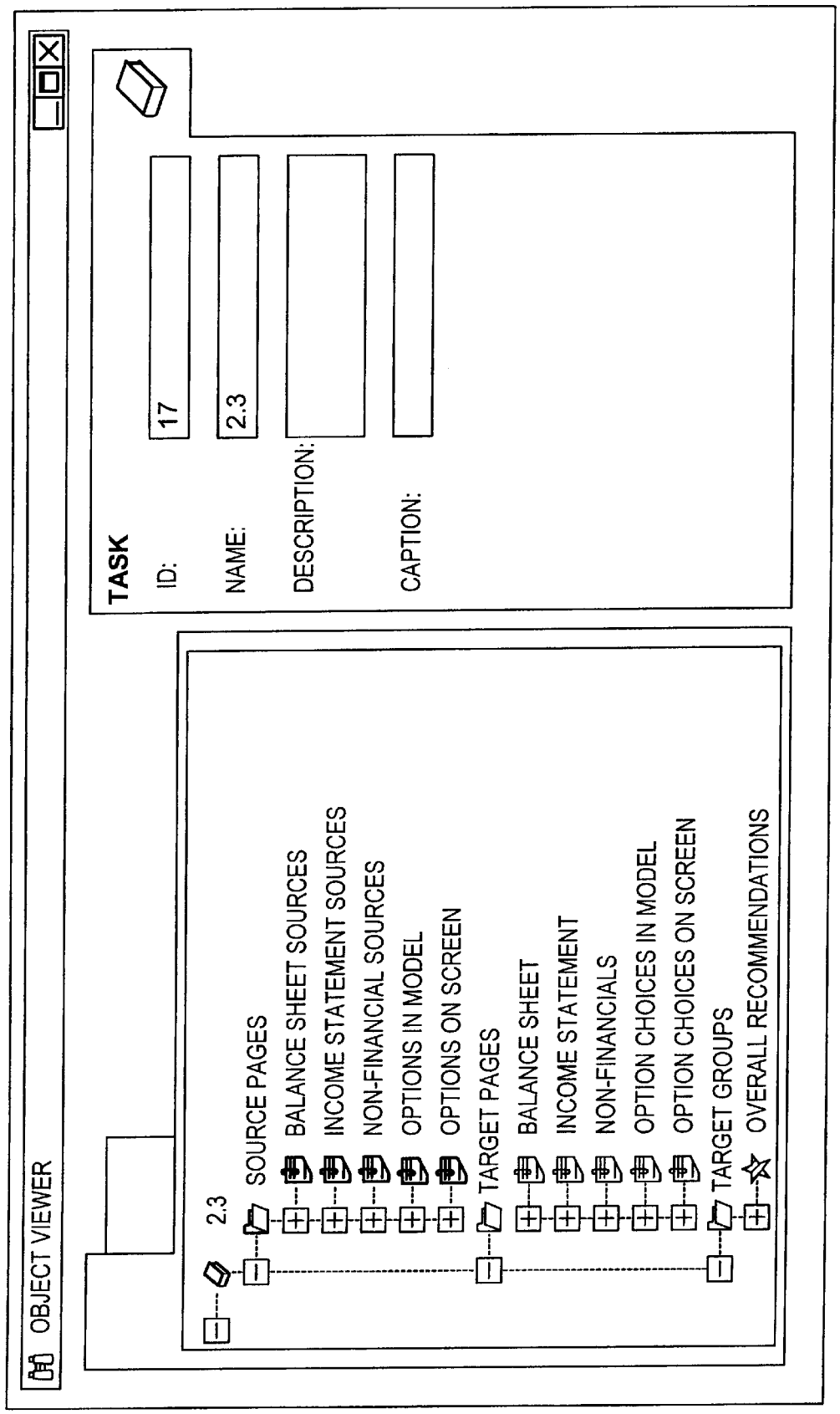
FIG. 69 illustrates an object viewer in accordance with a preferred embodiment.

The Object Viewer:

The Object Viewer is a snapshot of the ICAT configuration. Although ICAT objects, such as Targets and SourceItems cannot be configured in the object viewer, the utility is good for viewing the objects as feedback and is used in the Simulation Workbench. FIG. 69 illustrates an object viewer in accordance with a preferred embodiment. As shown in FIG. 69, the object viewer lists the SourcePages, Target Pages and Target Groups for a selected task. By examining further details associated with these objects, designers can obtain specific information, such as SourceItemID numbers and the values that are mapped as correct answers. SourceItemIDs and TargetIDs can be dragged from the graphical hierarchy on the left to the Object Editor to configure Inputs, Outputs, Lists, ControlSourceItems and ControlTargets.

FIG. 70 illustrates an Object Viewer Configuration in an Utilities menu in accordance with a preferred embodiment. The object viewer configuration display facilitates interactive user selection of ICAT objects to view in the Object Viewer. These selections are saved for the designer as their preferences so that the next time the user utilizes a utility, the preferences are utilized as the user's predefined settings.

Figure 71:
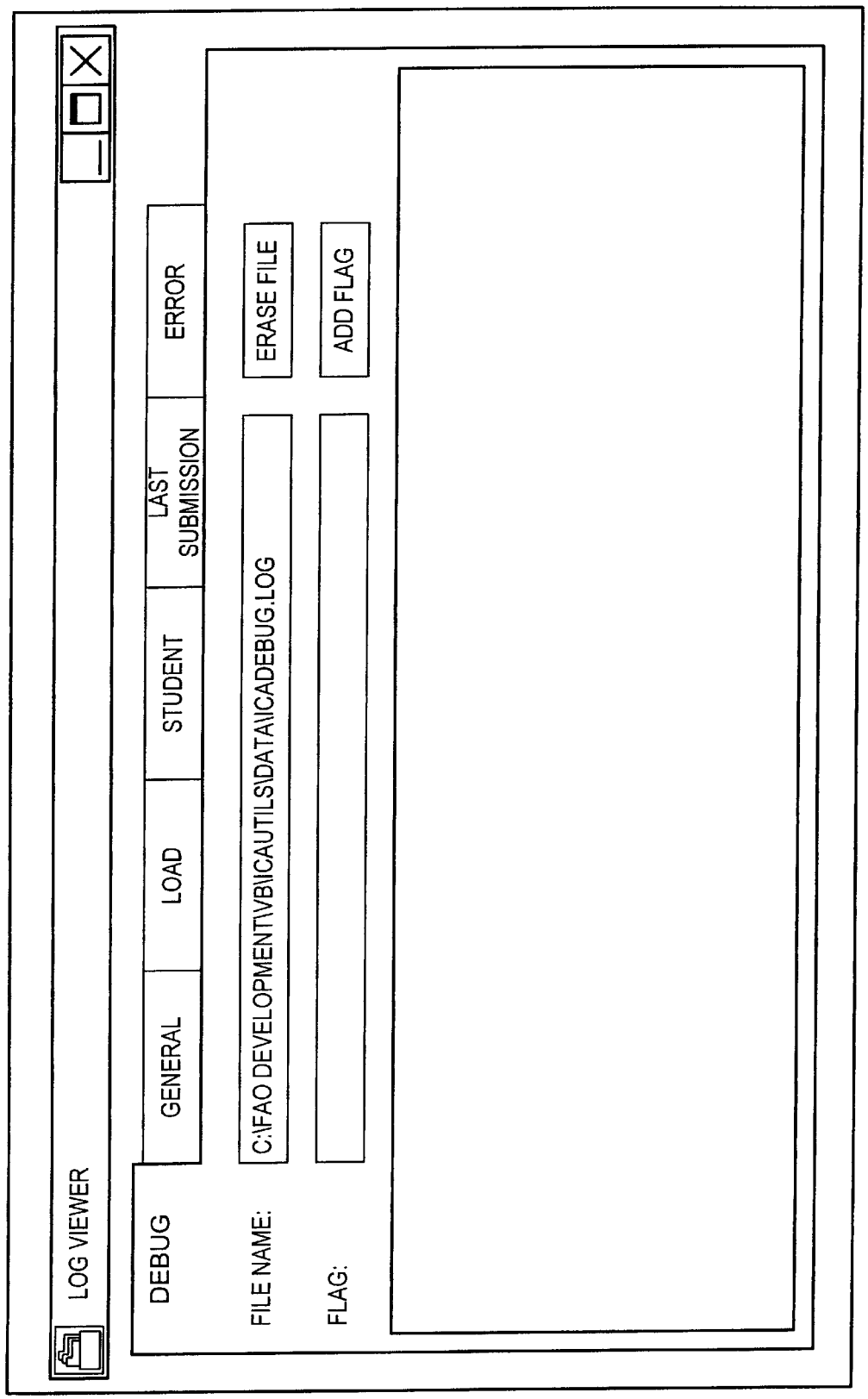
FIG. 71 illustrates a log viewer in accordance with a preferred embodiment.

The Log Viewer:

The Log Viewer utility is used to view the logs created by the ICAT. These are very helpful in debugging feedback. FIG. 71 illustrates a log viewer in accordance with a preferred embodiment.

The Debug Log shows every object passed to the ICAT. If an account was dragged to a journal page, then the SourceItemID (account) and target (Journal page) are mapped with the attribute (amount journalized). If an object is deleted, it is also noted here.

The General Log shows general ICAT data such as the Target Groups, Rules and feedback received.

The Load Log shows the ICAT objects used when the ICAT was loaded.

The Student Log groups ICAT data by Target Group and shows the number of correct, incorrect or extra items in that group. This log also shows every ICAT rule as well which ones have been fired and which ones have not.

The Last Submission Log shows the feedback received from the last submission to ICAT.

The Error Log shows any errors that were incurred by the ICAT.

Figure 72:
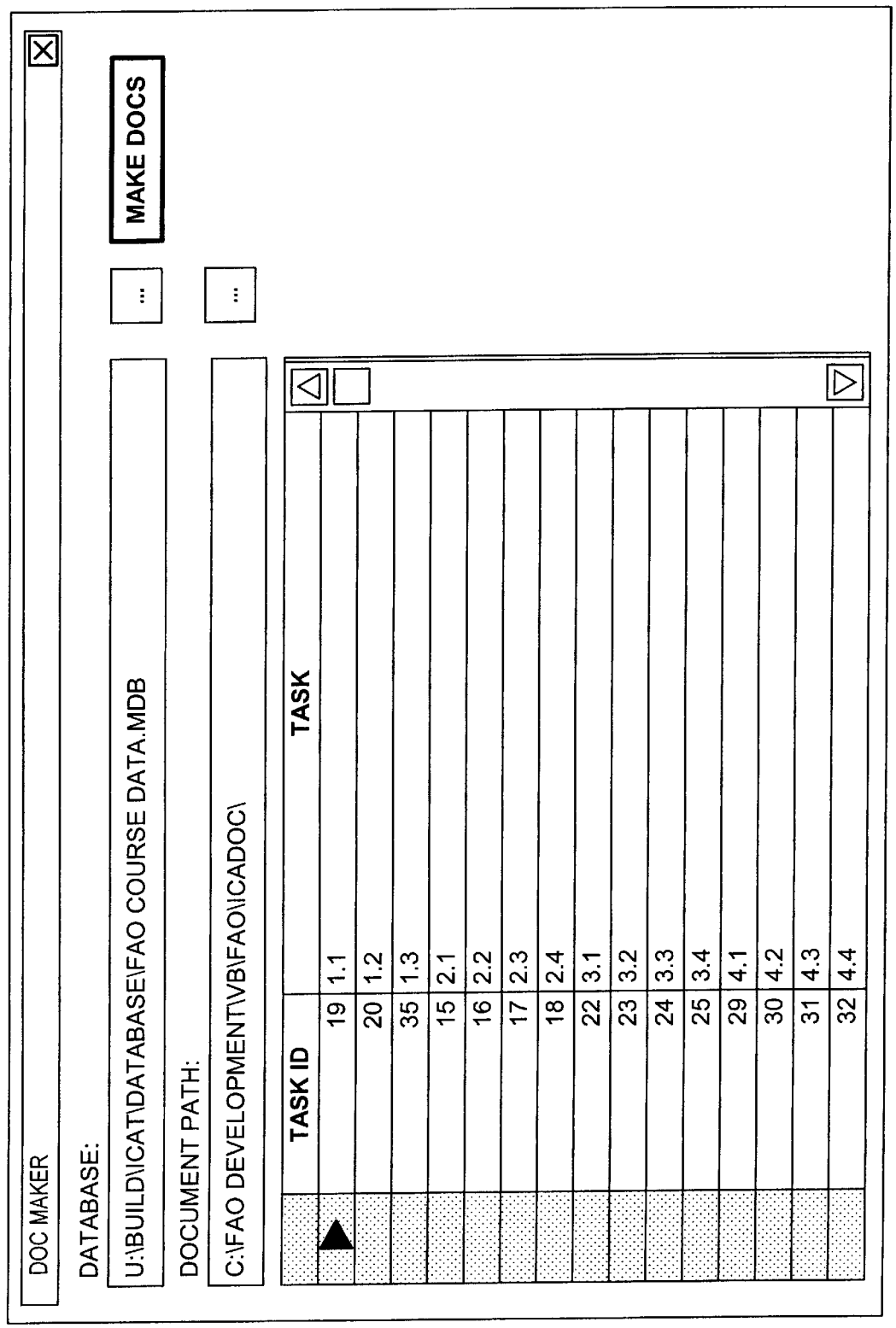
FIG. 72 illustrates a Doc Maker display in accordance with a preferred embodiment.

The Doc Maker:

The Doc maker is used to make ICA Docs, which are used by the application and the Simulation Workbench to process information and give remediation. FIG. 72 illustrates a Doc Maker display in accordance with a preferred embodiment. To create an ICA Doc, a user selects the database from where the ICAT data is stored. Then, select the Document Path where the ICA Doc will be created to. Finally, select the desired tasks and click on the Make Docs button.

Figure 73:
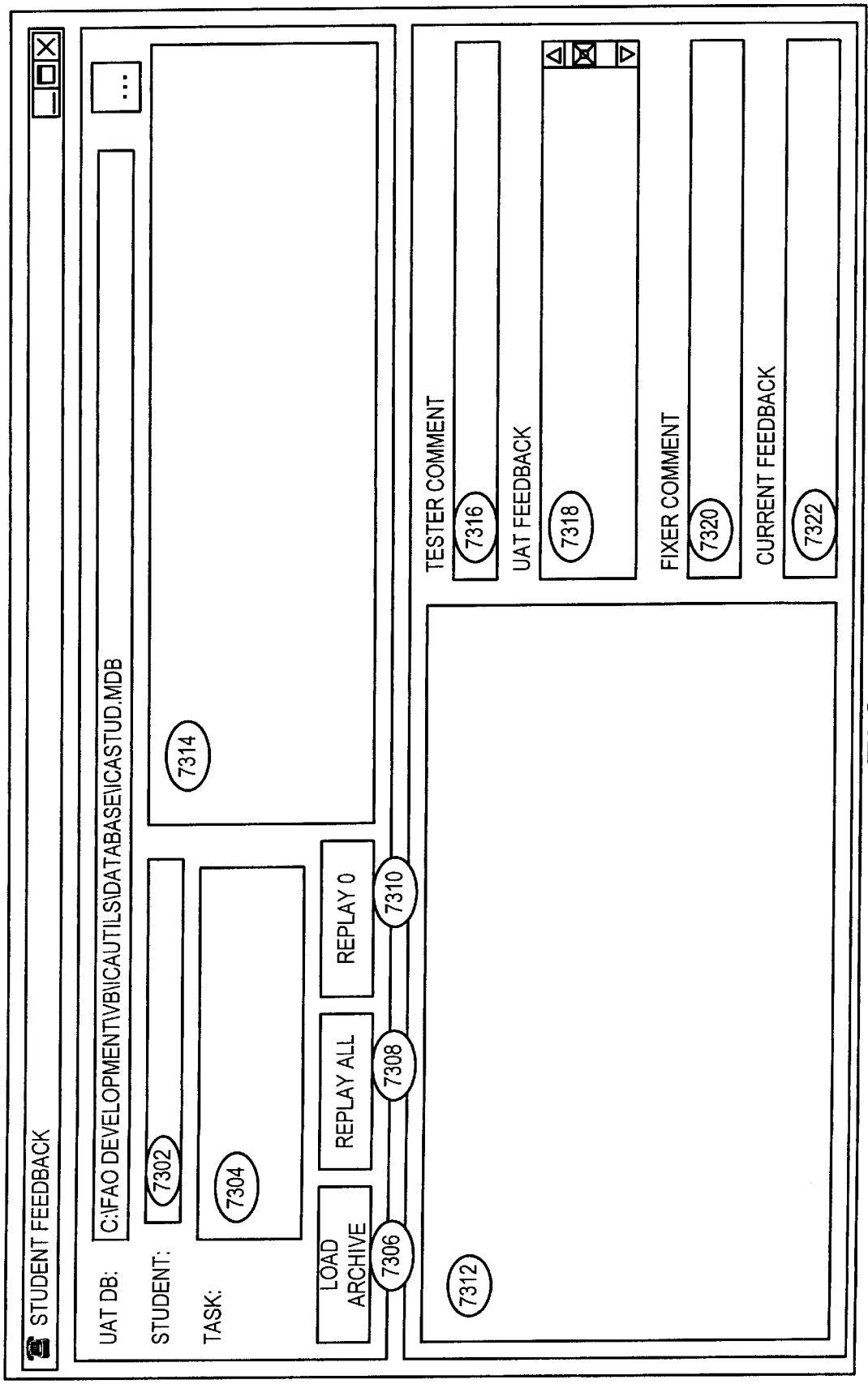
FIG. 73 illustrates a Feedback display in accordance with a preferred embodiment.

The Feedback Reviewer:

The feedback reviewer utility is used after the configuration process is complete and other users are working with the application. The application stores all of the ICAT submissions in a student table, which can then be passed back to the ICAT after changes have been made. FIG. 73 illustrates a Feedback Reviewer display in accordance with a preferred embodiment. A user first selects a saved student profile by positioning the cursor over and clicking the Student combobox (1). This action invokes logic which then populates any tasks that the student performed in the Task list (2). By selecting a task, all of the submissions that the student performed populate the submission table (7).

To view a submission, click on the submission in the submission table (7). This will populate all of the Targets, SourceItems and Attributes submitted at that time in the submission data table (6). Also, any comments added by the tester in the application will appear in the Tester Comment Field (8) as well as the feedback received for that submission (9). To resubmit this data to the ICAT, click on the Load Archive button (3). This action loads the SourceItems, Targets and Attributes from the Submission Data (6) into the ICAT. Then, this data can be replayed one step at a time by clicking the Replay button (5) or all of the data for all submissions can be replayed by clicking on the Replay All button (4). After this data is replayed, the Current Feedback field (11) is populated with the feedback received. Any comments can be added to the Fixer Comments field (10). This utility efficiently facilitates student submissions transmission to the ICAT without recreating the work. ICAT rules can be configured and then the submissions can be replayed to test the associated changes.

Example in Accordance With A Preferred Embodiment

The following example is provided to step through the process for using the ICA Utilities:

Objective:

The objective here is to create a task where users will journalize an invoice and receive feedback on their work.

Step 1) Configure the ICAT:

After planning the task, the designer should add all relevant information to the ICAT such as the SourceItems (Accounts), Targets (Invoices), Attributes (Amounts to Journalize) and any Rules they wish to create. For this example, the correct answer is created in the ICAT (Debit Machinery for $1,000 and credit Accounts Payable for $1,000) along with some basic rules and feedback.

Step 2) Create the Simulation Model:

The tables below represent the model for the example simulation.

| Accounts | SourceItem | Invoice 1 |
|---|---|---|
| Accounts Payable | 1 | Wills Machinery |
| Accounts Receivable | 2 | Two pressing machines |
| Cash | 3 | were purchased on |
| Machinery | 4 | account for $1,000. |

| | Account SID | Amount |
|---|---|---|
| Debit | | DR_AMOUNT |
| Credit | | CR_AMOUNT |

The three tabular displays appearing above show an invoice associated with the purchase of two machines on account. We also see the SourceItemIDs for the possible accounts (these were configured in the ICAT). In the simulation model, defined names were given for the Amount fields in both the Debit (DR_AMOUNT) and Credit (CR_AMOUNT) fields. The SourceItemID field is created to the left of the attribute field and the attribute field always has the defined name. This is because the simulation engine finds the Defined Name and gets the attribute from there. Then, it looks to the left of the defined name to find the SourceItemID.

Step 3) Configure the Inputs, Outputs and Lists

Figure 74:
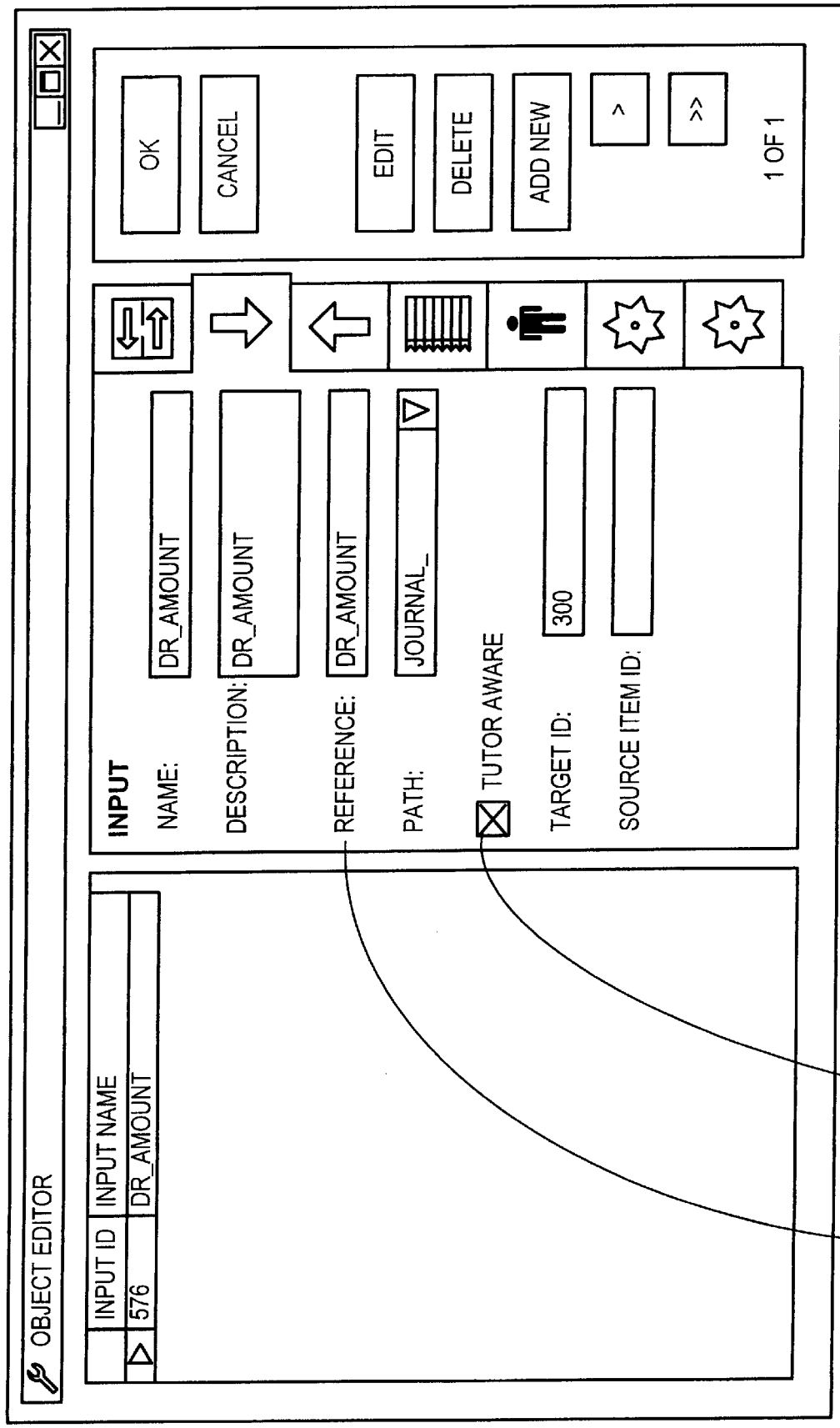
FIG. 74 is an object editor display that illustrates the use of references in accordance with a preferred embodiment.

For this example, only 2 inputs are needed and they are the debit and credit entry for the invoice. In the Object editor, create a path to be used to pass the inputs to the ICAT. Then, configure the inputs using the DR_AMOUNT and CR_AMOUNT defined names and the Target defined in the ICAT. FIG. 74 is an object editor display that illustrates the use of references in accordance with a preferred embodiment. The reference is used in the defined name (DR_AMOUNT), the Input is Tutor aware and will be mapped to TargetID 300 (created in the ICAT to distinguish the debit for this invoice). The credit input is created in the same way.

Step 4) Test the Feedback in the Simulation Workbench

Designers can open the Simulation Workbench and load the model that was created in Step 2. Then, different SourceItemIDs for the accounts and the amounts can be changed in the model. During this time, designers can Load and Run the Simulation to see the feedback. One example entails the step of putting the Machinery SourceItemID (4) in the Debit SID field, 1,000 in the Debit Amount field, Accounts Payable SourceItemID (1) in the Credit SID field and 1,000 in the Credit Amount field to see if they get praise by the Coach.

After planning the task, the designer should add all relevant information to the ICAT such as the SourceItems (Accounts), Targets (Invoices), Attributes (Amounts to Journalize) and any Rules they wish to create. For this example, the correct answer is created in the ICAT (Debit Machinery for $1,000 and credit Accounts Payable for $1,000) along with some basic rules and feedback.

Step 2) Create the Simulation Model:

The tables below represent the model for the example simulation.

| Accounts | SourceItem | Invoice 1 |
|---|---|---|
| Accounts Payable | 1 | Wills Machinery |
| Accounts Receivable | 2 | Two pressing machines |
| Cash | 3 | were purchased on |
| Machinery | 4 | account for $1,000. |

| Account SID | Amount |
|---|---|
| Debit | DR_AMOUNT |
| Credit | CR_AMOUNT |

The three tabular displays appearing above show an invoice associated with the purchase of two machines on account. We also see the SourceItemIDs for the possible accounts (these were configured in the ICAT). In the simulation model, defined names were given for the Amount fields in both the Debit (DR_AMOUNT) and Credit (CR_AMOUNT) fields. The SourceItemID field is created to the left of the attribute field and the attribute field always has the defined name. This is because the simulation engine finds the Defined Name and gets the attribute from there. Then, it looks to the left of the defined name to find the SourceItemID.

Step 3) Configure the Inputs, Outputs and Lists

For this example, only 2 inputs are needed and they are the debit and credit entry for the invoice. In the Object editor, create a path to be used to pass the inputs to the ICAT. Then, configure the inputs using the DR_AMOUNT and CR_AMOUNT defined names and the Target defined in the ICAT. FIG. 74 is an object editor display that illustrates the use of references in accordance with a preferred embodiment. The reference is used in the defined name (DR_AMOUNT), the Input is Tutor aware and will be mapped to TargetID 300 (created in the ICAT to distinguish the debit for this invoice). The credit input is created in the same way.

Step 4) Test the Feedback in the Simulation Workbench

Designers can open the Simulation Workbench and load the model that was created in Step 2. Then, different SourceItemIDs for the accounts and the amounts can be changed in the model. During this time, designers can Load and Run the Simulation to see the feedback. One example entails the step of putting the Machinery SourceItemID (4) in the Debit SID field, 1,000 in the Debit Amount field, Accounts Payable SourceItemID (1) in the Credit SID field and 1,000 in the Credit Amount field to see if they get praise by the Coach.

Step 5) View and Debug Errors

After submitting multiple times to the ICAT, a designer can view what was passed to the tutor by viewing the logs in the log viewer. If there was an error, such as the correct answers being put in but incorrect feedback showing, these logs would prove helpful in tracking down the problem. Designers can also look in the Object Viewer to see the actual ICAT configuration.

The combination of the Log Viewer and ICAT Viewer will help the designer in testing and finding any problems in their feedback.

Step 6) Making Changes are Fixing Errors

Once the problems have been tracked down (Step 5), a designer can make the appropriate changes in the ICAT. From the ICA Doc Maker utility, a new ICA Doc can be made and then retested all over again.

Step 7) Building the Task

After the task has been designed and feedback created, the coder can use the ControlSourceItem object in the Object Editor utility to map the SourceItemIDs to specific accounts. Therefore, when a user drags an account from the chart of accounts, the application retrieves that SourceItemID from the ControlSourceItem list and then passes it to the Simulation Model.

Figure 75:
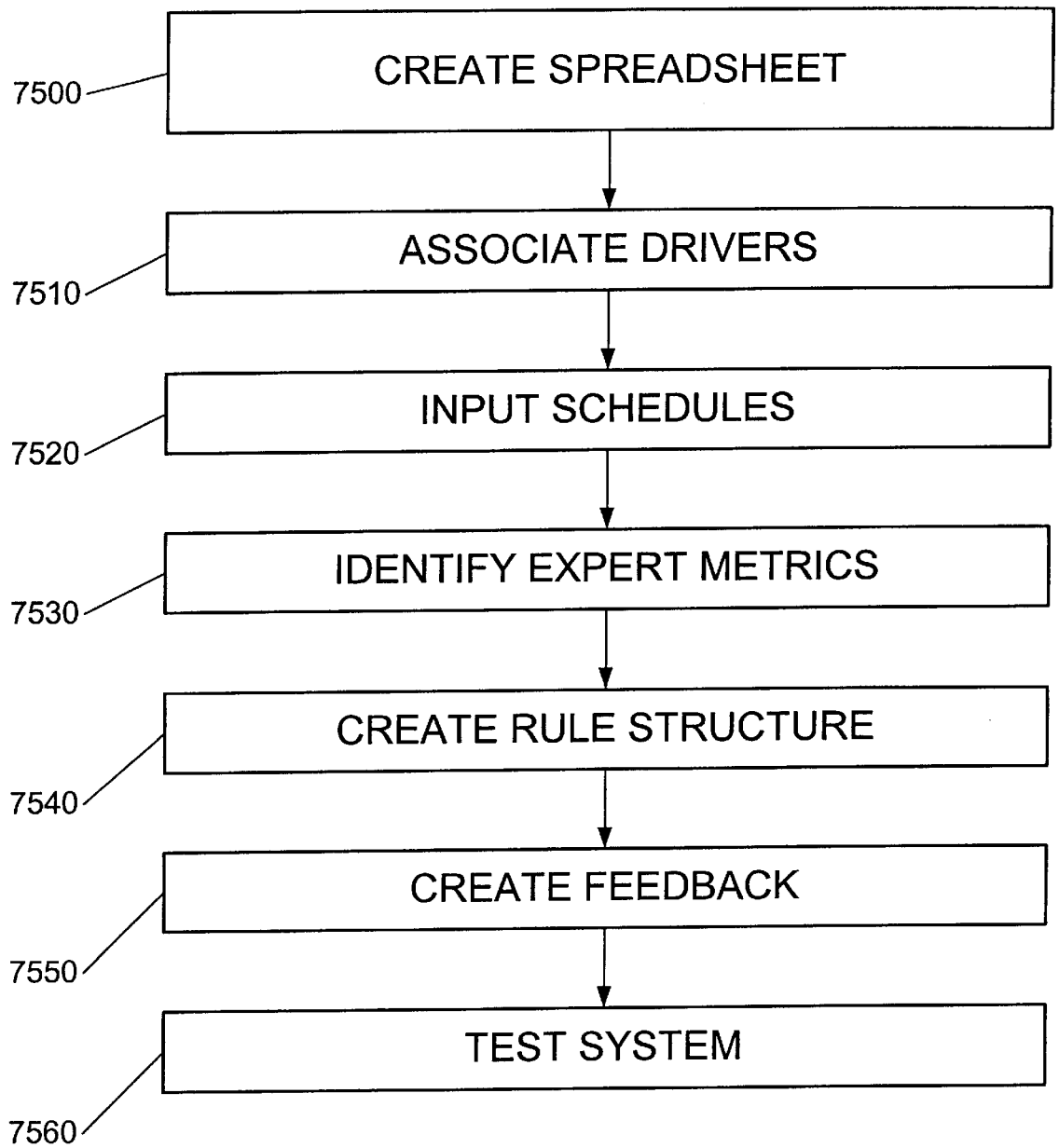
FIG. 75 presents the detailed design of smart spreadsheets in accordance with a preferred embodiment.

FIG. 75 presents the detailed design of smart spreadsheets in accordance with a preferred embodiment. Processing commences at function block 7500 where the excel spreadsheet is designed to model to perform scenario planning for the application that the business simulation is targeted for. By way of example, a model for real estate that analyzes an own versus rent decision is utilized to convey features in accordance with a preferred embodiment. Function block 7510 illustrates the next step which entails associating drivers for specific analysis tasks that are used in the model. For example, the price of unit, down payment, tax rate, estimated appreciation, assessment, rent, annual rent increase, type of loan, and salary will each be utilized in evaluating an formulating the decision. Then, at function block 7520, a loan amortization schedule is created to track the ten year equity growth, tax savings, portfolio value, net gain/loss schedules.

The next step entails designing the tutor approach. First, at function block 7530, the expert metrics are identified for home buying metrics. These include the ratio of a person's salary to their home loan payment + assessment, new payment/rent, five year gain, % down, scenario assumptions regarding market and real estate appreciation. Then, at function block 7540 the relative weights for each metric are established and the rule structures are established that identify an appropriate conclusion to reach. For example, praise would entail a message saying home is a good buy, polish would entail a message that the home may be a good buy, but several risks should be addressed, focus parent would entail a message that the home is not a good buy due to the following indicators, and list the indicators suggesting that the home is not a good buy. Finally, a redirect message would be: are you kidding, the inputs are entirely unrealistic.

Function block 7550 creates the focus child feedback based on a prioritization of key metrics such as the break even is too long, and the appreciation isn't high enough to justify the estimated foregone stock market appreciation, or there is not enough money down to grow equity in a short period of time. Finally, as function block 7560 suggests, the feedback is tested with sample scenario data and a user test model is created to capture user questions at interaction points of relevance, questions are attached to the tutor regression database, and the feedback is fixed and tested in the regression workbench.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for creating a business simulation utilizing a rule-based expert system with a spreadsheet object component that includes data and calculations required for the business simulation and communication of information to provide a dynamic, goal based educational learning experience, comprising the steps of:

(a) accessing the information in the spreadsheet object component of the rule-based expert system to retrieve information indicative of a goal;

(b) utilizing the information in the spreadsheet object component of the rule-based expert system to integrate goal-based learning information in a structured, dynamic business simulation designed by a profiling component to motivate accomplishment of the goal for use in the simulation;

(c) synchronizing events in the business simulation utilizing a time based model;

(d) analyzing the input from the student utilizing system tools to compare the input with a standard for achieving the goal; and (e) monitoring answers to questions posed to evaluate progress toward the goal utilizing the spreadsheet object component of the rule-based expert system and providing dynamic, goal-based, remediation learning information feedback from a remediation object component including a knowledge system and a software tutor comprising an artificial intelligence engine which generates individualized coaching messages that further motivate accomplishment of the goal utilizing the time based model to control a business simulation of information.

2. A method for creating a business simulation utilizing a rule-based expert system with a spreadsheet object component to provide a goal based educational learning experience as recited in claim 1, including the step of presenting an interactive session and querying a user for analysis of the interactive session including a decision.

3. A method for creating a business simulation utilizing a rule-based expert system with a spreadsheet object component to provide a goal based educational learning experience as recited in claim 1, including the step of altering the business simulation based on a user's decision to further refine the accomplishment of the goal.

4. A method for creating a business simulation utilizing a rule-based expert system with a spreadsheet object component to provide a goal based educational learning experience as recited in claim 1, including the step of advancing time as the business simulation proceeds.

5. A method for creating a business simulation utilizing a rule-based expert system with a spreadsheet object component to provide a goal based educational learning experience as recited in claim 1, including the step of presenting a new presentation and querying a user after the time is advanced.

6. A method for creating a business simulation utilizing a rule-based expert system with a spreadsheet object component to provide a goal based educational learning experience as recited in claim 1, including the step of simulating the management of resources utilizing the business simulation.

7. A method for creating a business simulation utilizing a rule-based expert system with a spreadsheet object component to provide a goal based educational learning experience as recited in claim 1, including the step of adjusting the feedback based on time.

8. A method for creating a business simulation utilizing a rule-based expert system with a spreadsheet object component to provide a goal based educational learning experience as recited in claim 1, including the step of passing information from the business simulation to an expert system to analyze the information and formulate feedback utilizing time as a variable for analysis.

9. A method for creating a business simulation utilizing a rule-based expert system with a spreadsheet object component to provide a goal based educational learning experience as recited in claim 1, including the step of synchronizing time.

10. An apparatus that creates a business simulation utilizing a rule-based expert system with a spreadsheet object component to provide a goal based educational environment, the apparatus comprising:

(a) a processor;

(b) a keyboard under the control of the processor for inputting information into the system;

(c) a display under the control of the processor;

(d) a memory that stores information in the spreadsheet object component of the rule based expert system to integrate goal-based learning information in a structured, dynamic business simulation designed by a profiling component to motivate accomplishment of the goal;

(e) logic that utilizes the information in the spreadsheet object component of the rule based expert system to integrate goal-based learning information in a structured, dynamic business simulation designed by a profiling component to motivate accomplishment of the goal;

(f) logic that synchronizes events in the business simulation utilizing a time based model for use in the business simulation; and (g) logic that monitors answers to questions posed to evaluate progress toward the goal utilizing the spreadsheet object component of the rule-based expert system and provides goal-based, remediation learning information feedback from a remediation object component including a knowledge system and a software tutor comprising an artificial intelligence engine which generates individualized coaching messages that further motivates accomplishment of the goal utilizing the time based model to control the business simulation.

11. A computer program embodied on a computer-readable medium that creates a business simulation utilizing a rule-based expert system with a spreadsheet object component that includes data and calculations required for the simulation and communication of information to provide a goal based educational environment, comprising (a) a code segment that utilizes information in the spreadsheet object component of the rule-based expert system to integrate goal based learning information in a structured, dynamic business simulation designed by a profiling component to motivate accomplishment of the goal for use in the business simulation;

(b) a code segment that synchronizes events utilizing a time based model; and (c) a code segment that monitors answers to questions posed to evaluate progress toward the goal utilizing the spreadsheet object component of the rule-based expert system and provides goal based, remediation learning information feedback from a remediation object component including a knowledge system and a software tutor comprising an artificial intelligence engine which generates individualized coaching messages that further motivate accomplishment of the goal utilizing the time based model to control the business simulation.

12. A computer program embodied on a computer-readable medium as recited in claim 11, including a code segment that presents an interactive session and queries a user for analysis of the interactive session including a decision.

13. A computer program embodied on a computer-readable medium as recited in claim 11, including a code segment that alters the business simulation based upon a user's decision to further refine the accomplishment of the goal.

14. A computer program embodied on a computer-readable medium as recited in claim 11, including a code segment that advances time as the business simulation advances.

15. A computer program embodied on a computer-readable medium as recited in claim 11, including a code segment that presents a new business simulation and queries a user for a new decision after an event.

16. A computer program embodied on a computer-readable medium as recited in claim 11, including a code segment that simulates the management of resources utilizing the business simulation.

17. A computer program embodied on a computer-readable medium as recited in claim 11, including a code segment that adjusts feedback based on time.

18. A computer program embodied on a computer-readable medium as recited in claim 11, including a code segment that passes information from the business simulation to an expert system to analyze the information and formulates feedback utilizing time as a variable for analysis.

19. A computer program embodied on a computer-readable medium as recited in claim 11, including a code segment that synchronizes the time.

* * * * *